US012629863B2

(12) United States Patent
Janowski

(10) Patent No.: US 12,629,863 B2
(45) Date of Patent: May 19, 2026

(54) MULTI-PURPOSE TOOLS AND METHODS OF USE

(71) Applicant: Brian Patrick Janowski, Marquette, MI (US)

(72) Inventor: Brian Patrick Janowski, Marquette, MI (US)

( * ) Notice: Subject to any disclaimer, the term of this patent is extended or adjusted under 35 U.S.C. 154(b) by 4 days.

(21) Appl. No.: 18/380,165

(22) Filed: Oct. 14, 2023

(65) Prior Publication Data

US 2025/0121529 A1 Apr. 17, 2025

Related U.S. Application Data

(63) Continuation of application No. 17/405,978, filed on Aug. 18, 2021, now Pat. No. 11,787,080, which is a continuation-in-part of application No. 16/746,873, filed on Jan. 19, 2020, now Pat. No. 11,628,591, which is a continuation-in-part of application No. 16/049,710, filed on Jul. 30, 2018, now Pat. No. 11,141,876.

(60) Provisional application No. 63/139,228, filed on Jan. 19, 2021, provisional application No. 63/080,302, filed on Sep. 18, 2020, provisional application No. 63/067,272, filed on Aug. 18, 2020, provisional application No. 62/794,622, filed on Jan. 20, 2019.

(51) Int. Cl.
*B27L 7/06* (2006.01)

(52) U.S. Cl.
CPC .................................... *B27L 7/06* (2013.01)

(58) Field of Classification Search
CPC ..... B25H 5/00; B27L 7/06; B66F 3/24; B66F 13/00
See application file for complete search history.

(56) References Cited

U.S. PATENT DOCUMENTS

| | | | |
|---|---|---|---|
| 1,830,769 | A | 11/1931 | Edgar |
| 2,203,632 | A | 6/1940 | Munson et al. |

(Continued)

FOREIGN PATENT DOCUMENTS

| | | | |
|---|---|---|---|
| DE | 3100044 A1 | 2/1982 |
| DE | 102008016470 A1 | 10/2009 |
| WO | 2012069801 A1 | 5/2012 |

OTHER PUBLICATIONS

Kindling Cracker King. From internet at least as early as Jul. 28, 2017.

(Continued)

*Primary Examiner* — Seahee Hong
(74) *Attorney, Agent, or Firm* — Device Patent LLC

(57) ABSTRACT

Multi-purpose and single function tools for splitting wood, material handling, and a variety of other uses are disclosed for projects around home, at a campground, or at a construction site. The tools are anchored entirely by the hitch receiver of a vehicle, the frame of a trailer, or by various forms of jack stands. The vehicle and jack stand supported wood splitters comprise a blade portion and a fixation portion extending from the blade portion. The blade portion comprises a generally upward facing cut edge. In some forms, the splitter is in the form of a jack stand which can be converted for use as a multi-purpose tool for material handling and other useful functions. Methods of use of the tools are disclosed as well as methods of converting the tool from one mode to another.

20 Claims, 40 Drawing Sheets

(56) References Cited

U.S. PATENT DOCUMENTS

| | | | | |
|---|---|---|---|---|
| 2,646,955 | A | 7/1953 | Russell | |
| 2,851,072 | A | 9/1958 | Gerjets et al. | |
| 3,026,865 | A | 3/1962 | Kazuichi | |
| 3,100,481 | A | 8/1963 | Stefanick | |
| 3,242,955 | A | 3/1966 | Hellstrom | |
| 3,802,473 | A | 4/1974 | Carr | |
| 3,886,927 | A | 6/1975 | Chattin | |
| 3,924,501 | A | 12/1975 | Cohen et al. | |
| 4,239,198 | A | 12/1980 | Trupp | |
| 4,244,407 | A | 1/1981 | McMullin | |
| 4,315,534 | A | 2/1982 | Blackstone | |
| 4,341,246 | A | 7/1982 | Salladay | |
| 4,362,194 | A | 12/1982 | Lawson | |
| 4,378,037 | A | 3/1983 | Conn | |
| 4,411,298 | A | 10/1983 | Ellingsen et al. | |
| 4,431,040 | A | 2/1984 | Friedrich et al. | |
| 4,446,898 | A | 5/1984 | Manteufel | |
| 4,453,580 | A | 6/1984 | Patten | |
| 4,782,867 | A | 11/1988 | Forsyth | |
| 4,782,868 | A | 11/1988 | Coller et al. | |
| 4,782,870 | A | 11/1988 | Duerr | |
| 4,800,937 | A | 1/1989 | Mangus | |
| 4,811,924 | A * | 3/1989 | Walters | B66F 13/00 248/352 |
| 4,945,960 | A | 8/1990 | McCauley | |
| 5,245,902 | A | 9/1993 | Pereira | |
| 5,284,193 | A | 2/1994 | Mires et al. | |
| 5,520,105 | A | 5/1996 | Healy | |
| 5,575,319 | A | 11/1996 | Chick | |
| 6,112,784 | A | 9/2000 | Lough | |
| 6,390,162 | B1 | 5/2002 | Sahlem | |
| 6,453,958 | B1 | 9/2002 | Slavich | |
| 6,546,976 | B1 * | 4/2003 | Hill | B27L 7/00 144/195.1 |
| 6,568,577 | B2 | 5/2003 | Baird et al. | |
| 6,601,746 | B2 | 8/2003 | Buckley et al. | |
| 6,604,562 | B1 * | 8/2003 | Smith | B66F 3/08 144/34.1 |
| 6,763,864 | B2 | 7/2004 | Setlack et al. | |
| 6,886,551 | B2 | 5/2005 | Scherer et al. | |
| 7,096,901 | B2 | 8/2006 | Brazzola | |
| 7,107,982 | B1 | 9/2006 | Lechner | |
| 7,243,826 | B2 | 7/2007 | Darst | |
| 7,556,072 | B2 * | 7/2009 | Koch, Jr. | B27L 7/00 144/195.1 |
| 7,587,968 | B1 | 9/2009 | Roberts | |
| 7,756,072 | B1 | 7/2010 | Fenner et al. | |
| 7,913,726 | B1 | 3/2011 | Honnell | |
| 8,668,000 | B2 | 3/2014 | Carrillo | |
| 8,689,778 | B1 | 4/2014 | Flores | |
| 9,103,493 | B2 * | 8/2015 | Klinzmann | F16M 11/28 |
| 10,124,507 | B2 | 11/2018 | Zhu et al. | |
| 11,124,398 | B2 * | 9/2021 | Moore | B66F 5/04 |
| 2008/0073361 | A1 | 3/2008 | Brouard | |
| 2009/0229709 | A1 | 9/2009 | Babcock | |
| 2016/0107330 | A1 * | 4/2016 | Hutchinson | B27L 7/06 225/81 |
| 2016/0288362 | A1 | 10/2016 | Campana | |
| 2019/0292029 | A1 * | 9/2019 | Moore | B66F 3/42 |

OTHER PUBLICATIONS

Mr. Quicksplit. Internet sourced at least as early as Jul. 28, 2017.

* cited by examiner

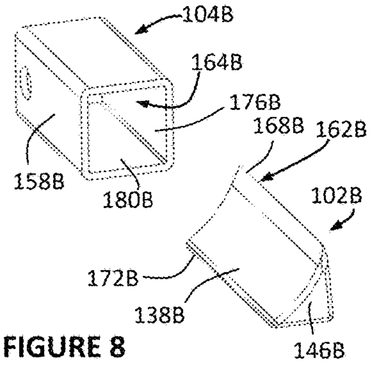
FIGURE 8
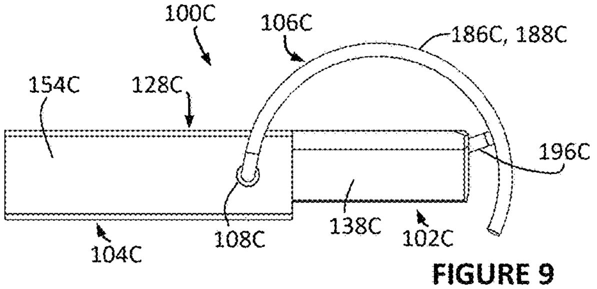
FIGURE 9
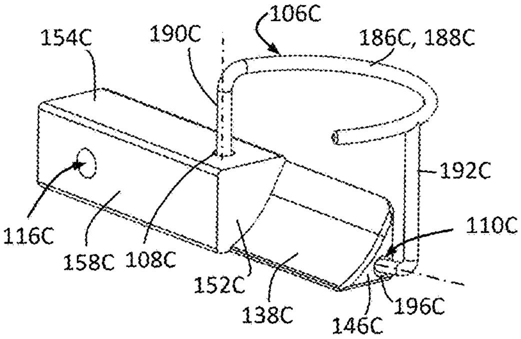
FIGURE 10A
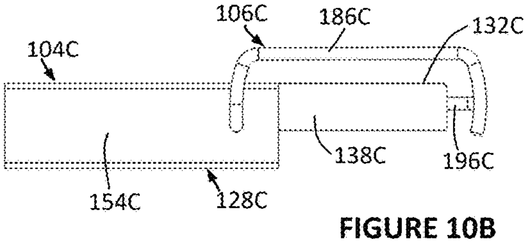
FIGURE 10B
FIGURE 10C
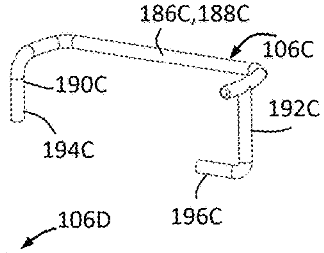
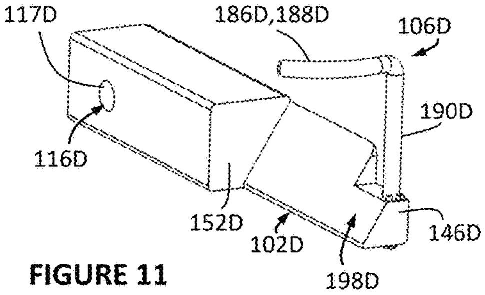
FIGURE 11
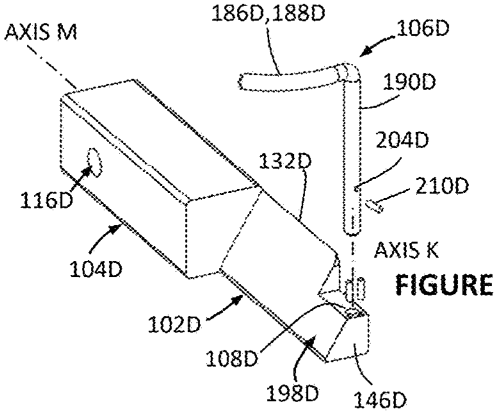
FIGURE 13
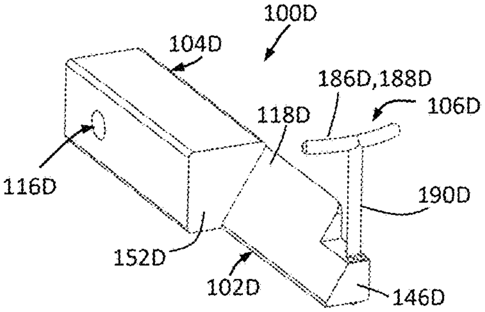
FIGURE 14
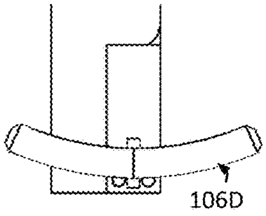
FIGURE 15
FIGURE 12
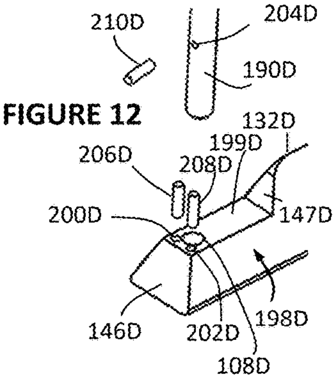

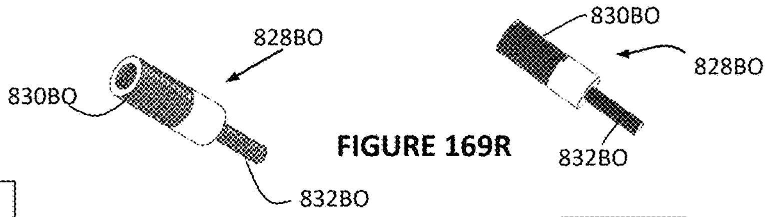
FIGURE 169R
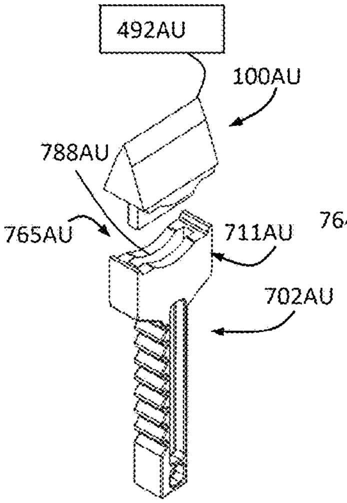
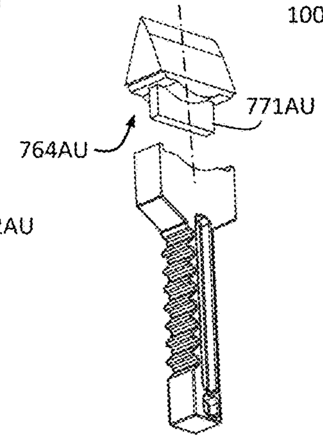
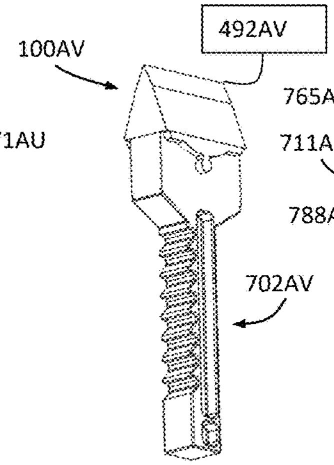
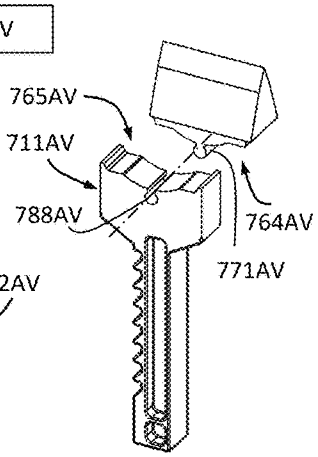
FIGURE 170
FIGURE 171
FIGURE 172
FIGURE 173
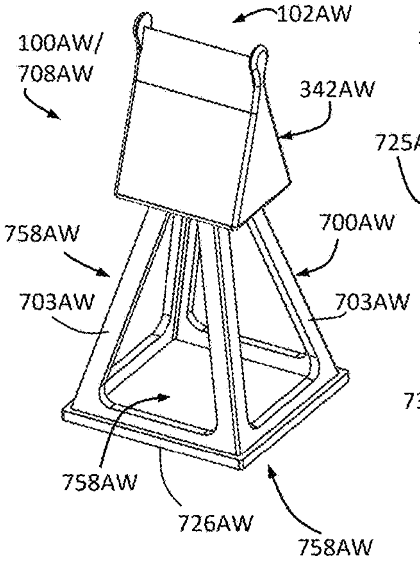
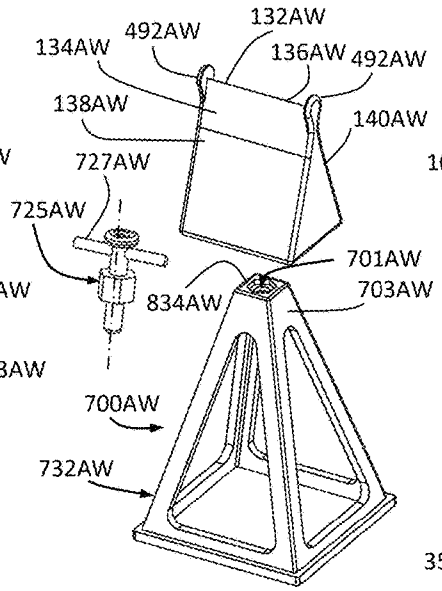
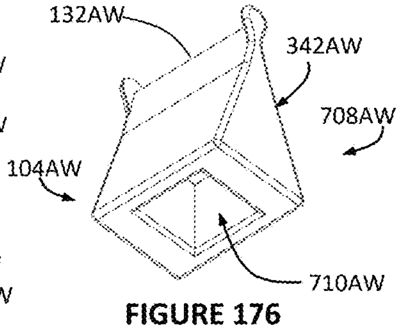
FIGURE 176
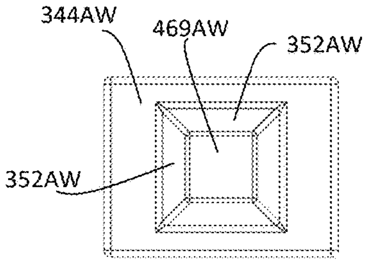
FIGURE 174
FIGURE 175
FIGURE 177

MULTI-PURPOSE TOOLS AND METHODS OF USE

This application is U.S. Continuation Patent application claiming benefit to U.S. Continuation-In-Part patent application Ser. No. 17/405,978 filed Aug. 18, 2021 which claims benefit of Provisional Patent Application No. 63/139,228 filed Jan. 19, 2021, and benefit of Provisional Patent Application No. 63/080,302 filed Sep. 18, 2020, and benefit of Provisional Patent Application No. 63/067,272 filed Aug. 18, 2020. This application also claims priority to U.S. Continuation-In-Part patent application Ser. No. 16/746,873 filed Jan. 19, 2020 which claims benefit of Provisional Patent Application No. 62/794,622 filed Jan. 20, 2019. This application also claims priority to U.S. Non-Provisional patent application Ser. No. 16/049,710 filed Jul. 30, 2018. The entire disclosures of these applications are hereby incorporated by reference and relied upon.

TECHNICAL FIELD

The invention relates generally to multi-purpose tools and their methods of use. More particularly, this application relates to apparatus and methods for splitting wood, especially to vehicle mounted and ground supported apparatuses and methods for splitting wood. The application also relates to apparatuses and methods for material handling and utility accessory handling. In some embodiments, various types of jackstands are used as the basis for multi-purpose tools.

BACKGROUND

Splitting wood is a common task performed by people around the world. The split wood is used typically in fires for heating of building structures, saunas, campfires, and for the enjoyment of fireplaces. Splitting wood, however, can be a difficult task and therefore there has been an abundance of prior art directed to machines of various sizes for this purpose. However, even the simplest of these devices are too large and complex and lead to poor body mechanics. The standard for splitting wood into kindling is the axe, however the axe has proved to be dangerous since the method typically involves swinging an axe blade toward a user's opposing hand stabilizing the log.

The abundance of tools a person may collect to perform various tasks can become overwhelming eventually cluttering the garage and other work areas.

What is needed are log splitting devices and methods that are significantly safer than a hand axe, yet simple, effective, inexpensive, and highly portable. What is also needed are tools that take up less space and if possible, tools that can be utilized for more than one purpose thereby occupying less space.

SUMMARY

Disclosed herein are tools and methods of use for the splitting of wood such as logs into smaller pieces such as kindling and tools for material handling. In a some preferred forms, a splitting tool is mounted within a trailer hitch receiver of a vehicle. The trailer hitch receiver provides substantial support used by the apparatus to maintain its position during a wood splitting process. In other forms, the article of invention is mounted to the frame or bumper of a trailer such as a travel trailer. Like the trailer hitch receiver, the trailer frame or bumper provides substantial support used by the apparatus to maintain its position during a wood splitting process. In some forms, a splitting tool is coupled to a trailer hitch ball. Most of the devices described herein may be used to split wood in any form but may be used to split other materials as well and may alternately be termed a splitting tool. In some forms, a splitting tool and other accessories such as for lighting and material handling utilize a jack stand base or a jack stand arm for support. In other embodiments, the material handling function of the multi-functional tools extends to securing skis during waxing, holding a sign, propping a paint can, holding a target, or backdrop along with other uses. It should be noted that the terms 'log' and 'wood' are used generically to represent all wood forms including wood that has been exposed to some form of processing.

In one form, a wood splitter comprises a fixation portion and a blade portion and an optional guide portion.

In one form, a fixation portion of a wood splitter is housed within a hitch receiver that is fixed to a vehicle.

In one form, a wood splitter is supported entirely by a hitch receiver of a vehicle.

In one form, a wood splitter in an operable configuration is supported entirely by the hitch receiver of a vehicle and is contained entirely within a defined space from an origin centered at the receiver entry of the hitch receiver whereas the defined space is between +5 inches and −2 inches along an axis OY, +/−3 inches along an axis OX, and +8 inches and −7 inches along axis OZ (−OZ extends into the hitch receiver). Alternatively, a wood splitter in an operable configuration is supported entirely by the hitch receiver of a vehicle and is contained entirely within a defined space from an origin centered at the receiver entry of the hitch receiver whereas the defined space is between +7 inches and −4 inches along an axis OY, +/−5 inches along an axis OX, and +10 inches and −9 inches along axis OZ (−OZ extends into hitch receiver).

In one form, a wood splitter comprises a fixation bore on the fixation portion for receiving a hitch pin.

In one form, a wood splitter comprises a primary blade and an optional secondary blade.

In one form, the primary blade has a cut edge that is aligned substantially parallel to the elongate axis of the hitch receiver.

In one form, a primary blade is at an oblique angle to the secondary blade such as 90 degrees.

In one form, a wood splitter is manufactured by one or more of machining and casting and forging.

In one form, one end of a log is placed on top of a blade portion of a wood splitter extending from a hitch receiver of a vehicle wherein the log is impacted on an opposing end thereby splitting the log when driven over a primary blade.

In one form, in one form a blade portion comprises a deflector portion below at least one of a primary blade and a secondary blade to create wedging forces during splitting.

In one form, a collector is positioned below a wood splitter to capture split wood pieces.

In one form, a fixation portion is sized and shaped to be received in one or more of a standard 1.25 inch, 2 inch, 2.5 inch, and 3 inch hitch receiver of a vehicle but may be custom sized. Typically, the hitch receiver opening has a square extended profile.

In one form, a fixation portion is received in a splitter sleeve fixed to one or more of a trailer frame or bumper.

In one form, a fixation portion and a blade portion are formed from a body portion.

In one form, a fixation portion is formed from one or more of a solid bar and a tube and a plate.

In one form, one or more of a primary blade and optional secondary blade has a cut edge which may be sharpened.

In one form, a primary blade has a primary edge face and a secondary edge face that is vertical or sloped.

In one form, the primary edge and secondary edge face transition to respective primary and secondary deflector faces.

In one form, a primary edge and secondary edge face generally upward.

In one form, a cut edge is centered between sloping deflector faces of a blade portion.

In one form, a cut edge is offset between sloping deflector faces.

In one form, a fixation portion and other aspects of a body portion are defined by one or more of; a top face, a bottom face, a first side face, a second side face, proximal end face and a distal end face.

In one form a fixation face defines a fixation bore having a diameter for housing a hitch pin.

In one form, a blade portion comprises a blade extension for seating within a fixation recess.

In one form, a blade extension has one or more of a first side extension wall, a second side extension wall, an upper extension wall, and a lower extension wall.

In one form, fixation recess comprises one or more of: an upper recess wall, a lower recess wall, a first side recess wall, and a second side recess wall.

In one form, a fixation portion comprises a proximal tube wall and a distal tube wall terminating the ends.

In one form, a wood splitter is part of a dual-function hitch ball-wood splitter.

In one form, a ball mount is inserted in a hitch receiver with a hitch ball facing superiorly for towing functions, and alternately the ball mount is flipped with a wood splitter facing superiorly for wood splitting functions.

In one form, the blade portion is removable in a dual-function hitch ball-wood splitter.

In one form, a wood splitter comprises a grip band seated in a circumferential inset in a fixation portion of the wood splitter.

In one form, a wood splitter comprises a guide portion.

In one form, a guide portion comprises a guide wall with guide surface thereon.

In one form, a guide portion comprises one or more of a first guide leg and a second guide leg.

In one form, a first guide leg transitions into a first guide foot.

In one form, a second guide leg transitions into a second guide foot.

In one form, a guide wall has a portion that is generally horizontal.

In one form, a guide surface is generally superior, parallel, and spaced from a cut edge.

In one form, a guide portion has a deflectable insertion.

In one form, a first guide foot is seated in a first guide receiver.

In one form, a second guide foot is seated in a second guide receiver.

In one form, a guide portion is pivotable.

In one form, the motion of a guide portion is limited by one or more of a first lock pin, a second lock pin, and a third lock pin.

In one form, a guide portion is one of L shaped and T shaped.

In one form, a guide portion comprises a pivot joint.

In one form, a body portion is formed generally square and elongate.

In one form, various components of a wood splitter are one or more of fastened and welded.

In one form, a wood splitter comprises a bottle opener.

In one form, a cut edge is one or more of linear, concave, and convex.

In one form, a blade portion comprises a removable edge portion.

In one form, a blade portion comprises a blade interlock for removing a removable edge portion.

In one form, a wood splitter comprises an operational configuration and a storage configuration.

In one form, a removable edge portion is removed from a blade portion in a storage configuration.

In one form, a guide wall is in the form of a ring wherein the ring is partially or fully enclosed and defines a guide aperture.

In one form, a wood splitter comprises a blade cover to minimize exposure to a blade portion when not in use.

In one form, a blade cover comprises one or more magnets.

In one form, a collector is positioned between a wood splitter and a ground surface.

In one form, wood pieces fall and are collected in a collector.

In one form a collector is inclined.

In one form, a blade portion is covered by a removable sleeve.

In one form, a wood splitter comprises a deflector saddle.

In one form, a wood splitter comprises a fixed or removable blade plate.

In one form, a blade plate comprises one or more blade slots.

In one form, a blade plate comprises one or more blade holes.

In one form, a cut edge is integrated into an upright wall of a tubular body portion.

In one form, a support wedge is used to provide support to a deflector plate.

In one form, a wood splitter is configured with a foldable guide that functions as a blade cover in a storage configuration.

In one form, a wood splitter comprises a deflector plate supported at an upper deflector support face.

In one form, a wood splitter comprises a blade plate secured to a second side face.

In one form, a wood splitter comprises a guide portion that is generally U-shaped.

In one form, a wood splitter comprises a joined tubular fixation portion and a blade plate.

In one form, a blade plate comprises a blade extension.

In one form, a wood splitter comprises a bottom face mounted deflector plate.

In one form, a fixation portion is secured to a vertical wall in a hitch receiver by a clamp post in combination with a tightened clamp nut.

In one form, a fixation portion is secured to a vertical wall in a hitch receiver by a clamp bolt threaded into a body portion of a wood splitter.

In one form, a wood splitter is absent a deflector face.

In one form, a deflector plate is formed as an extension of a body portion by formation of a deflector bend.

In one form, a fixation portion comprises a profile extension for adding stability.

In one form, a blade portion including deflector plate are formed from a monolithic body portion.

In one form, a blade portion comprises one or more of a first bumper and a second bumper situated on an end of the blade portion.

In one form, a wood splitter comprises an adjustable height blade portion.

In one form, a blade portion is secured to a superior end of a height strut which is removably coupled to a fixation portion.

In one form, height strut comprises a plurality of spaced height apertures.

In one form, an inferior end of a height strut comprises a ground pad.

In one form, a wood splitter comprises a fixation portion configured for capture over a hitch ball.

In one form, a wood splitter comprises a fixation portion configured for capture over a hitch ball secured to a ball mount.

In one form, a wood splitter comprises a blade housing in the form of a cylindrical tube.

In one form, a blade housing comprises a base surface at an inferior end.

In one form, the base surface is aligned with a plane.

In one form, a blade housing comprises a pair of opposed perch surfaces at a superior end.

In one form, a blade housing comprises opposed slope surfaces.

In one form, a blade portion comprises a blade plate.

In one form, a blade portion comprises a pair of opposed deflector plates.

In one form, a blade portion comprises opposed deflector plates and one or more cut edge formed monolithically.

In one form, a primary deflector face and a secondary deflector face intersect at a cut edge.

In one form, a blade plate is removable.

In one form, a wood splitter is placed over a hitch ball such that the hitch ball is confined within a ball space within a fixation portion.

In one form, the ball space extends superiorly more than 2.2 inches from an inferior end of a wood splitter.

In one form, the ball space has a lateral diameter between about 1.875 inches and 3.5 inches measured at its narrowest point.

In one form, a base surface of a wood splitter fixation portion is supported by one or more of a base pod of a ball mount and a hitch ball base.

In one form, a fixation portion of a wood splitter is captured over a reverse side of a hitch ball secured to a ball mount.

In one form, a ball mount and hitch ball serve to support a wood splitter.

In one form, a wood splitter comprises a modified hitch ball comprising a rod capture.

In one form, a wood splitter comprises a blade rod joining a fixation portion to a hitch ball.

In one form, a wood splitter is configured for use as both a hand axe and as a hitch receiver mounted wood splitter.

In one form, a hitch coupler couples an axe handle to a hitch receiver.

In one form, a hitch coupler comprises a generally square coupler outer surface sized to fit in a corresponding hitch receiver.

In one form, a hitch coupler comprises a handle cavity for occupation by an axe handle.

In one form, a wood splitter is configured for use when mounted to one or more of; a trailer frame, a trailer tongue, or the bumper of a trailer or other vehicle.

In one form, a wood splitter is rotated between an operational configuration (mode) and a storage configuration.

In one form, a wood splitter is housed within a splitter sleeve in a storage configuration.

In one form, a wood splitter is removed from a splitter sleeve in a storage configuration (mode).

In one form, a splitter sleeve is part of a bracket for mounting to a trailer frame or trailer tongue.

In one form, a fixation portion of a wood splitter comprises a stem with optional threads.

In one form, a stem of a wood splitter fixation portion is housed in a frame hole or the hole of a holed plate extending from a trailer frame or trailer tongue.

In one form, an interchangeable wood splitter is part of a kit that includes interchangeable trailer balls (hitch balls).

In one form, an interchangeable wood splitter is an accessory to an interchangeable hitch ball system.

In one form, a fixation portion of a wood splitter is configured for mounting to a structure such as a ball mount, trailer frame, bumper, or intermediate bracket attached to these structures.

In one form, a fixation portion comprises a female cavity that is threaded to accept a blade lock bolt.

In one form, a fixation portion comprises a threaded stem for capture by a hitch ball nut.

In one form, a fixation portion comprises an unthreaded stem whereby the wood splitter utilizes gravity to remain fixed to an anchor.

In one form, a guide portion is generally U-shaped.

In one form, a guide portion folds down.

In one form, a wood splitter comprises one or more of: an upper window, a lower window, an upper chamber, and a lower chamber.

In one form, a wood splitter comprises a ball space sized and shaped for occupation by a hitch ball in a captured ball configuration.

In one form, a fixation portion of a wood splitter is configured to secure by fastener or post in a posted configuration and by positioning over a hitch ball in a captured ball configuration.

In one form, one or more flutes may extend into a fixation portion.

In one form, a log boss may be located at one end of a cut edge for quick positioning of a log.

In one form, a blade cover is provided for covering and uncovering a cut edge of a blade portion.

In one form, a blade cover hangs from a guide portion in an operational mode.

In one form, a blade cover is flipped up in an operational mode.

In one form, a wood splitter comprises a fixation portion in the form of one of a square tube and square bar with a blade portion having a blade extension fixed to an inside or outside vertical surface of the tube or bar.

In one form, a wood splitter comprises a guide surface of a guide portion that is adjustable in distance from a cut edge of a blade portion.

In one form, a receiver block extends from a body portion of a hitch splitter for housing a first guide receiver.

In one form, a wood splitter has a guide portion that is switchable between at least two of the following configurations (modes): an open mode, a storage mode, an operational mode, an and an absent mode.

In one form, a guide portion comprises a faceted collar.

In one form, a faceted collar interfaces with a block face to determine position of a guide portion.

In one form, a guide portion is in the form of a turret.

In one form, a guide portion has a generally circular guide wall with a generally vertical first guide leg extending from it. An L-shaped prong extends between the first guide leg and another portion of the guide wall.

In one form, a guide portion is vertically adjustable above the cut edge.

In one form, a body portion comprises one or more of: a fixation cavity, a primary blade cavity, and a secondary blade cavity.

In one form, a wood splitter comprises a tubular fixation portion fixed to a casted or machined blade portion.

In one form, a wood splitter comprises a solid bar fixation portion fixed to a casted or machined blade portion.

In one form, a method for splitting wood comprises the step of obtaining a wood splitter having a blade portion and a fixation portion extending from the blade portion and securing the fixation portion in a hitch receiver of a vehicle.

In one form, a method for splitting wood comprises the step of obtaining a wood splitter having an internal ball space and placing it over a hitch ball such that the hitch ball occupies the ball space.

In one form, a jack stand is converted into a wood splitter utilizing a cover blade supported by a portion of a jack stand lift arm captured therein.

In one form, a jack stand is converted into a wood splitter whereby the jack stand lift arm is substituted with a jack stand blade arm.

In one form, a wood splitter comprises a ball window for laterally passing a hitch ball in and out of a ball space.

In one form, a wood splitter comprises a ball window at an inferior end of a splitter for passing a hitch ball in and out of a ball space from an inferior end.

In one form, a wood splitter comprises a neck collar for laterally passing a hitch ball in and out of a ball space.

In one form, the neck collar secures the wood splitter upright on a European style hitch ball and is held with a neck pin.

In one form, a wood splitter comprises a blade portion with upright cut edge extending from a neck and torso.

In one form, a wood splitter comprises a blade cap.

In one form, a jack stand is modified for use as a multi-function jack stand.

In one form, a multi-function jack stand comprises secondary support.

In one form, the secondary support supports an elongate support member.

In one form, the secondary support supports an accessory.

In one form, the secondary support is integrated in the lift arm of a jack stand.

In one form, the secondary support is integrated in the jack stand base.

In one form, a multi-function jack stand supports a blade.

In one form, a multi-function jack stand supports a light.

In one form, a multi-function jack stand supports a screen.

In one form, a multi-function jack stand supports a camera mount.

In one form, a multi-function jack stand supports material support pod.

In one form, a multi-function jack stand supports a paint can.

In one form, a multi-function jack stand supports a hanger.

In one form, a multi-function jack stand supports a material support assembly.

In one form, a multi-function jack stand is operable for staking to the ground.

In one form, a multi-function jack stand supports a ski wax strut.

In one form, a multi-function jack stand supports a flag or sign.

In one form, a multi-function jack stand supports a target.

BRIEF DESCRIPTION OF THE SEVERAL VIEWS OF THE DRAWINGS

These and other features and advantages of the present invention will become more readily appreciated when considered in connection with the following detailed description and appended drawings, wherein each Figure is according to one or more embodiments shown and described herein, and wherein:

FIG. 8 depicts a top perspective view of a wood splitter having a substantially solid blade portion secured in a substantially tubular fixation portion for mounting within a hitch receiver of a vehicle;

FIG. 9 depicts a top view of a wood splitter having a guard portion seated within guard receivers and wherein the wood splitter is configured for mounting within a hitch receiver of a vehicle;

FIG. 10A depicts a top perspective view of the wood splitter illustrated in FIG. 9;

FIG. 10B depicts a top view of a wood splitter having a guide portion seated within guide receivers similar to FIG. 9. The guide portion includes a generally linear wall portion that is substantially parallel a cut edge of a blade portion. The wood splitter is configured for mounting within a hitch receiver of a vehicle;

FIG. 10C depicts a top perspective view of the guide portion of FIG. 10A;

FIG. 11 depicts a top perspective view of a wood splitter having a guard portion seated within a guard receiver and wherein the wood splitter is configured for mounting within a hitch receiver of a vehicle;

FIG. 12 depicts an exploded top perspective view of the wood splitter of FIG. 11;

FIG. 13 depicts a partial exploded top perspective view of the wood splitter of FIG. 12;

FIG. 14 depicts a top perspective view of a wood splitter having a guard portion seated within a guard receiver and wherein the wood splitter is configured for mounting within a hitch receiver of a vehicle;

FIG. 15 depicts a partial top view of a wood splitter having a guard portion seated within a guard receiver and wherein the wood splitter is configured for mounting within a hitch receiver of a vehicle;

FIG. 93G depicts a perspective view of a wood splitter fastened to an extended length ball mount tongue;

FIG. 93H depicts a perspective view of a wood splitter with ball space and secondary blade;

FIG. 93J depicts a perspective view of a wood splitter with ball space with alternative secondary blade;

FIG. 93K depicts a perspective view of an alternative wood splitter with internal ball space;

FIG. 93L depicts a perspective view of a wood splitter with ball space and several optional features;

FIG. 93M depicts a perspective view illustrating assembly of the wood splitter of FIG. 93L over a hitch ball base;

FIG. 93N depicts a perspective view illustrating an operable configuration with the wood splitter of FIG. 93L seated on a hitch ball.

FIG. 93P depicts a perspective view illustrating a wood splitter having one or more base tabs extending from a base surface of a fixation portion;

FIG. 93Q depicts a perspective view illustrating various features that may be included in a wood splitter;

FIG. 93R depicts a perspective view of a wood splitter with ball space having a pivoting guide portion folded down in a storage configuration;

FIG. 93S depicts a perspective view of the wood splitter of FIG. 93R having a fixation portion with ball space with pivoting guide portion locked upright in an operational configuration;

FIG. 93T depicts a perspective view of the wood splitter of FIG. 93R with guide portion removed illustrating a first guide receiver and guide boss;

Figure 94A:
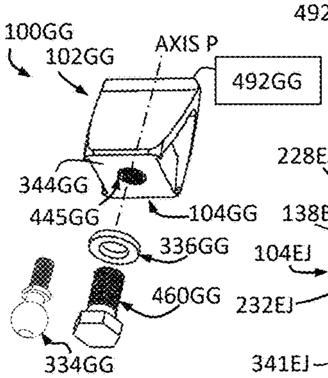
Figure 94B:
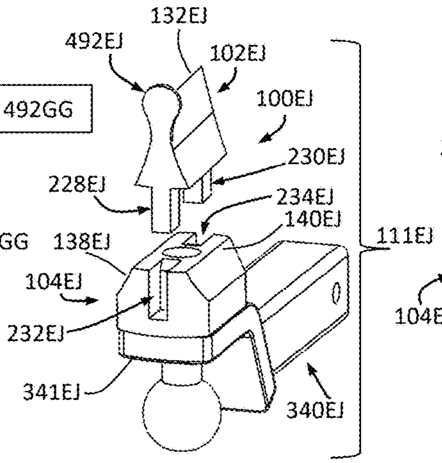
Figure 94C:
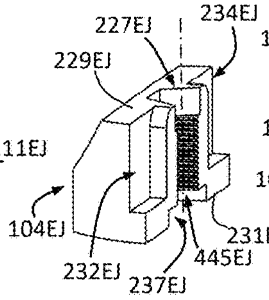
Figure 94D:
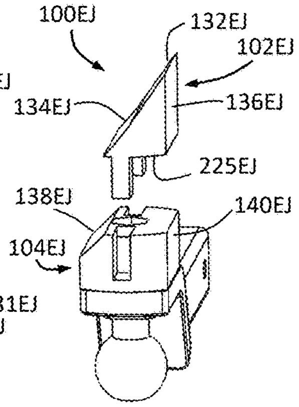
Figure 95:
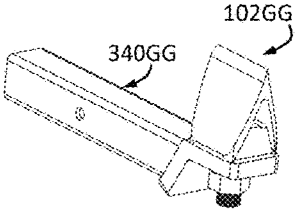
Figure 96:
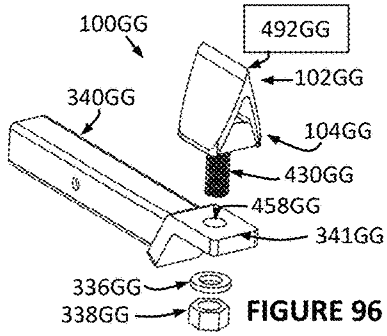
Figure 97:
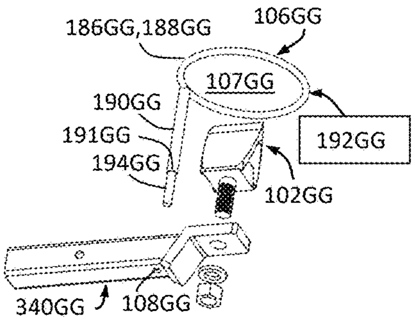
Figure 98:
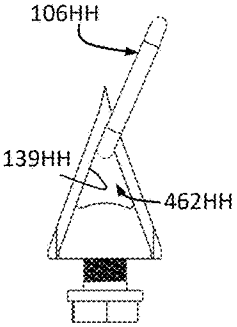
Figure 99:
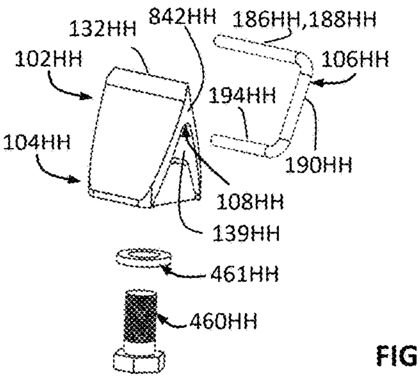
Figure 100:
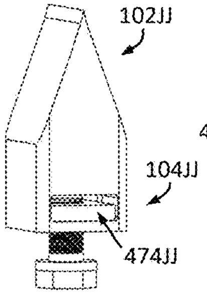
Figure 101:
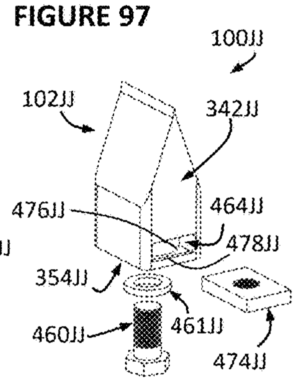
Figure 102:
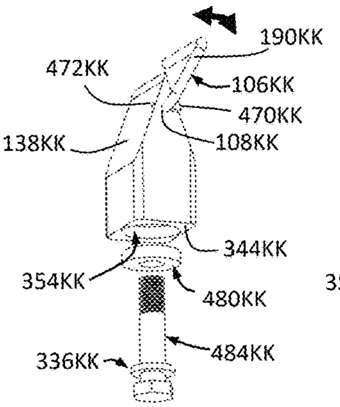
Figure 103:
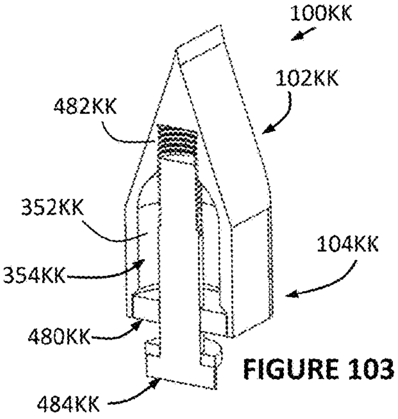
Figure 104:
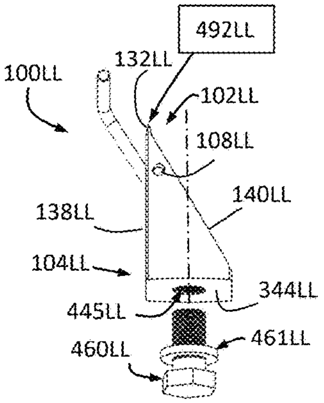
Figure 105:
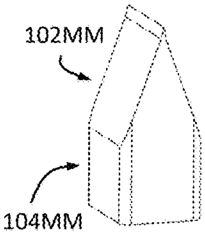
Figure 106:
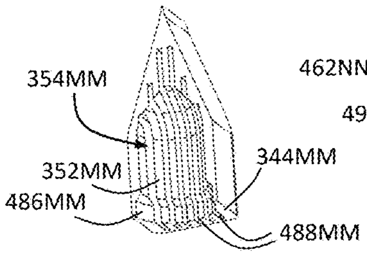
Figure 107:
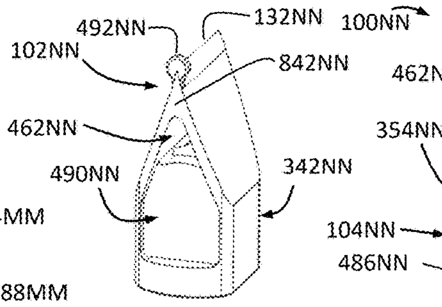
Figure 108:
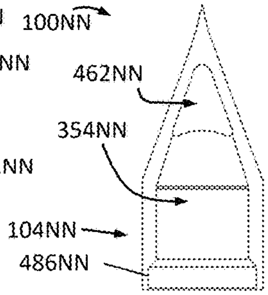
Figure 109:
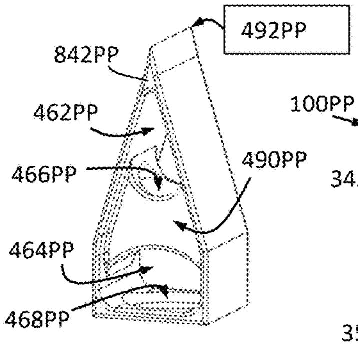
Figure 110:
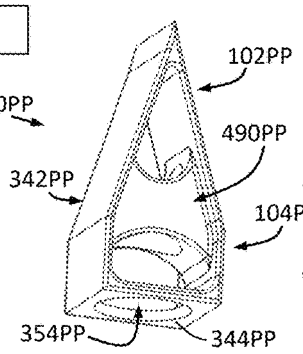
Figure 111:
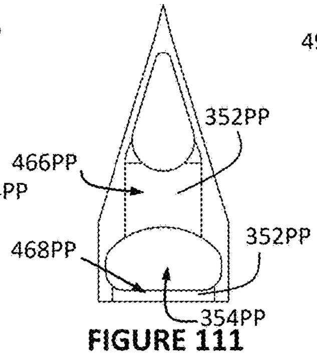
Figure 112:
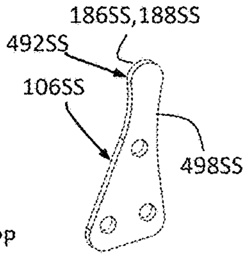
Figure 113:
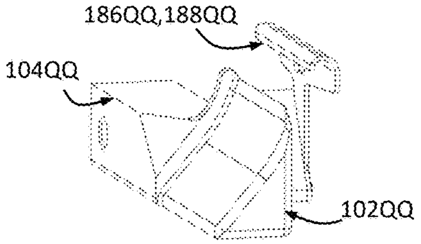
Figure 114:
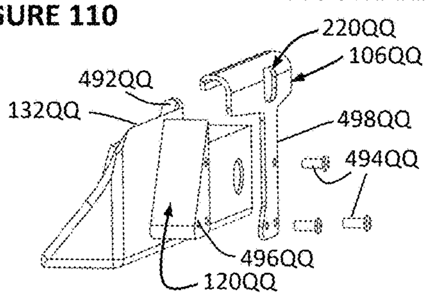
Figure 115:
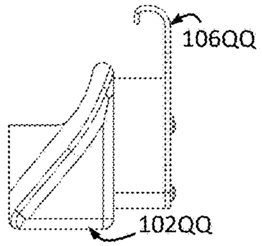
Figure 116:
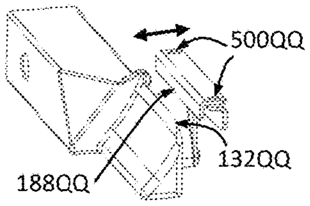
Figure 117:
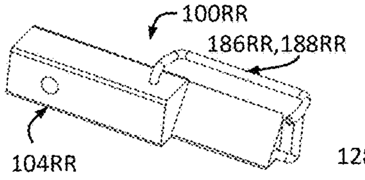
Figure 118:
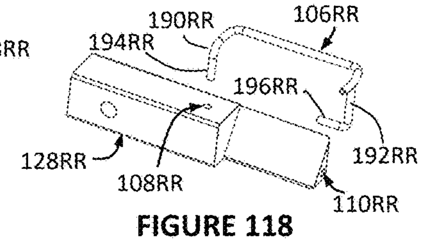
Figure 119:
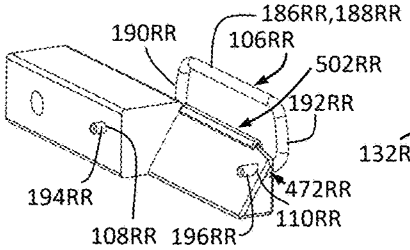
Figure 120:
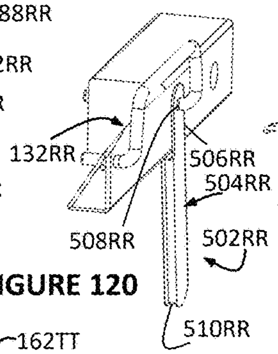
Figure 121:
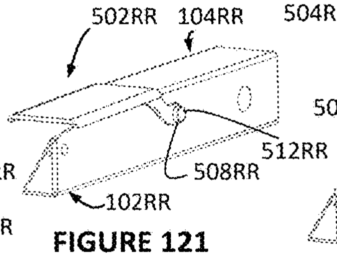
Figure 122:
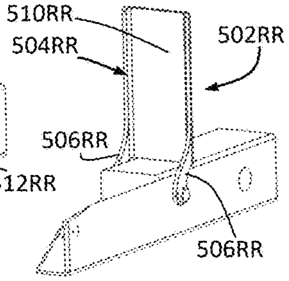
Figure 123:
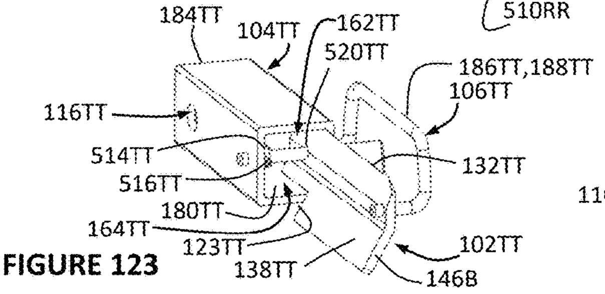
Figure 124:
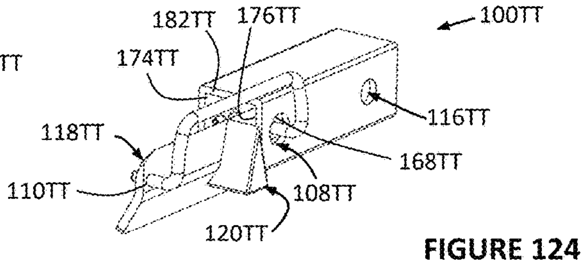
Figure 125:
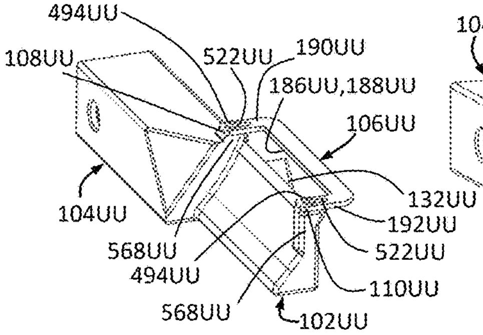
Figure 126:
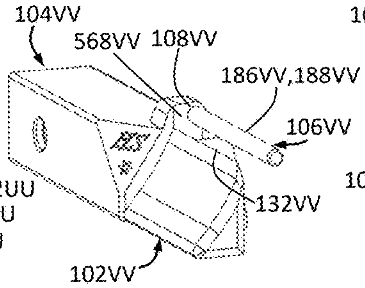
Figure 127:
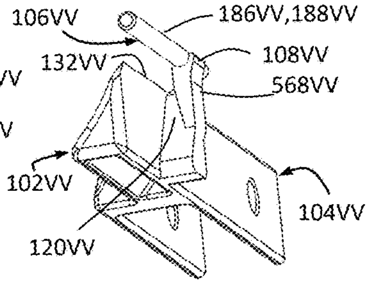
Figure 128:
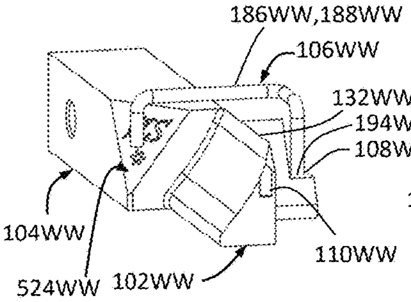
Figure 129:
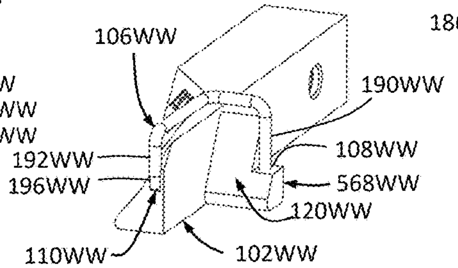
Figure 130:
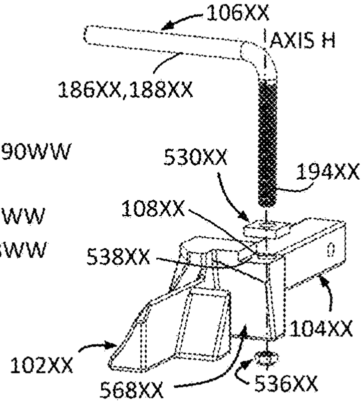
Figure 131:
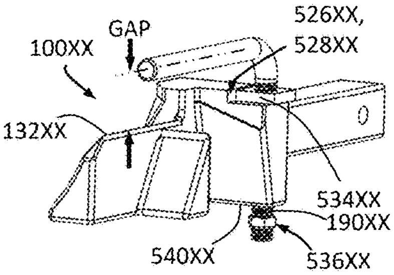
Figure 132:
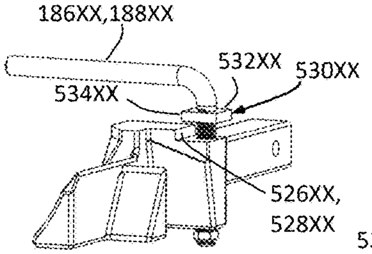
Figure 133:
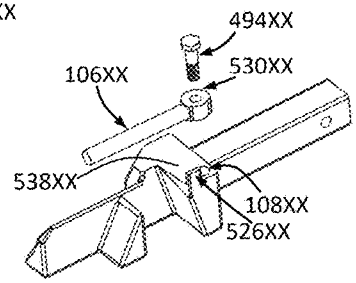
Figure 134:
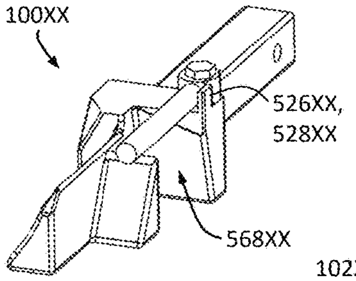
Figure 135:
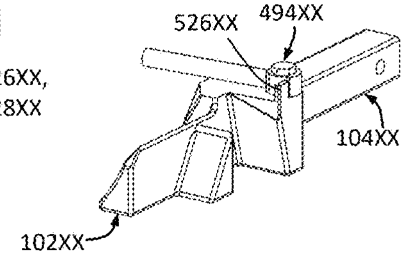
Figure 136:
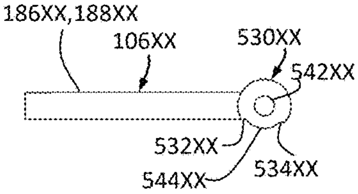
Figure 137:
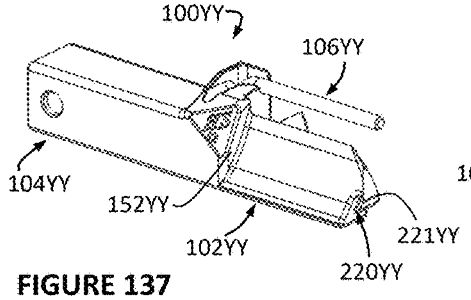
Figure 138:
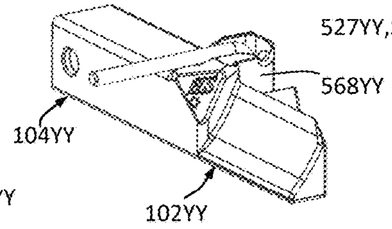
Figure 139:
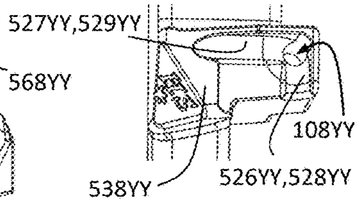
Figure 140:
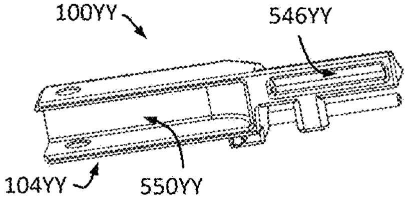
Figure 141:
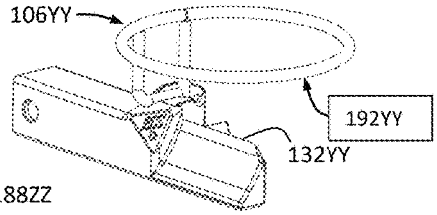
Figure 142:
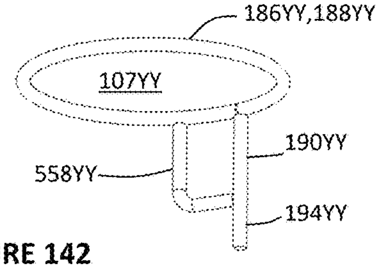
Figure 144:
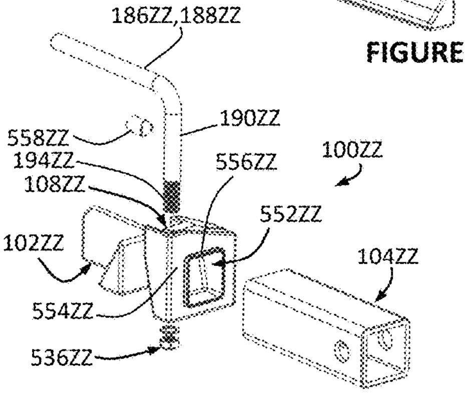
Figure 143:
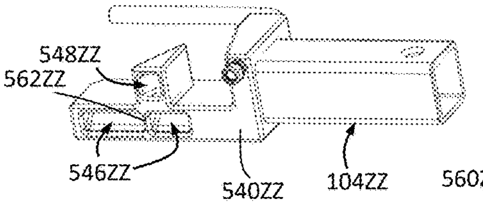
Figure 146:
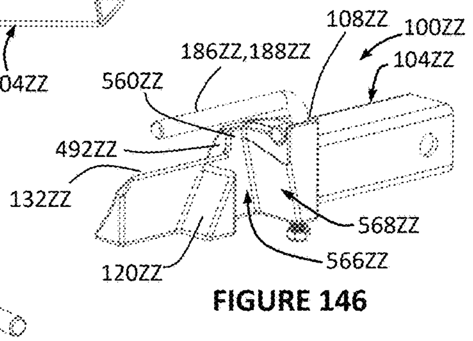
Figure 147:
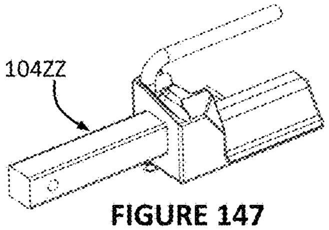
Figure 145:
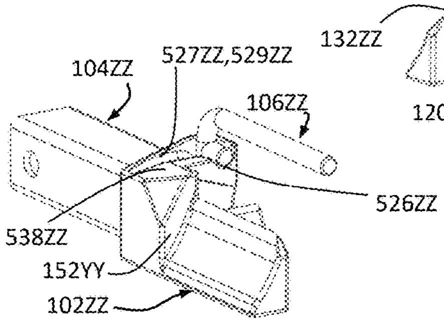
Figure 148:
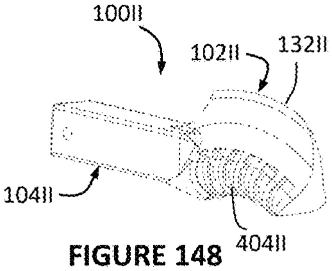
Figure 149:
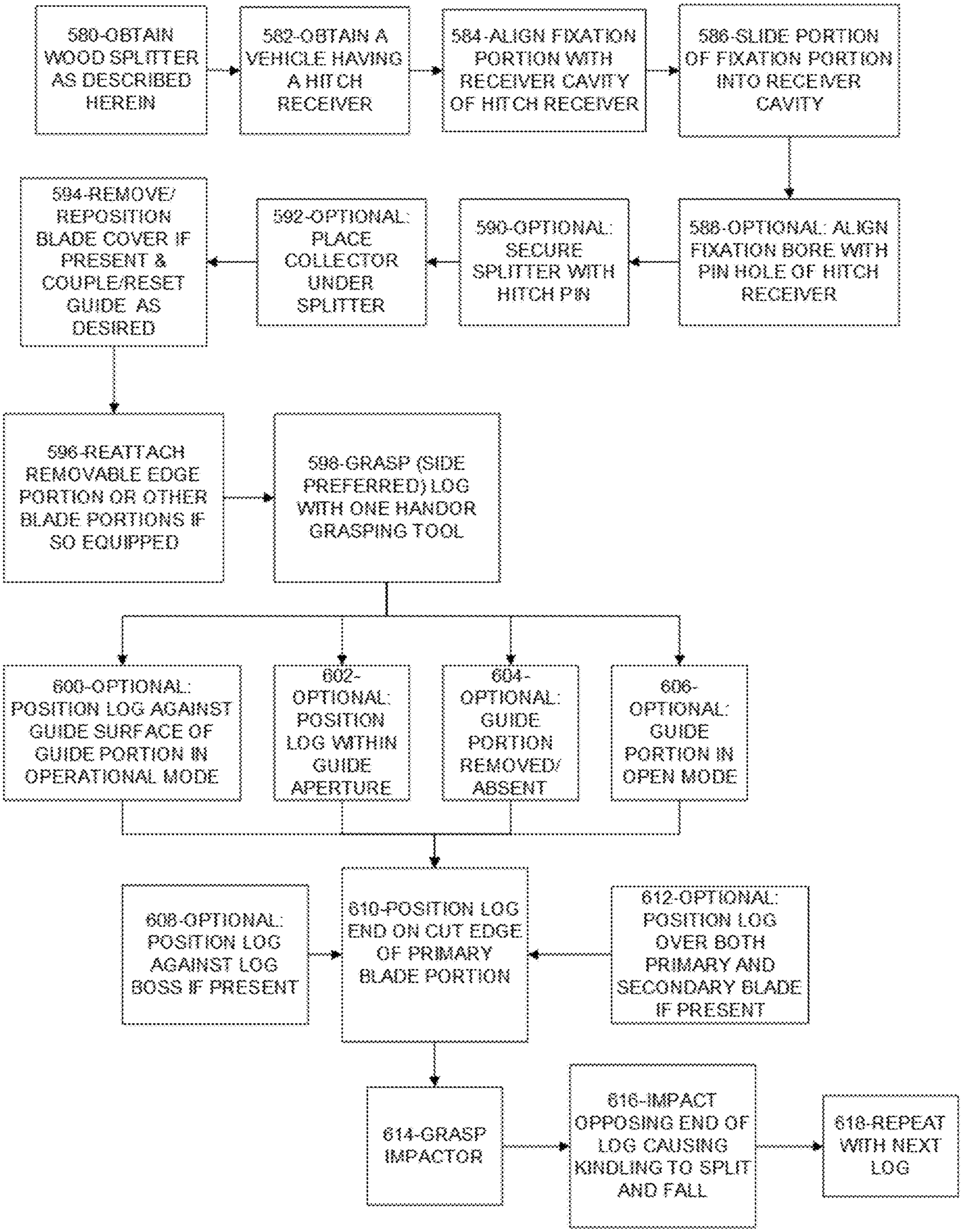
Figure 150:
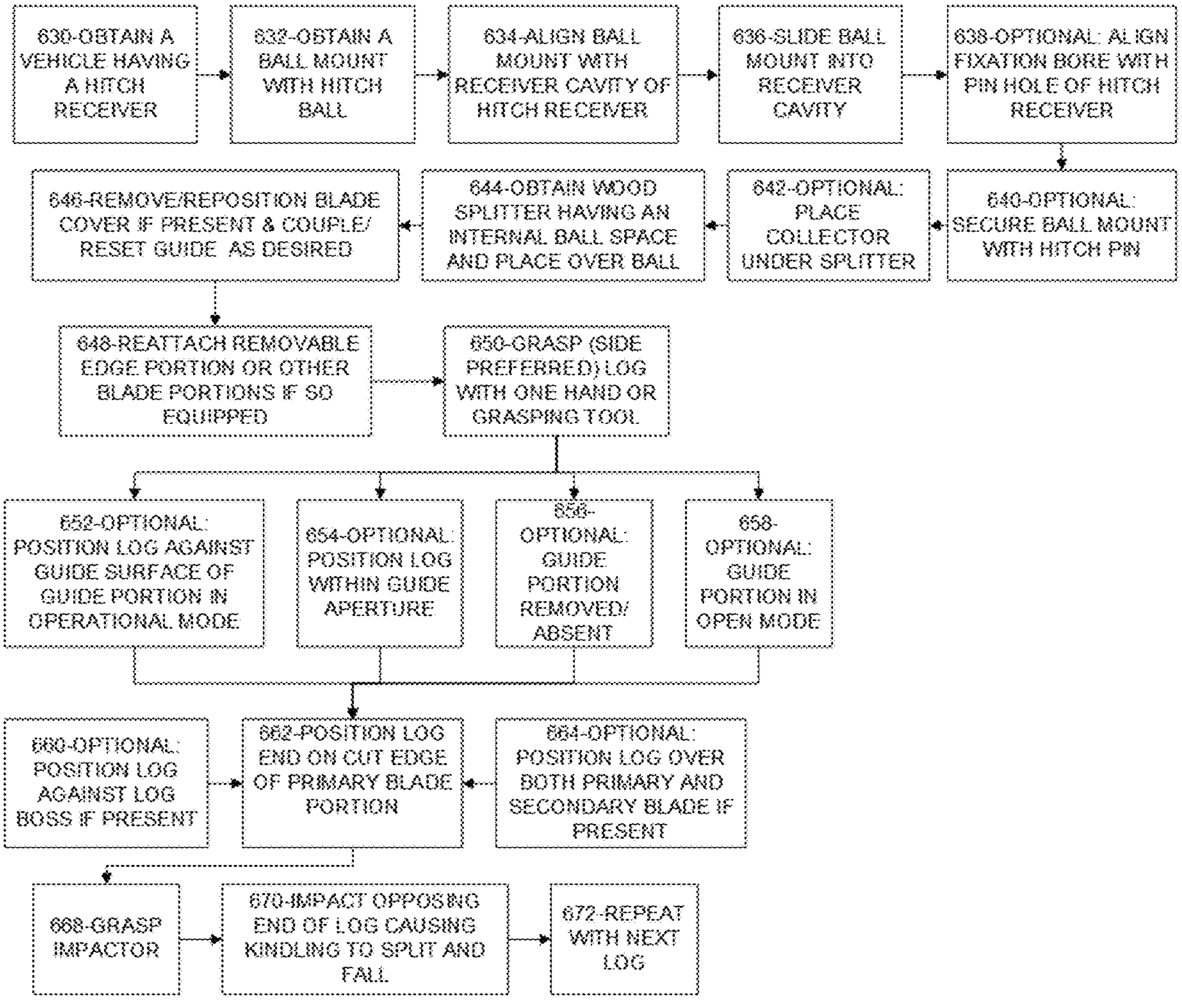
Figure 151:
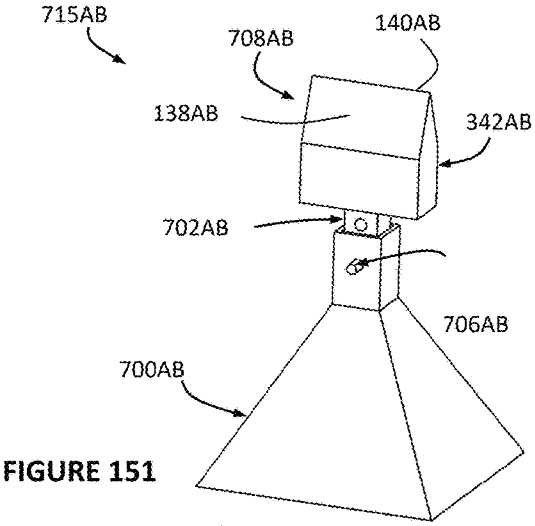
Figure 152:
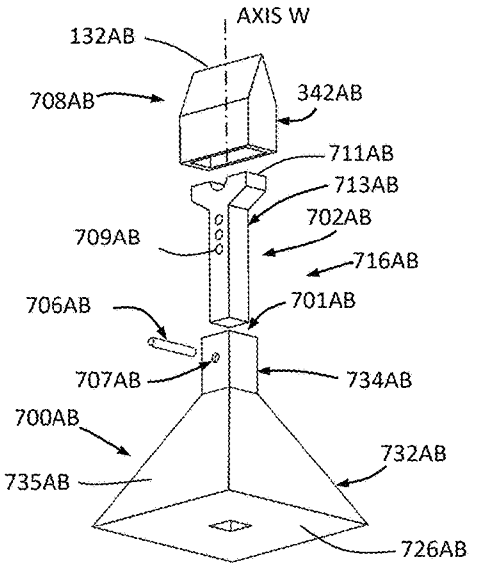
Figure 153D:
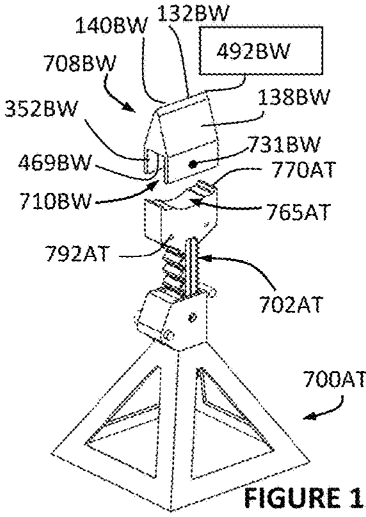
Figure 153A:
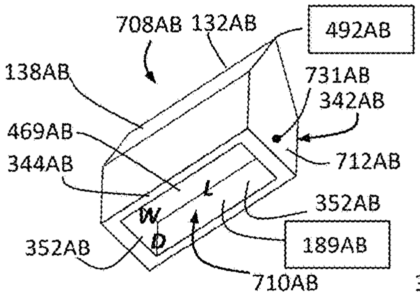
Figure 153C:
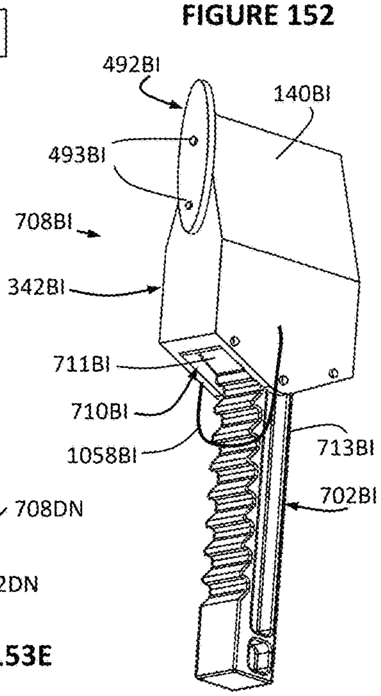
Figure 153E:
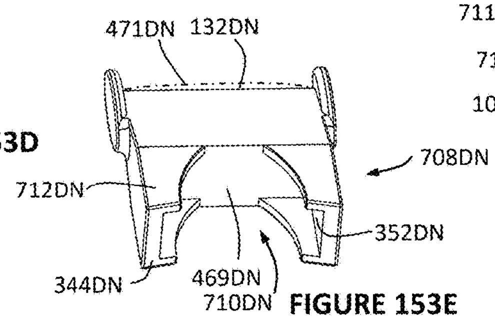
Figure 153B:
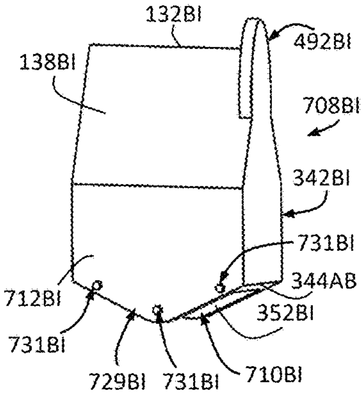
Figure 153F:
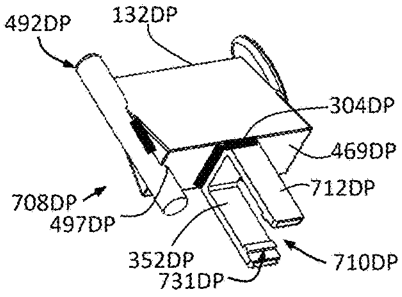
Figure 153G:
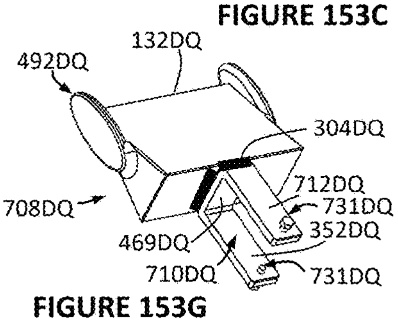
Figure 154:
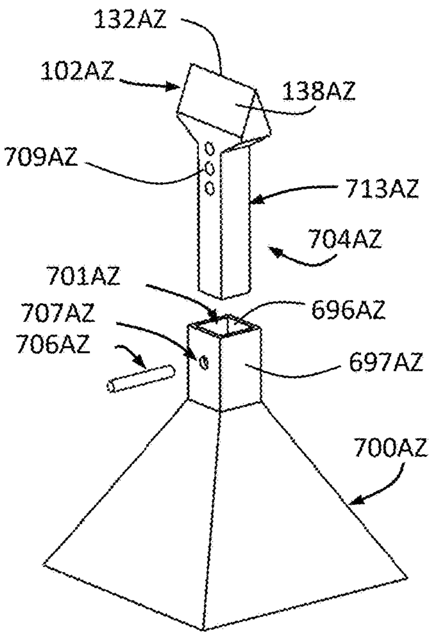
Figure 155:
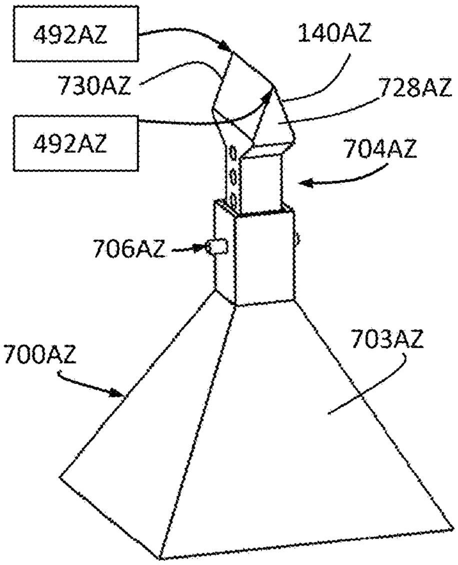
Figure 156:
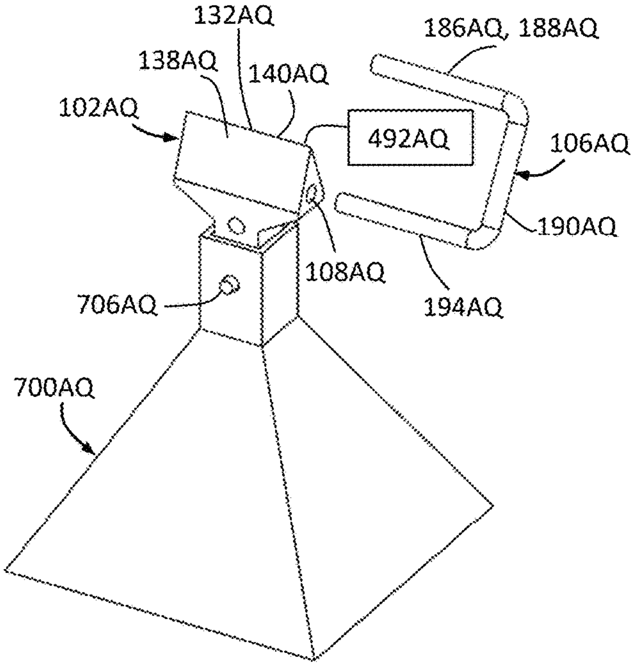
Figure 157:
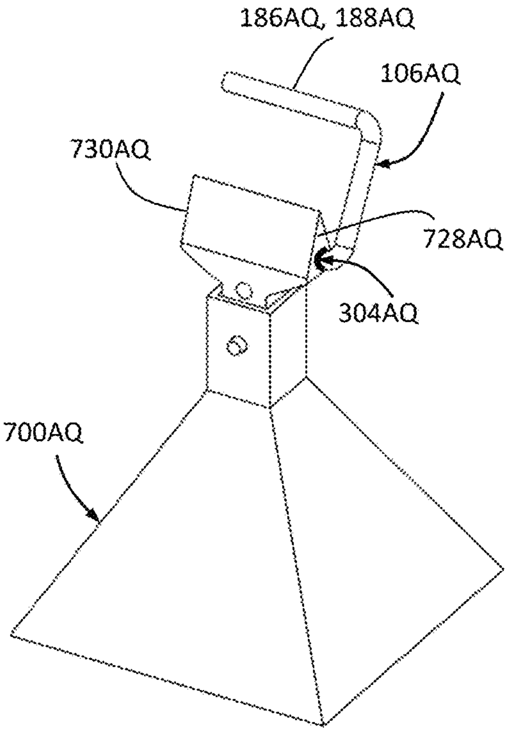
Figure 158:
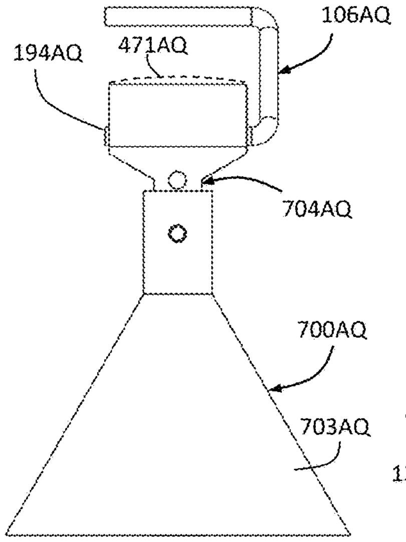
Figure 159B:
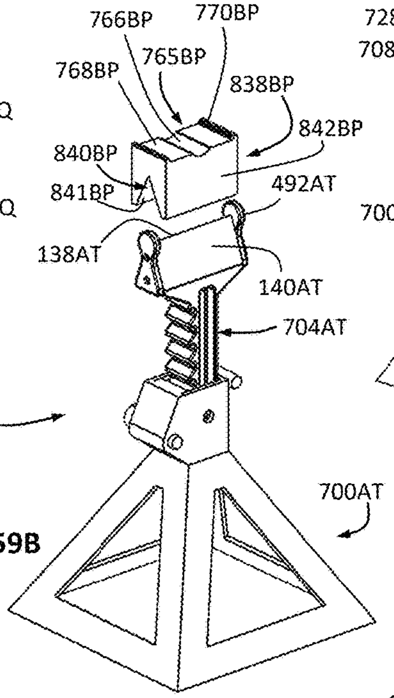
Figure 159A:
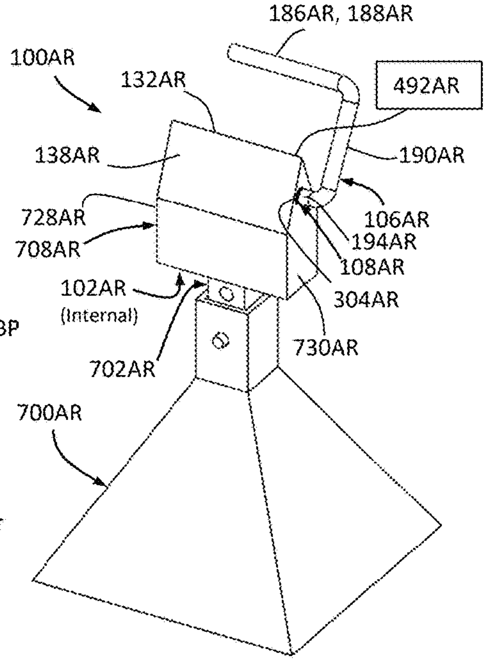
Figure 160:
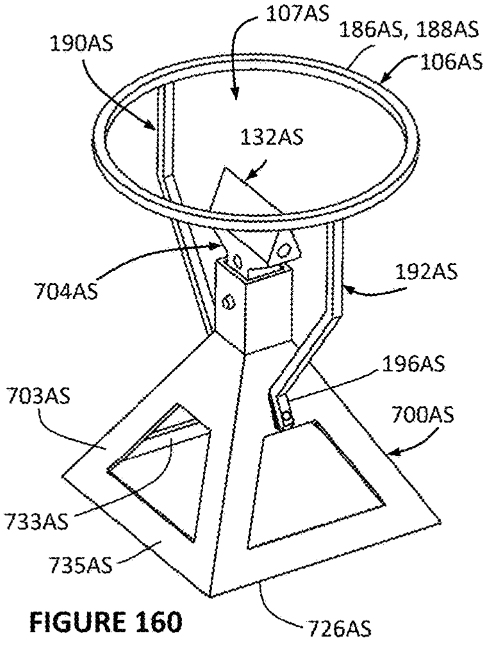
Figure 161:
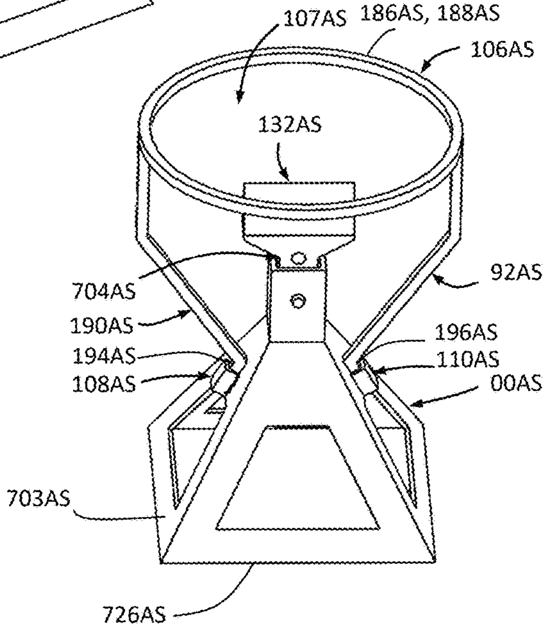
Figure 162:
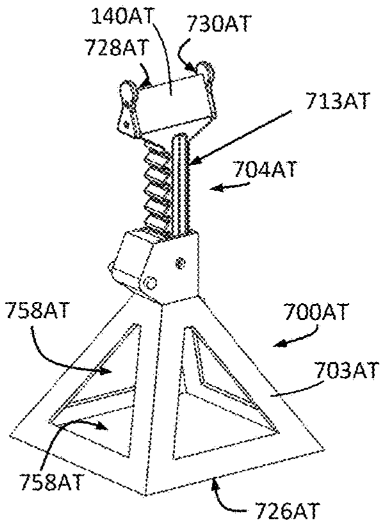
Figure 163:
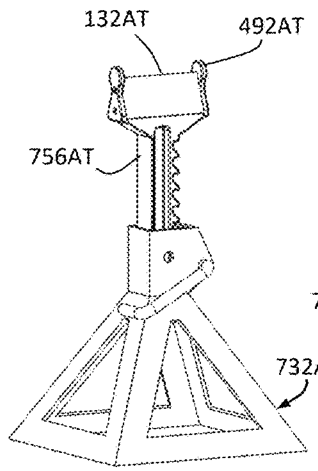
Figure 164:
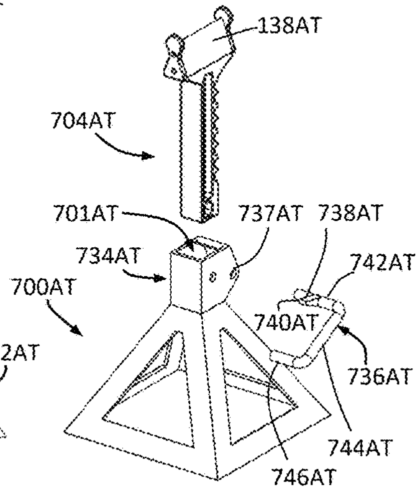
Figure 165:
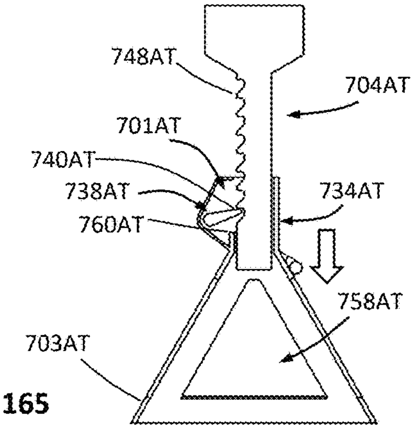
Figure 166:
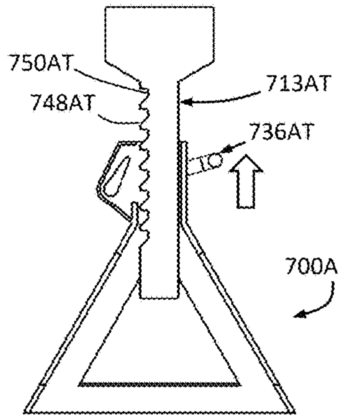
Figure 167:
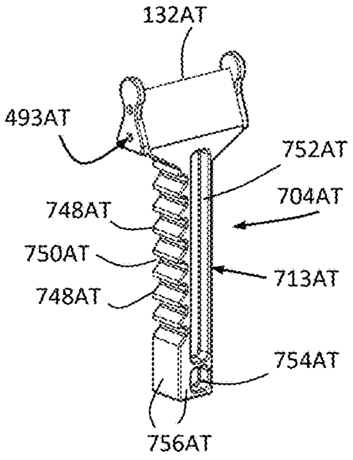
Figure 168:
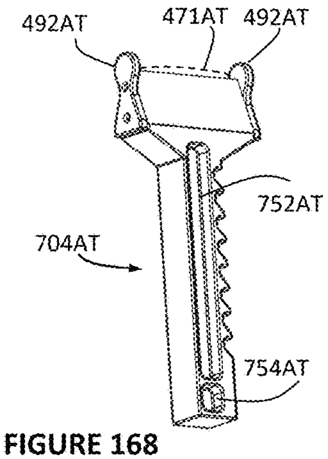
Figure 169A:
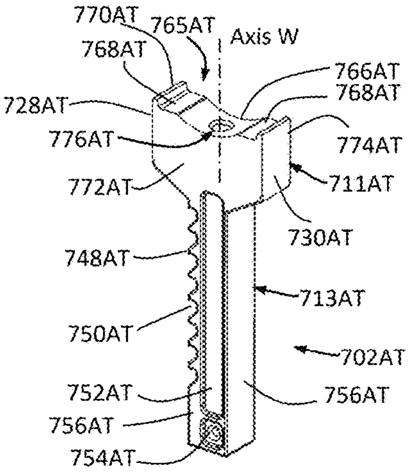
Figure 169B:
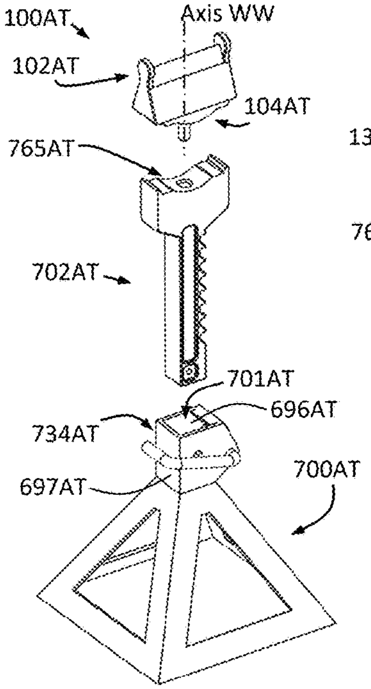
Figure 169C:
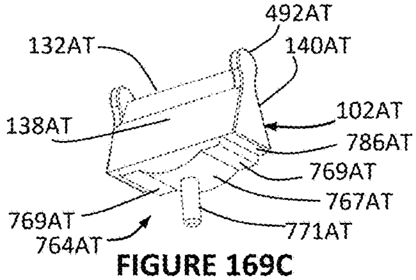
Figure 169D:
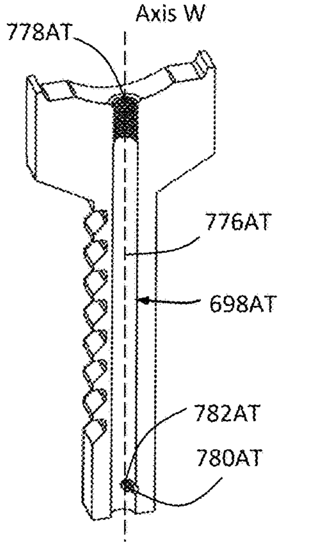
Figure 169G:
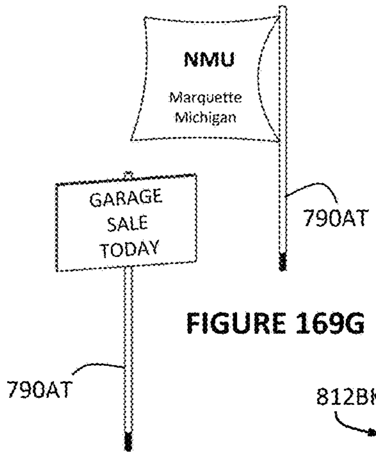
Figure 169E:
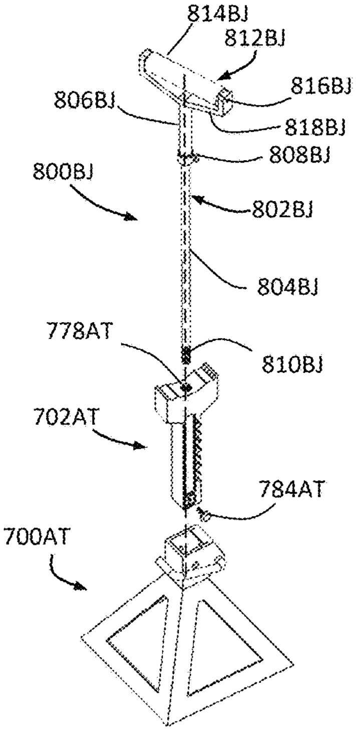
Figure 169F:
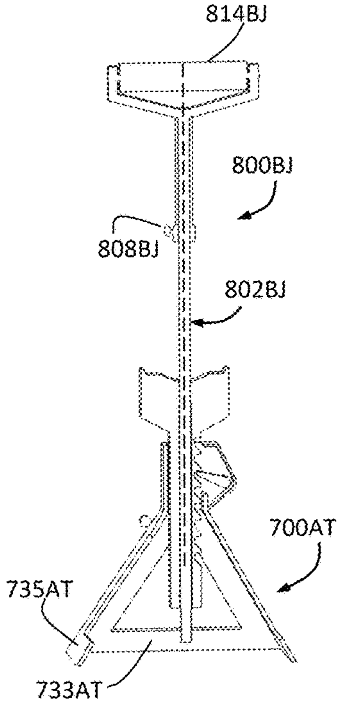
Figure 169H:
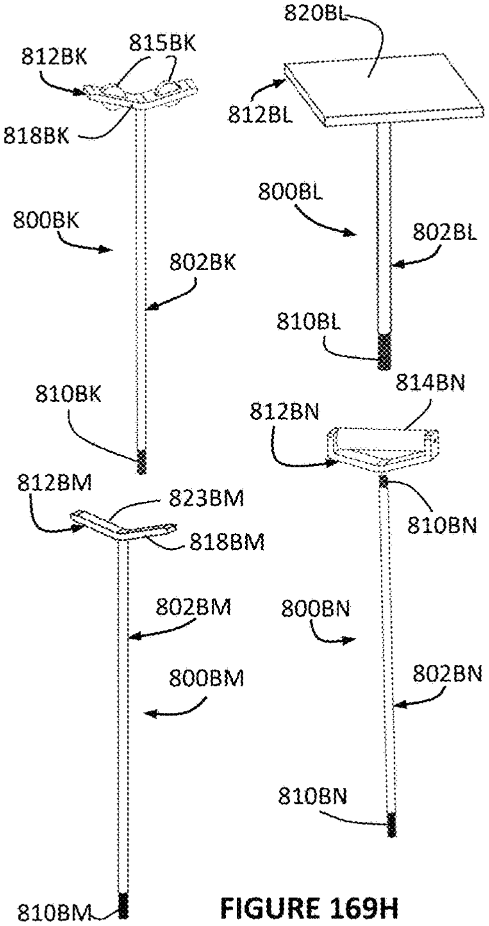
Figure 169I:
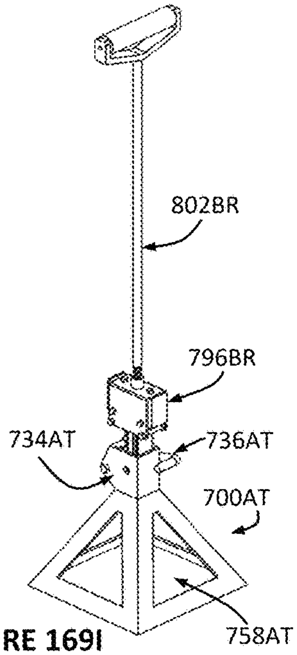
Figure 169J:
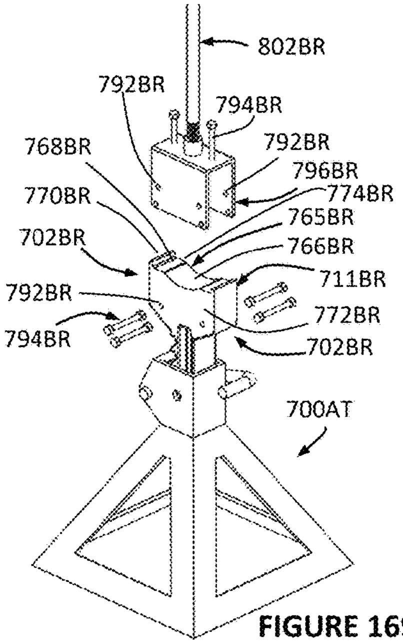
Figure 169K:
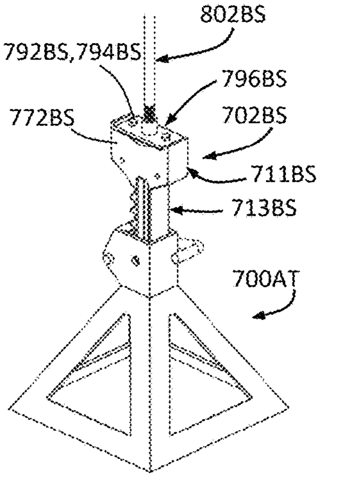
Figure 169L:
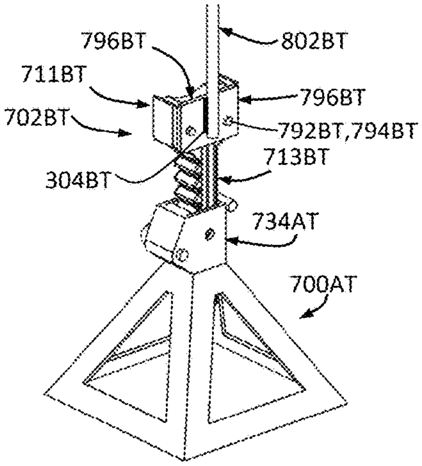
Figure 169M:
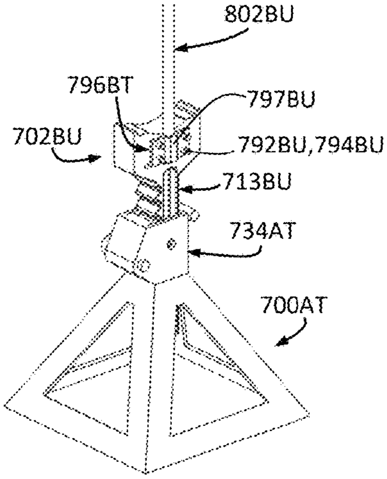
Figure 169N:
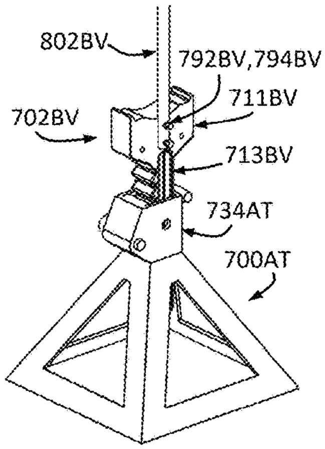
Figure 169P:
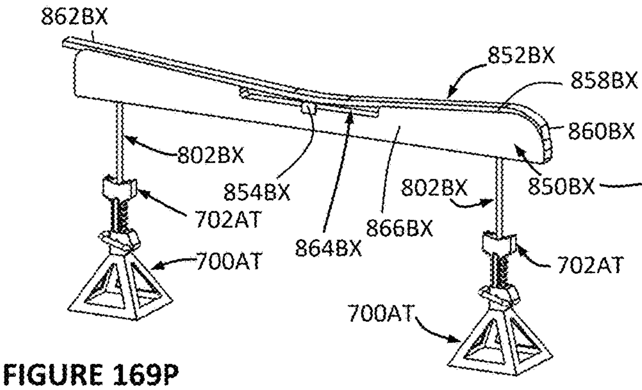
Figure 169Q:
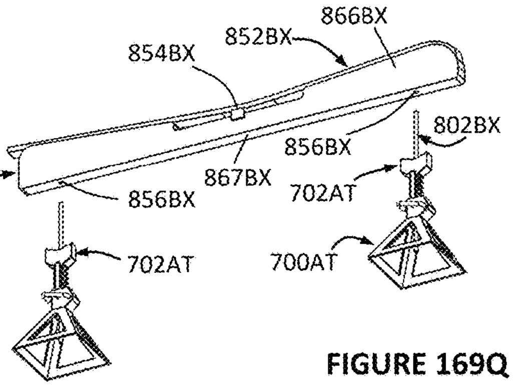
Figure 178:
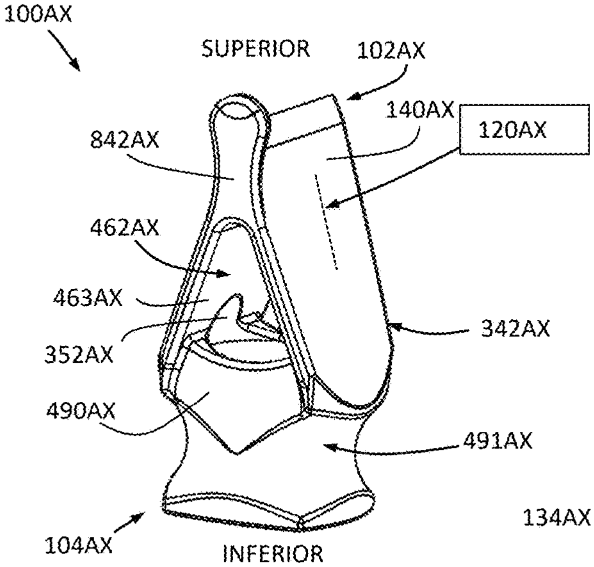
Figure 179:
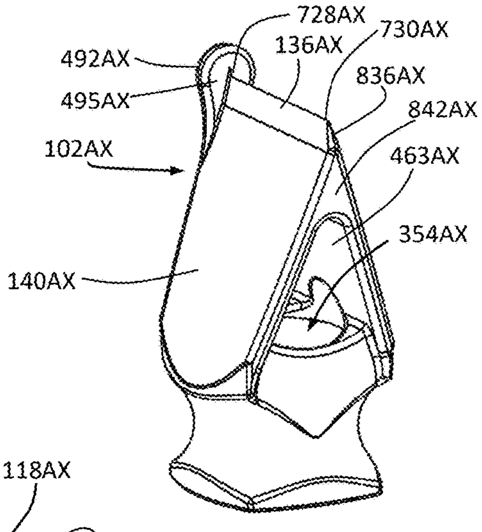
Figure 180:
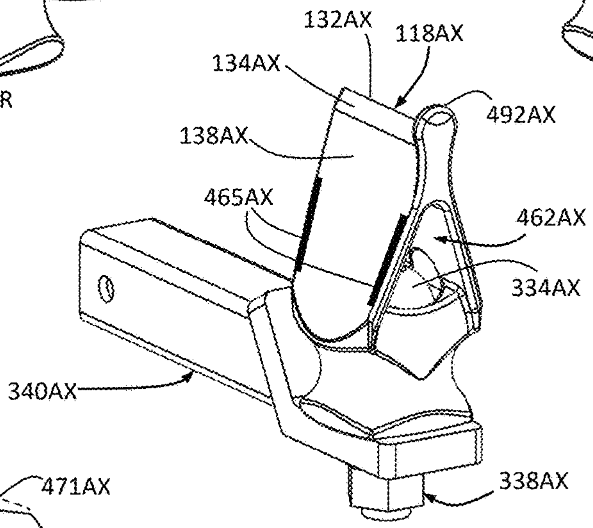
Figure 181:
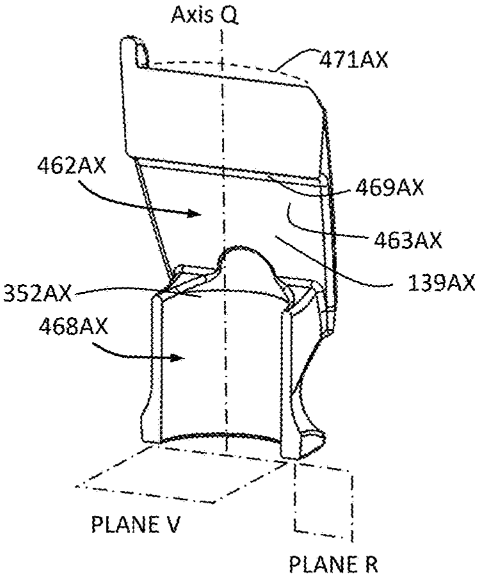
Figure 182:
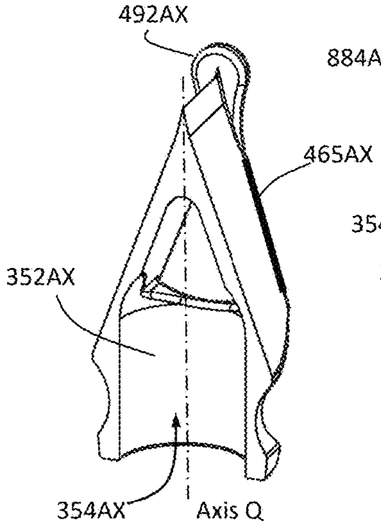
Figure 183:
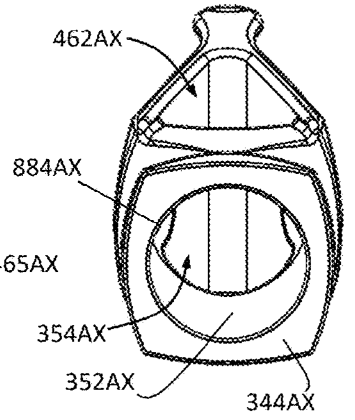
Figure 184:
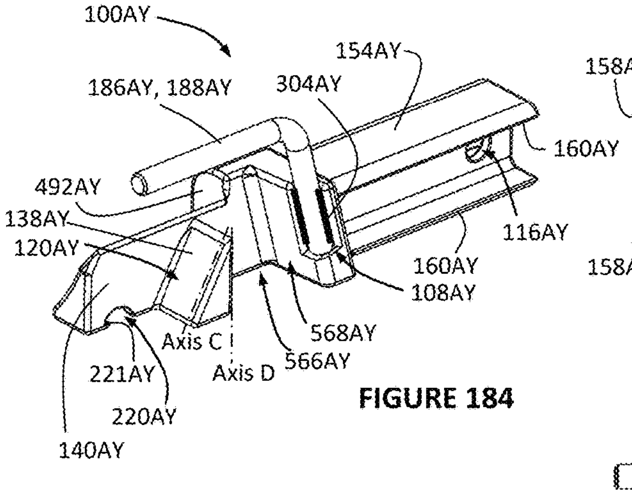
Figure 185:
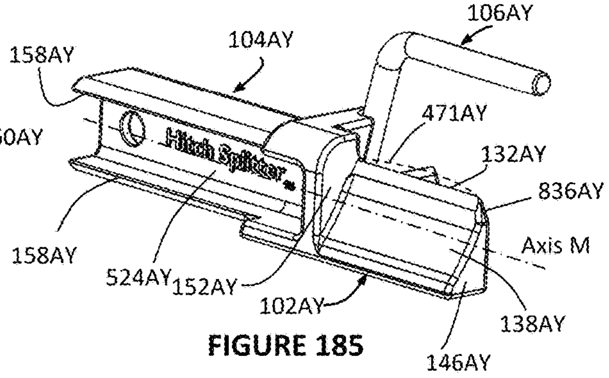
Figure 186:
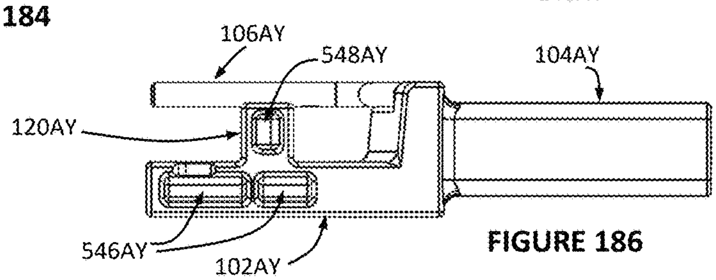
Figure 187:
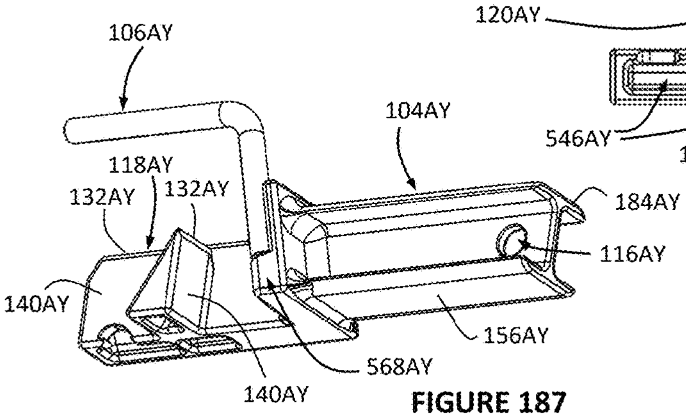
Figure 188:
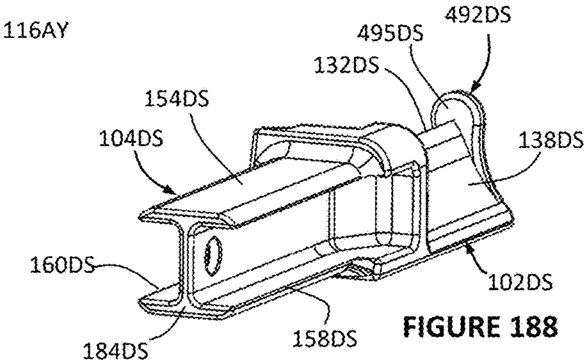
Figure 188B:
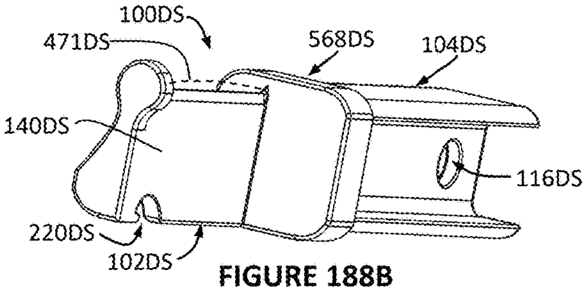
Figure 189:
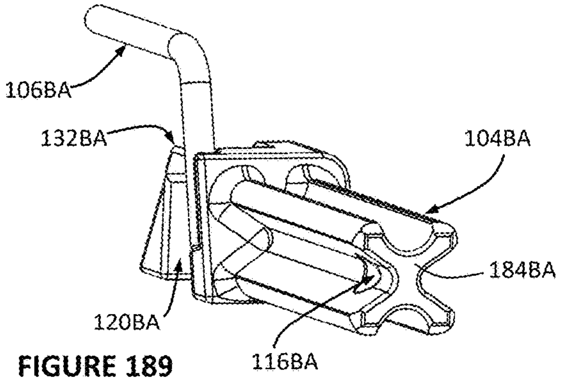
Figure 190:
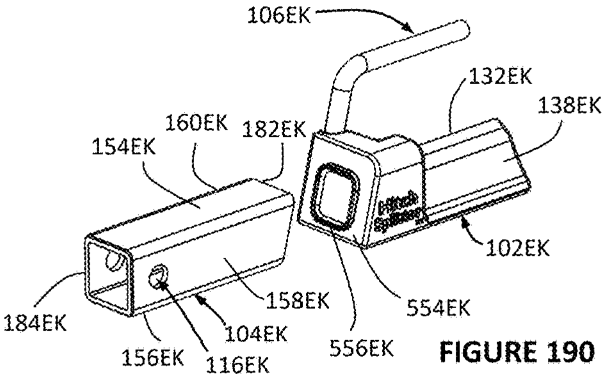
Figure 191:
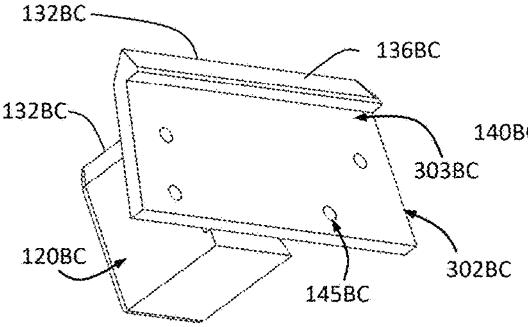
Figure 192:
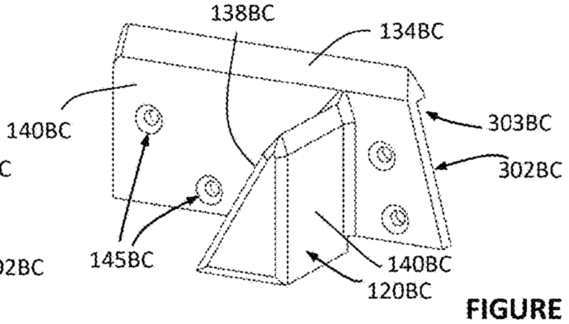
Figure 193:
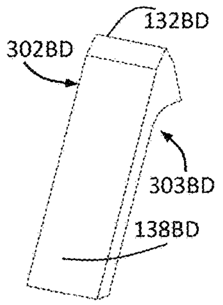
Figure 194:
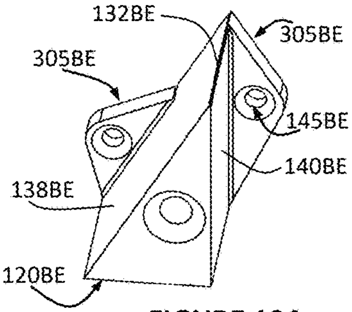
Figure 195:
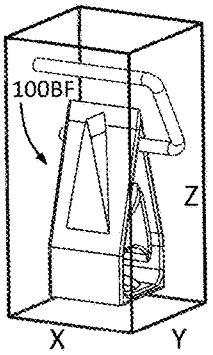
Figure 196:
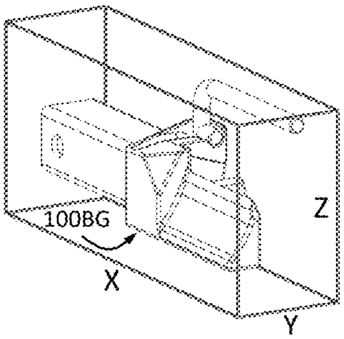
Figure 197:
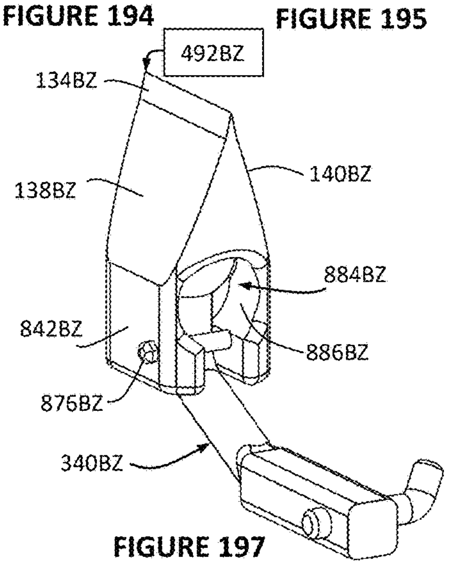
Figure 198:
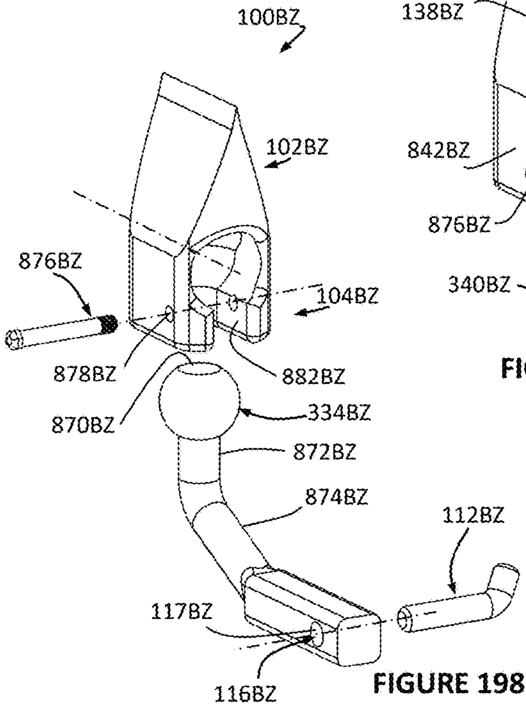
Figure 199:
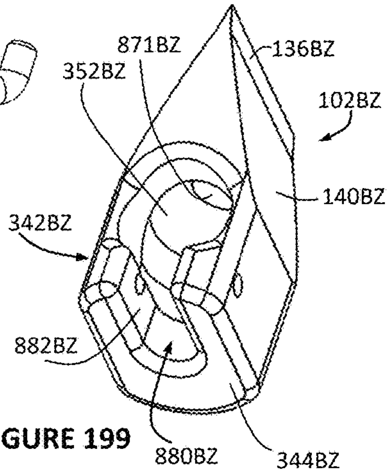
Figure 200:
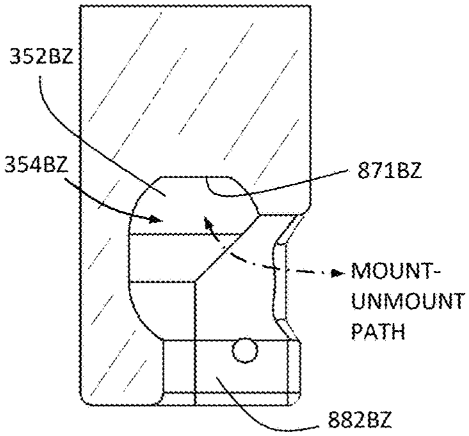
Figure 201:
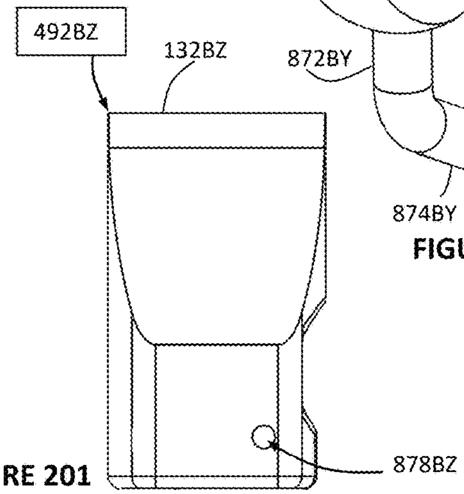
Figure 202:
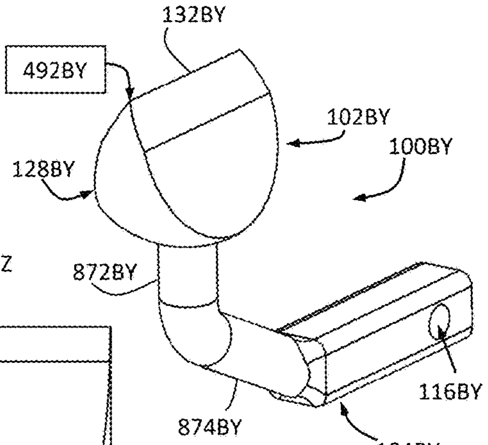
Figure 203:
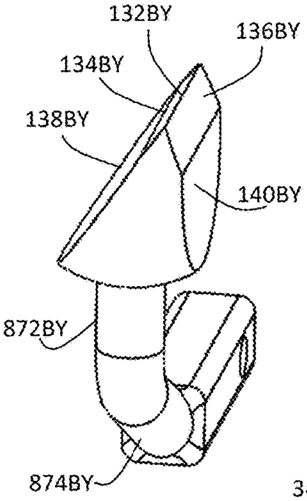
Figure 204:
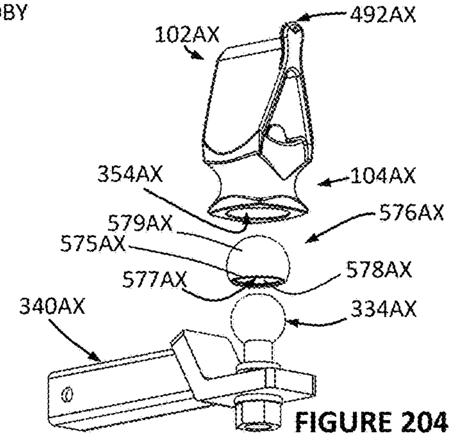
Figure 205:
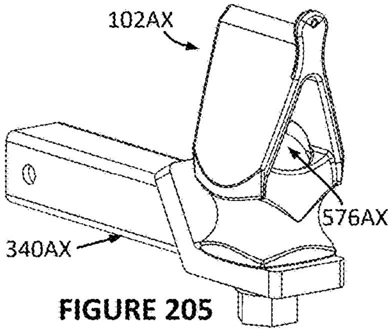
Figure 206:
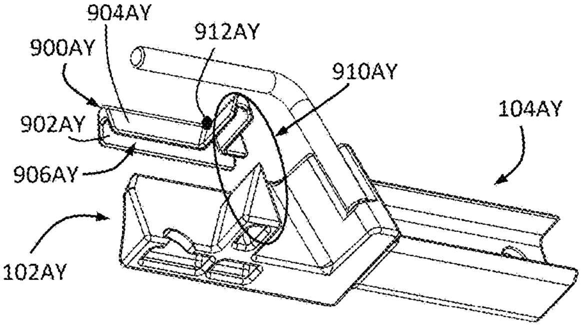
Figure 207:
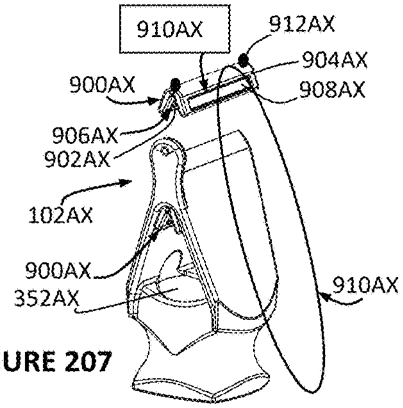
Figure 208:
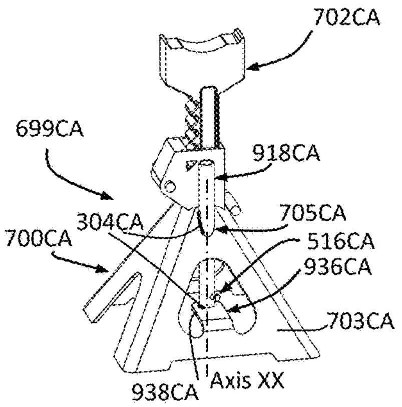
Figure 209:
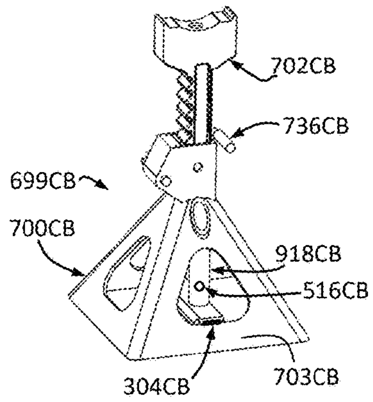
Figure 210:
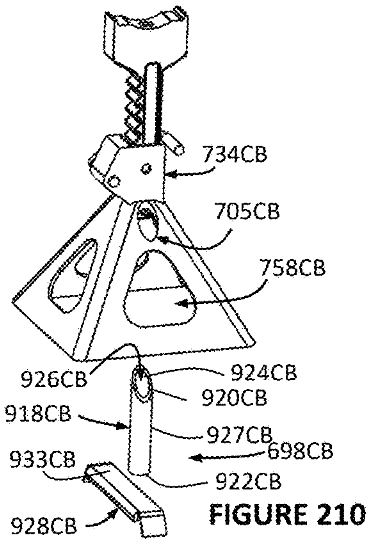
Figure 211:
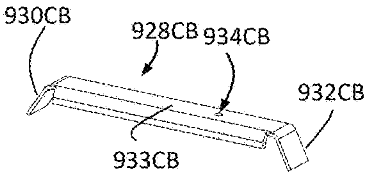
Figure 212:
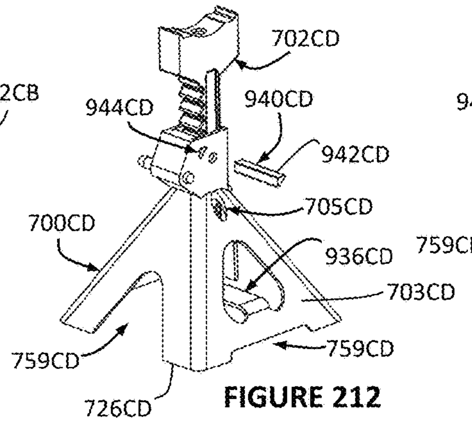
Figure 213:
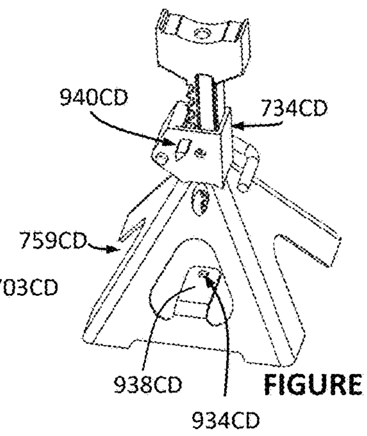
Figure 214:
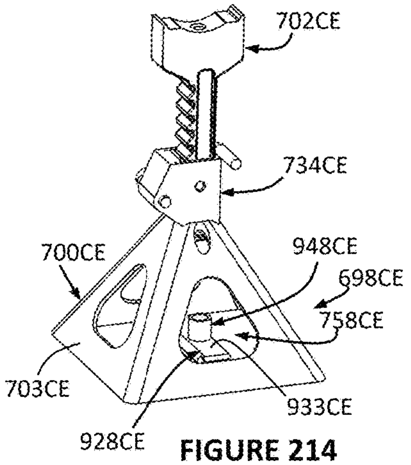
Figure 215:
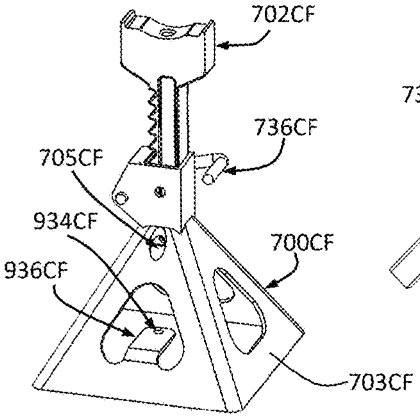
Figure 216:
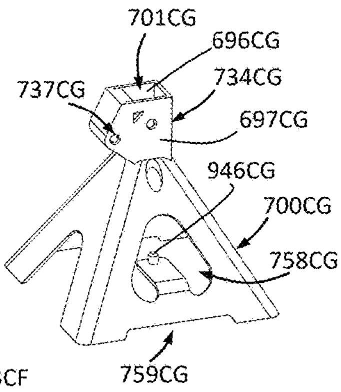
Figure 217:
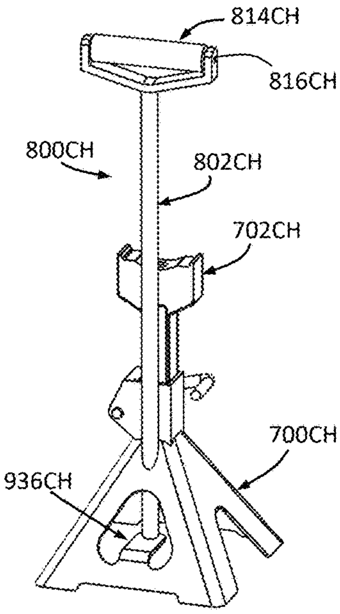
Figure 218:
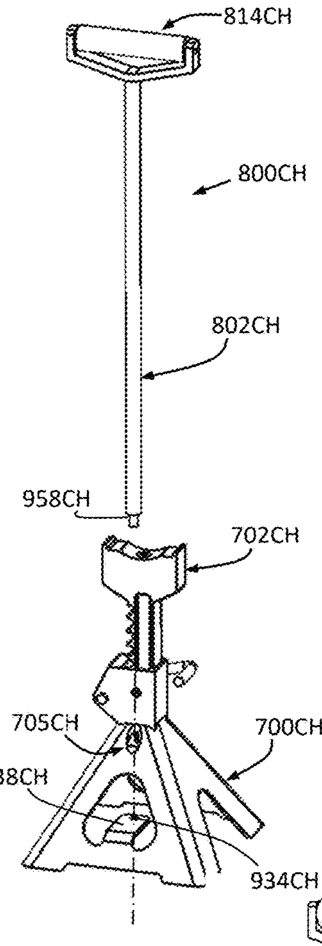
Figure 219:
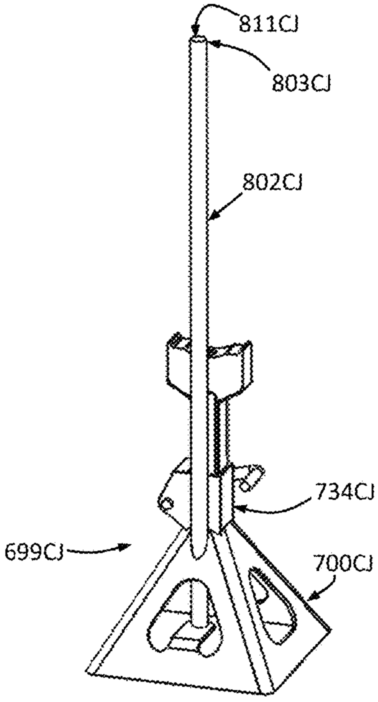
Figure 220:
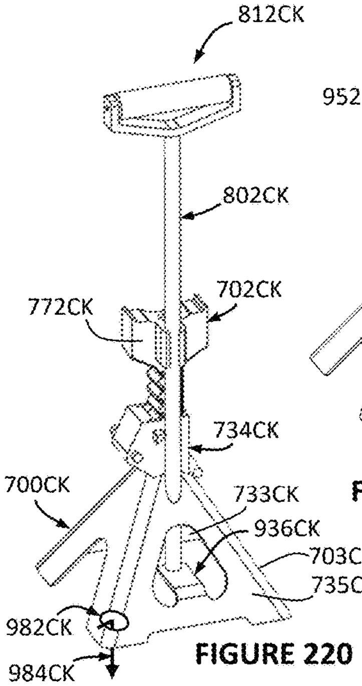
Figure 221:
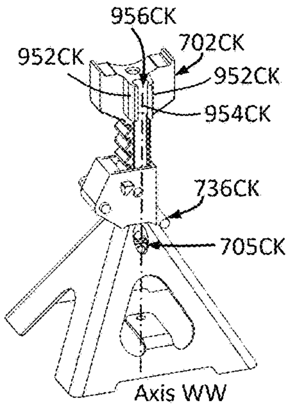
Figure 222:
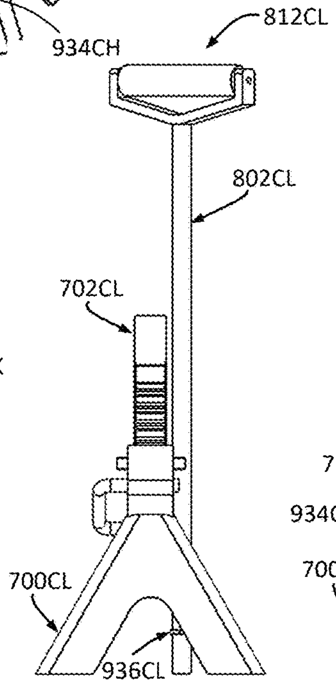
Figure 223:
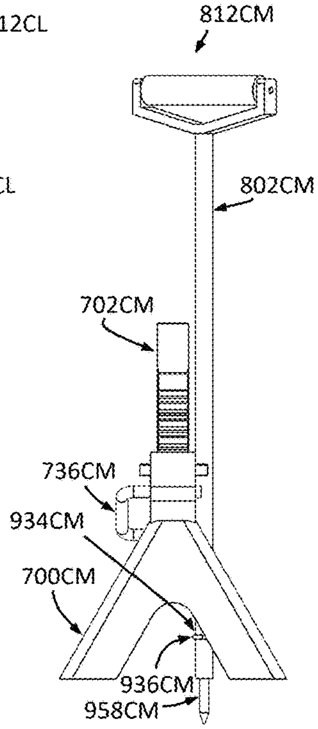
Figure 224:
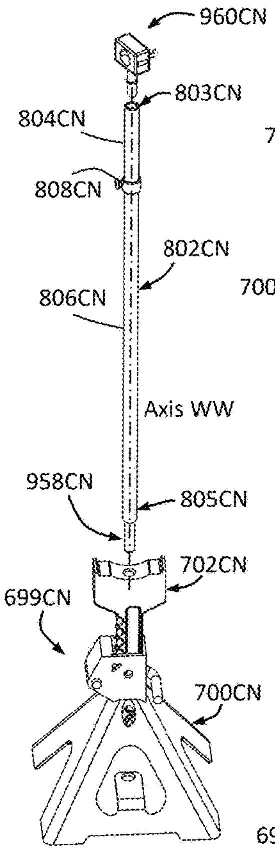
Figure 225:
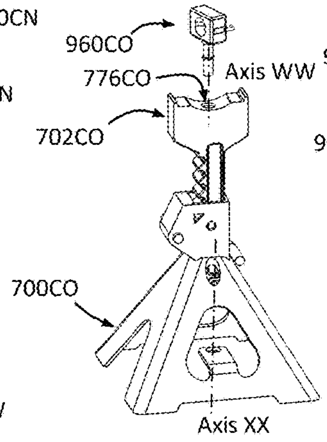
Figure 226:
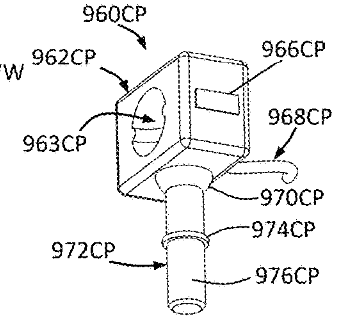
Figure 228:
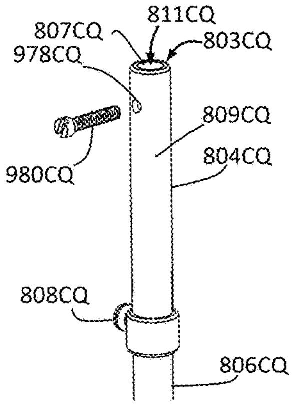
Figure 227:
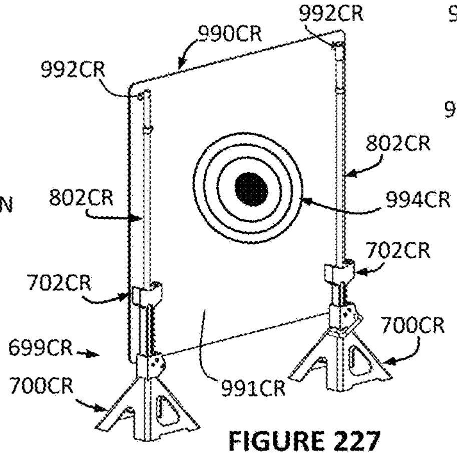
Figure 229:
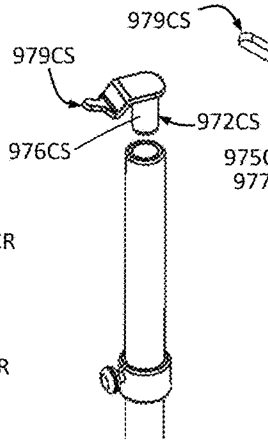
Figure 230:
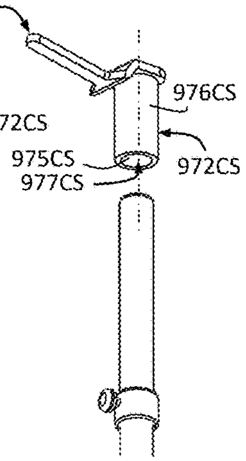
Figure 231:
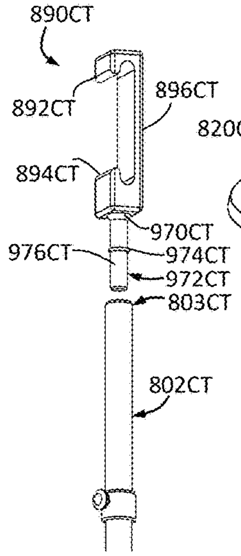
Figure 232:
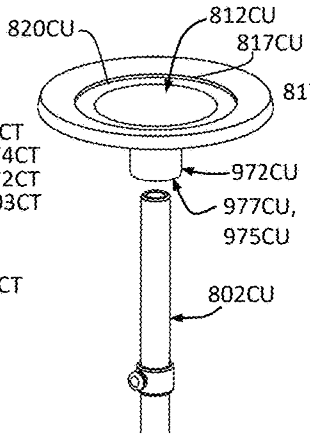
Figure 233:
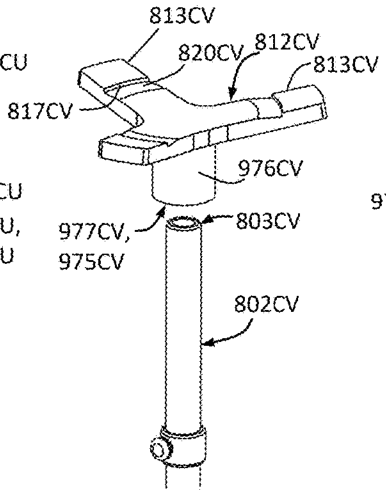
Figure 234:
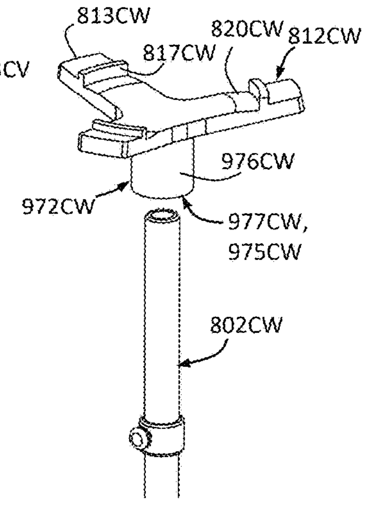
Figure 235:
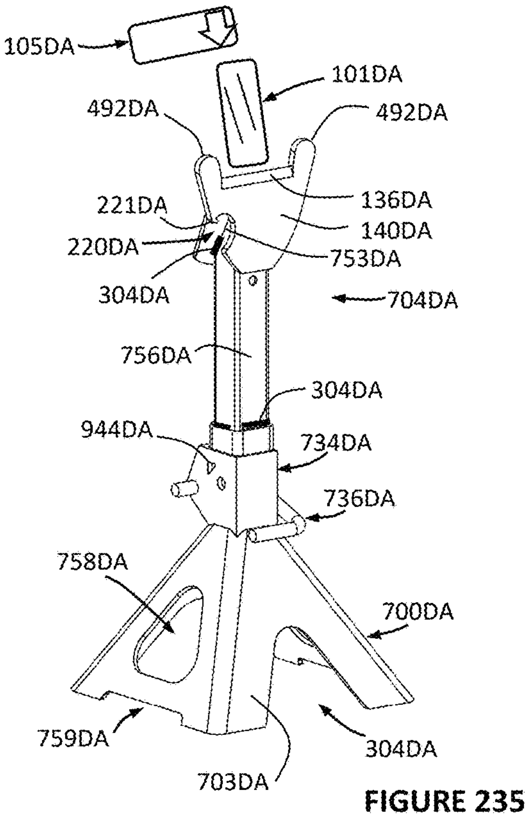
Figure 236:
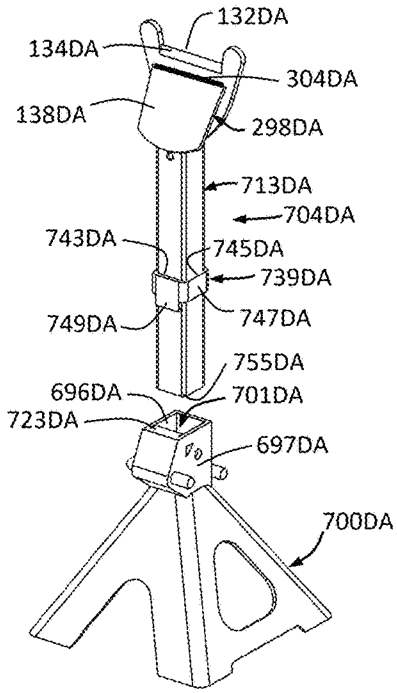
Figure 237:
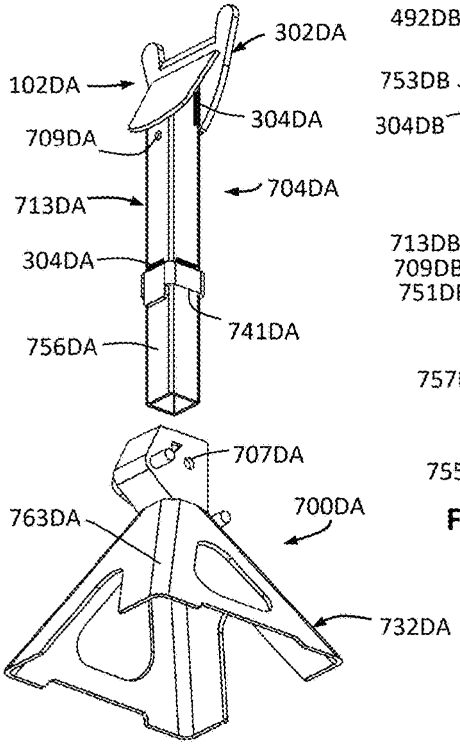
Figure 238:
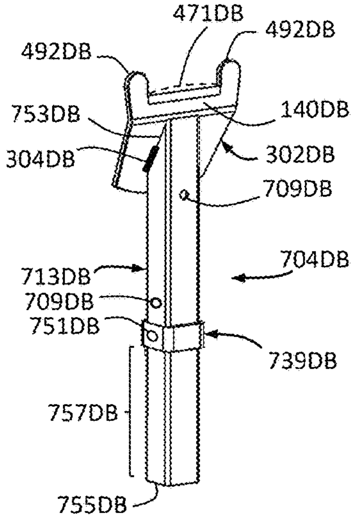
Figure 239:
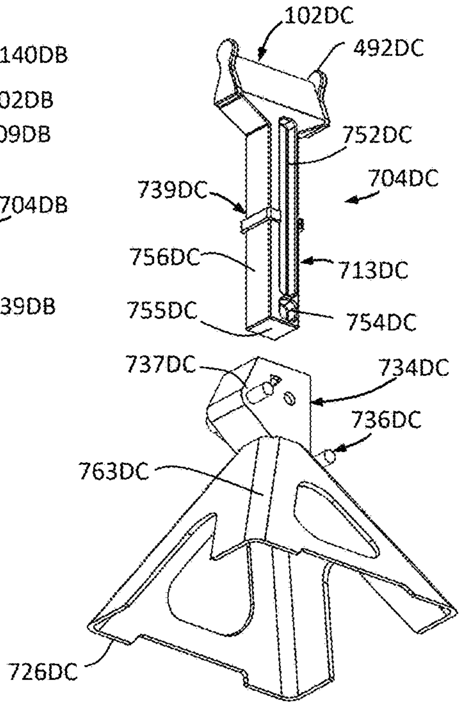
Figure 240:
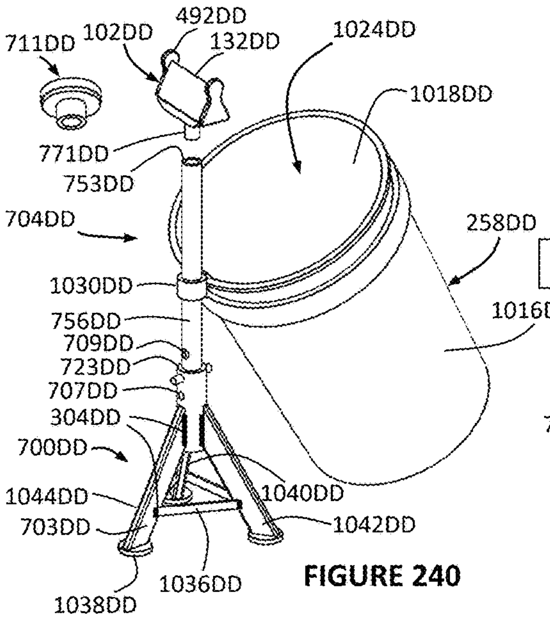
Figure 241:
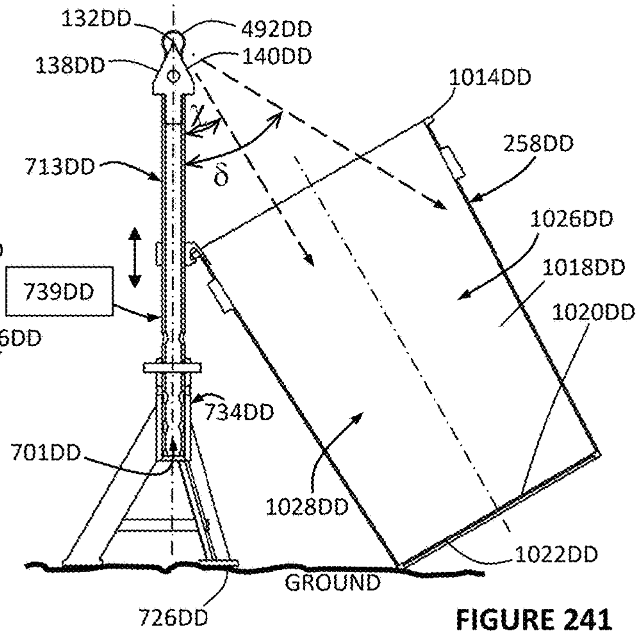
Figure 242:
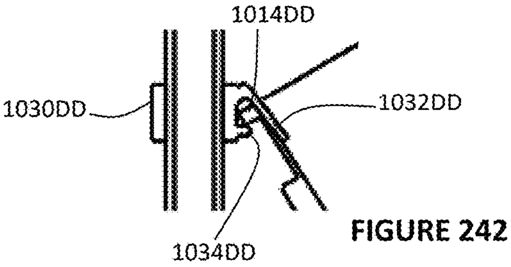
Figure 243:
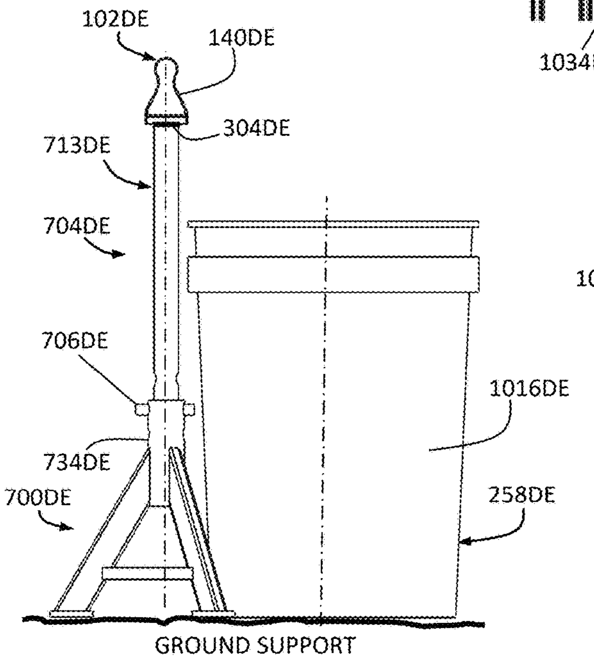
Figure 244:
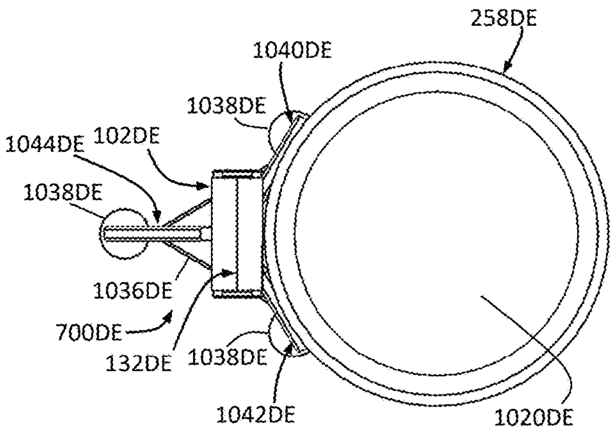
Figure 245:
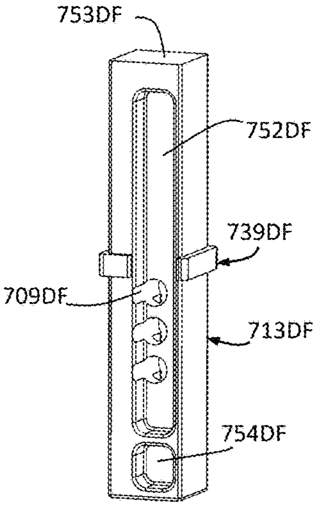
Figure 246:
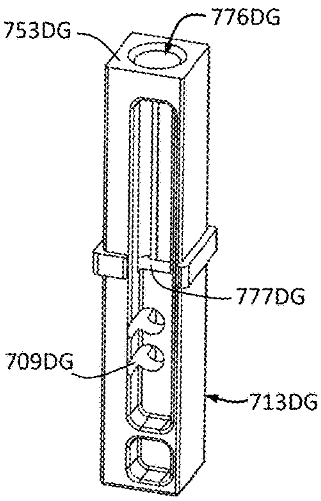
Figure 247:
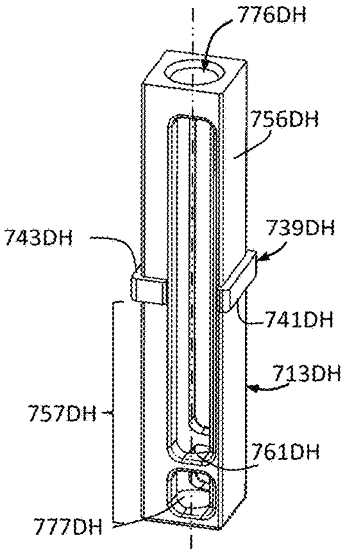
Figure 248:
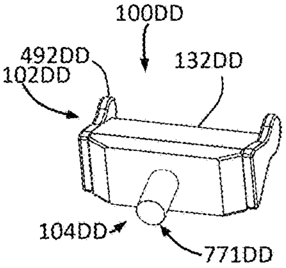
Figure 249:
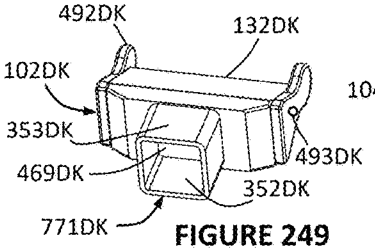
Figure 250:
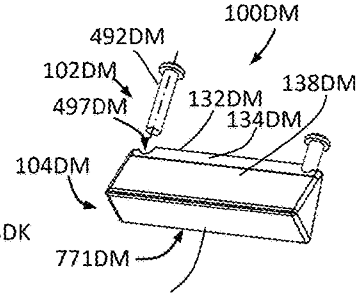
Figure 251:
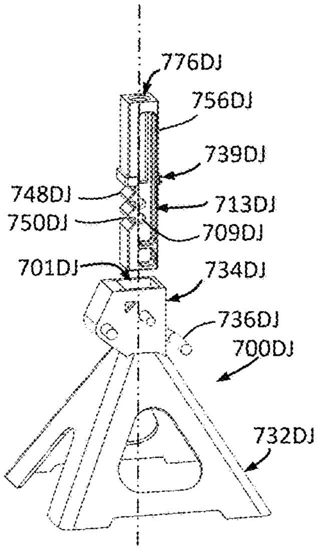
Figure 252:
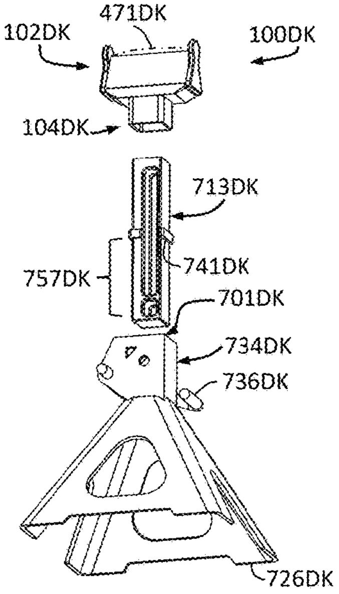
Figure 253:
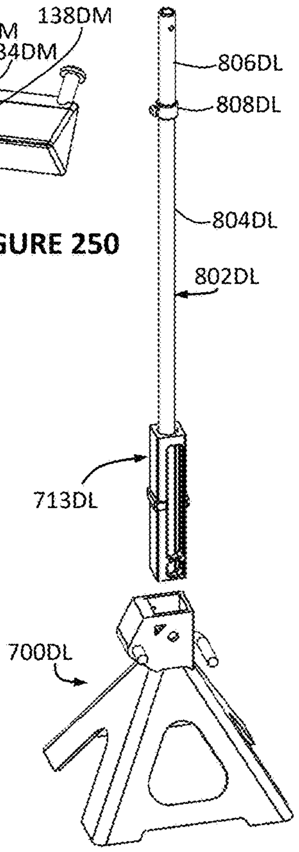
Figure 254:
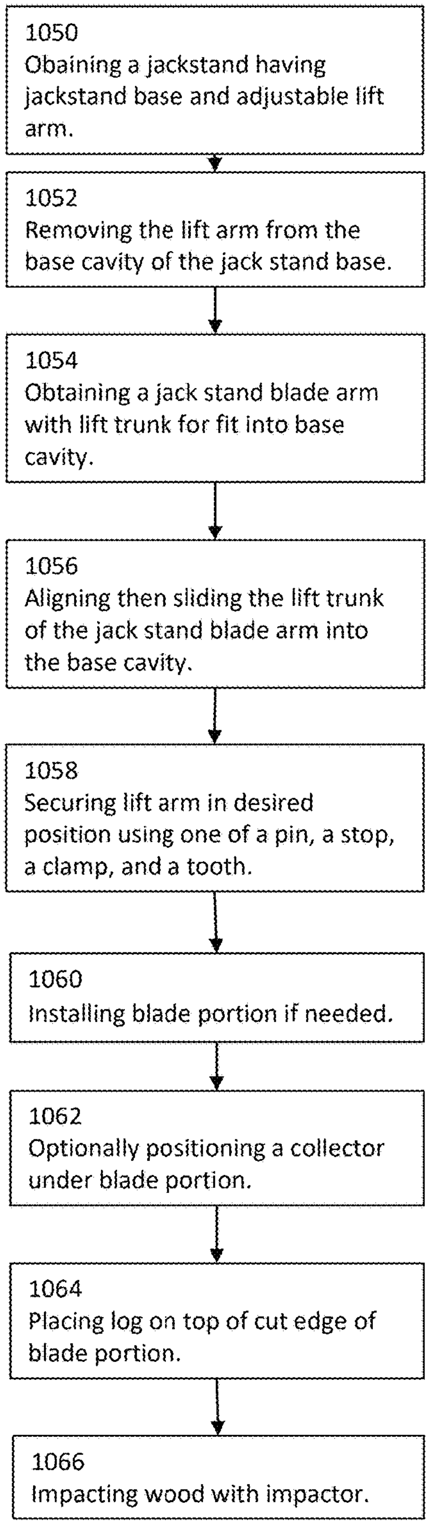
Figure 255:
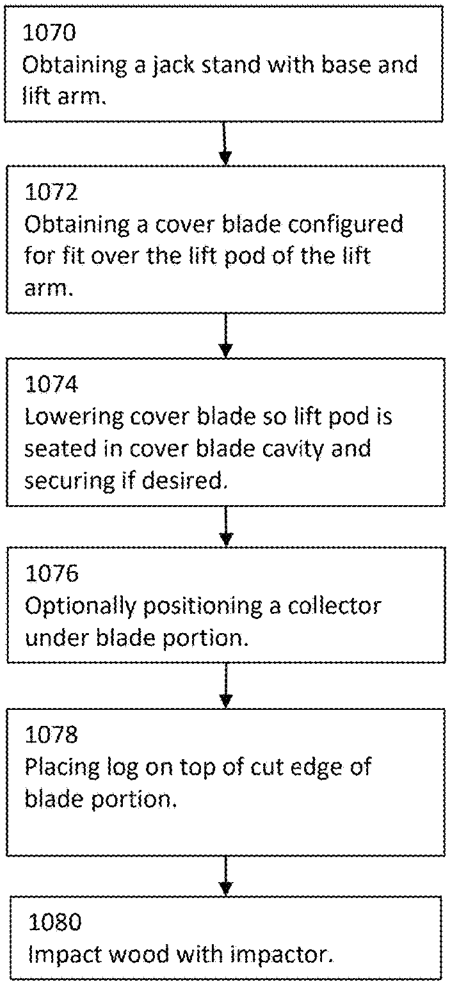
Figure 256:
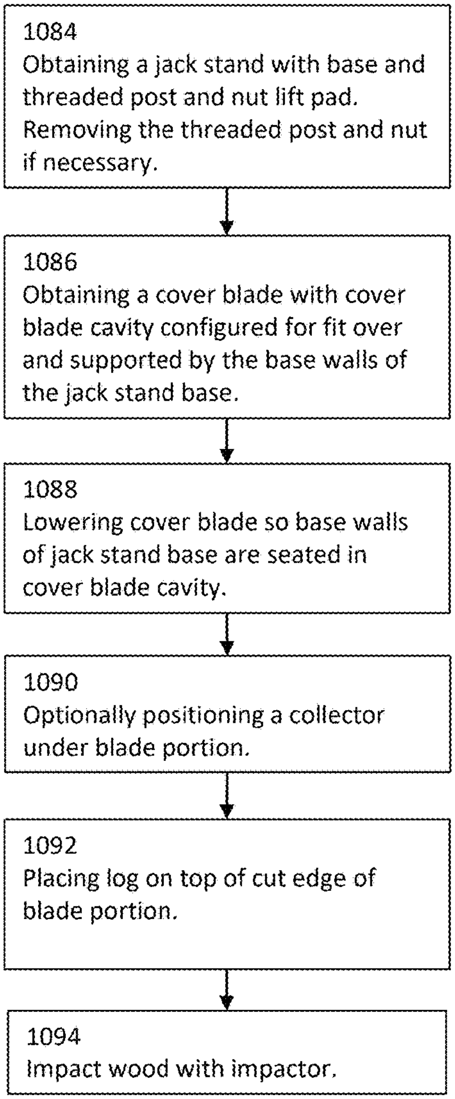
Figure 257:
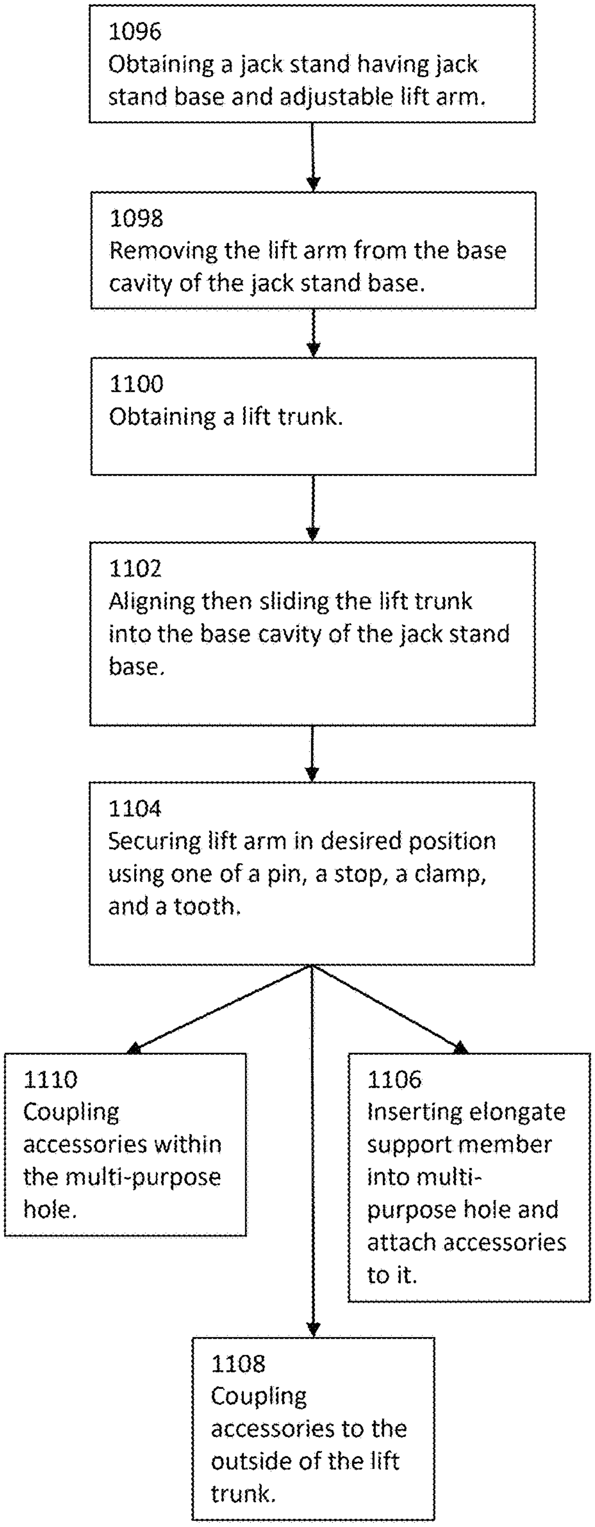

FIG. 94A is a perspective view of a wood splitter having a female cavity and blade lock bolt and alternatively, the blade lock bolt is substituted by a threaded hitch ball;

FIG. 94B depicts a perspective view of a wood splitter having a fixation portion in the form of a blade coupler, and a removable blade portion;

FIG. 94C depicts a cross-sectional view of a blade coupler similar to that illustrated in FIG. 94B;

FIG. 94D depicts a perspective view of a wood splitter with a blade portion having a cut edge offset to one side;

FIG. 95 is a perspective view of a wood splitter having an extended stem and mounted to a ball mount;

FIG. 96 is an exploded view of the wood splitter and ball mount illustrated in FIG. 95;

FIG. 97 is an exploded view of the wood splitter and ball mount illustrated in FIG. 95 with a ring shaped guide portion;

FIG. 98 is a side view of a wood splitter with a novel guide portion;

FIG. 99 is an exploded perspective view of the wood splitter of FIG. 98;

FIG. 100 is a perspective view of a dual mode wood splitter in a posted configuration;

FIG. 101 is an exploded view of the dual mode wood splitter of FIG. 100;

FIG. 102 is an exploded perspective view of another dual mode wood splitter;

FIG. 103 is a cross sectional view of the dual mode wood splitter of FIG. 102;

FIG. 104 is a perspective view of a wood splitter having an offset cut edge;

FIG. 105 is a perspective view of a wood splitter configured for a captured ball configuration;

FIG. 106 is a cross sectional view of the wood splitter of FIG. 105 configured for a captured ball configuration with optional flutes;

FIG. 107 is a perspective view of a wood splitter configured for a captured ball configuration;

FIG. 108 is a cross sectional view of the wood splitter of FIG. 107 illustrating the internal ball space;

FIG. 109 is a perspective view of a wood splitter configured for a captured ball configuration;

FIG. 110 is a perspective view of a wood splitter configured for a captured ball configuration;

FIG. 111 is a cross-sectional view of the wood splitter illustrated in FIG. 109;

FIG. 112 is a perspective view of a guide portion in the form of a plate with extended superior lobe;

FIG. 113 is a perspective view of a wood splitter with a novel guide portion;

FIG. 114 is an exploded view of the wood splitter of FIG. 113;

FIG. 115 is an end view of the wood splitter of FIG. 113;

FIG. 116 is a perspective view of a wood splitter with an adjustable form of the guide portion illustrated in FIG. 113;

FIG. 117 is a perspective view of a wood splitter having a novel guide portion;

FIG. 118 is an exploded perspective view of the wood splitter of FIG. 117;

FIG. 119 is a perspective view of a wood splitter having a novel adjustable guide portion and cut blade cover;

FIG. 120 is a perspective view of a wood splitter with blade cover in an uncovered position;

FIG. 121 is a perspective view of a wood splitter with blade cover in a covered position;

FIG. 122 is a perspective view of a wood splitter with blade cover in an uncovered position;

FIG. 123 is a perspective view of a wood splitter with novel guide portion and construction;

FIG. 124 is an opposing perspective view of the wood splitter of FIG. 123;

FIG. 125 is a perspective view of a wood splitter with a novel guide portion;

FIG. 126 is a perspective view of a wood splitter with a novel guide portion;

FIG. 127 is a perspective view of a wood splitter with a novel guide portion;

FIG. 128 is a perspective view of a wood splitter with a novel guide portion;

FIG. 129 is a perspective view of the wood splitter of FIG. 128 with guide portion in a different mode;

FIG. 130 is an exploded perspective view of a wood splitter with a novel guide portion;

FIG. 131 is a perspective view of the wood splitter of FIG. 130 in an operational mode;

FIG. 132 is a perspective view of the wood splitter of FIG. 130 about to set into an open mode;

FIG. 133 is a perspective view of a wood splitter having a novel guide portion;

FIG. 134 is a perspective view of the wood splitter of FIG. 133 in an operational configuration;

FIG. 135 is a perspective view of the wood splitter of FIG. 133 in an open configuration;

FIG. 136 is a top view of a guide portion of the wood splitter of FIG. 133;

FIG. 137 is a perspective view of a novel wood splitter with integrated bottle opener in an operational mode;

FIG. 138 is a perspective view of the wood splitter of FIG. 137 in an open mode;

FIG. 139 is a partial close-up view of the first guide receiver of the wood splitter of FIG. 137;

FIG. 140 is a perspective view of the wood splitter of FIG. 137 showing various cavities;

FIG. 141 is a perspective view of the wood splitter of FIG. 137 using a novel guide portion;

FIG. 142 is a perspective view of the guide portion of the wood splitter of FIG. 141;

FIG. 143 is a perspective view of a novel wood splitter;

FIG. 144 is an exploded view of the wood splitter of FIG. 143;

FIG. 145 is a different perspective view of the wood splitter of FIG. 143;

FIG. 146 is a different perspective view of the wood splitter of FIG. 143;

FIG. 147 is a perspective view of a wood splitter having a solid fixation portion;

FIG. 148 is a perspective view of a wood splitter having a curved blade portion;

FIG. 149 is a diagram of an embodiment of one method of splitting wood utilizing a hitch receiver supported wood splitter as described herein;

FIG. 150 is a diagram of an embodiment of one method of splitting wood utilizing a wood splitter having an internal ball space in conjunction with a ball mount and hitch ball;

FIG. 151 is a perspective view of a wood splitter in the form of a jack stand with a novel cover blade accessory;

FIG. 152 is an exploded view of the jack stand with cover blade accessory of FIG. 151;

FIG. 153A is a perspective view of a cover blade;

FIG. 153B depicts a perspective view of a cover blade;

FIG. 153C depicts a perspective view of a cover blade seated over the lift pod of a jack stand lift arm;

FIG. 153D is an exploded perspective view of a cover blade having a cover blade cavity that is open on two ends and fits over a lift pod like a saddle;

FIG. 153E depicts a perspective view of a cover blade;

FIG. 153F depicts a perspective view of a cover blade;

FIG. 153G depicts a perspective view of a cover blade;

FIG. 154 is an exploded view of a wood splitter in the form of a jack stand with a jack stand lift arm substituted with a jack stand blade arm;

FIG. 155 is a perspective view of the wood splitter illustrated in FIG. 154;

FIG. 156 depicts a partially exploded perspective view of a jack stand having a blade portion and guide portion;

FIG. 157 depicts a perspective view of an assembled wood splitter of FIG. 156;

FIG. 158 depicts a front view of the wood splitter of FIG. 157;

FIG. 159A depicts a perspective view of the wood splitter of FIG. 152 with a guide portion;

FIG. 159B depicts a top perspective view of an adaptable lift pod with complementary fit over the blade of a jack stand blade arm;

FIG. 160 depicts a perspective view of a wood splitter having a jack stand blade arm pinned in a jack stand base with elevated guide portion;

FIG. 161 depicts an alternative perspective view of the wood splitter of FIG. 160 with elevated guide portion;

FIG. 162 depicts a perspective view of a wood splitter having a jack stand blade arm;

FIG. 163 depicts an opposing perspective view of the wood splitter of FIG. 162;

FIG. 164 depicts an exploded perspective view of the wood splitter of FIG. 162;

FIG. 165 depicts a cross-sectional view of the wood splitter of FIG. 162 with engaged stop;

FIG. 166 depicts a cross-sectional view of the wood splitter of FIG. 162 with disengaged stop;

FIG. 167 depicts a perspective view of a jack stand blade arm;

FIG. 168 depicts an alternate perspective view of the of the jack stand blade arm of FIG. 167;

FIG. 169A depicts a perspective view of a modified jack stand lift arm with multi-purpose hole;

FIG. 169B depicts an exploded perspective view of a modified jack stand lift arm with complementing wood splitter having protruding blade anchor;

FIG. 169C depicts a bottom perspective view of the wood splitter with protruding blade anchor of FIG. 169B;

FIG. 169D depicts a cross-sectional perspective view of the modified jack stand lift arm of FIG. 169B;

FIG. 169E depicts a top perspective view of a modified jack stand with a complementing material support assembly;

FIG. 169F depicts a cross-sectional view of the modified jack stand with a complementing material support assembly of FIG. 169E;

FIG. 169G depicts perspective view of example signs and flags coupled to sign poles suited for mounting in the multi-purpose hole of the modified jack stand lift arm of FIG. 169A;

FIG. 169H depicts perspective views of examples of various material support assemblies that are suited for mounting in the multi-purpose hole of the modified jack stand lift arm of FIG. 169A;

FIG. 169I depicts a top perspective view of an example of an alternative means of fixing an elongate support member to a jack stand lift arm using a U-shaped support bracket;

FIG. 169J depicts a partial exploded view of the U-shaped support bracket of FIG. 169I;

FIG. 169K depicts a partial top perspective view of a support bracket for mounting to an upper support surface of a jack stand lift arm;

FIG. 169L depicts a partial top perspective view of a support bracket for mounting to a first arm face of a jack stand lift arm;

FIG. 169M depicts a partial top perspective view of a clamping style support bracket for mounting to a first arm face of a jack stand lift arm;

FIG. 169N depicts a partial top perspective view of direct fixation of an elongate support member to a first arm face of a jack stand lift arm;

FIG. 169P depicts a top perspective view of a pair of modified jack stand lift arms used in conjunction with complementing elongate support members to support a ski wax strut;

FIG. 169Q depicts a bottom perspective view of the ski wax station of FIG. 169P with ski wax strut lifted off elongate support members;

FIG. 169R depicts perspective view of a size coupler which may be used to couple various sized elongate support members to a modified jack stand lift arm;

FIG. 170 depicts a top perspective view of a modified jack stand lift arm with recess for seating a tongue of a blade insert;

FIG. 171 depicts a bottom perspective view of a modified jack stand lift arm of FIG. 170 with wood splitter removed;

FIG. 172 depicts a bottom perspective view of a modified jack stand lift arm with recess for seating a tongue of a blade insert;

FIG. 173 depicts a top perspective view of the modified jack stand lift arm of FIG. 172 with wood splitter removed;

FIG. 174 depicts a top perspective view of an alternative form of jack stand base with cover blade seated over a superior end;

FIG. 175 depicts a top perspective exploded view of an alternative form of jack stand base and cover blade;

FIG. 176 depicts a bottom view of the cover blade depicted in FIG. 174;

FIG. 177 depicts a bottom perspective view of the cover blade depicted in FIG. 174;

FIG. 178 depicts a perspective view of a wood splitter configured for a captured ball configuration;

FIG. 179 depicts an opposing perspective view of the wood splitter of FIG. 178 configured for a captured ball configuration;

FIG. 180 depicts a perspective view of the wood splitter of FIG. 178 seated over a hitch ball on a ball mount assembly;

FIG. 181 depicts a cross-sectional perspective view of the wood splitter of FIG. 178 with view of the internal ball space;

FIG. 182 depicts a cross-sectional perspective view of the wood splitter of FIG. 178 (but turned 90 degrees to the FIG. 181 view) with view of the internal ball space;

FIG. 183 depicts a bottom perspective view of the wood splitter of FIG. 178 with view of the internal ball space;

FIG. 184 depicts a top perspective view of a novel wood splitter with optional integrated bottle opener;

FIG. 185 depicts an alternative top perspective view of the wood splitter of FIG. 184;

FIG. 186 depicts a bottom view of the wood splitter of FIG. 184;

FIG. 187 depicts a bottom perspective view of the wood splitter of FIG. 184;

FIG. 188 depicts a top perspective view of a wood splitter with log boss at the end of the blade portion;

FIG. 188B depicts an opposing perspective view of the wood splitter of FIG. 188;

FIG. 189 depicts a top perspective view of a wood splitter having a fixation portion with X-shaped profile;

FIG. 190 depicts a top perspective exploded view of a wood splitter having a tubular fixation portion for welded fixation to a blade portion;

FIG. 191 depicts a bottom perspective view of an adjunct blade;

FIG. 192 depicts a top perspective view of the adjunct blade of FIG. 191;

FIG. 193 depicts a top perspective view of an alternative adjunct blade;

FIG. 194 depicts a top perspective view of an adjunct blade;

FIG. 195 depicts a perspective view of a volume envelope in which wood splitters having a ball space or that are secured to a ball mount can fit;

FIG. 196 depicts a perspective view of a volume envelope in which wood splitters having a fixation portion operable to be received in a hitch receiver can fit;

FIG. 197 depicts a perspective view of a wood splitter mounted to a European style ball mount;

FIG. 198 depicts an exploded perspective view of the wood splitter of FIG. 197;

FIG. 199 depicts a bottom perspective view of the wood splitter illustrated in FIG. 197;

FIG. 200 depicts a cross-sectional perspective view vertically through the cut edge of the wood splitter of FIG. 197;

FIG. 201 depicts a side view of the wood splitter of FIG. 197;

FIG. 202 depicts a perspective view of a wood splitter with centered cut edge;

FIG. 203 depicts a perspective view of a wood splitter with offset cut edge;

FIG. 204 depicts an exploded view of a wood splitter comprising an alternative form of ball space reducer fit over a hitch ball;

FIG. 205 depicts a perspective view of the wood splitter of FIG. 204;

FIG. 206 depicts a bottom perspective view of a wood splitter with a blade cap;

FIG. 207 depicts a front perspective view of a wood splitter with a blade cap;

FIG. 208 depicts a front perspective view of a multi-function jack stand with integrated secondary support;

FIG. 209 depicts a front perspective view of a multi-function jack stand with integrated secondary support;

FIG. 210 depicts an exploded view of the multi-function jack stand of FIG. 209;

FIG. 211 depicts a front perspective view of a support strut of the multi-function jack stand of FIGS. 209-210;

FIG. 212 depicts a front perspective view of a multi-function jack stand with integrated secondary support and optional removed secondary key;

FIG. 213 depicts a front perspective view of a multi-function jack stand with integrated secondary support and optional secondary key inserted;

FIG. 214 depicts a front perspective view of a multi-function jack stand with integrated secondary support;

FIG. 215 depicts a front perspective view of a multi-function jack stand with integrated secondary support;

FIG. 216 depicts a front perspective view of a multi-function jack stand base with integrated secondary support;

FIG. 217 depicts a front perspective view of a multi-function jack stand with integrated secondary support and an inserted material support assembly;

FIG. 218 depicts a partially exploded front perspective view of a multi-function jack stand with integrated secondary support and material support assembly of FIG. 217;

FIG. 219 depicts a front perspective view of a multi-function jack stand with integrated secondary support and an inserted elongate support member;

FIG. 220 depicts a front perspective view of a multi-function jack stand with integrated secondary support and an inserted material support assembly;

FIG. 221 depicts a front perspective view of a multi-function jack stand with integrated secondary support;

FIG. 222 depicts a side perspective view of a multi-function jack stand with integrated secondary support and an inserted material support assembly;

FIG. 223 depicts a side perspective view of a multi-function jack stand with integrated secondary support and a material support assembly;

FIG. 224 depicts a partially exploded top perspective view of a multi-function jack stand with elongate support member and utility light;

FIG. 225 depicts a partially exploded top perspective view of a multi-function jack stand with utility light;

FIG. 226 depicts a bottom perspective view of a utility light for use with a multi-function jack stand;

FIG. 227 depicts a top perspective view of a multi-function jack stand with integrated secondary support and elongate support member utilized to support a screen, drape, curtain, or backdrop;

FIG. 228 depicts a partial perspective view of a support member receiver of an elongate support member and a utility aperture and utility fastener;

FIG. 229 depicts a partial exploded perspective view of a support member receiver of an elongate support member with a hanger for coupling with the elongate support member;

FIG. 230 depicts a partial exploded perspective view of a support member receiver of an elongate support member with a hanger for coupling with the elongate support member;

FIG. 231 depicts a partial exploded perspective view of a support member receiver of an elongate support member with camera mount for coupling with the elongate support member;

FIG. 232 depicts a partial exploded perspective view of a support member receiver of an elongate support member with a material support pod for coupling with the elongate support member;

FIG. 233 depicts a partial exploded perspective view of a support member receiver of an elongate support member with a material support pod for coupling with the elongate support member;

FIG. 234 depicts a partial exploded perspective view of a support member receiver of an elongate support member with a material support pod for coupling with the elongate support member;

FIG. 235 depicts a perspective view of a jack stand blade arm disposed in a base cavity of a jack stand base;

FIG. 236 depicts a partial exploded perspective view of the jack stand blade arm and jack stand base of FIG. 235;

FIG. 237 depicts a partial exploded inferior perspective view of the jack stand blade arm and a jack stand base of FIG. 235;

FIG. 238 depicts a perspective view of a jack stand blade arm;

FIG. 239 depicts a partial exploded inferior perspective view of a jack stand blade arm and a jack stand base;

FIG. 240 depicts a partial exploded view of a modular jack stand blade arm and jack stand base with a collector;

FIG. 241 depicts a cross-sectional view through a central plane of the modular jack stand blade arm and jack stand base with a collector of FIG. 240;

FIG. 242 depicts a side closeup view of the collector retainer illustrated in FIG. 240-241;

FIG. 243 depicts a side view of a jack stand blade arm and jack stand base with collector;

FIG. 244 depicts a top view of the jack stand blade arm and jack stand base with collector of FIG. 243;

FIG. 245 depicts a perspective view of a lift trunk;

FIG. 246 depicts a perspective view of a lift trunk;

FIG. 247 depicts a perspective view of a lift trunk;

FIG. 248 depicts a perspective view of a wood splitter;

FIG. 249 depicts a perspective view of a wood splitter;

FIG. 250 depicts a perspective view of a wood splitter;

FIG. 251 depicts a partially exploded perspective view of a lift trunk aligned for insertion in a jack stand base;

FIG. 252 depicts a partially exploded inferior perspective view of a modular wood splitter, lift trunk, and jack stand;

FIG. 253 depicts a partially exploded perspective view of an elongate support member, a lift trunk, and jack stand;

FIG. 254 is a diagram illustrating a method of converting a jack stand into a jack stand wood splitter using a jack stand blade arm;

FIG. 255 is a diagram illustrating a method of converting a jack stand into a jack stand wood splitter using a cover blade;

FIG. 256 is a diagram illustrating a method of converting a jack stand into a jack stand wood splitter using a cover blade;

FIG. 257 is a diagram illustrating a method of converting a lift trunk to utilize a jack stand as a multi-purpose jack stand.

Figure 258:
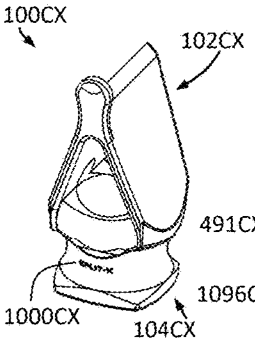
Figure 259:
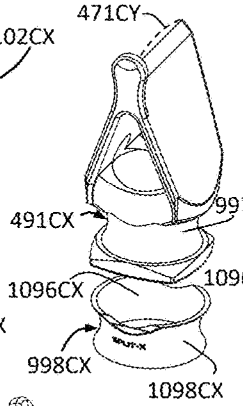
Figure 260:
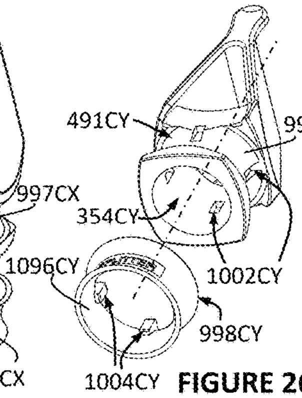
Figure 261:
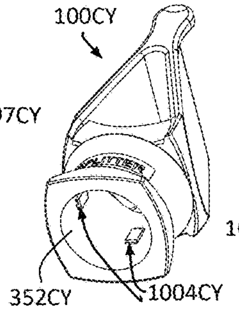
Figure 262:
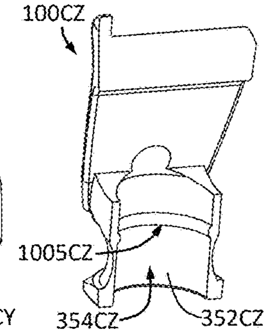
Figure 263:
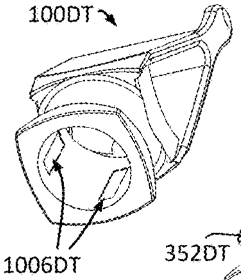
Figure 264:
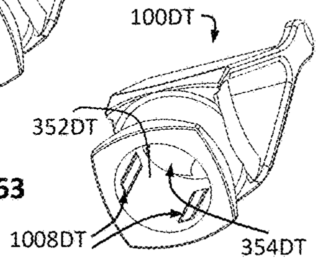
Figure 265A:
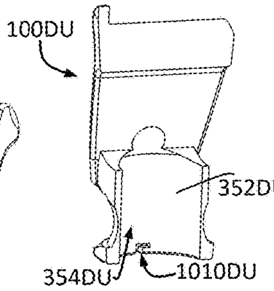
Figure 265B:
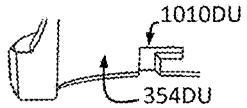
Figure 266:
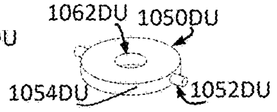
Figure 267:
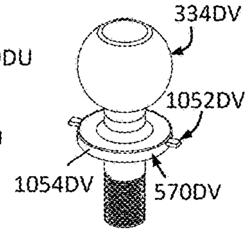
Figure 268:
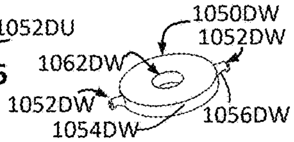
Figure 271A:
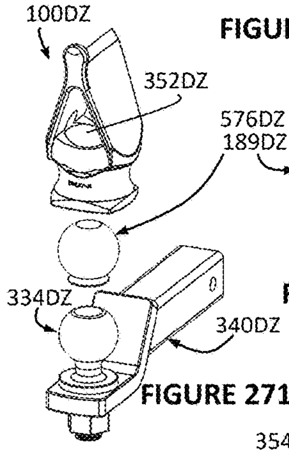
Figure 271B:
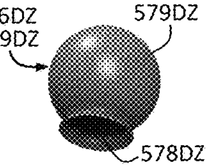
Figure 270:
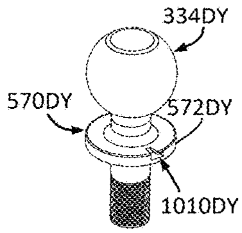
Figure 269:
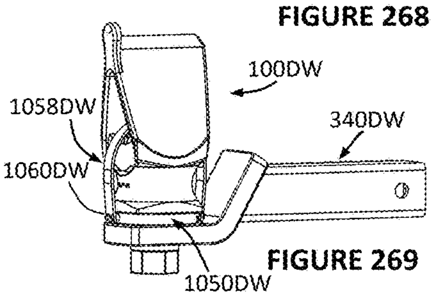
Figure 272:
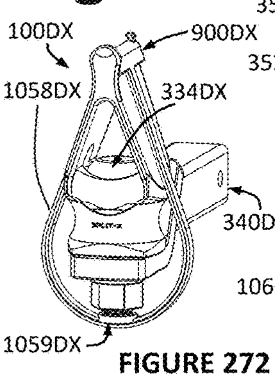
Figure 273:
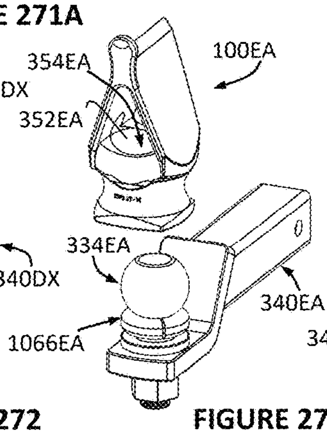
Figure 274:
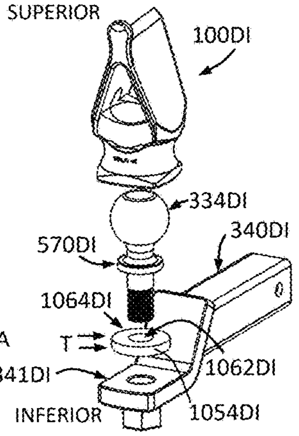
Figure 275:
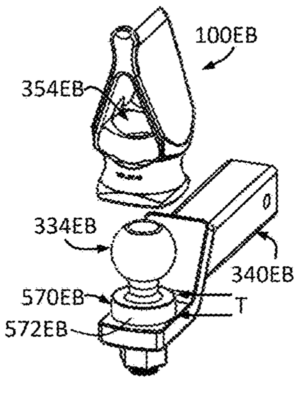
Figure 276:
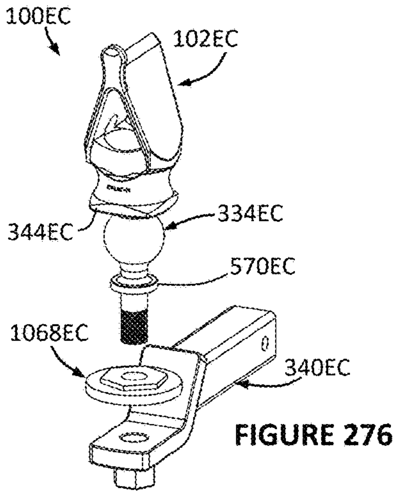
Figure 278:
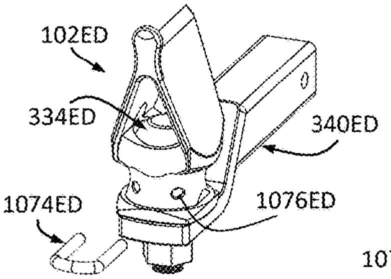
Figure 279:
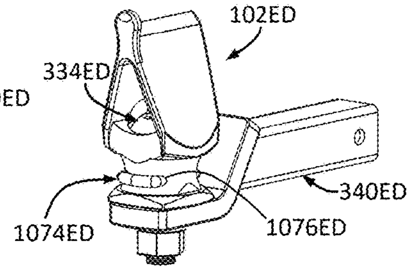
Figure 277:
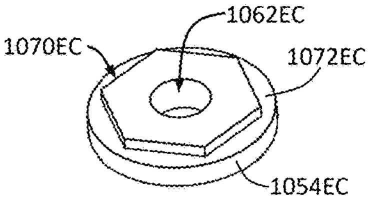
Figure 280:
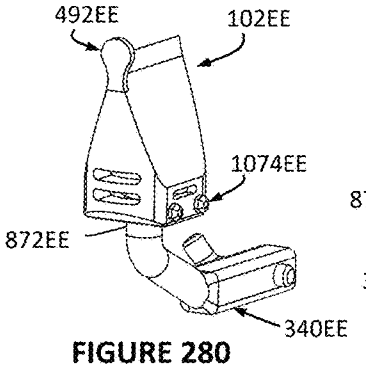
Figure 281:
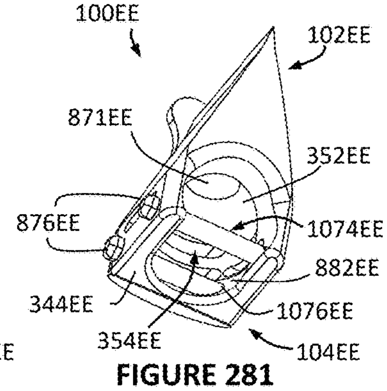
Figure 282:
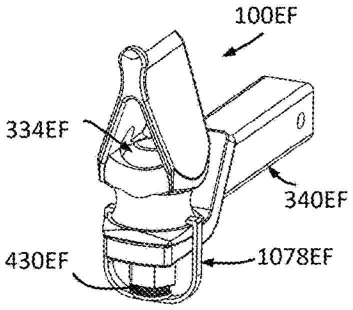
Figure 283:
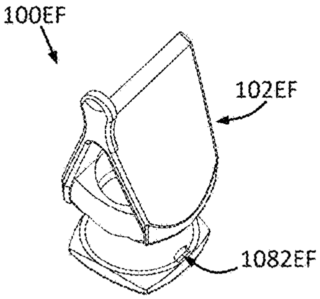
Figure 284:
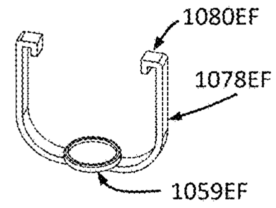
Figure 285:
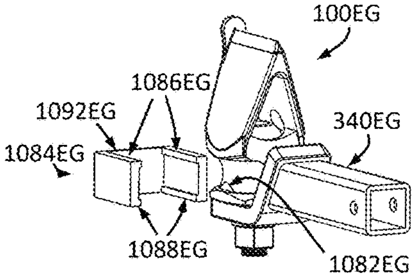
Figure 286:
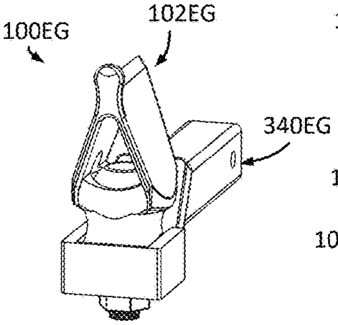
Figure 287:
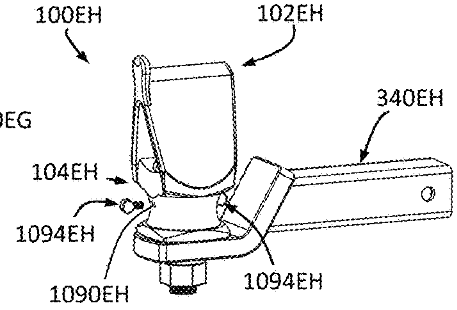

FIG. 258 depicts a perspective view of a wood splitter configured for a captured hitch ball fixation with grip band;

FIG. 259 depicts an exploded perspective view of FIG. 258;

FIG. 260 depicts an exploded perspective view of a wood splitter configured for a captured ball configuration with grip band;

FIG. 261 depicts a perspective view of the wood splitter of FIG. 260;

FIG. 262 depicts a cross-sectional view of a wood splitter with ball space having an internal annular bumper;

FIG. 263 depicts a bottom perspective view of a wood splitter configured for a captured ball configuration with bumper slots in the ball space;

FIG. 264 depicts the wood splitter of FIG. 263 with bumpers seated in the bumper slots;

FIG. 265A depicts a cross-sectional view of a wood splitter configured for a captured hitch ball with bayonet engagement slot at the lower end of the ball space;

FIG. 265B depicts a close-up view of the bayonet engagement slot of FIG. 265A;

FIG. 266 depicts a perspective view of a bayonet washer for fixation between a ball mount and a hitch ball (see FIG. 274);

FIG. 267 depicts a hitch ball with one or more bayonets integrated into its base;

FIG. 268 depicts a perspective view of a slotted bayonet washer for fixation between a ball mount and hitch ball (see FIG. 274);

FIG. 269 depicts a perspective view of the slotted bayonet washer of FIG. 268 used with a restraining band to secure a wood splitter;

FIG. 270 depicts a perspective view of a hitch ball base with integrated bayonet engagement slot;

FIG. 271A depicts a partial exploded view of a friction sleeve for placement over a hitch ball before placement of a wood splitter;

FIG. 271B is an enlarged perspective view of the friction sleeve illustrated in FIG. 271A;

FIG. 272 depicts a perspective view of a wood splitter seated over a ball mount and hitch ball with a banded blade guard;

FIG. 273 depicts an exploded perspective view of a donut bumper secured around the neck of a hitch ball before placement of a wood splitter;

FIG. 274 depicts an exploded perspective view of an elevated washer situated between a ball mount and a hitch ball base;

FIG. 275 depicts a partial exploded perspective view of a hitch ball with integrated base stabilizer;

FIG. 276 depicts an exploded perspective view of a stabilizer washer situated between a ball mount and hitch ball base;

FIG. 277 depicts an enlarged perspective view of the stabilizer washer in FIG. 276;

FIG. 278 depicts a partially exploded perspective view of a wood splitter configured with locking pin for locking onto a hitch ball;

FIG. 279 depicts a perspective view of the wood splitter locked with locking pin of FIG. 278;

FIG. 280 depicts a perspective view of a wood splitter operable to be fully supported on a hitch ball;

FIG. 281 depicts a bottom perspective view of the wood splitter of FIG. 280;

FIG. 282 depicts a perspective view of a wood splitter fixed to a ball mount by a lower restraint band;

FIG. 283 depicts a top perspective view of a wood splitter with restraint recesses as used in FIG. 282;

FIG. 284 depicts a top perspective view of the lower restraint band as illustrated in FIG. 282;

FIG. 285 depicts a rear partially exploded perspective view of a coupler clip for securing a wood splitter to a ball mount;

FIG. 286 depicts a front perspective view of a coupler clip engaged to secure the wood splitter of FIG. 285 to the ball mount;

FIG. 287 depicts a partially exploded perspective view of a wood splitter with set screw operable to hold a wood splitter to a hitch ball.

DETAILED DESCRIPTION OF SELECTED EMBODIMENTS

Select embodiments of the article of invention will now be described with reference to the Figures. Like numerals indicate like or corresponding elements throughout the several views. Various embodiments having like or corresponding elements are distinguished by letters (i.e. 100A, 100B, 100C, 100AA). Element numbers without an attached letter in most cases refers to objects used in conjunction with an embodiment of this disclosure (i.e., impact tool 105). Embodiments described in the Specification and Drawings are fully supported as will be recognized by those skilled in the art. To avoid redundant explanation in the Specification and redundant labeling of elements in the Drawings, like elements are not re-described and/or relabeled in every instance. Some features described and illustrated for one embodiment, may optionally be utilized within other similar embodiments although not described or illustrated in the feature to again avoid redundant work. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

FIGS. 1 through 4 illustrate an embodiment of the article of invention. In this embodiment, a wood splitter 100A is illustrated housed within a hitch receiver 126 that is fixed to a vehicle 127 such as for example, a car, a truck, a UTV, and trailer. Although not required, a hitch pin 112 (which may take other forms such as a bolt) is extended through a hole bored through a hitch receiver 126 and passes through a fixation bore 116A on a fixation portion of wood splitter 100A. A hitch pin retainer 114 may be used to secure hitch pin 112 in position. In this embodiment, wood splitter 100A comprises a primary blade 118A and an optional secondary blade 120A extending at an oblique angle from the primary blade. In preferred forms, the oblique angle is generally 90 degrees. As noted in FIG. 2, the blade portion 102A of the wood splitter is spaced sufficiently from the vehicle thereby avoiding damage to the vehicle during splitting actions. In this embodiment and others, the wood splitter 100A is manufactured from metal, preferably steels and their alloys. In some embodiments the steels are stainless steels. However, any material having sufficient strength, ductility, and hardness may be used such as aluminum, and aluminum alloys. In some places, polymers may be used. Individual parts and assemblies of the article of invention may be formed by one or more of a range of manufacturing processes including machining, casting, and forging. In some embodiments, the tools are in the form of a single casted or forged part. All or a portion of the blade portions may be hardened or remain unhardened. Some parts can be manufactured from plastic injection.

Figure 1:
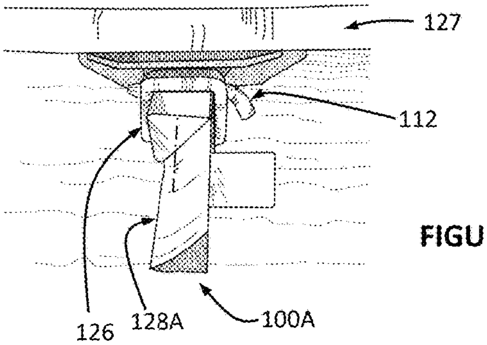
FIG. 1 depicts a top perspective view of a wood splitter mounted within a hitch receiver of a truck.
Figure 2:
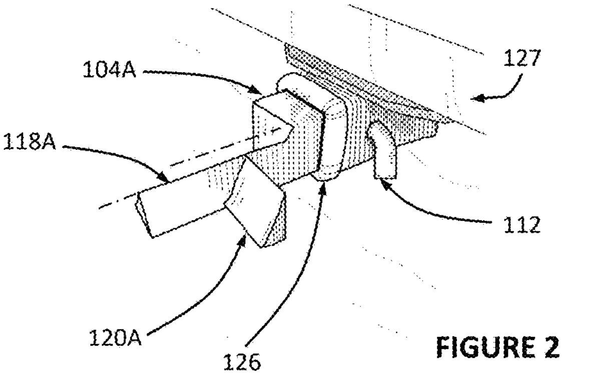
FIG. 2 depicts a side perspective view of a wood splitter mounted within a hitch receiver of a truck.
Figure 3:
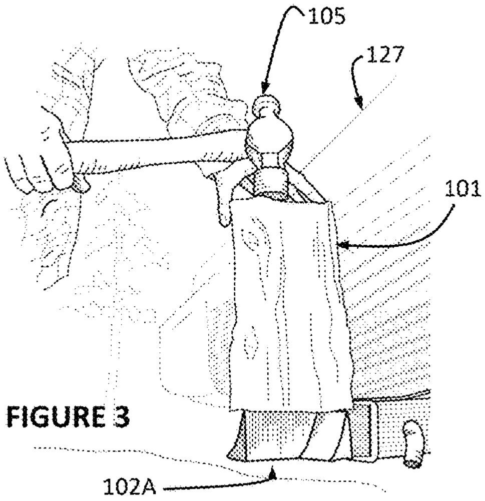
FIG. 3 depicts a side perspective view of a user using a hammer to impact a log against a wood splitter mounted within a hitch receiver of a truck.
Figure 88:
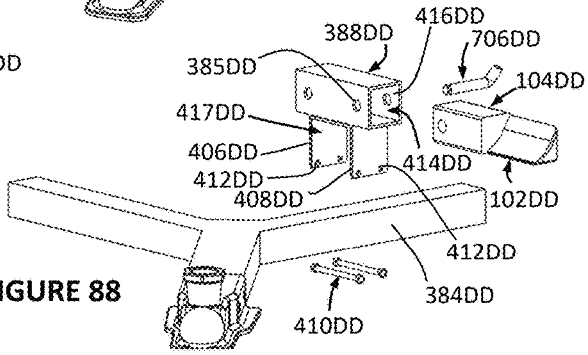
FIG. 88 depicts a top perspective exploded view of the wood splitter of FIG. 86.

FIG. 3 illustrates a user positioning a log on a blade portion 102A of a wood splitter 100A secured within a hitch receiver 126 of a vehicle such as a truck. The user holds the side of a log 101 or other wood with one hand and impacts the top of the log with an impact tool 105 such as a hammer or mallet. The impact causes the log 101 to be driven down over a primary blade 118A (and secondary blade 120A if so equipped) and also over a deflector portion 130A of the splitter. As a consequence of this, the log 101 is split into smaller pieces. In some embodiments, a collector (such as 258I in FIG. 30) is positioned below a wood splitter to capture the smaller wood pieces (also referred to as kindling 103) as they fall from the wood splitter. A wood splitter according to some embodiments of this invention are configured for being slidingly received in standard size hitch receiver openings such as a 2 inch×2 inch hitch receiver, and in other embodiments for a standard 1.25 inch×1.25 inch hitch receiver, standard 2.5 inch×2.5 inch hitch receiver, and 3 inch×3 inch hitch receivers. However, it is conceived the device could be used in any other custom sized receiver. In addition, the disclosed wood splitter embodiments may be received in parts functionally equivalent to hitch receivers for splitting purposes such as splitter sleeve 388DD (FIG. 88).

Referring back to FIG. 1, it illustrates one embodiment of the article of invention. In this embodiment a wood splitter comprises a fixation portion 104A and a blade portion 102A formed from a body portion 128A. The fixation portion 104A is generally configured to be received in a hitch receiver 126 secured to a vehicle 127. In this embodiment, fixation portion 104A is in the form of a solid bar made of a metal such as steel. The blade portion 102A comprises a primary blade 118A and in this embodiment also comprises an optional secondary blade 120A extending generally perpendicular to primary blade 118A. The primary blade 118A and secondary blade both have a cut edge 132A with a primary edge face 134A and a secondary edge face 136A. One or more of a primary edge face and a secondary edge face may be vertical or sloped. In some embodiments, a primary edge face 134A and secondary edge face 136A seamlessly transition into a primary deflector face 138A and secondary deflector face 140A of a deflector portion 130A whereas in other embodiments there is a distinct transition such as a change in angle between them. In some embodiments, the primary edge faces and secondary edge faces are separated from the primary and secondary deflector faces by respective primary and secondary transition faces.

Figure 4:
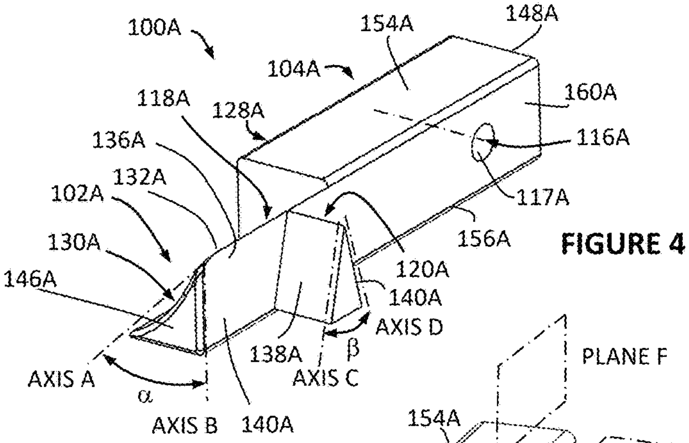
FIG. 4 depicts a top perspective view of a wood splitter with secondary blade for mounting within a hitch receiver of a vehicle.

Edge faces, transition faces, and deflector faces may assume a variety of profiles not limited to generally flat, concave, and convex. In preferred embodiments, the aforementioned primary and secondary blade components face generally upward however in other embodiments the blade portions are vertical or downward. Distances between opposed edge, transition, and deflector faces increase moving inferiorly from the cut edges as illustrated in FIG. 4. Axis A and axis B extend from a cut edge 132A and generally follow the included surfaces below thereby defining a slope angle $\alpha$. When the optional secondary blade is present, axis C and D extend from a cut edge of the secondary blade along the wedged surfaces defining a slope angle $\beta$. In preferred embodiments, these angles ($\alpha$ and $\beta$) range between 20 degrees and 80 degrees although they may assume values outside this range.

Figure 5:
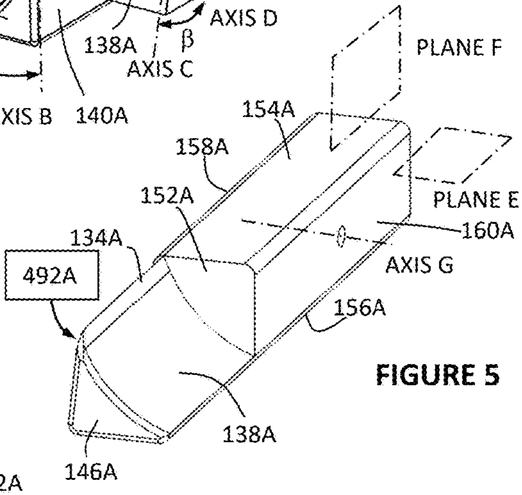
FIG. 5 depicts a top perspective view of a wood splitter for mounting within a hitch receiver of a vehicle.
Figure 22:
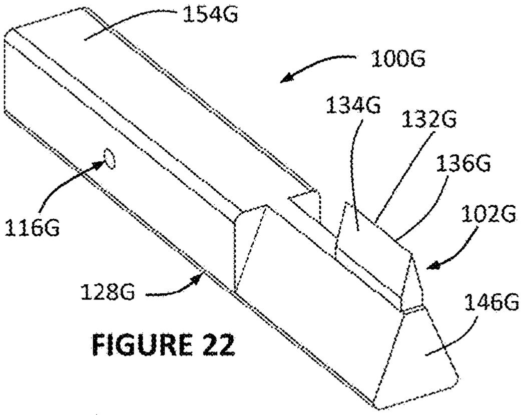
FIG. 22 depicts a top perspective view of a wood splitter having a removable portion of a blade portion for mounting within a hitch receiver of a vehicle.

In some embodiments, a cut edge of a blade portion is generally centered between sloping faces of a blade portion (i.e. FIG. 22). In other embodiments such as illustrated in FIGS. 4 and 5, a cut edge 132A is offset to one side of body portion 128A. This offset tends to create steeper incline faces on one side versus the other. A cut edge offset to the right (FIG. 4) is preferable for right-handed users, whereas a cut edge offset to the left (FIG. 5) is preferable for left hand users. Some embodiments include two cut edges so configured such that by rotating a wood splitter 90 degrees within a hitch receiver, a user may use a single wood splitter to perform left-handed and right handed splitting.

Embodiments having a secondary blade 120A, it is preferable the second blade also includes one or more opposed primary and secondary edge faces, transition faces, and deflector faces. Distances between opposed edge, transition, and deflector faces increase moving inferiorly from the cut edge of a secondary blade as represented by the angle β (FIG. 4) between axis C and axis D each extending down opposing slopes.

In this and other embodiments, a fixation portion 104A and other aspects of a body portion 128A may be defined by a top face 154A, a bottom face 156A, a first side face 158A, and a second side face 160A. A proximal end face 146A and a distal end face 148A are positioned at the opposing ends. A fixation face 117A defines a fixation bore 116A extending between first side face 158A and second side face 160A. Fixation bore 116A has an elongate axis G and is characterized by a diameter sufficient to house a hitch pin 112. It is preferred that fixation bore 116A is generally aligned with a horizontal mid plane (plane E) and is generally perpendicular to first and second side faces 158A and 160A. Embodiments configured to accommodate both left-handed and right-handed users may include a secondary fixation bore (not shown) extending between bottom face 156A and top face 154A. A distal blade face 152A may extend between blade portion 102A and fixation portion 104A. Plane F (FIG. 5) is orthogonal to plane E. Plane F stands vertical in operation and is centrally located between first and second side faces 158A, 160A within the fixation portion of wood splitter embodiments that are secured within a hitch receiver of a vehicle.

Figure 4B:
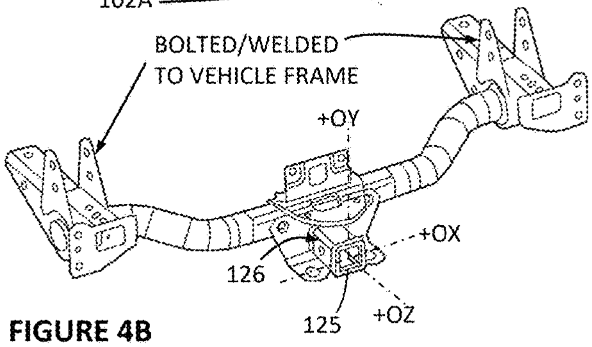
FIG. 4B depicts a top perspective view of one embodiment of a common hitch receiver and a receiver entry.
Figure 4A:
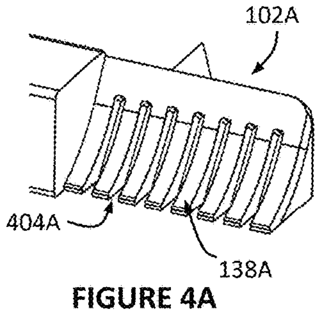
FIG. 4A depicts a partial top perspective view of a blade portion of a wood splitter having a plurality of vertical relief grooves extending along a deflector face.

FIG. 4A illustrates a blade portion of the wood splitter of FIG. 4 having a plurality of relief grooves 404A extending into a primary deflector face 138A of a blade portion 102A. The relief grooves 404A may be utilized in a variety of wood splitter embodiments having either primary or secondary deflector faces.

FIG. 4B illustrates one embodiment of a typical hitch receiver that is bolted or welded to the frame of a vehicle such as one of a car, truck, and UTV. Various vehicle mounted wood splitters as disclosed herein and in operable configurations are supported entirely by the hitch receiver of a vehicle (or ball mounts inserted therein) and in preferred embodiments are contained entirely within a defined space from an origin centered at the receiver entry 125 of the hitch receiver 126 whereas the defined space is between +5 inches and −3 inches along an axis OY, +/−3 inches along an axis OX, and +8 inches and −7 inches along axis OZ (−OZ extends into the hitch receiver). The '+' symbol designates a positive direction in FIG. 4B. Alternatively, a wood splitter in an operable configuration is supported entirely by the hitch receiver of a vehicle and is contained entirely within a defined space from an origin centered at the receiver entry of the hitch receiver whereas the defined space is between +7 inches and −5 inches along an axis OY, +/−5 inches along an axis OX, and +10 inches and −9 inches along axis OZ (−OZ extends into hitch receiver). In alternative embodiments, a wood splitter can extend outside the defined space.

Figure 6:
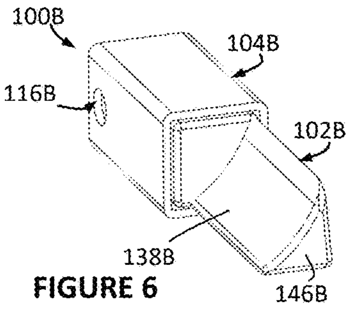
FIG. 6 depicts a top perspective view of a wood splitter having a substantially solid blade portion secured in a substantially tubular fixation portion for mounting within a hitch receiver of a vehicle.
Figure 7:
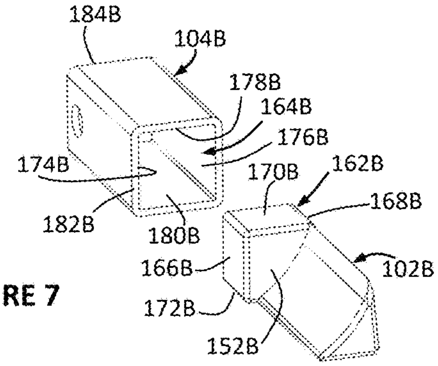
FIG. 7 depicts a top perspective exploded view of the wood splitter of FIG. 6 having a substantially solid blade portion secured in a substantially tubular fixation portion for mounting within a hitch receiver of a vehicle.

FIGS. 6-8 illustrates yet another embodiment of the article of invention. In this embodiment of a wood splitter 100B, a blade portion 102B comprises a blade extension 162B configured for seating within fixation recess 164B and held by one or more of; fasteners such as screws and pins, and welds. Blade extension 162B is defined by one or more of; a first side extension wall 166B, a second side extension wall 168B, an upper extension wall 170B, and a lower extension wall 172B. Fixation recess 164B comprises one or more of; an upper recess wall 178B, a lower recess wall 180B, a first side recess wall 174B, and a second side recess wall 176B. Fixation portion 104B comprises a proximal tube wall 182B and a distal tube wall 184B terminating the ends. As illustrated in FIG. 8, in some embodiments blade portion 102B does not comprises a four sided blade extension whereas the blade extension is two sided and is instead seated on second side extension wall 168B and lower extension wall 172B against respective second side recess wall 176B and lower recess wall 180B.

FIGS. 9 and 10A illustrate another embodiment of the article of invention equipped with a guide portion. In this embodiment, guide portion 106C comprises a guide wall 186C having a guide surface 188C formed thereon. Extending from guide wall 186C is a first guide leg 190C which is spaced from a second guide leg 192C. Body portion 128C is equipped with one or more guide receivers. The guide receivers may be in the form of a bored hole or may assume other forms capable of securing one or more guide legs and guide feet if present. In this embodiment, wood splitter 100C comprises a first guide receiver 108C disposed in top face 154C and a second guide receiver 110C disposed in proximal end face 146C however the guide receivers may be positioned at other faces such as a second side face. As illustrated here, a guide leg may include a guide foot portion such as the second guide foot 196C which is housed within second guide receiver 110C. Each guide receiver may comprise a radial guide face defining the walls of the bore and an end guide face at the bottom of the bore.

FIG. 10B illustrates a variation of the guide portion 106C illustrated in FIG. 9. The embodiment in FIG. 9 has a generally horizontal guide wall 186C with guide surface 188C formed thereon having a curved or semi-circular shape. In contrast, guide portion 106C in FIG. 10C comprises a generally horizontal guide wall 186C with guide surface 188C that is generally linear along a portion adjacent cut edge 132C.

Guide portion 106C in FIGS. 9, 10A, 10B, and 10C are configured to have a deflectable insertion. Therefore, to attach guide portion 106C to body portion 128C, first guide leg 190C is inserted in first guide receiver 108C, then guide portion 106C is pivoted such that second guide foot 196C is near second guide receiver 110C. The user applies a force to second guide leg 192C to deflect it far enough to clear proximal end face 146C until it can be aligned with second guide receiver 110C. The user then releases second guide leg 192C thereby allowing it to spring into second guide receiver 110C thus securing it in position. A reverse of these steps are used to remove guide portion 106C from body portion 128C.

FIGS. 11-13 illustrates another embodiment of the article of invention also equipped with a guide portion 106D. In this embodiment, a proximal end of blade portion 102D comprises a guide boss 198D configured with a first guide receiver 108D positioned generally vertical along axis K in this embodiment and disposed in a generally horizontal positioned guide boss face 199D. A second proximal end face 147D transitions between guide boss 198D and cut edge 132D. First pin recess 200D houses first lock pin 206D, and second pin recess 202D houses second lock pin 208D and third pin recess 204D in first guide leg 190D houses third lock pin 210D. When first guide leg 190D is inserted into first guide receiver 108D, motion of guide portion 106D is limited by third lock pin 210D being captured between first lock pin 206D and second lock pin 208D. In addition, third lock pin 210D may be used to set first guide leg 190 vertical position within first guide receiver 108D. In this embodiment, guide portion 106D is an "L" shape. Guide portion 106D may be configured to lift out and be removed by the user, or may be fixed within by a pin, screw, weld or other means. For example, a fourth lock pin 214D can be seated within fourth pin recess 212D at the inferior end of first guide leg 190D to limit removal.

Figure 16:
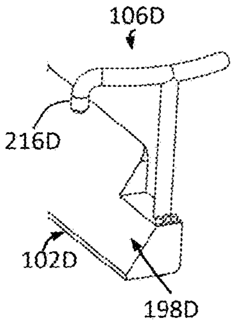
FIG. 16 depicts a partial top perspective view of a wood splitter having a guard portion with softened end seated within a guard receiver and wherein the wood splitter is configured for mounting within a hitch receiver of a vehicle.
Figure 17:
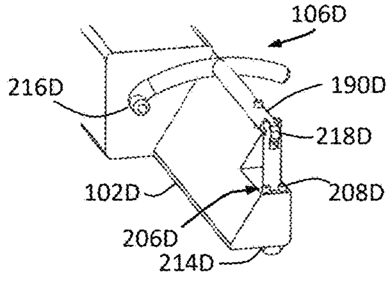
FIG. 17 depicts a partial top perspective view of a wood splitter having a collapsible guard portion seated within a guard receiver and wherein the wood splitter is configured for mounting within a hitch receiver of a vehicle.
Figure 18:
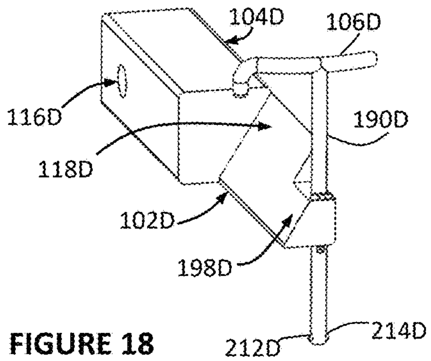
FIG. 18 depicts a top perspective view of a wood splitter having a guard portion seated within a guard receiver in an operational mode and wherein the wood splitter is configured for mounting within a hitch receiver of a vehicle.

FIG. 14 illustrates a similar wood splitter 100D embodiment however, guide portion 106D is in the shape of a "T". The shape of guide portion 106D may be fashioned into a wide range of shapes. FIG. 15 illustrates a top view of a "T" shaped guide portion 106D. FIG. 16 illustrates a partial view of a "T" shaped guide portion having a buffer leg 216D to soften contact by a user. FIGS. 17 and 18 illustrate an embodiment wherein a first guide leg 190D comprises a pivot joint 218D thus providing an option to fold a superior portion of a guide portion 106D down over primary blade 118D in a storage mode thereby reducing the profile and shielding a user from accidental harm. During operation, guide portion 106D is lifted upright and lowered into first guide receiver 108D consequently aligning pivot joint 218D along axis K and locking it as illustrated in FIG. 18. Third lock pin 210D holds the vertical position.

Figure 19:
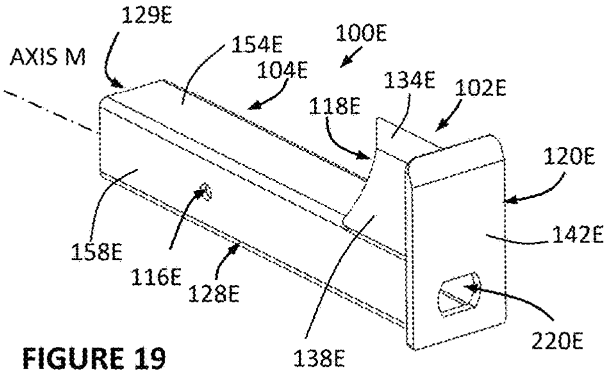
FIG. 19 depicts a top perspective view of a wood splitter with secondary blade for mounting within a hitch receiver of a vehicle.
Figure 20:
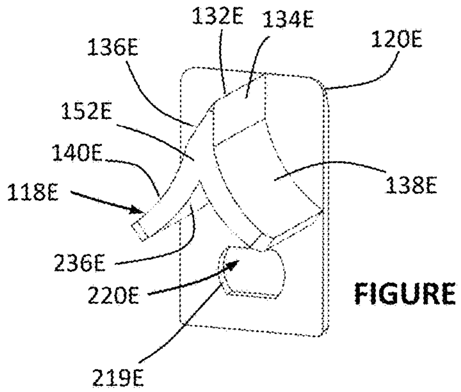
FIG. 20 depicts a perspective view of a blade portion of the wood splitter of FIG. 19 for mounting within a hitch receiver of a vehicle.

FIG. 19-20 illustrates another embodiment of the article of invention equipped with both a primary blade 118E and a secondary blade 120E aligned generally perpendicular to each other. The secondary blade option provides for the creation of an additional wood piece during each wood splitting cycle. In this embodiment, body portion 128E is in the form of a generally square elongate tube although the illustrated embodiment and other embodiments may alternatively use a solid elongate bar, U-channel, L-shape, or other shape configuration. When using non-bar materials, wall thicknesses should be sufficient to prevent plastic deformation upon splitting impact. In this embodiment, body portion 128E serves as both a fixation portion 104E and as a support of blade portion 102E. In this embodiment, primary blade 118E comprises opposed primary deflector face 138E and secondary deflector face 140E to wedge the wood apart during splitting. Superiorly, the deflector faces narrow and transition into primary edge face 134E and secondary edge face 136E until reaching cut edge 132E. Inferiorly, blade bottom blade surface 236E rests over top face 154E of body portion 128E and is secured in place with welds therebetween. An optional secondary blade 120E is joined, preferably by welding, to a proximal end face of body portion 128E and primary blade 118E. In some embodiments as illustrated here, a bottle opener recess 220E defined by an opener face 219E is provided for the user to open and consume bottled drinks when splitting wood. In this embodiment, bottle open recess 220E is positioned for opening to the internal tube cavity 129E of body portion 128E. Although most embodiments illustrate the cut edge of a primary blade or secondary blade to be generally linear, in alternative embodiments, the cut edge may be concave or convex superiorly.

Figure 21:
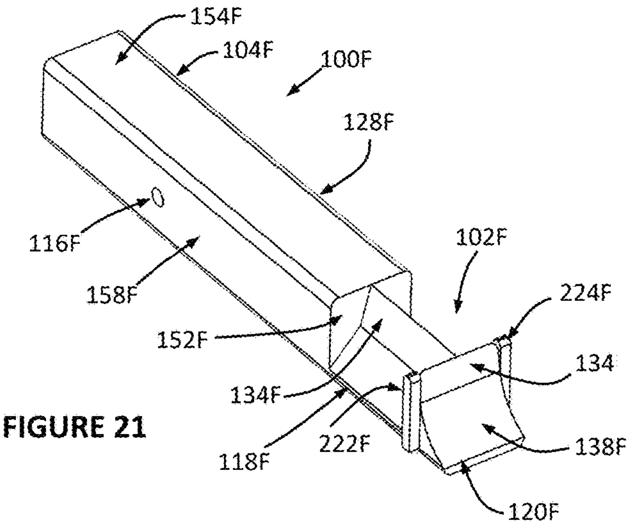
FIG. 21 depicts a top perspective view of a wood splitter for mounting within a hitch receiver of a vehicle.

FIG. 21 illustrates another embodiment of the article of invention. In this embodiment, wood splitter 100F comprises a solid body portion 128F. Here primary blade 118F and optional secondary blade 120F are machined or casted. As illustrated in this embodiment, a blunt sided first bumper 222F and a second bumper 224F may be secured to the side edges of blades to reduce blade exposure. The bumper is sometimes referred to as a log boss or side boss.

Figure 23:
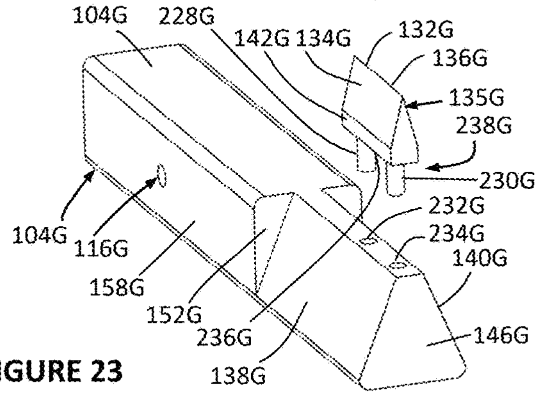
FIG. 23 depicts a top perspective exploded view of the wood splitter of FIG. 22 having a removable portion of a blade portion and whereby the wood splitter is for mounting within a hitch receiver of a vehicle.

FIG. 22-23 illustrates another embodiment of a wood splitter 100G comprising a body portion 128G that is solid and having a blade portion 102G that is at least partially removable. Sloped primary deflector face 138G and secondary deflector face 140G are cut in body portion 128G. A blade interlock 238G mechanism is used to secure a removable edge portion 135G of the blade from blade portion 102G. In this embodiment blade interlock 238G is in the form of a pair of spaced tongues namely first tongue 228G and second tongue 230G extending from blade bottom surface 236G. The first tongue 228G and second tongue 230G are received a complementary first recess 232G and second recess 234G in an operational configuration and the removable aspect may be separated from the blade portion in a storage configuration as illustrated in FIG. 23. Alternatively, the recesses and tongues may be reversed such that the tongues extend from body portion 128G.

Figure 24:
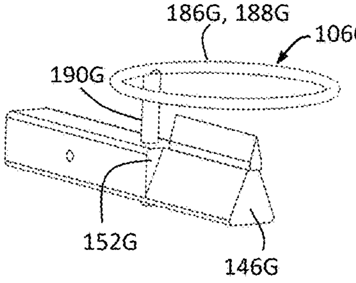
FIG. 24 depicts a top perspective view of the wood splitter of FIG. 22 including a guard portion for mounting within a hitch receiver of a vehicle.
Figure 25:
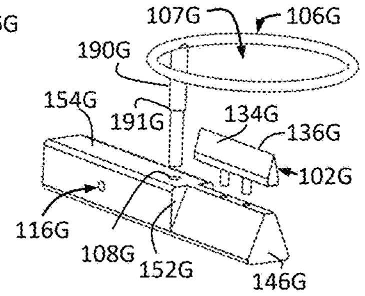
FIG. 25 depicts a top perspective exploded view of the wood splitter of FIG. 22 including a guard portion for mounting within a hitch receiver of a vehicle.
Figure 26:
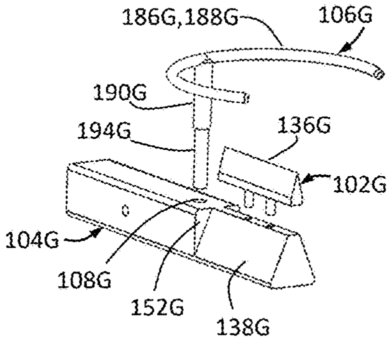
FIG. 26 depicts a top perspective view of the wood splitter of FIG. 22 including an alternative guard portion for mounting within a hitch receiver of a vehicle.

FIG. 24-25 illustrates an embodiment of the wood splitter of FIG. 22 with a guide portion 106G. In this embodiment, guide portion 106G comprises guide wall 186G with guide surface 188G thereon wherein the guide wall is in the form of a generally horizontally ring, however, may form other shapes such as an oval or square in other embodiments. Guide wall 186G is supported by at least one first guide leg 190G and generally centered superiorly (but may be offset) over blade portion 102G. First guide leg 190G is received in first guide receiver 108G to support it in position. A leg stop 191G may be used to properly position the guide legs. Examples of leg stops may include lock pins as described earlier, bosses, spring clips, leg diameter changes (as illustrated here). FIG. 26 illustrates an alternative shaped guide wall 186G that is opened at one end for user convenience. In alternative embodiments, portions of the guide wall 186G may be linear as discussed earlier and cut edges 132G of blade portion 102G may be offset from center as illustrated elsewhere in this disclosure. In embodiments wherein the guide wall is ring shaped, it consequently defines a guide aperture 107G through which the user feeds wood to be split.

Figure 27:
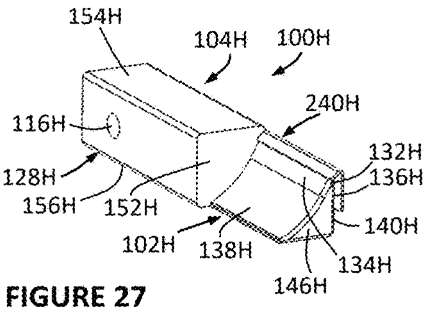
FIG. 27 depicts a top perspective view of a wood splitter including a blade cover for mounting within a hitch receiver of a vehicle.
Figure 28:
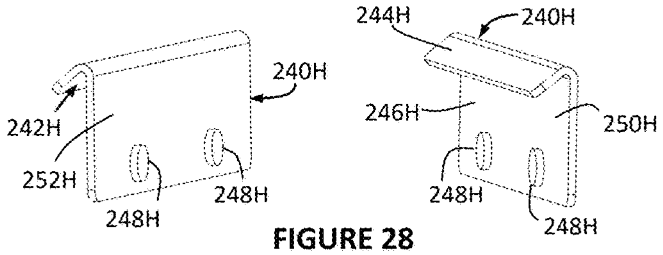
FIG. 28 depicts two side views of the blade cover illustrated in FIG. 27.

FIGS. 27 and 28 illustrate an embodiment of a blade cover 240H for use during a storage configuration (mode) to minimize exposure to a blade portion 102H when not in use. In this embodiment, blade cover 240H comprises a primary cover wall 244H and a secondary cover wall 246H intersecting to form an edge pocket 242H of size and shape to enclose a cut edge 132H. Primary cover wall 244H and secondary cover wall 246H are preferably shaped to generally parallel any one or more corresponding edge faces, deflector faces, and transition faces of blade portion 102H. In one embodiment, blade cover 240H comprises one or more magnets 248H secured to secondary cover wall 246H on inner cover surface 250H and on external cover surface 252H. Magnets 248H on inner cover surface 250H, releasably secure the cover over cut edge 132H by magnetic attraction with blade portion 102H. Magnets 248H on external cover surface 252H, secure blade cover 240H to a part of body portion 128H such as bottom face 156H to prevent loss when wood splitter 100H is used in operational mode. However, inner cover magnets may be used in both a storage and operational mode.

Figure 29:
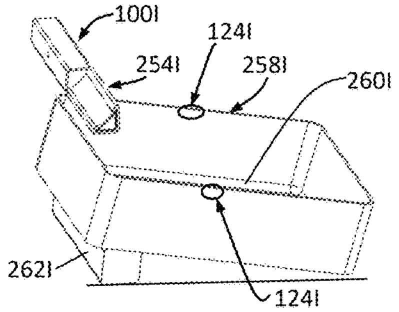
FIG. 29 depicts a top perspective view of a wood splitter including a blade cover positioned over a kindling collector.
Figure 30:
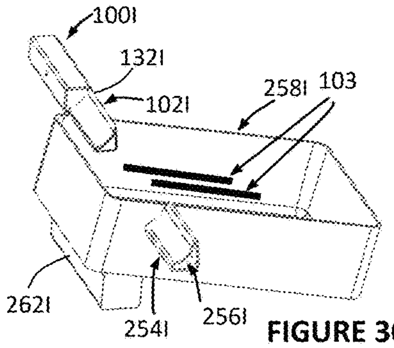
FIG. 30 depicts a top perspective view of a wood splitter with a blade cover removed and positioned over a kindling collector.

FIGS. 29 and 30 illustrate an embodiment of a wood splitter 100I as it would be if secured in a hitch receiver of a vehicle 127 with a collector 258I positioned between wood splitter 100I and a ground surface. As wood is driven downward over a cut edge 132I, wood pieces such as kindling 103 are split off and fall into collector 258I. Collector 258I is in the form of a bucket or tub in some embodiments and may comprise a collector handle 124I such as a bucket handle for carrying convenience. As noted in FIG. 30, sleeve 254I is preferably sized and shaped with sleeve cavity 256I to complement the size and shape of blade portion 102I and be slid off in an operational configuration and slid over blade portion 102I in a storage configuration thereby limiting exposure injury to the blade portion. Collector 258I may be inclined such that split wood pieces fall away from blade portion 102I and collect on collector floor 260I. An elevator 262I such as a wood block or brick may be used to provide inclination to encourage kindling to fall in a somewhat orderly pile.

Figure 31:
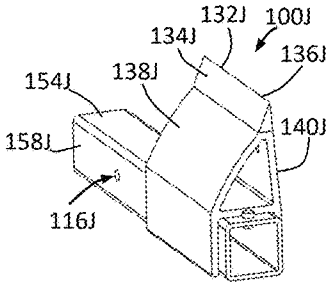
FIG. 31 depicts a top perspective view of a wood splitter having a removeable blade portion and an extruded deflector body portion.
Figure 32:
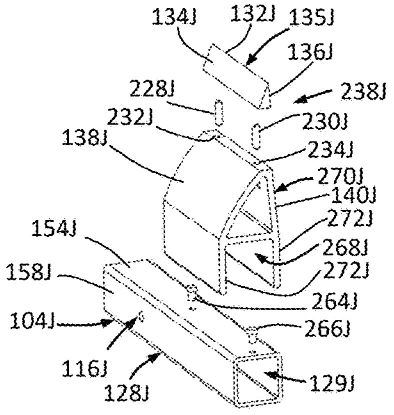
FIG. 32 depicts a top perspective exploded view of the wood splitter of FIG. 31.
Figure 33:
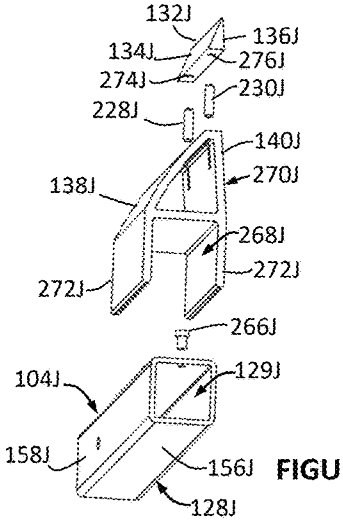
FIG. 33 depicts a bottom perspective exploded view of the wood splitter of FIG. 31.

FIG. 31-33 illustrates another embodiment of a wood splitter 100J comprising a deflector saddle 270J portion. The deflector saddle 270J in this embodiment is extruded (although other techniques such as casting can used) preferably of an aluminum alloy with primary deflector face 138J and secondary deflector face 140J integrated into the body of the extrusion. The deflector saddle 270J portion is configured for fixed or removable mounting on top face 154J of body portion 128J. In a fixed configuration, fasteners or equivalents may be used. In a removable configuration, deflector saddle 270J may include a pair of opposing saddle legs 272J defining a U-channel 268J sized to slide over and seat on body portion 128J. A first positioner 264J and a second positioner 266J are positioned on and protrude from top face 154J to position deflector saddle 270J portion therebetween. Also illustrated is a blade interlock 238J operating as described with previous embodiments.

Figure 34:
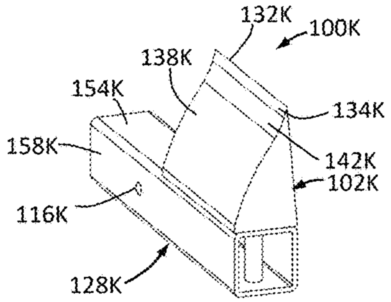
FIG. 34 depicts a top perspective view of a wood splitter having a removeable blade portion.
Figure 35:
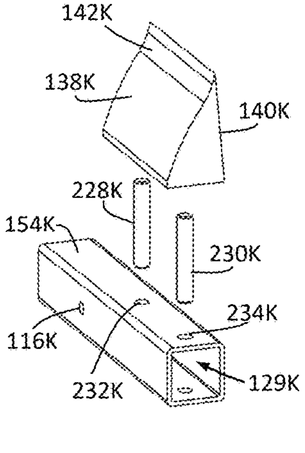
FIG. 35 depicts a top perspective exploded view of the wood splitter of FIG. 34.
Figure 36:
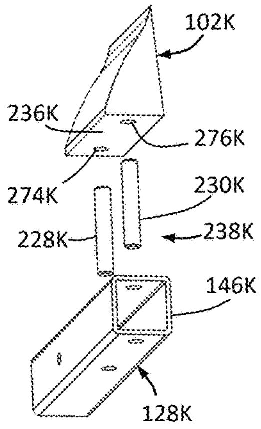
FIG. 36 depicts a bottom perspective exploded view of the wood splitter of FIG. 34.

FIGS. 34-36 illustrates yet another embodiment of a wood splitter 100K comprising a blade portion 102K fixed or removably fixed to top face 154K of body portion 128K. Body portion 128K may be solid or tubular. First tongue 228K and second tongue 230K are pressed, threaded or otherwise fixed in respective first blade port 274K and second blade port 276K which are disposed in blade bottom surface 236K. First and second tongue 228K, 230K are housed in respective first recess 232K and second recess 234K which extend into top face 154K of body portion 128K. In other forms first tongue 228K and second tongue 230K are in the form of bolts for fastening blade portion 102K to top face 154K. In some forms blade portion 102K is welded to body portion 128K.

Figure 37:
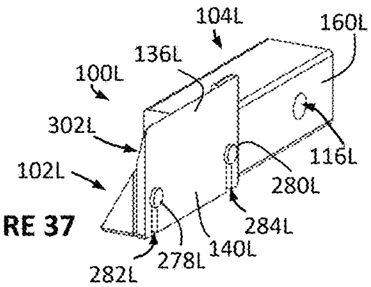
FIG. 37 depicts a top perspective view of a wood splitter having a removeable blade portion.
Figure 38:
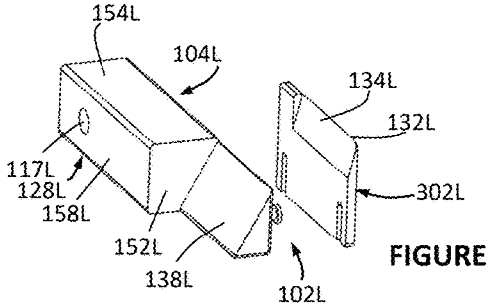
FIG. 38 depicts a top perspective exploded view of the wood splitter of FIG. 37.
Figure 39:
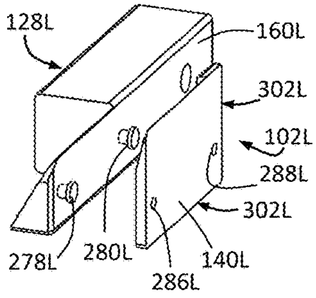
FIG. 39 depicts a top perspective exploded view of the wood splitter of FIG. 37.

FIG. 37-39 illustrates another embodiment of a wood splitter 100L comprising a removable blade plate 302L. Here, a part of blade portion 102L is in the form of a blade plate 302L having a cut edge 132L at a superior end and at least one of a primary and a secondary edge face 134L, 136L. Extending from an inferior end of the plate is a generally vertical first blade slot 282L and a distally spaced second blade slot 284L. A complementing first blade post 278L and a second blade post 280L having heads are positioned for securing the removable blade plate 302L adjacent second side face 160L. Primary deflector face 138L is sloped to meet removable blade plate 302L. As yet another variation, removable blade plate 302L comprises a first blade hole 286L and a second blade hole 288L extending through removable blade plate 302L. In this embodiment, first blade post 278L and second blade post 280L are in the form of screw fasteners for threadably locking the plate to body portion 128L.

Figure 40A:
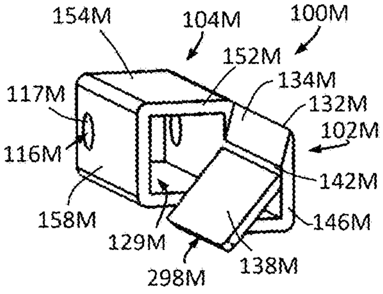
FIG. 40A depicts a top perspective view of a wood splitter having an integrated blade portion.
Figure 40B:
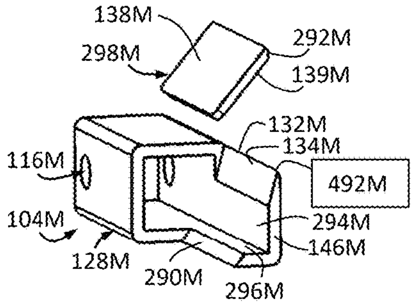
FIG. 40B depicts a top perspective exploded view of the wood splitter of FIG. 40A having an integrated blade portion.
Figure 45:
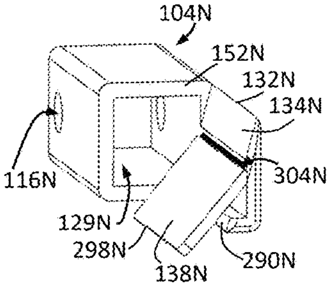
FIG. 45 depicts a top perspective view of a wood splitter configured for mounting within a hitch receiver of a vehicle.
Figure 46:
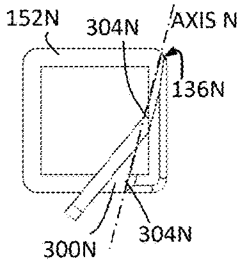
FIG. 46 depicts an end view of the wood splitter of FIG. 45 with integrated blade portion and configured for mounting within a hitch receiver of a vehicle.

FIG. 40A, 40B illustrate an embodiment of a wood splitter 100M comprising a cut edge 132M integrated into an upright wall 294M of tubular body portion 128M. A base wall 296M extends horizontally from the bottom of upright wall 294M. Sloped at the end of base wall 296M is deflector support face 290M for support of sub-primary deflector face 139M of deflector plate 298M. Deflector mate face 292M abuts an inside surface of upright wall 294M. A weld may be used at contact junctions between deflector plate 298L and one or more of upright wall 294M and deflector support face 290M. Note that primary edge face 134M is sloped steeper than primary deflector face 138M in preferred embodiments. Similarly, FIGS. 45-48A illustrate various embodiments with deflector plate mounting variations. In these embodiments, primary edge face 134N, 134P are aligned with respective deflector support face 290N, 290P for simplified manufacturing purposes. FIG. 45, 46 illustrate use of a support wedge 300N to provide support to deflector plate 298N, whereas in the embodiment in FIG. 47, 48A a sub-primary deflector face 139P is supported at an upper edge of deflector support face 290P. Contact junctions between the deflector plate and a base wall and an upper wall are preferably welded 304P. Welds 304N also hold support wedge 300N in place.

Figure 41A:
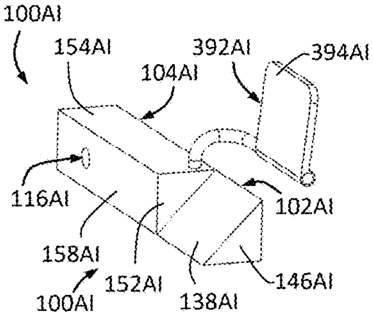
FIG. 41A depicts a top perspective view of a wood splitter having a pivotable blade guide and cover.
Figure 41B:
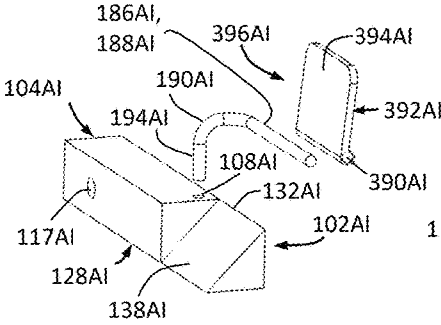
FIG. 41B depicts a top perspective exploded view of the wood splitter of FIG. 41A.

FIGS. 41A-41B illustrate an embodiment of a wood splitter 100AI configured with a foldable guide 396AI that functions as a blade cover in a storage configuration. In this embodiment, first guide receiver 108AI extends into body portion 128AI through top face 154AI. First guide foot 194AI at the terminal end of first guide leg 190AI is housed in first guide receiver 108AI. Guide wall 186AI with guide surface 188AI thereon runs generally parallel, superior, and along the length of cut edge 132AI. Pivot plate 392AI comprises a pivot cylinder 390AI extending along an inferior edge of pivot plate 392AI allowing consequent movement between it and guide wall 186AI. Pivot motion of pivot cylinder is limited to approximately 90 degrees between an operational and storage configuration. In an operational configuration, shield face 394AI is generally upright to serve as a guide to log 101 pieces to be split. In a storage configuration, pivot plate 392AI is folded down covering cut edge 132AI.

Figure 42:
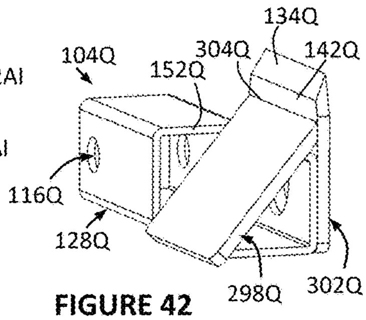
FIG. 42 depicts a top perspective view of a wood splitter having a side mounted blade portion configured for mounting within a hitch receiver of a vehicle.
Figure 43:
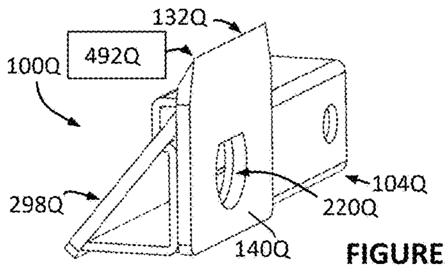
FIG. 43 depicts a top perspective view of the wood splitter of FIG. 42 for mounting within a hitch receiver of a vehicle.
Figure 44:
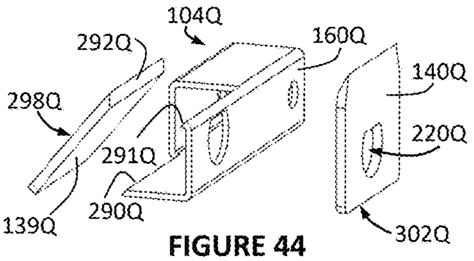
FIG. 44 depicts an exploded top perspective view of the wood splitter of FIG. 42 configured for mounting within a hitch receiver of a vehicle.

FIGS. 42-44 illustrate an embodiment of a wood splitter 100Q having a deflector plate 298Q supported at upper deflector support face 291Q and deflector support face 290Q. Blade plate 302Q is secured to second side face 160Q and deflector mate face 292Q abuts primary transition face 142Q. Blade plate 302Q includes in this embodiment a bottle opener recess 220Q. Again, welds 304Q are preferably utilized to secure deflector plate 298Q to body portion 128Q and to blade plate 302Q. Likewise, welds are preferably utilized to secure blade plate 302Q to second side face 160Q.

Figure 47:
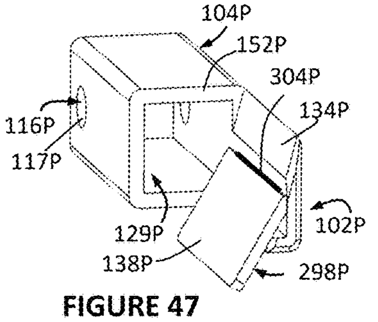
FIG. 47 depicts a top perspective view of a wood splitter with integrated blade portion for mounting within a hitch receiver of a vehicle.
Figure 48A:
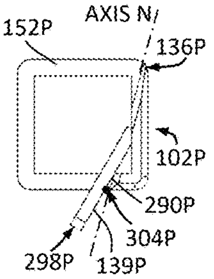
FIG. 48A depicts an end view of the wood splitter of FIG. 47 configured for mounting within a hitch receiver of a vehicle.
Figure 48B:
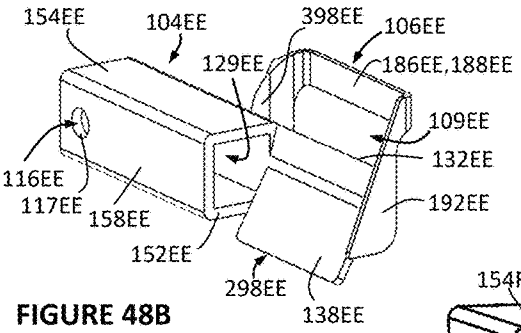
FIG. 48B depicts an end view of the wood splitter of FIG. 47 with guide configured for mounting within a hitch receiver of a vehicle.
Figure 48C:
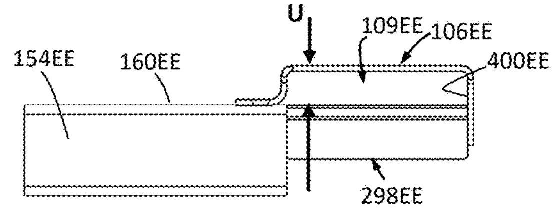
FIG. 48C depicts a top view of the wood splitter of FIG. 47 with guide configured for mounting within a hitch receiver of a vehicle.
Figure 48D:
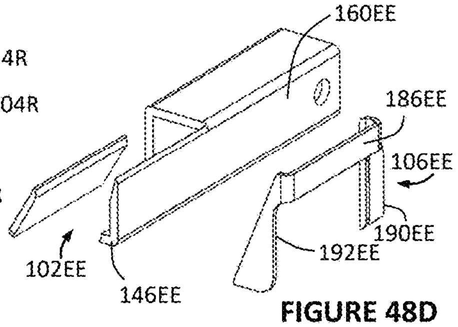
FIG. 48D depicts an exploded view of the wood splitter of FIG. 47 with guide configured for mounting within a hitch receiver of a vehicle.

FIGS. 48B, 48C, and 48D illustrate the wood splitter of FIG. 47 with one embodiment of a guide portion 106EE. In this embodiment, guide portion 106EE is generally U-shaped comprising a generally flat guide wall 186EE with guide surface 188EE formed thereon positioned substantially parallel and superior yet offset (by distance 'U') from cut edge 132EE. This arrangement defines a fall aperture 109EE through which split wood pieces will fall during splitting operations. Extending inferiorly at a distal end of guide wall 186EE is first guide leg 190EE with first fixation face 398EE thereon. Extending inferiorly at a proximal end of guide wall 186EE is second guide leg 192EE with second fixation face 400EE formed thereon. First fixation face 398EE is secured to second side face 160EE and second fixation face 400EE is secured to proximal end face 146EE. In preferred embodiments this fixation is by use of fasteners for the purpose of guide portion 106EE removal for blade sharpening otherwise welds and other similar mechanical operations may be used.

Figure 49:
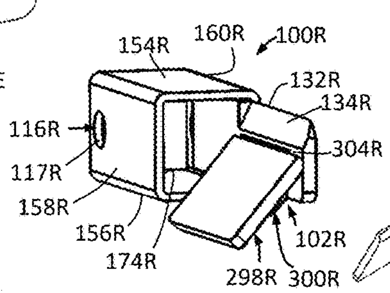
FIG. 49 depicts a top perspective view of a wood splitter having a flat blade portion for mounting within a hitch receiver of a vehicle.
Figure 50:
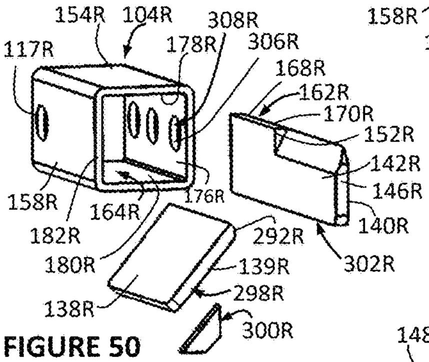
FIG. 50 depicts an exploded view of the wood splitter illustrated in FIG. 49.

FIG. 49-50 illustrates another embodiment of a wood splitter 100R comprising a joined tubular fixation portion 104R and a blade plate 302R. In this embodiment, blade plate 302R comprises a blade extension 162R for fixation against at least one of the internal tube faces within fixation recess 164R (alternatively, blade extension 162R may be fixed against an external tube face such as first side face 158R or second side face 160R). In this embodiment, blade extension 162R is fixed against second side recess wall 176R within fixation recess 164R. Fixation aperture wall 306R defines one or more fixation apertures 308R which may be used to weld blade plate 302R second side recess wall 176R. Alternatively, fasteners may be used to secure blade plate 302R to second side recess wall 176R. As a further alternative, blade plate 302R may be welded from inside fixation recess 164R to one of the adjacent internal walls. Deflector plate 298R is secured at a sloped angle to blade plate 302R by abutting deflector mate face 292R to primary transition face 142R and welding, fastening, or utilization of other fixation technique. Support wedge 300R may be used to provide additional support to deflector plate 298R.

Figure 52:
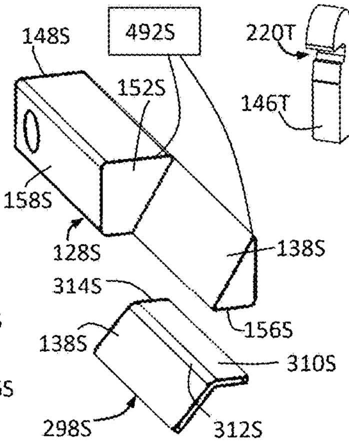
FIG. 52 depicts an exploded top perspective view of the wood splitter of FIG. 51 configured for mounting within a hitch receiver of a vehicle.
Figure 51:
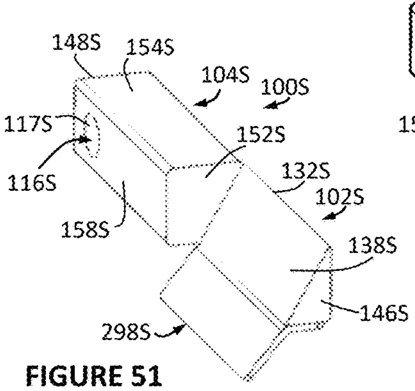
FIG. 51 depicts a top perspective view of a wood splitter configured for mounting within a hitch receiver of a vehicle.

FIG. 51-52 illustrates yet another embodiment of a wood splitter 100S comprising a bottom face 156S mounted deflector plate 298S. Deflector plate 298S comprises a first flange 314S having upward facing landing face 310S which is configured for fixation to a downward facing face such as bottom face 156S of body portion 128S. Landing face 310S is fixed to bottom face 156S using common fixation methods such as fasteners or welds. Deflector plate 298S may comprise a deflector bend 312S for angulation purposes, however in alternative embodiments, deflector plate 298S is flat and bottom face 156S is angled in blade portion 102S to achieve the desired angulation.

Figure 53:
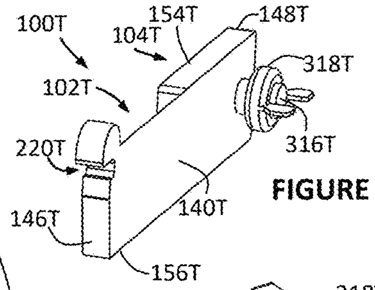
FIG. 53 depicts a top perspective view of a wood splitter configured for mounting within a hitch receiver of a vehicle.
Figure 54:
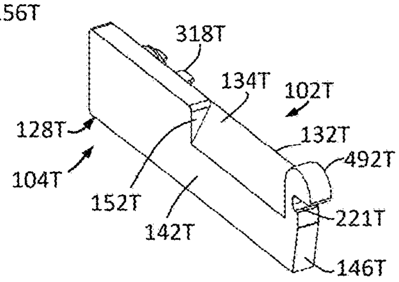
FIG. 54 depicts a top perspective view of the wood splitter of FIG. 53 configured for mounting within a hitch receiver of a vehicle.
Figure 55:
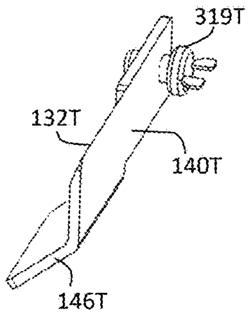
FIG. 55 depicts a top perspective view of a wood splitter with deflector portion for mounting within a hitch receiver of a vehicle.
Figure 56:
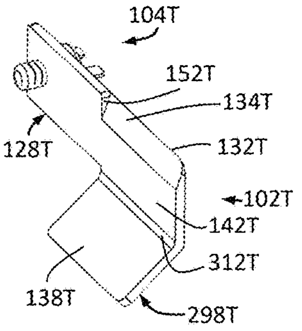
FIG. 56 depicts a top perspective view of the wood splitter with deflector portion of FIG. 55 configured for mounting within a hitch receiver of a vehicle.
Figure 57:
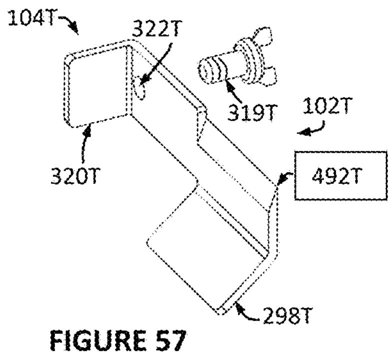
FIG. 57 depicts a top perspective view of a wood splitter illustrating an alternative fixation portion and configured for mounting within a hitch receiver of a vehicle.
Figure 58:
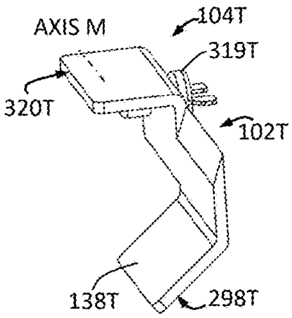
FIG. 58 depicts a top perspective view of a wood splitter illustrating an alternative fixation portion and configured for mounting within a hitch receiver of a vehicle.
Figure 59:
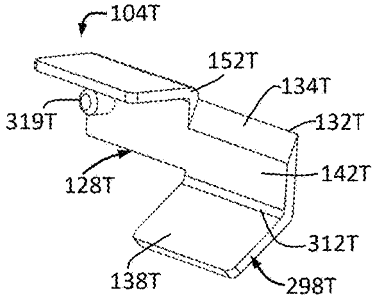
FIG. 59 depicts a top perspective view of the wood splitter of FIG. 58 illustrating an alternative fixation portion and configured for mounting within a hitch receiver of a vehicle.

The fixation portion of the splitter has been primarily illustrated as a square tube or bar. The applicant recognizes the fixation portion may assume a variety of other shape profiles insertable into common square profiled hitch receivers having measures in inches of at least one of 1.25×1.25, 2×2, 2.5×2.5, and 3×3. It is recognized the invention will also perform in custom sized applications and serve to support and fix blade portion position. For example, the fixation portion could assume a 'H', 'T', 'Z', '+', 'X', 'T', 'L', and 'U' shape profile preferably along axis-M to name just a few alternative profiles. FIGS. 53-59 illustrate just some example embodiments comprising alternative fixation portions. FIGS. 53 and 54 illustrate for example, a fixation portion 104T that is in the form of a flat bar. In this embodiment, body portion 128T which comprises both a fixation portion 104T and a blade portion 102T, comprises a cut edge 132T and a primary edge face 134T extending downward from the cut edge. In this embodiment, a clamp post 316T in combination with a tightened clamp nut 318T are utilized to releasably fix and support wood splitter 100T to a vertical wall within a hitch receiver. Further illustrated here in FIGS. 53-54 is an embodiment of an optional log boss 492T at a proximal end, preferably rounded in profile raised above the cut edge 132T. As a further option to a variety of embodiments disclosed herein, the splitter includes a bottle flange 221T stepped in from a proximal end of the splitter and forming a bottle opener recess 220T. In some embodiments, the bottle opener feature is present without the log boss and vise-versa. Alternatively, the clamp post and nut are in the form of a clamp bolt 319T threaded into threaded hole 322T of body portion 128T as illustrated in FIGS. 55-59. This embodiment (FIG. 53-54) does not include a sloped deflector face although it is recognized a deflector face could be readily integrated to the device using disclosure from embodiments disclosed earlier. In the embodiment of FIG. 55-56, a deflector plate 298T is formed as an extension of body portion 128T by formation of a deflector bend 312T thereby causing a formation of a sloped primary deflector face 138T. FIGS. 58-59 illustrate the embodiment of FIG. 55 adapted with one or more generally horizontal profile extensions 320T from body portion 128T to form an L-shaped or U-shaped fixation portion 104T along axis-M thereby adding additional torsional stability to the construct. The embodiment illustrated in FIG. 57 utilizes an upstanding profile extension 320T from body portion 128T to gain additional stability from the walls of a hitch receiver. The various embodiments may be equipped with a log boss if so desired.

Figure 60:
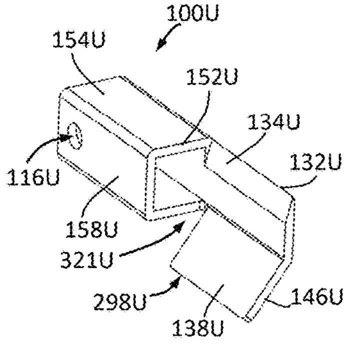
FIG. 60 depicts a top perspective view of a wood splitter with integrated blade and deflector portions and configured for mounting within a hitch receiver of a vehicle.
Figure 61:
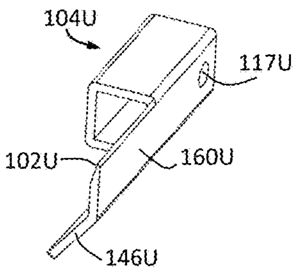
FIG. 61 depicts an alternative top perspective view of the wood splitter of FIG. 60 with integrated blade and deflector portions and configured for mounting within a hitch receiver of a vehicle.
Figure 62:
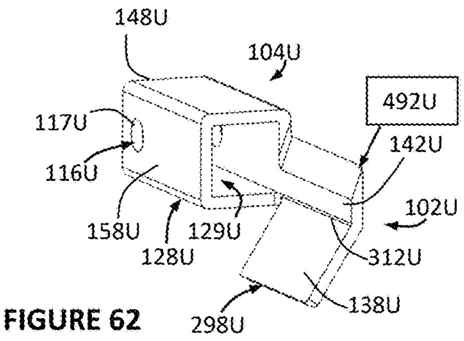
FIG. 62 depicts a top perspective view of a wood splitter with lowered integrated blade and deflector portions and configured for mounting within a hitch receiver of a vehicle.

FIGS. 60 and 61 illustrate another embodiment of a wood splitter 100U comprising a blade portion 102U including deflector plate 298U that are formed from body portion 128U. In this embodiment, a portion of tubular body portion 128U is cut away, a deflection cut 321U is made, and a bottom wall of the tubular body is bent downwards at deflector bend 312U thereby forming angled deflector plate 298U.

Figure 63:
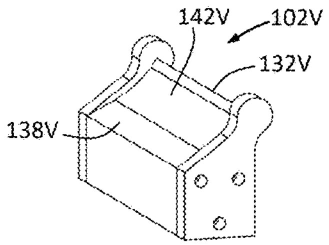
FIG. 63 depicts a top perspective view of a wood splitter blade portion equipped with side bosses (log bosses)
Figure 64:
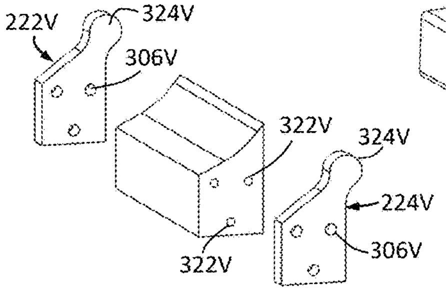
FIG. 64 depicts an exploded top perspective view of the wood splitter blade of FIG. 63 with side bosses.

FIG. 63 illustrates an embodiment of a blade portion 102V comprising a first bumper 222V and a second bumper 224V situated on each end of the blade portion 102V to buffer interaction between users and cut edge 132V. First and second bumper 222V, 224V preferably comprise an enlarged portion 324V nearest a cut edge 132V. In this embodiment, the enlarged portion 324V is in the form of a bulb. Fixation apertures 306V may be included for use of fasteners that extend through to threaded holes 322V to secure a bumper to blade portion 102V.

Figure 65:
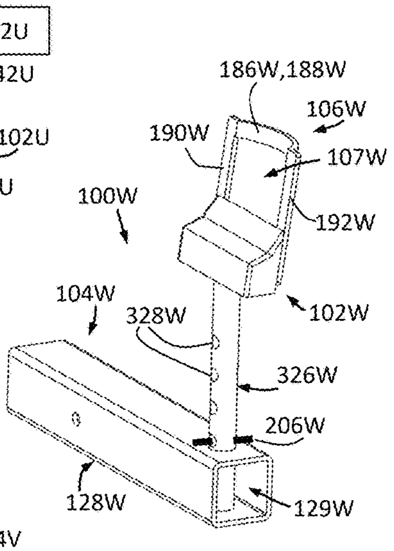
FIG. 65 depicts a top perspective view of an adjustable height wood splitter and configured for mounting within a hitch receiver of a vehicle.
Figure 66:
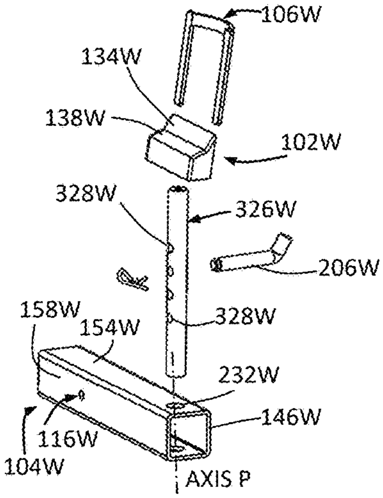
FIG. 66 depicts an exploded top perspective view of the wood splitter of FIG. 65 configured for mounting within a hitch receiver of a vehicle.
Figure 67:
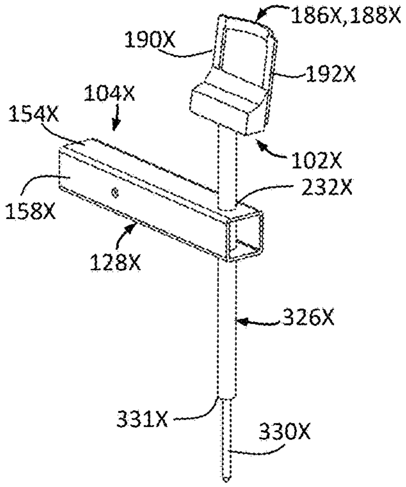
FIG. 67 depicts a top perspective view of a ground engaging wood splitter configured for mounting within a hitch receiver of a vehicle.
Figure 68:
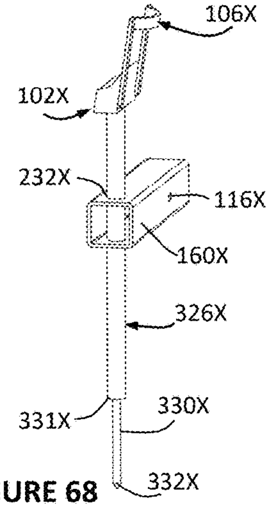
FIG. 68 depicts an alternative top perspective view of the ground engaging wood splitter of FIG. 67 configured for mounting within a hitch receiver of a vehicle.
Figure 69:
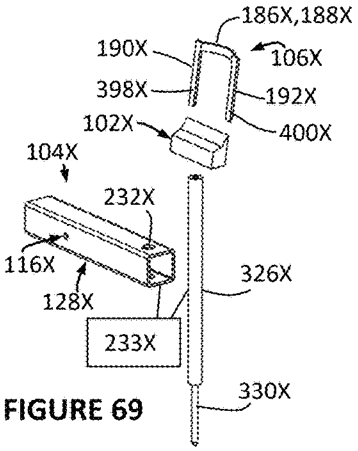
FIG. 69 depicts an exploded top perspective view of the ground engaging wood splitter of FIG. 67 configured for mounting within a hitch receiver of a vehicle.
Figure 70:
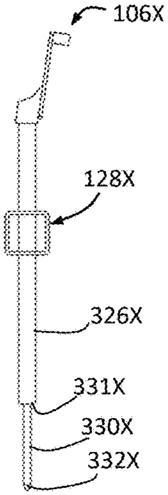
FIG. 70 depicts an end view of the ground engaging wood splitter of FIG. 67 configured for mounting within a hitch receiver of a vehicle.

FIGS. 65 and 66 illustrate another embodiment of a wood splitter 100W comprising an adjustable height blade portion 102W for improved user ergonomics. In this embodiment, blade portion 102W is secured to the superior end of a height strut 326W by use of threaded, pinned, welded or other suitable technique. In this embodiment, height strut 326W stands generally vertical and is removably housed within first recess 232W along axis P. Height strut 326W comprises a plurality of spaced height apertures 328W along the length of height strut 326W. Height apertures 328W are configured to house a removable first lock pin 206W for height adjustment of blade portion 102W by the user. First lock pin 206W secures blade portion 102W at a chosen height by abutting against top face 154W of body portion 128W. When the user is done using the wood splitter 100W, first lock pin 206W may be removed as well as blade portion 102W with height strut 326W and guide portion 106W. FIG. 67-70 illustrate an embodiment similar to that illustrated in FIGS. 65 and 66 but configured to engage a ground surface. In an adjustable form, height strut 326X can be adjustable by telescoping or can be fixed in length. In this embodiment as illustrated, an inferior end of height strut 326X comprises a ground stake 330X. Ground stake 330X preferably has a narrowed entry point 332X for eased insertion into dirt. Ground pad 331X is a broadened surface for abutting a ground surface thereby limiting entry into the ground even during impact to maintain a definitive blade portion 102X height and also add stability to the construct. In an operable mode, height strut 326X extends through first recess 232X of fixation portion 104X thereby eliminating side to side movement. Alternatively, a coupler bracket 233X between the height strut and ball mount or a hitch ball can be utilized to secure the height strut to the ball mount (i.e. 340Y). In an alternative embodiment, ground stake 330X is absent wherein ground pad 331X provides the sole stability. In this case, ground pad 331X may include a bevel, point or other ground engaging surface.

Figure 71:
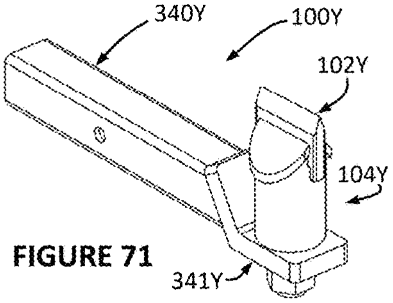
FIG. 71 depicts a top perspective view of a hitch ball mounted wood splitter configured for use over a hitch ball.
Figure 73:
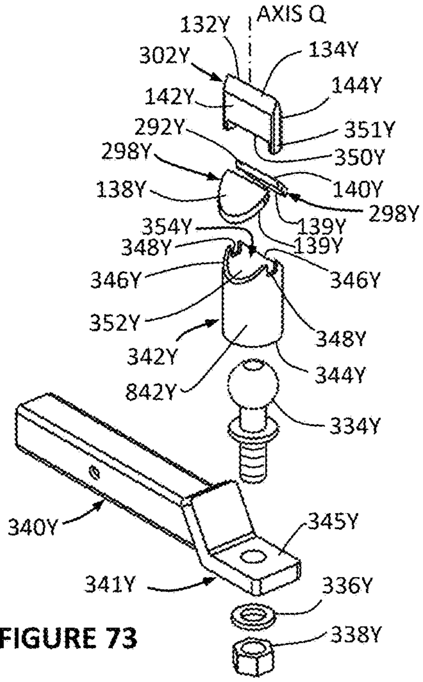
FIG. 73 depicts an exploded top perspective view of a hitch ball mounted wood splitter configured for use over a hitch ball.
Figure 72:
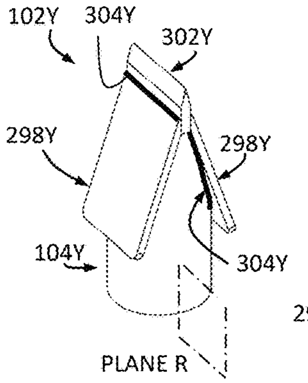
FIG. 72 depicts a top perspective view of a hitch ball wood splitter configured for use over a hitch ball.
Figure 72B:
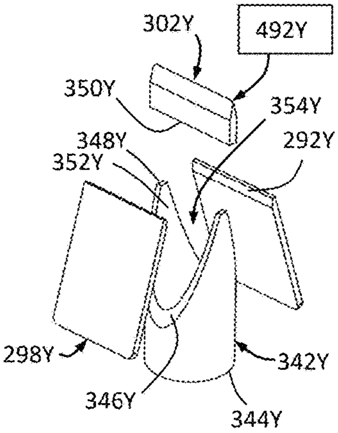
FIG. 72B depicts an exploded view of the hitch ball wood splitter of FIG. 72.

FIGS. 71 and 73 illustrates another embodiment of a wood splitter 100Y configured for capture over a standard hitch ball 334Y. In this embodiment a user uses a ball mount 340Y with hitch ball 334Y secured to it using a hitch ball washer 336Y and a hitch ball nut 338Y to secure the construct. Standard ball mounts are available in a variety of forms with various levels of drop or elevation. The ball mount illustrated in FIG. 71 for example, provides a 2-inch drop or if turned 180 degrees a zero-inch drop. Users may choose elevation or drop levels best suited for the application. Some may prefer for example, elevated ball mounts for improved biomechanics (i.e., reduced back bending). A wood splitter 100Y in this embodiment comprises a blade portion 102Y and fixation portion 104Y with ball space 354Y for mounting on ball mount 340Y and hitch ball 334Y. Central axis Q extends through both the hitch ball and wood splitter as illustrated in FIG. 73. Capturing the hitch ball within the ball space serves to secure and prevent lateral movement of the wood splitter from Axis Q during splitting operations. Fixation portion 104Y comprises a blade housing 342Y preferably in the form of a cylindrical tube although other profiles such as a square tube may be used. Blade housing 342Y comprises a base surface 344Y at an inferior end and a pair of opposed perch surfaces 348Y at a superior end. Sloping downward and away from perch surfaces 348Y are opposed slope surfaces 346Y on each side of vertical plane R beginning near a superior end of said blade housing 342Y. A blade plate 302Y comprises a rest surface 350Y at an inferior end and a cut edge 132Y at a superior end, and opposed primary transition face 142Y and secondary transition face 144Y defining the sides. A pair of opposed deflector plates 298Y comprise an upward facing primary deflector face 138Y on one plate and an upward facing secondary deflector face 140Y on the other. Each deflector plate 298Y comprises a sub-primary deflector face 139Y on an inferior surface. Each deflector plate 298Y is secured to blade housing 342Y preferably by welds between slope surface 346Y and the corresponding sub-primary deflector face 139Y. Blade plate 302Y may be removable or preferably secured by weld 304Y between rest surface 350Y and perch surfaces 348Y. Wood splitter 100Y is removed from hitch ball 334Y in a storage mode. To change to an operational mode, a ball mount 340Y with hitch ball 334Y is secured in a hitch receiver 126 of a vehicle and serves to support fixation portion 104Y. Wood splitter 100Y is then placed over hitch ball 334Y such that hitch ball 334Y is confined within ball space 354Y of fixation portion 104Y which is defined by internal capture face 352Y. Base surface 344Y is seated on and supported by an upward facing base pod 345Y of ball mount 340Y. In preferred embodiment the diameter of ball space 354Y is only slightly larger than hitch ball 334Y for added stability (i.e. <0.1", although it may be larger). In this embodiment, alignment of parts along axis Q is preferred as illustrated. FIGS. 72 and 72B illustrate a similar embodiment as FIG. 71-72 but with squared deflector plates 298Y at a steeper slope and notches at the perch surfaces are removed. Note that in some embodiments blade plate 302Y is removable and may be separated by the user for temporary safety purposes if so desired. One or more positioning boss 351Y may be used to capture and/or align the blade plate 302Y to blade housing 342Y.

Figure 74:
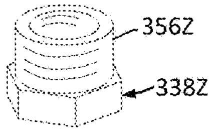
FIG. 74 depicts a top perspective view of a hitch ball nut mounted wood splitter configured for use over an opposing end of a hitch ball.
Figure 75:
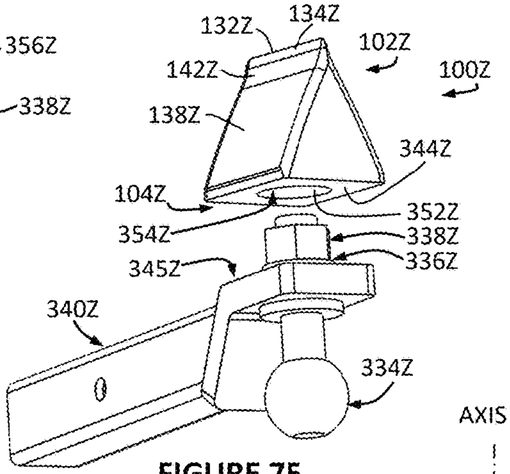
FIG. 75 depicts a modified hitch ball nut as used in the hitch mounted wood splitter of FIG. 74.
Figure 76:
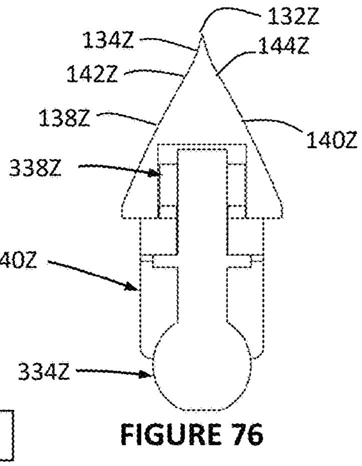
FIG. 76 depicts a cross sectional view through the hitch ball of the hitch ball nut mounted wood splitter of FIG. 74.

FIGS. 74-77 illustrate another embodiment of a wood splitter 100Z configured for capture over the reverse side of a hitch ball 334Z secured in a ball mount 340Z. In this embodiment, blade portion 102Z is in the form of a wedge comprising a superiorly facing cut edge 132Z. The disclosed cut edges, they may range from sharpened to relatively dull depending on the performance desired by the user. Extending into a generally horizontal base surface 344Z is a ball space 354Z defined by capture face 352Z. Ball space 354Z is sufficient in size to slide only over hitch ball nut 338Z and hitch ball washer 336Z such that base surface 344Z abuts base pod 345Z on ball mount 340Z. In an alternative embodiment, ball space 354Z is threaded. In turn, a portion of the external surface of hitch ball nut 338Z comprises external threads 356Z for threaded engagement therebetween as illustrated in FIG. 74. The capture faces 352Z define a ball space having a diameter and fit configured to keep the hitch ball nut aligned within the ball space along Axis S thereby securing wood splitter 100Z from lateral movement.

Figure 77:
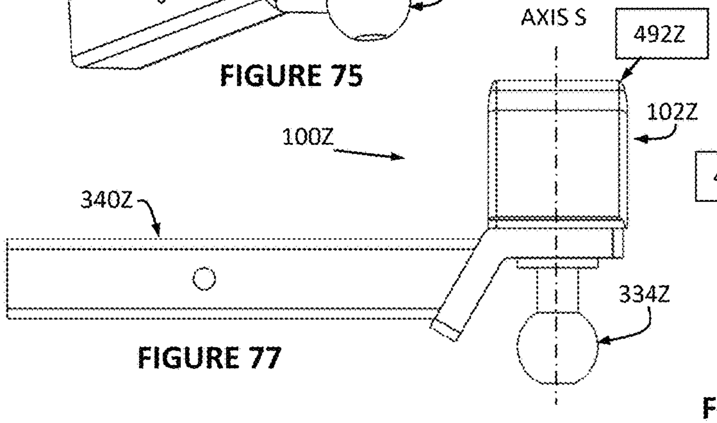
FIG. 77 depicts a side view of the hitch ball nut mounted wood splitter of FIG. 74.

The central axis of ball space 354Z and the central axis of hitch ball 334Z are aligned along axis S in an operational configuration (FIG. 77). Wood splitter 100Z is removed from hitch ball mount 340Z in a storage configuration by lifting off or unthreading if threaded engagement. In an operational configuration, the user inserts hitch ball mount 340Z into a hitch receiver 126 of a vehicle 127 in an upside-down orientation. The user then places wood splitter 100Z with ball space 354Z over hitch ball nut 338Z and hitch ball washer 336Z. Wood splitter 100Z is then ready for use.

Figure 79:
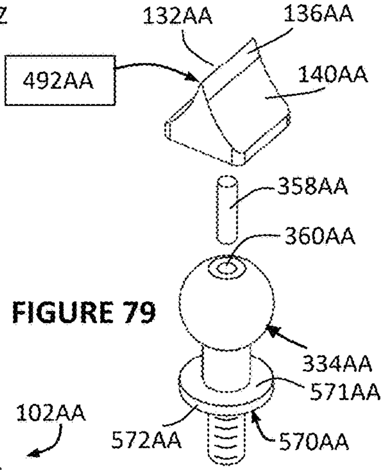
FIG. 79 depicts an exploded top perspective view of the hitch ball mounted wood splitter of FIG. 78.
Figure 78:
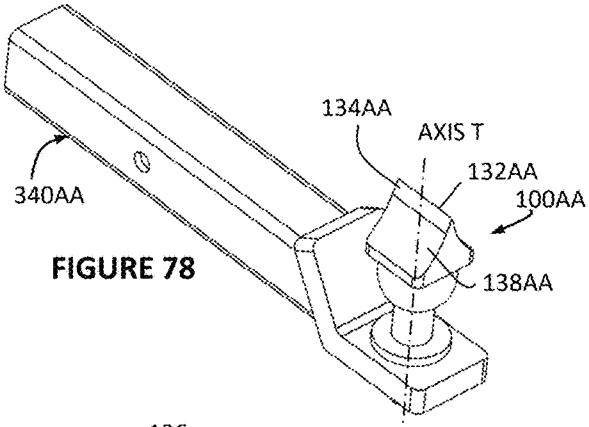
FIG. 78 depicts a top perspective view of a hitch ball mounted wood splitter for use on a hitch ball.
Figure 80:
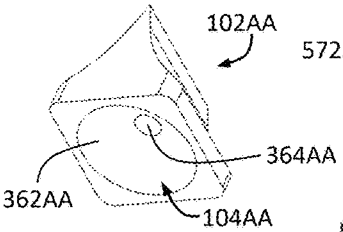
FIG. 80 depicts a blade and deflector portions of the hitch ball mounted wood splitter of FIG. 78.

FIG. 78-80 illustrate another embodiment of a wood splitter 100AA again utilizing a modified hitch ball 334AA and standard ball mount 340AA to mount a fixation portion 104AA on. In this embodiment, hitch ball 334AA comprises a rod capture 360AA typically in the form of a bore along axis T. Rod capture 360AA may extend entirely through to an opposing end of hitch ball 334AA for the passage of water if so desired or diverted to exit at a side of the ball. Blade rod 358AA may be in the form of one or more of a smooth pin, a threaded rod, or a combination of threads on one end and smooth on the other. Blade rod 358AA in this embodiment is mechanically pressed in rod recess 364AA yet left partially protruding from hemi-spherical ball palm 362AA surface. Rod capture 360AA in this embodiment is sized to allow sliding insertion of the protruding end of blade rod 358AA therein. In alternative embodiments, the exposed end of blade rod 358AA is threaded and is housed in complementary threads in rod capture 360AA. Wood splitter 100AA and blade rod 358AA is removed from hitch ball 334AA in a storage configuration. In an operational configuration, the user places wood splitter 100AA over hitch ball 334AA such that blade rod 358AA is housed within rod capture 360AA and ball palm 362AA abuts hitch ball 334AA. Blade rod 358AA holds wood splitter 100AA in position at the top of hitch ball 334AA.

Figure 82A:
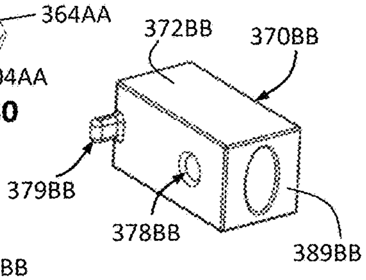
FIG. 82A depicts a top perspective view from a trailing end of the hitch coupler of FIG. 82 operable to couple a hand axe to a hitch receiver.
Figure 81:
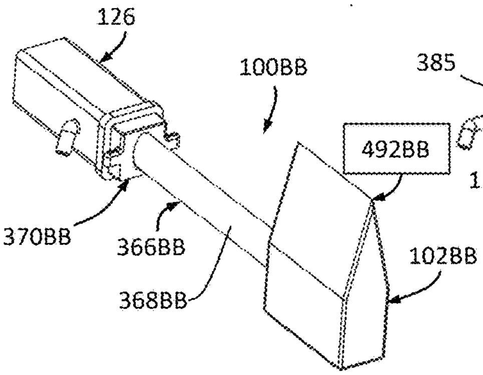
FIG. 81 depicts a top perspective view of an axe convertible to hitch wood splitter configured for mounting within a hitch receiver of a vehicle.
Figure 82:
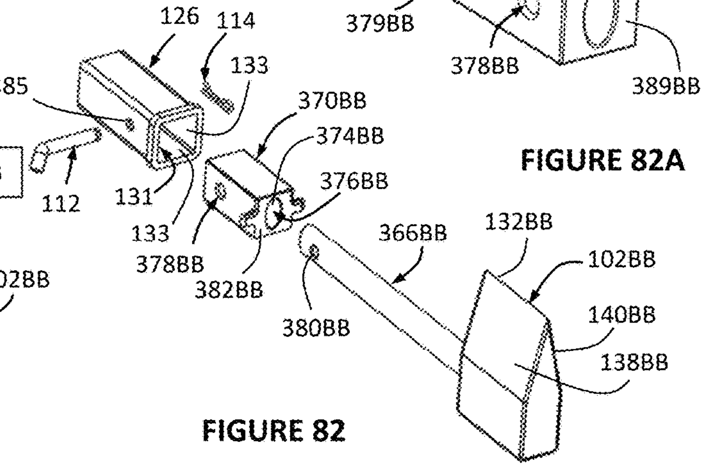
FIG. 82 depicts a top perspective view of an axe removed from a hitch coupler that is operable for mounting within a hitch receiver of a vehicle.
Figure 82B:
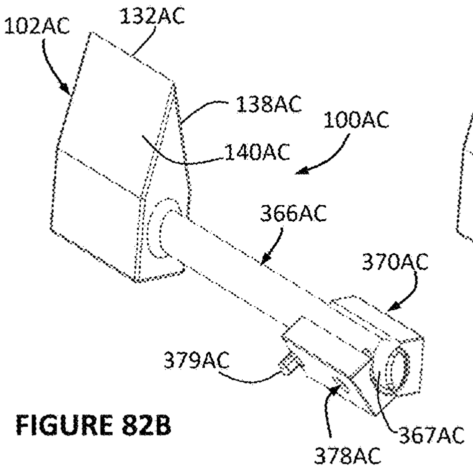
FIG. 82B depicts a perspective view of a hitch coupler being applied to an axe handle of an axe.
Figure 82C:
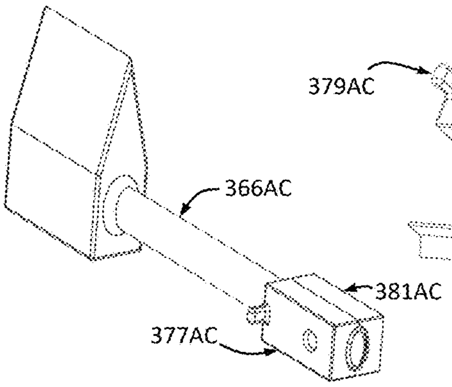
FIG. 82C depicts a perspective view of the hitch coupler of FIG. 82B enclosed about an axe handle.
Figure 82D:
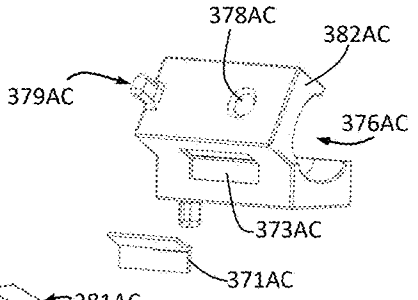
FIG. 82D depicts a perspective view of a hitch coupler and optional coupler hinge.
Figure 82E:
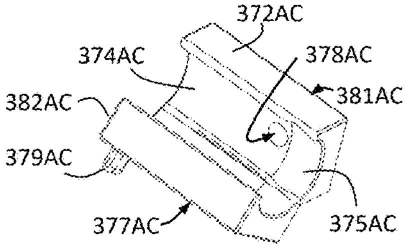
FIG. 82E depicts an opposing perspective view of the hitch coupler of FIG. 82D.
Figure 82F:
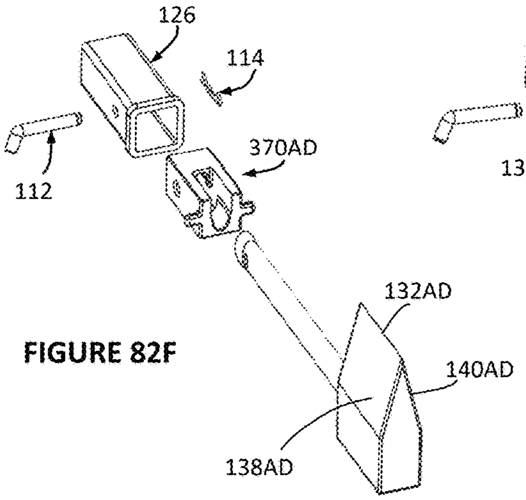
FIG. 82F depicts an exploded perspective view of a hand axe and hitch coupler.
Figure 82G:
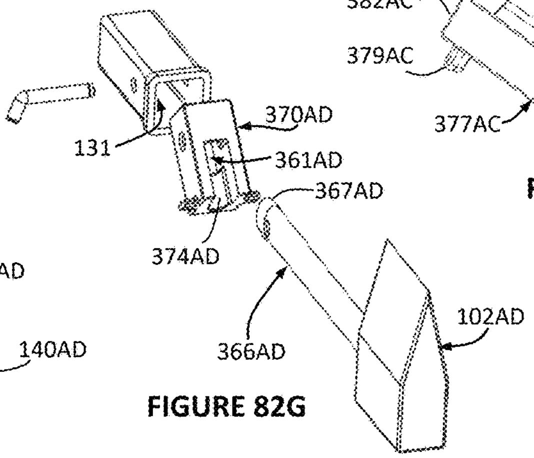
FIG. 82G depicts a perspective view of a hand axe preparing to be coupled with a hitch coupler.

FIGS. 81,82,82A illustrate yet another embodiment of a wood splitter 100BB configured for use both as a hand axe and as a hitch receiver mounted wood splitter. In this embodiment, a blade portion 102BB is fixed to an elongate axe handle 366BB. An axe handle surface 368BB envelopes elongate axe handle 366BB. A retaining hole 380BB extends through axe handle 366BB at a distal end for locking in position with a hitch pin 112 if so desired. Hitch coupler 370BB comprises a generally square coupler outer surface 372BB (although other profiles will be recognized by those skilled in the art) sized to sliding fit into receiver cavity 131 defined by receiver surfaces 133 of a corresponding hitch receiver 126. In preferred embodiments, receiver cavity 131 is generally square (corners can be rounded) and sized for receiving a 2"×2" or 1.25"×1.25" ball mounts but may also include 2.5"×2.5" and 3.0"×3.0" ball mounts (inches). In alternative embodiments, the receiver cavity 131 can be of non-standard dimensions with the hitch coupler sized for sliding fit accordingly. A coupler hole 378BB extends through hitch coupler 370BB for occupation by a hitch pin 112 for securing both axe handle 366BB and hitch coupler 370BB within hitch receiver 126. Coupler inner face 374BB defines handle cavity 376BB. Handle cavity 376BB is sized and shaped to complement axe handle surface 368BB profile to minimize movement therebetween during operation. The complementing surfaces are therefore preferably non-circular. Lead face 382BB and trailing face 389BB cap off ends of hitch coupler 370BB. To use as an axe or for storage mode (configuration) (FIG. 82), hitch pin 112 is removed if present and blade portion 102BB with axe handle 366BB are distracted from hitch coupler 370BB. In an operational configuration (FIG. 81), axe handle 366BB is slid into hitch coupler 370BB and the assembly is placed in a suitable sized hitch receiver of a vehicle. A hitch pin 112 may be used to lock the assembly in position. Hitch coupler 370BB preferably comprises one or more finger features for easy insertion and removal of the hitch coupler 370BB in receiver cavity 131 of hitch receiver 126. In this embodiment, the finger features are illustrated in the form of coupler ears 379BB extending from the sides of hitch coupler 370BB. In other embodiments the finger feature may be in the form of a depression or ridge. In alternative embodiments, hitch coupler 370BB may be partially or fully split for eased coupling around axe handle 366BB. In addition, coupler inner face 374BB and axe handle 366BB may include complementary intermeshing features such as teeth. In this embodiment, the axe serves as blade portion 102BB and hitch coupler 370BB serves as a fixation portion.

FIGS. 82B-82E illustrates yet another embodiment of a wood splitter 100AC again configured for use both as a hand axe and as a hitch receiver mounted wood splitter. In this embodiment, hitch coupler 370AC comprises a first body 377AC and second body 381AC that enclose around axe handle 366AC. In some embodiments, first body 377AC and second body 381AC are independent parts that are positioned together to enclose axe handle 366AC. In other embodiments and as illustrated here, hinge seat 373AC extends in and across coupler outer surface 372AC for seating a coupler hinge 371AC therein. Coupler hinge 371AC may assume a variety of forms including but not limited to for example any one of: a metal form, a fabric, and a thin extension of first body 377AC and second body 381AC. Handle cavity 376AC is operable to receive axe handle 366AC therein and is defined by coupler inner surface 374AC and secondary coupler inner surface 375AC for seating handle bulb 367AC therein. Generally, secondary coupler inner surface 375AC defines an enlarged space for occupation by an enlarged handle bulb 367AD. In a method of use, first body 377AC and second body 381AC are moved/pivoted away from each other before closing about axe handle 366AC. Hitch coupler 370AD is then slid into receiver cavity 131 of a hitch receiver. An optional hitch pin 112 may be used to secure the assembly in place.

Figure 82H:
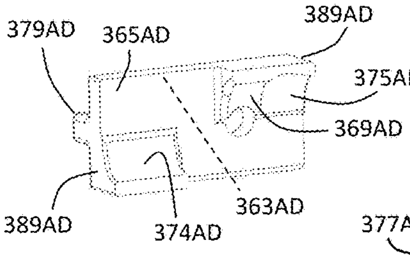
FIG. 82H depicts a cross-sectional perspective view through a central vertical plane of the hitch coupler illustrated in FIG. 82F.
Figure 82J:
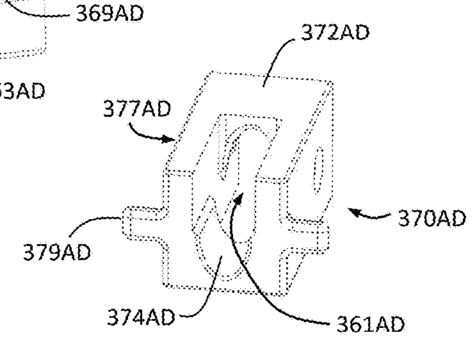
FIG. 82J depicts a close-up perspective view of the hitch coupler illustrated in FIG. 82F.
Figure 82K:
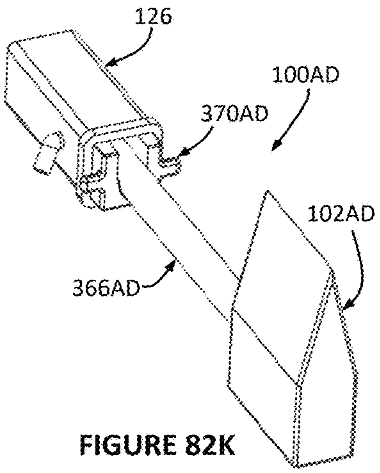
FIG. 82K depicts a perspective view of the hand axe and coupler assembled in an operative mode or configuration in a hitch receiver.

FIGS. 82F-82K illustrates yet another embodiment of a wood splitter 100AD configured for use both as a hand axe and as a hitch receiver mounted wood splitter. As illustrated in FIG. 82J, hitch coupler 370AD is formed of a first body 377AD comprising an insertion aperture 361AD extending along an insert axis 363AD. Fourth coupler inner surface 365AD is enlarged to define an insertion aperture 361AD sufficiently large to pass distal end of axe handle 366AD (including handle bulb 367AD) therethrough. Axe handle 366AD is typically non-circular and of a generally oval profile thereby limiting rotation once seated in hitch coupler 370AD. Coupler inner surface 374AD is situated proximal and operable to cup a portion of axe handle 366AD against downward impact forces transmitted from blade portion 102AD. As illustrated in FIG. 82H, third couple inner surface 369AD and secondary coupler inner surface 375AD are operable to respectfully cup a portion of axe handle 366AD and handle bulb 367AD to counteract upward forces from the distal end (when positioned in hitch receiver) of the axe handle. In a method of use, axe handle 366AD is extended through insertion aperture 361AD then hitch coupler 370AD is pivoted such that the coupler inner surfaces are at least partially engaged with axe handle 366AD. Hitch coupler 370AD with axe handle 366AD is then slid into receiver cavity 131 of hitch receiver 126 and optionally pinned with hitch pin 112 and optionally secured with hitch pin retainer 114.

Figure 83:
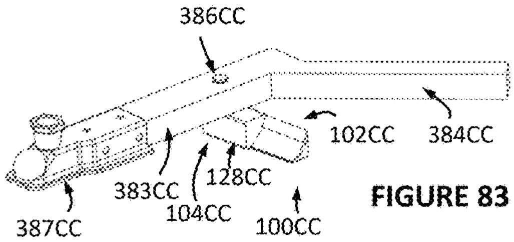
FIG. 83 depicts a top perspective view of a wood splitter secured to a frame of a trailer in an operational mode.
Figure 84:
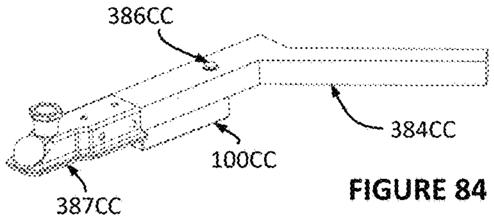
FIG. 84 depicts a top perspective view of the wood splitter of FIG. 83 in a storage mode.
Figure 85:
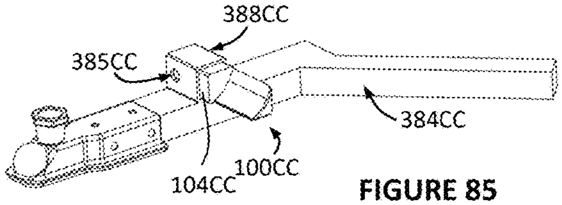
FIG. 85 depicts a top perspective view of a wood splitter secured to a frame of a trailer in an alternative embodiment.

FIGS. 83-90 illustrate another embodiment of a wood splitter 100CC configured for use on a trailer frame 384CC or trailer tongue 383CC instead of a hitch receiver 126. A tongue coupler 387CC is fixed to a trailer tongue 383CC and operable to releasably couple to a hitch ball for towing by a vehicle. In this embodiment (FIG. 83), wood splitter 100CC is secured to trailer frame 384CC using a blade restraint 386CC illustrated here in the form of a pin extending through a body portion 128CC of fixation portion 104CC. The pin is restrained on both a top and bottom end (i.e. bolt head, nut) to retain position. In an operational configuration, wood splitter 100CC is extended outward from trailer frame 384CC to provide access to it as illustrated in FIG. 83. In a storage configuration, wood splitter 100CC is rotated for storage underneath trailer frame 384CC as illustrated in FIG. 84 thereby minimizing contact by those passing by. In an alternative configuration as illustrated in FIG. 85, fixation portion 104CC of wood splitter 100CC is housed within splitter sleeve 388CC having a form reflective of a hitch receiver. In this embodiment, splitter sleeve 388CC is in the form of a section of square tube secured to a top section of trailer frame 384CC. In preferred embodiments, the square tube is welded or bolted to trailer frame 384CC. The internal dimensions of splitter sleeve 388CC are configured for sliding engagement of a fixation portion 104CC of wood splitter 100CC. Splitter sleeve 388CC may include a pin hole 385CC for securing wood splitter 100CC in place in an operational configuration using a hitch pin 112. In a storage configuration, hitch pin is removed and wood splitter 100CC is slid out from splitter sleeve 388CC and preferably stored.

Figure 86:
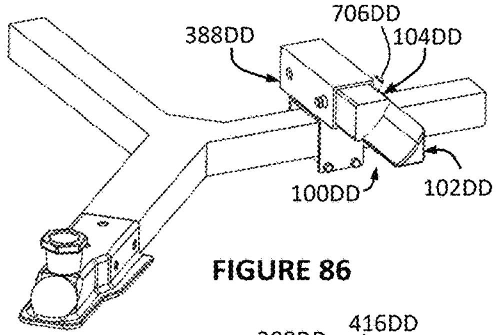
FIG. 86 depicts a top perspective view of a wood splitter with mounting bracket in an operational configuration.
Figure 87:
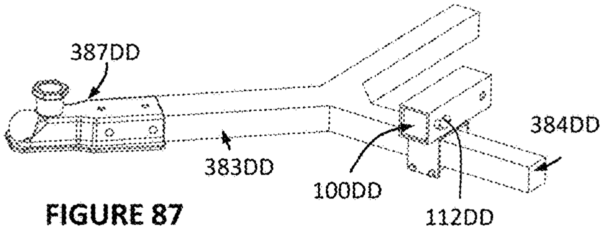
FIG. 87 depicts a top perspective view of the wood splitter of FIG. 86 in a storage configuration.

FIG. 86 represents yet another embodiment of a trailer mounted wood splitter 100DD wherein splitter sleeve 388DD is configured as a bracket for mounting to a trailer frame 384DD having a tongue coupler 387DD. In some embodiments the bracket is permanently fixed such as by welding, and in other embodiments is removable in conjunction with fasteners for example. Squarely configured sleeve walls 416DD define sleeve cavity 414DD which again is sized and shaped for housing wood splitter 100DD therein. In an operational configuration (also known as operational mode), blade portion 102DD is exposed as illustrated in FIG. 86. In a storage configuration (also known as storage mode), wood splitter 100DD is reversed wherein blade portion 102DD is shielded within sleeve cavity 414DD as illustrated in FIG. 87. Hitch pin 112DD may be utilized to secure wood splitter 100DD within splitter sleeve 388DD. One or more bracket fasteners 410DD (i.e. bolt, nut, washers) may be used to secure splitter sleeve 388DD to the trailer, in this case spanning between aligned leg apertures 412DD on first bracket leg 406DD and second bracket leg 408DD. A protectant such as a rubber liner may be used at the internal bracket walls 417DD to minimize abrasion between the bracket and trailer. This removable bracket configuration provides retrofitting to existing trailers and mounting to new trailers without disrupting frame metal or paint.

Figure 89:
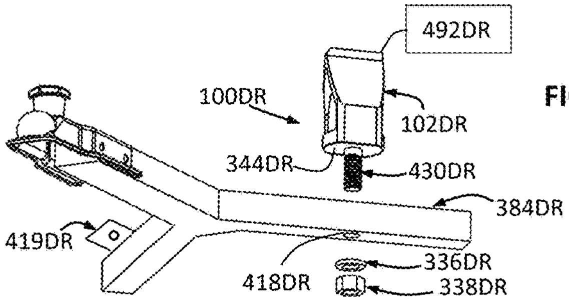
FIG. 89 depicts a bottom perspective exploded view of a wood splitter having a threaded stem.
Figure 90:
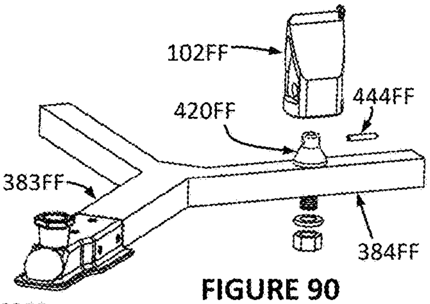
FIG. 90 depicts a top perspective exploded view of a wood splitter configured to mount to an interactive lock head of a base fastener.

FIG. 89 illustrates another embodiment of a wood splitter 100DR whereby the wood splitter 100DR has a stem 430DR that is threaded extending from a base surface 344DR. In this embodiment, frame hole 418DR serving to secure stem 430DR therein, extends through a portion of one or more of a trailer frame and a trailer tongue and a trailer bumper. Stem 430DR is seated in frame hole 418DR for operational use. A hitch ball nut 338DR with hitch ball washer 336DR may be utilized to secure wood splitter 100DR to the trailer frame or trailer tongue. However, in an alternative embodiment, it is unnecessary for stem 430DR to be threaded in which case the user simply drops the post through frame hole 418DR for use, and removes wood splitter 100DR as desired by simply lifting wood splitter 100DR off the trailer frame. In an alternate embodiment, stem 430DR may be secured within the hole of a holed plate 419DR extending fixed or removably fixed from a trailer frame or trailer tongue or from a bracket on either.

Figure 91:
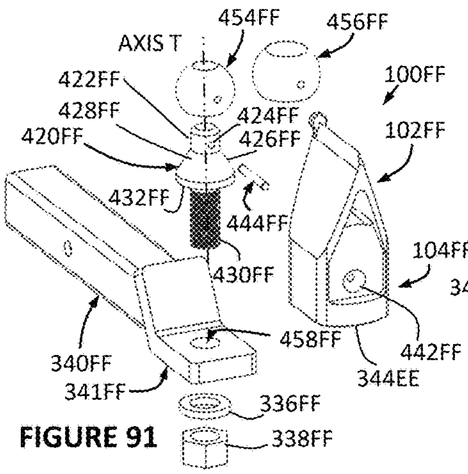
FIG. 91 depicts a top perspective exploded view of interchangeable system capable of mounting various size trailer balls and a wood splitter to a base fastener.

FIGS. 90-93A represents various forms of a wood splitting system that includes a base fastener 420FF having an interactive lock head for quick attachment and detachment of parts to it. As illustrated in FIG. 91, (wherein base fastener 420FF is seated in ball mount hole 458FF) base fastener 420FF comprises a central axis T with a broad beveled boss 426FF sloping towards a superiorly protruding center boss 422FF. Head aperture 424FF extends generally perpendicular through center boss 422FF for housing of release pin 444FF. On center boss 422FF and beveled boss 426FF is male surface 428FF. The underside of center boss 422FF is generally flat with base face 432FF thereon. Stem 430FF extends generally centrally and inferiorly from base face 432FF and may be threaded for fixing to a support structure such as a ball mount (FIG. 91), trailer frame (FIG. 90) or trailer tongue, or indirectly through a complementary bracket attached to these structures or holed plate 419EE. Various sized interchangeable trailer balls such as the 1.875" ball 454FF and 2" ball 456FF and 2.3125" ball (not shown) are currently available as interchangeable kits for use with a variety of trailers. Inclusion of an interchangeable wood splitter 100FF offers an expansion creating a novel interchangeable kit that includes wood splitting capabilities when using base fastener 420FF and a complementary support structure such as those mentioned above (i.e. ball mount, trailer frame, holed plate). Alternatively, wood splitter 100FF may be offered as an accessory to swappable hitch kits. In these embodiments, wood splitter fixation portion 104FF comprises a female cavity 445FF generally complementing the size and shape of base fastener 420FF. In this embodiment, female cavity 445FF comprises a female bevel 448FF leading to a superiorly placed female recess 446FF with female surface 452FF thereon both 448FF and 446FF. Pin aperture 450FF extends generally perpendicular to axis 'T' through the body of wood splitter fixation portion 104FF. Distracting release pin 444FF provides the user quick removal of an interchangeable head or blade. To attach wood splitter 100FF, female cavity 445F is aligned along axis 'T' above center boss 422FF and lowered such that center boss 422FF is fully seated within female recess 446FF. Head aperture 424FF is aligned with pin aperture 450FF. Release pin 444FF can then be inserted in the pin aperture spanning across both apertures thereby locking wood splitter 100FF thereon. Finger recess 442FF may be present as a depression at the pin aperture. It is recognized that wood splitter 100FF may be used for splitting without release pin 444FF. Other quick release mechanisms known in the art such as bayonet may be substituted for the previously described pin method.

Figure 93A:
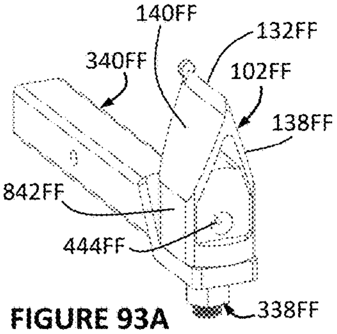
FIG. 93A depicts a perspective view of the wood splitter of FIG. 92.
Figure 93B:
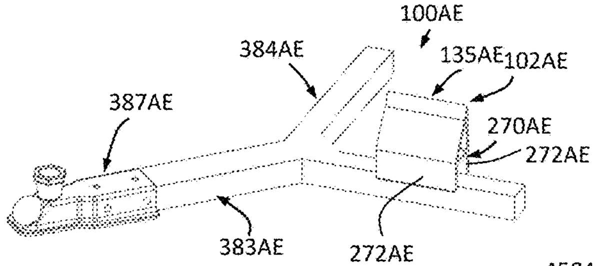
FIG. 93B depicts a partial perspective view of a wood splitter having a saddle seated over a portion of a trailer frame.

FIG. 93B illustrates yet another embodiment of a wood splitter 100AE configured for use on a trailer frame 384AE or trailer tongue 383AE instead of a hitch receiver 126. In this embodiment, wood splitter 100AE comprising deflector saddle 270AE is a form of wood splitter 100J illustrated previously in FIGS. 31-33. Deflector saddle 270AE, having opposed spaced saddle legs 272AE, is sized for seating a portion of trailer frame 384AE or trailer tongue 383AE therein thereby releasably securing wood splitter 100AE for log splitting impact.

Figure 93C:
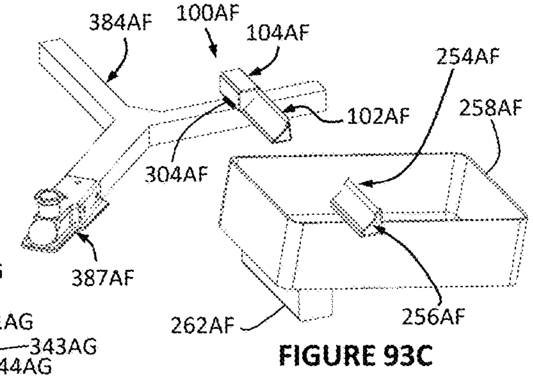
FIG. 93C depicts a partial perspective view of a wood splitter welded to a portion of a trailer frame with a protective sleeve.

FIG. 93C illustrates yet another embodiment of a wood splitter 100AF configured for use on a trailer frame 384AF or trailer tongue 383AE instead of a hitch receiver 126. In this embodiment, wood splitter 100AF which is a form of wood splitter 100I is secured to trailer frame 384AF by one or more welds 304AF extending between trailer frame 384AF and fixation portion 104AF of wood splitter 100AF. A removable protector such as protective sleeve 254AF with sleeve cavity 256AF formed therein is operable to slide over or otherwise be affixed on the blade portion 102AF when the splitter is not in use and removed in an operative mode. Collector 258AF may be placed below wood splitter 100AF to catch kindling as it is split from a log and lumber. Elevator 262AF may be used to tilt collector whereby kindling pieces fall to the side thereby not interrupting the splitting process.

Figure 93D:
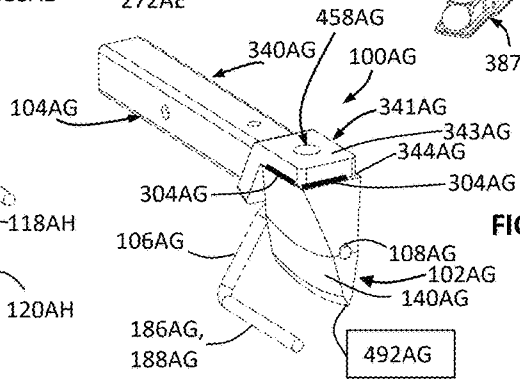
FIG. 93D depicts a perspective view of a wood splitter welded to a ball mount tongue of a ball mount.
Figure 93F:
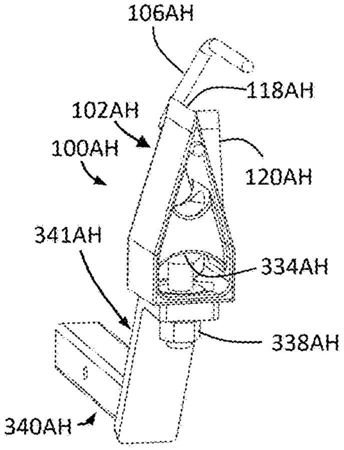
FIG. 93F depicts a perspective view of a wood splitter with secondary blade and with extended length ball mount tongue.
Figure 93E:
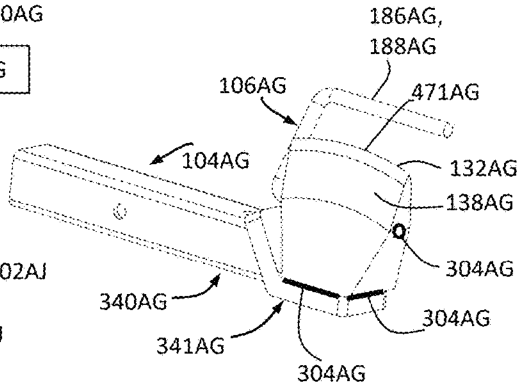
FIG. 93E depicts an opposing perspective view of the wood splitter of FIG. 93D.

FIGS. 93D-93E illustrates another embodiment of a wood splitter operable to use when seated within a receiver cavity 131 of a hitch receiver. In this embodiment, a ball mount 340AG comprises a fixation portion 104AG and a ball mount tongue 341AG extending from fixation portion 104AG. Ball mount tongue 341AG comprises opposing tongue faces 343AG suitable for mounting a base surface 344AG of blade portion 102AG thereon. One or more welds 304AG extend between ball mount tongue 341AG and blade portion 102AG to fix it in place. Weld 304AG may also be used to secure guide portion 106AG to blade portion 102AG in a predetermined position. As recognized here and with a wide variety of other embodiments described herein, a fixed or removable log boss may be positioned to elevate over one end, or both ends of the cut edge. A log boss may be used in conjunction with a guide portion or in the absence of a guide portion.

FIG. 93F illustrates an embodiment of a wood splitter 100AH removably seated over a hitch ball 334AH which in turn is mounted to a ball mount 340AH. Note that the ball mount tongue 341AH may be extended various lengths when used in this disclosure. In some forms, a base pod 345Y of a ball mount tongue is generally aligned with a fixation portion (FIG. 73) of the ball mount whereas in other embodiments the base pod is offset by up to 8 inches or more. FIG. 93F illustrates, for example, an extended length ball mount tongue 341AH that thereby raises the height of wood splitter 100AH providing more room for a collector (i.e. 258AF) to be placed below as well as reduced back bending by a user during splitting operations. This is particularly useful on vehicles having lower hitch receivers. In addition, as just one example, FIG. 93F illustrates this style of wood splitter (fitting over a hitch ball 334AH/having a ball space) may also comprise a secondary blade 120AH extending generally perpendicular to primary blade 118AH. This is further illustrated in FIG. 93H. Note in this embodiment that secondary blade 120AH comprises a primary deflector face 138AH that is angled away from secondary deflector face 140AH to produce a wedge effect during splitting. Inset from an outside surface of secondary blade 120AH is secondary blade cavity 548AH (shown here at placement site). FIG. 93J illustrates the same embodiment with one or more secondary blade 120AK which has a primary deflector face 138AK and a secondary deflector face 140AK that are substantially parallel in nature. Note that in preferred wood splitters having a ball space only one secondary blade 120AK is present or absent all together, however as illustrated here (FIG. 93J), there may be two secondary blades 120AK opposed to each other.

Figure 93G:
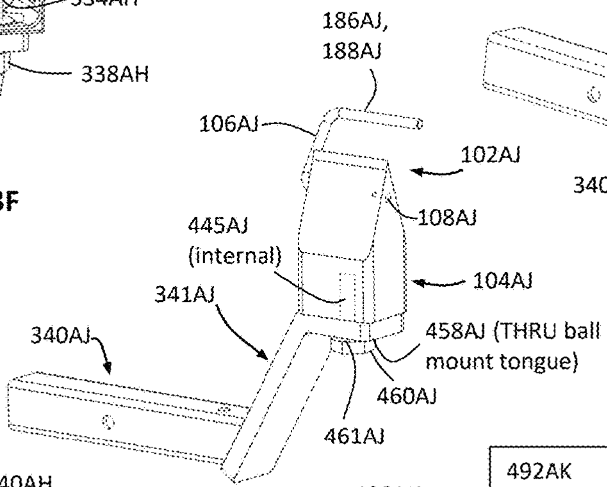
Figure 93H:
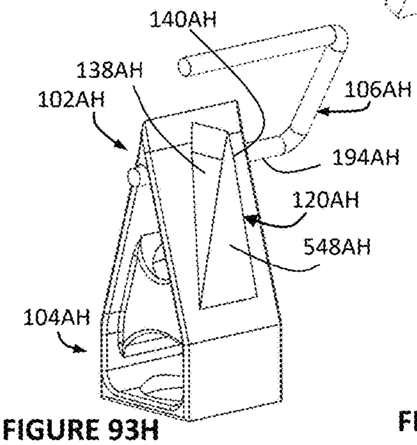
Figure 93J:
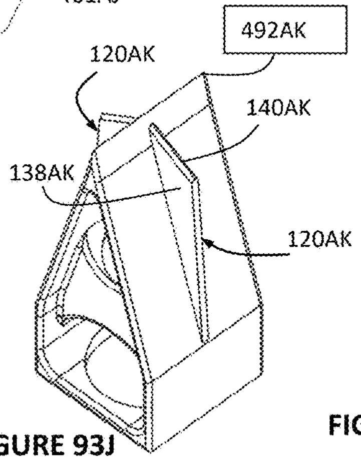

FIG. 93G illustrates an embodiment of a wood splitter 100AJ whereby a blade lock bolt 460AJ extends through a ball mount hole 458AJ and threading into a threaded female cavity 445AJ of fixation portion 104AJ fixing it in place. Blade lock washer 461AJ may be utilized. Ball mount 340AJ in this embodiment also comprises an extended length ball mount tongue 341AJ.

Figure 93K:
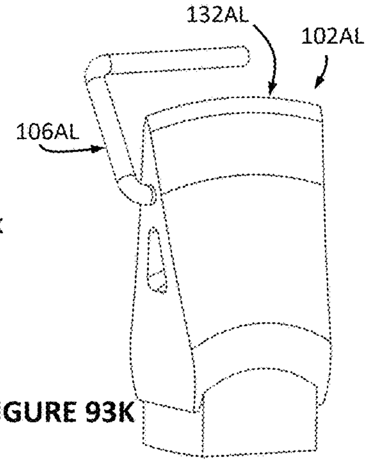

FIG. 93K illustrates another embodiment of a wood splitter 100AL again with a convex cut edge 132AL. Note in this embodiment cut edge 132AL is wider than the inferior base of wood splitter fixation portion 104AL.

Figure 93L:
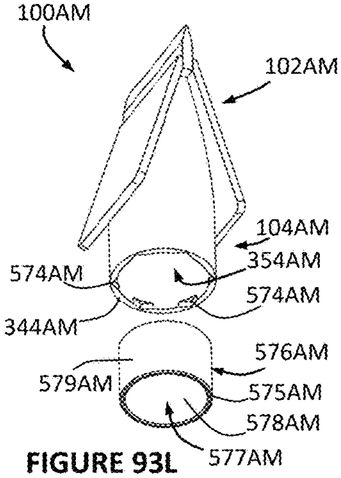
Figure 93M:
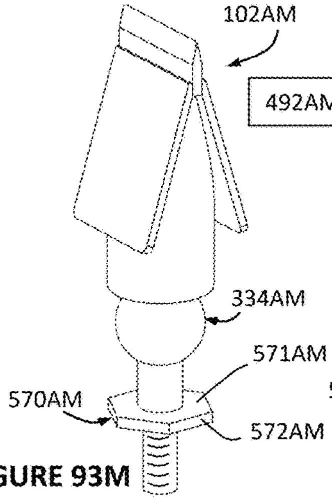
Figure 93N:
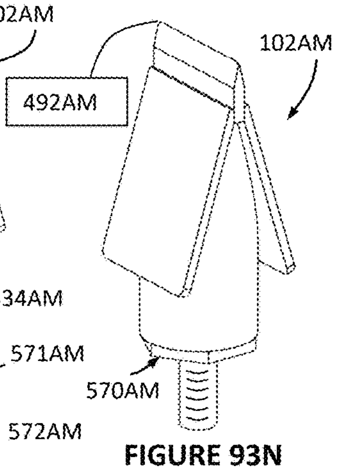
Figure 93P:
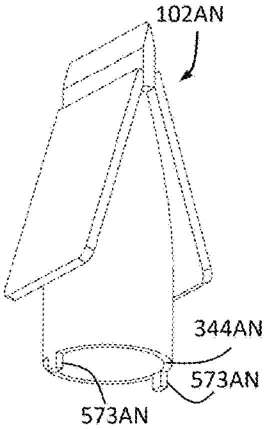

FIG. 93L illustrates one embodiment of a wood splitter 100AM comprising one or more optional features that may be useful on a variety of embodiments of the invention. Wood splitter 100AM is a form of wood splitter 100Y illustrated earlier. In some embodiments, base surface 344AM is supported directly against a base pod of a ball mount tongue whereas in other embodiments is supported by superior base face 571AM of hitch ball base 570AM as illustrated in FIG. 93M-93N. In some embodiments, base face insets 574AM are inset in base surface 344AM for seating a hitch ball base 570AM having a base profile 572AM that is faceted therein similar to a socket over the head of a bolt. This configuration fixes wood splitter 100AM from rotating during use if so desired. In some embodiments, one or more base tabs 573AN (FIG. 93P) extend from base surface 344AN for capture on one or more sides of a ball mount tongue (i.e. 341AG). In some embodiments for example, ball space 354AM (FIG. 93L) is sized for housing two or more trailer ball sizes (i.e. 1⅞", 2", 2 5/16", 3"). In these cases, a user may use an optional ball space reducer 576AM that provides a ball space 354AM of one diameter when ball space reducer 576AM is absent, and a small ball spacer diameter when ball space reducer 576AM is fitted inside ball space 354AM. In most cases, the ball space reducer removes excess play during use when utilizing a smaller hitch ball. In this embodiment, a ball space reducer 576AM comprises a reducer outer face 579AM defining an outer diameter for fit into ball space 354AM, and a reducer inner face 578AM of a smaller diameter defining a reducer cavity 577AM of a smaller diameter operable to house a smaller hitch ball. In some embodiments, the ball space reducer is biased such that it can be stretched over the surface of a hitch ball. Another form of ball space reducer 576AX is illustrated in FIGS. 204-205. In this embodiment, the ball space reducer is in the general form of a sphere (i.e. like a tennis ball) comprising a reducer outer face 579AX, a reducer inner face 578AX, and a reducer interface 575AX dividing the sphere and extending between the reducer inner face and the reducer outer face. The reducer inner face defines a substantially spherical reducer cavity 577AX sized for fit over hitch ball 334AX. In some embodiments, the ball space reducer is compressible whereas a friction fit is created between wood splitter capture face 352AX and hitch ball 334AX during operation thereby providing additional stability of the wood splitter during use. In some embodiments, the ball space reducer is manufactured from an elastomer and may have a felt covering. In other embodiments although not limited to these, the ball space reducer is at least partially manufactured from felt or other textiles and may be in the form of a sleeve or sock. In some embodiments, the ball space reducer comprises a logo or insignia on an outer surface for branding purposes (visible to other motorists) when the vehicle is in transport without the wood splitter mounted over it.

Figure 93Q:
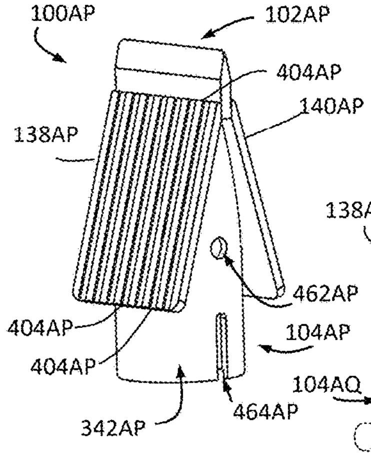

FIG. 93Q illustrates one embodiment of a wood splitter 100AP comprising other features that may be integrated into various embodiments. Note that in this embodiment, primary deflector face 138AP and secondary deflector face 140AP comprise one or more spaced and sloped relief grooves 404AP. In other embodiments, primary deflector face 138AP and secondary deflector face 140AP are substantially smooth. Various apertures or cuts through blade housing 342AP, either closed from (i.e. designated here as an upper window 462AP) or open to an edge (i.e. designated here as a lower window 464AP) may be present as further illustrated this Figure.

Figure 93R:
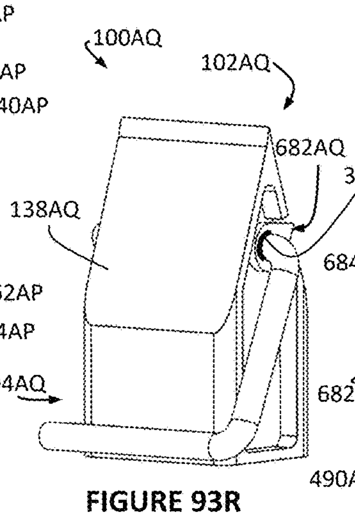
Figure 93S:
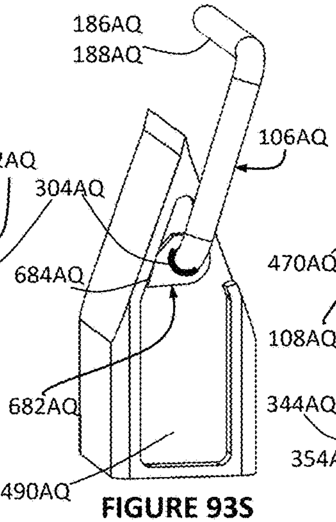
Figure 93T:
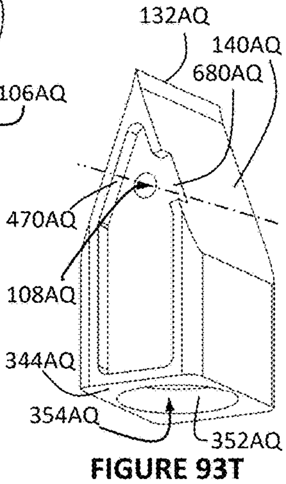

FIGS. 93R-93T illustrate an embodiment of a wood splitter 100AQ with an internal ball space 354AQ extending from base surface 344AQ whereby the ball space is sized and shaped to house a hitch ball therein. At least one side of wood splitter 100AQ comprises a lateral inset 490AQ defining a guide boss 470AG spaced from first guide receiver 108AQ. First guide receiver extends generally horizontally through wood splitter 100AQ at a height above where a hitch ball would internally occupy. A cammed tooth 682AQ having a cam aperture receives first guide foot 194AQ therein. A weld 304AQ or other fixation means is used to secure cammed tooth 682AQ at a predetermined position on first guide foot 194AQ. Cammed tooth 682AQ is fixed such that guide portion 106AQ can be folded down in a storage configuration and held upright in an operational configuration. In an operational configuration, cammed tooth 682AQ is rotated until tooth face 684AQ abuts guide boss 470AQ thereby holding guide surface 188AQ in a predetermined position superior, parallel, and spaced from cut edge 132AQ. Clearance window 680AQ is present if required to provide clearance for tooth face 684AQ when rotating guide portion 106AQ between storage and operational configurations. In some embodiments, clearance is provided by sliding the guide portion laterally first then rotating in which there is no need for a clearance window. In some embodiments, a clipped or pinned internal spring encircles first guide foot 194AQ causing cammed tooth 682AQ to be biased to remain medial in position against guide boss 470AQ.

FIGS. 94-104 illustrate a variety of embodiments of wood splitters configured for mounting to a structure such as a ball mount, trailer frame, bumper, or intermediate bracket attached to these structures. FIG. 94A for example, illustrates a wood splitter 100GG having a female cavity 445GG that is threaded through base surface 344GG along an Axis P. Female cavity 445GG is sized to complement blade lock bolt 460GG to securely hold the fixation portion 104GG of the wood splitter to a ball mount 340GG by extending through a ball mount hole 458GG and thereby fixing the wood splitter to the ball mount much like depicted in FIG. 95. Alternatively, blade lock bolt 460GG can be substituted with a threaded hitch ball 334GG whereby the threads on the hitch ball are used to fix the wood splitter in place while simultaneously holding the hitch ball in place. In this case, on one side of ball mount 340GG is wood splitter 100GG, whereas on the other side, is the hitch ball 334GG thereby operating as a dual-function hitch ball-wood splitter. The user would then insert this assembly in a hitch receiver with hitch ball positioned superiorly when towing thereby using the normal function of the hitch ball, and would flip this orientation so that the wood splitter 100GG is positioned superiorly for use as a wood splitter. (Note-Hitch ball 334GG in FIG. 94 is illustrated at a reduced scale). As illustrated later in FIG. 100 for example, the blade lock bolt can be threaded directly into the fixation portion of the wood splitter, or alternatively, into a separate nut such as a blade nut 474JJ abutting and/or inset in the fixation portion.

FIGS. 94B-94D provide an example embodiment of a dual-function hitch ball-wood splitter 111EJ arrangement. Again, by flipping the orientation of the ball mount 340EJ within a hitch receiver of a vehicle, the device can be used for towing or wood splitting as described earlier. FIGS. 94B-94D relate to an embodiment of this dual-function hitch ball-wood splitter 111EJ. In this embodiment, the wood splitter 100EJ comprises a fixation portion 104EJ in the form of a threaded block. The fixation portion comprises a base face 231EJ that is of substantially flat profile for mounting against a ball mount tongue 341EJ of a ball mount 340EJ. Extending substantially perpendicular from base face 231EJ is a female cavity 445EJ which in this case is threaded to receive and interlock with threads extending from a hitch ball. In this case, the fixation portion 104EJ operates as a locking nut on the hitch ball. Depending on configuration, the fixation portion 104EJ can comprise a primary deflector face 138EJ and an opposing secondary deflector face 140EJ separated by a ceiling face 229EJ positioned to support the mate face 225EJ of blade portion 102EJ. Inset into the fixation portion 104EJ are one or more pockets here in the form of a first recess 232EJ, and an opposing second recess 234EJ. In some cases, a pocket in the form of a non-circular port 227EJ that is substantially aligned with the elongate axis of the female cavity 445EJ is present. The first recess, second recess, and female cavity are substantially sized to receive extensions from the blade portion 102EJ such as one or more of a first tongue 228EJ, and a second tongue 230EJ. In some cases, only a non-circular first tongue is present and housed in non-circular port 227EJ which in this case is in the form of a hex to limit rotation of the blade portion during use. Located between wedging primary deflector face 138EJ and secondary deflector face 140EJ and spaced from base face 231EJ is ceiling face 229EJ. In some embodiments, the blade portion can include a primary edge face 134EJ, and an opposed secondary edge face 136EJ extending from cut edge 132EJ. In some embodiments, a log boss 492EJ extends upwards from the blade portion at one or more ends of the cut edge as seen previously. As would be recognized by one skilled in the art, the deflector faces and edge faces can comprise a wide variety of configurations. For example, in one embodiment, the deflector faces are configured entirely on the blade portion, whereas in other embodiments the deflector faces extend from the blade portion to the fixation portion as illustrated. In some embodiments, the edge faces are absent and only the deflector faces remain. As depicted in FIG. 94B, the fixation portion 104EJ is in the form of a blade coupler operable to receive removable blade portion 102EJ. The fixation portion comprises a superiorly facing ceiling face 229EJ operable to support opposing mate face 225EJ of removeable blade portion 102EJ thereon. This coupling relationship provides the user the option of removing the blade portion 102EJ of wood splitter 100EJ when not in use and perhaps storage in the vehicle, and quickly re-coupling the blade portion 102EJ in preparation for splitting of wood. Coupling between the recesses and tongue in this embodiment secures the blade portion in place with the assistance of gravity. Those skilled in the art will recognize other coupling relationships known in the art can be utilized. FIG. 94C depicts a cross-sectional view of a fixation portion in the form of a lock coupler similar to that illustrated in FIG. 94B. Note the threads extending at least partially through female cavity 445EJ that extends upwards from base face 231EJ. Washer recess 237EJ also extends upwards from the base face for housing a common hitch ball washer (i.e. 336Y, usually in the form of a lock washer) used to lock hitch balls. This embodiment also depicts a non-circular port 227EJ extending at least partially into the fixation portion from ceiling face 229EJ for receiving a non-circular first tongue as previously discussed. In this embodiment, the non-circular port is generally aligned with the female cavity along an axis. FIG. 94D depicts a variation wherein the wood splitter comprises a blade portion having a cut edge 132EJ offset to one side of the wood splitter. During splitting operations, the substantially vertical deflector face tends to aim kindling directly into a collector such as a bucket sitting on a ground surface below.

Illustrated in FIGS. 95-96 is a similar wood splitter 100GG yet with a stem 430GG extending from the base surface 344GG which in this case is threaded for capture by hitch ball nut 338GG with hitch ball washer 336GG for securing to a ball mount 340GG through a ball mount hole 458GG. In alternative embodiments, stem 430GG may be utilized without hitch ball nut 338GG and therefore may not require threads in which case wood splitter 100GG utilizes gravity to remain seated during splitting. FIG. 97 illustrates the system shown in FIG. 96 with a guide portion 106GG. Guide portion 106GG comprises a guide wall 186GG with guide surface 188GG formed thereon with the guide wall here in the general shape of a ring which may be fully or only partially enclosed. Guide wall 186GG defines a guide aperture 107GG through which logs may be placed for splitting. Guide wall 186GG is supported by first guide leg 190GG and in some case a second guide leg 192GG as illustrated in earlier embodiments. In this embodiment, first guide leg 190GG comprises a first guide foot 194GG portion. A leg stop 191GG is provided to control the vertical position of the guide portion by abutting against an anchor surface such as a surface of a ball mount 340GG as the leg stop is housed in first guide receiver 108GG. In some embodiments, first guide foot 194GG and first guide receiver 108GG have non-circular profiles to keep guide portion 106GG in a predetermined position over blade portion 102GG.

FIGS. 98-99 illustrates an embodiment of a wood splitter 100HH having a guide portion 106HH extending from a first guide receiver 108HH in the wood splitter. The guide portion 106HH is generally U-shaped. First guide receiver 108HH may assume a variety of forms such as a hole, groove, or a recess. In this embodiment, wood splitter 100HH comprises an upper window 462HH extending laterally or otherwise diametrically through sides of the wood splitter. Here first guide receiver 108HH is located at a superior junction between two sub-primary deflector faces 139HH that at least partially define upper window 462HH. Welds may be utilized to secure a first guide foot 194HH to at least one of sub-primary deflector faces 139HH. In this embodiment, guide portion 106HH comprises first guide leg 190HH extending between first guide foot 194HH and first guide wall 186HH wherein first guide leg 190HH elevates first guide wall 186HH above cut edge 132HH. As illustrated previously in FIG. 48C, first guide wall is positioned generally parallel and laterally spaced from cut edge 132HH for producing a predetermined thickness of kindling from a log. In addition, first guide wall 186HH may also serve as a user guard to protect from direct exposure to blade portion 102HH. It is recognized that first guide foot 194HH may be secured at a variety of positions within upper window 462HH and at a variety of angles. In an alternative embodiment, guide portion 106HH may be generally L shaped with first guide foot 194HH secured (welds, fasteners, captured) to an external wood splitter 100HH surface, a surface of a receiver block (i.e. 568ZZ FIG. 146), or within a first guide receiver within the receiver block.

In alternative embodiments such as illustrated in FIGS. 102 and 104, the first guide foot is configured for seating within a first guide receiver 108KK, 108LL in the form of a bore extending through at least a portion of a wood splitter. Again, the first guide wall position may be fixed by welding. Alternatively, as illustrated in FIG. 102, guide portion 106K may be pivotable within first guide receiver 108KK wherein a portion of first guide leg 190KK abuts against guide boss 470KK extending from blade portion 102KK in an operational mode and wherein the guide portion 106KK is folded down against primary deflector face 138KK in a storage mode. Alternatively, a set screw or locking pin may be extended through lock port 472KK to interfere with or otherwise clamp guide portion 106KK in a predetermined position. FIG. 104 represents another example of a wood splitter 100LL having a cut edge 132LL that is offset from a central plane of the wood splitter. In addition, primary deflector face 138LL comprises a steeper angulation than secondary deflector face 140LL. The steeper angulation arrangement is preferred for steering kindling pieces into a collector. An offset cut edge may be utilized in any of the embodiments displayed herein especially those where the wood splitter is rigidly fixed or balanced to less likely cause wobble of the wood splitter during impact. For example, the embodiments illustrated in FIGS. 93D, 94, and 95 have a secured fixation portion that will not wobble with impact even in an offset blade configuration.

FIGS. 100-103 illustrates a novel wood splitter 100KK capable of securing to an anchor such as a ball mount tongue by fastener or post in a posted configuration, and alternatively by positioning over a hitch ball in a captured ball configuration. For example, in a posted configuration, FIGS. 100 and 101 illustrates a wood splitter 100JJ having a lower window 464JJ extending through at least one side of blade housing 342JJ forming an inset blade floor 476JJ bounded by a floor stop 478JJ illustrated here in the form of a ridge. In this embodiment, a blade nut 474JJ having a centralized threaded hole is slid into lower window 464JJ and seated against blade floor 476JJ and guided by one or more floor stops 478JJ illustrated here in the form of a ridge. Inset blade floor 476JJ is sized to receive blade nut 474JJ. A threaded blade lock bolt 460JJ engages the threaded hole in blade nut 474JJ securing the assembly to an anchor such as within a ball mount hole of a ball mount. In a captured ball configuration, blade nut 474JJ is removed/absent along with blade lock bolt 460JJ to expose ball space 354JJ. Ball space 354JJ has a diameter sufficient for sliding over a hitch ball thereby utilizing the hitch ball to stabilize wood splitter 100JJ during splitting operations. Removal of captured ball style wood splitters involves the user simply lifting the wood splitter up and off the trailer ball and ball mount (note FIG. 73). FIG. 102 illustrates a second example of a wood splitter 100KK offering both a posted configuration and a captured ball configuration. In a posted configuration, extending into the superior end of ball space 354KK is superior lock recess 482KK having threads complementing extended blade lock bolt 484KK. Extended blade lock bolt 484KK extends through ball space 354KK to engage superior lock recess 482KK to lock wood splitter 100KK to an anchor such as a ball mount or trailer frame. Optional floor plate 480KK comprises a periphery of sufficient size for fit within ball space 354KK and may be positioned in the inferior portion of ball space 354KK to assist positional support of wood splitter 100KK. In a captured ball configuration, extended blade lock bolt 484KK is removed/absent along with floor plate 480KK. Wood splitter 100KK is then set over a ball mount secured hitch ball wherein the hitch ball is captured within ball space 354KK and base surface 344KK rests upon a ball mount surface similar to the embodiment illustrated in FIG. 71. The captured ball configuration is well suited for quick and portable wood splitting due to the simplicity of simply placing the device over a hitch ball of a vehicle.

FIGS. 105-111 illustrate additional forms of wood splitters well suited for a captured ball configuration many of which may be formed by machining or metal casting. These embodiments like all others may include a secondary blade (i.e., FIG. 4). FIGS. 105 and 106 illustrates a wood splitter having a capture face 352MM defining an internal ball space 354MM that is sized and shaped for sliding over and capturing a hitch ball therein. Although the ball space may assume many forms, the ball space 354MM is preferably cylindrical and preferably hemi-spherical at a superior end. At an inferior end, the ball space may broaden in diameter at 486MM to accommodate the flared base often seen with a hitch ball. In some embodiments the ball space may not broaden inferiorly. In this event and depending on the hitch ball style, base surface 344MM will be supported by the ball mount base pod (see 345Y, FIG. 73) or the top surface of the flared base of the hitch ball. One or more flutes 488MM may extend through base surface 344MM and capture face 352MM as a means to reduce weight and material. FIG. 107-108 illustrates yet another embodiment of a wood splitter 100NN again comprising an upper window 462NN that intersects with the superior end of ball space 354NN. At one or more ends of cut edge 132NN, a log boss 492NN may be positioned for quick positioning of a log. The log boss is an enlarged mass extending above the cut edge that a user may use to quickly position a log for splitting while also reducing exposure to the blade. In some embodiments, a log boss is positioned on each end of cut edge 132NN. One or more lateral insets 490NN may be used in the blade housing 342NN to reduce weight and material.

FIG. 109-111 illustrates yet another example of a wood splitter for a captured ball configuration configured to minimize material. In this embodiment, wood splitter 100PP comprises an upper window 462PP, and a lower window 464PP extending through blade housing 342PP. Defined internally in ball space 354PP between upper window 462PP and lower window 464PP is upper chamber 466PP which is preferably positioned such that capture face 352PP is generally aligned with the widest spherical diameter of a hitch ball that would reside therein thereby offering undiminished support. Defined between lower window 464PP and base surface 344PP is lower chamber 468PP preferably sized to capturing a hitch ball base 570AA therein. In some embodiments the lower chamber diameter is sized the same as the upper chamber diameter. In other embodiments, the lower chamber 468PP diameter is larger than the upper chamber 466PP diameter to accommodate hitch balls that have a hitch ball base 570AA of a larger diameter than the hitch ball.

Figure 92:
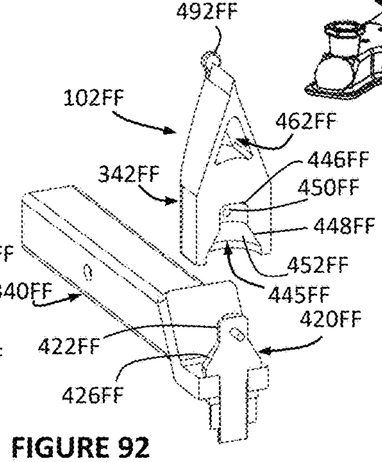
FIG. 92 depicts a perspective cross sectional view through a wood splitter and base fastener of the interchangeable system of FIG. 91.

FIGS. 178-183 illustrate yet another example embodiment of a wood splitter having a captured ball configuration. Wood splitter 100AX comprises a blade housing 342AX extending along Axis Q from a substantially flat base surface 344AX that is aligned in a first plane, Plane V. Primary blade 118AX comprises cut edge 132AX superiorly with opposed primary deflector face 138AX and secondary deflector face 140AX diverging as they extend below thereby creating a wedge. The deflector faces can be substantially flat as illustrated here, or non-planar. The cut edge may be centered thus intersecting Axis Q or offset from Axis Q (typically resulting in one of the opposing primary or secondary deflector faces being steeper than the other). Here the primary blade is substantially flat and horizontal, but can be concave, convex, or assume other profiles (note non-linear cut edge 471AX). Primary edge face 134AX and secondary edge face 136AX may also be present adjacent the cut edge as well as a secondary blade 120AX if so desired as illustrated previously in FIGS. 93H, 93J, and others. At one or more ends (first end 728AX, second end 730AX) of cut edge 132AX, a log boss 492AX can be positioned for quick positioning of a log and for use as a blade buffer. The log boss is an enlarged mass extending above the cut edge 132AX that a user may use to quickly position a log for splitting while also reducing exposure to the cut edge. As illustrated in FIG. 180, blade portion 102AX is preferably orientated over the hitch ball such that the log boss 492AX is adjacent the user thereby also providing a level of protection between the user and the cut edge 132 AX. Log boss face 495AX is formed thereon the log boss and faces the cut edge. In other embodiments, such as illustrated in FIG. 92, blade portion 102FF has a log boss 492FF orientated opposite the user. In some embodiments, a log boss is positioned on each end of cut edge 132AX. One or more lateral insets 490AX extending towards Axis Q from outer faces 842AX may be positioned in the blade housing 342AX thus reducing weight and material. This embodiment also comprises a circumferential inset 491AX encircling fixation portion 104AX. Blade housing 342AX comprises an upper window 462AX defined by sub-primary deflector face 139AX on wedge wall 463AX. The upper window intersects with the superior end of ball space 354AX. Upper window 462AX extends above ball space 354AX and traverses diametrically between outer faces 842AX under primary deflector face 138AX and secondary deflector face 140AX of wedge wall 463AX to lateral sides of the blade housing. The ball space 354AX, substantially defined by capture face 352AX, is generally cylindrical in this embodiment with a substantially vertical elongate axis, but may comprise other non-circular profiles such as hexagonal while still functioning to utilize the hitch ball 334AX as a structure for immobilizing the wood splitter during use. Ends of cut edge 132AX absent of a log boss may include a sloped relief 836AX. As with all captured ball configurations, preferred embodiments are sized to house within the ball space hitch ball diameters of about 1.875 inch, 2 inch, 2.3125 inch, and 3.0 inch. Most splitting tools disclosed herein including that shown in FIG. 178 comprise ball spaces having a lateral diameter between about 1.875 inches and 3.5 inches and wherein the ball space extends superiorly more than 2.2 inches (although not limited to this) from base surface 344AX along axis Q through ball window 884AX. Note in some embodiments, the ball space curves inward at a superior end whereby the capture face is spherical but also can be of other profiles. For example, a curved inward capture face 352AX is illustrated in at least FIGS. 178 and 181. In some embodiments, the curved inward capture face is positioned operable to engage a hitch ball to at least partially or wholly support a splitter. However, in most embodiments the splitter is supported vertically in its entirety at base surface 344AX. In preferred embodiments, the ball space has a height sufficient to accommodate hitch balls that vary in height. FIG. 181 also depicts a ceiling face 469AX directed downward at the joining of the wedge walls. As an option, some embodiments disclosed herein include a direction ridge 465AX that extends upward from one or more lateral ends of one or more of the primary deflector face and secondary deflector face. These direction ridges create a funneling effect by guiding kindling toward the inside of a collector and therefore limit kindling from misdirection away from the collector. Similarly, these direction ridges can be used on the wood splitters of a variety of embodiments disclosed herein as would be recognized by those skilled in the art. As mentioned previously, those skilled in the art will recognize that the cut edge of any of the splitter blades disclosed herein can be but are not limited to straight, convex, and concave. Most Figures illustrate straight cut edges, although non-linear cut edges (i.e. 471AX, 471AY, 471AQ, 471AT, 471DB, 471DK) are illustrated by dotted line in some of the Figures.

Some embodiments are sized to work for more than one hitch size. For example, a ball space configured for receiving a 2.3125 inch ball may still work adequately on a 2 inch or 1.875 inch hitch ball without excessive play however a ball space reducer can be helpful. Note also that the blade housing 342Y in some embodiments is assembled by welds 304Y as illustrated in FIG. 72 from tubing and metal plate, whereas in other embodiments such as blade housing 342AX of FIG. 178 is free of welds and is of a single piece construction (a casting for example) except possibly where an optional guide portion is attached to the blade housing. For a single piece blade housing construction, metal casting or forging process may be utilized.

FIGS. 258-287 are associated with wood splitters having a ball space (whereas the ball space serves as a fixation portion) for mounting over a hitch ball in an operable configuration (mode). The hitch ball thereby serves to substantially maintain the position of the wood splitter in an operable configuration when supported on a ball mount. The ball space can be entirely enclosed aside from the inferior opening for passing a hitch ball such as illustrated in FIG. 93L for example, or can have any variety of openings (i.e. windows) as illustrated in other embodiments. Several of the embodiments of FIG. 258-287 have features previously illustrated in other embodiments disclosed herein such as, for example, the features illustrated in the FIG. 178 embodiment. The embodiment depicted in FIG. 258-259, includes a recessed annular face 997CX defining a circumferential recess 491CX encircling the inferior portion of the splitter. A grip band 998CX having an internal face 1096CX facing inside and an external face 1098CX facing outside is sized and shaped for seating in the circumferential recess. The grip band is stretched over the inferior end of the splitter and housed in the circumferential recess as illustrated in FIG. 258. Preferably the grip band 998CX is made from a polymer or elastomeric material such as silicone. Band insignia 1000CX such as a company logo can be positioned on the external face 1098CX of the grip band for product branding purposes. A distinct color palate can also be used as a source identifier.

In some embodiments, the grip band 998CY comprises one or more bumper boss 1004CY spaced about and extending from the internal face 1096CY. The bumper boss are sized, shaped, and positioned to extend through corresponding bumper apertures 1002CY (FIG. 260) that extend through the annular face 997CY and a short distance into ball space 354CY where they resiliently engage a portion of a hitch ball when the splitter is in an operable mode and thereby further stabilizes the splitter while also allowing installation and removal of the splitter with a friction fit. FIG. 262 illustrates yet another embodiment of a wood splitter 100CZ comprising an internal annular bumper 1005CZ seated on the capture face 352CZ of ball space 354CZ or within a bumper slot within the capture face 352CZ to again provide a friction fit between the hitch ball and splitter. The splitter illustrated in FIGS. 263 and 264 comprise one or more bumper slots 1006DT inset in the capture face 352DT. Resilient bumpers 1008DT are fixed within the bumper slots and have a thickness to again provide a friction fit between the wood splitter 100DT and a hitch ball while still enabling a user to don and doff the splitter with a small axial/rotatory force (i.e. 0.5 lb.-20 lb.).

FIGS. 265A-267 illustrate embodiments comprising a bayonet style engagement between the splitter and bayoneted base. As illustrated in FIG. 265A, inset at an inferior end in capture face 352DU is one or more bayonet engagement slot 1010DU. The engagement slot has a width sufficient for occupation by a corresponding bayonet and typically has a vertical leg and a horizontal leg as further illustrated in FIG. 265B. FIG. 266 illustrates bayonet washer 1050DU having a radial washer face 1054DU of size and shape to be inset into the inferior end of the ball space 354DU with a sliding fit. Bayonet 1052DU extends radially from radial washer face 1054DU and in an operational mode, engages in bayonet engagement slot 1010DU by entering in the vertical leg and then the horizontal leg with a rotation of the splitter thereby securing the wood splitter with the bayonet washer thereby fixing it to the ball mount. In this embodiment, bayonet washer 1050DU is fit between the hitch ball base and ball mount similar to that of FIG. 274 whereby the threaded portion of a hitch ball extends through washer hole 1062DU of the bayonet washer 1050DU. Alternatively, the function of the bayonet washer can be integrated into a hitch ball as illustrated in FIG. 267. In this embodiment, hitch ball base 570DV has a radial washer face 1054DV with diameter sized for sliding fit into the splitter ball space 354DU. Bayonets 1052DV are sized/positioned to engage the bayonet engagement slots and serve for quick engagement/release of the splitter from the hitch ball. An increased height of the radial washer face can provide further stability to the splitter by limiting motion at the inferior end of the splitter. FIG. 270 illustrates a similar embodiment to that of FIG. 265-267. In this embodiment, the hitch ball base 570DY comprises a bayonet engagement slot 1010DY inset in hitch ball base 570DY. A bayonet extending from the capture face of a splitter engages the slot when lowered and rotated.

FIG. 271A-271B illustrate the use of a friction spacer 189DZ which can also be described as a thin form of a ball space reducer 576DZ. This friction spacer 189DZ is useful to create a friction fit between the hitch ball 334DZ and capture face 352DZ of a mating splitter when the gap therebetween is very small yet can be filled with a thin spacer. FIG. 271B illustrates this friction spacer 189DZ in the form of a thin weaved cloth such as of polypropylene. In this case, the friction spacer is simply draped or stretched over the hitch ball before pressuring the splitter into the operable position. The friction spacer 189DZ comprises a reducer inner face 578DZ facing inside and a reducer outer face 579DZ facing outside.

FIGS. 268-269 illustrate yet another embodiment for securing a splitter to a ball mount. FIG. 268 illustrates bayonet slots 1056DW inset in the inferior side of bayonets 1052DW. In this embodiment, the bayonets extend from either a separate bayonet washer 1050DW, but can alternatively extend from a hitch ball base such as illustrated earlier as 570DV. Here, a restraining band 1058DW having restraint receivers 1060DW at the ends of the restraining band, is stretched through the upper window of the splitter with the restraint receivers removably coupled to the opposing bayonets thereby securing the splitter to the ball mount 340DW. In this embodiment, radial washer face 1054DW has an oversize diameter exceeding the diameter of the capture space whereas the base surface of the respective splitter is supported by the superior facing surface of the bayonet washer 1050DW. Alternatively, the radial washer face 1054DW has a diameter for sliding fit into the ball space of a respective splitter and slots for passage of the bayonets extending through the inferior end of the ball space. FIG. 272 illustrates an embodiment of a wood splitter 100DX in an operable mode over a hitch ball and is secured by a blade cap 900DX. Extending from the blade cap is a restraining band 1058DX that extends under the ball mount 340DX or under the threaded hitch ball stem. A restraining cup 1059DX can be utilized to engage a portion of the threaded hitch ball stem or nut thereby preventing the restraining band from slipping off. FIG. 273 illustrates an embodiment of a wood splitter 100EA utilizing a donut bumper 1066EA placed, wrapped, or stretched around the neck of a hitch ball 334EA. The donut bumper is compressible and creates a friction fit between the capture face 352EA of ball space 354EA and the outer surface of the donut bumper 1066EA. In this way, the donut bumper is utilized to provide additional stabilization to the wood splitter while still allowing the wood splitter to be easily removable.

FIG. 274-275 illustrate various form of utilizing an elevated washer 1064DI or a fitted hitch ball base 570EB to add stabilization in the ball space of a splitter. In FIG. 274, elevated washer 1064DI (positioned between standard hitch ball base 570DI and the ball mount tongue 341DI) comprises a radial washer face 1054DI sized for sliding fit within the ball space of a respective splitter. It is preferred that the radial washer face has an enhanced thickness 'T' for stabilizing the inferior end of the ball space by limiting any side-to-side movement when splitting off axis. In preferred embodiments, 'T' is between 0.2 inches and 0.5 inches but can assume other thicknesses. The enhanced thickness hitch ball base illustrated in FIG. 275 accomplishes a similar function of limiting side-to-side movement. Here again, the hitch ball base 570EB has a circular diameter sized for sliding fit within the ball space 354EB of a respective splitter. In alternative embodiments, the elevated washer or enhanced thickness hitch ball base 570EB can have a non-circular base profile 572EB for fit into a non-circular ball space (i.e. FIG. 93L) thereby limiting rotation between the splitter and ball mount.

FIG. 276-277 illustrates yet another option for supporting a wood splitter having a capture space. In this embodiment, a stabilizer washer 1068EC comprises an upward facing landing surface 1072EC for supporting the base surface 344EC of wood splitter 100EC. Radial washer face 1054EC is therefore of sufficient radial diameter (larger than the respective ball space diameter) for this to occur. Optionally, a circular or non-circular elevated boss 1070EC can rise up for sliding fit into a ball space of respective wood splitter 100EC. A central washer hole 1062EC extends through the stabilizer washer for housing the threaded stem of the hitch ball. As described previously, the elevated boss 1070EC can have an enhanced thickness 'T' to offer additional inferior stabilization of the wood splitter 100EC.

FIGS. 278 and 279 depict another embodiment of a wood splitter mounted over a hitch ball. In this embodiment, the splitter is secured in position by application of one or more lock pins or as shown here a U-shaped locking pin 1074ED. Here the legs of the locking pin are spaced to seat within spaced pin receiving holes 1076ED. The legs of the locking pin travel under the inferior side of the hitch ball in an operational mode (FIG. 279) thereby limiting motion that can occur between the hitch ball and splitter. Once the locking pin 1074ED is removed, the wood splitter can also be elevated for removal.

FIG. 280-281 depicts yet another embodiment of a wood splitter 100EE whereby the wood splitter is supported entirely by the hitch ball much like the wood splitter illustrated in FIG. 197-199 which captures the neck 872BZ between collar face 882BZ and neck pin 876BZ. However, in the FIG. 280 embodiment, neck 872EE is captured between a pair of opposed neck pins 876EE that extend through a pair of spaced pin receiving holes 1076EE. Here, base surface 344EE does not require vertical support from a surface of a ball mount or hitch ball base.

FIGS. 282-284 depict yet another embodiment of an apparatus for helping to stabilize a wood splitter 100EF to a ball mount 340EF. In this embodiment, the wood splitter is equipped with one or more restraint recesses 1082EF at an inferior end of the wood splitter. A lower restraint band 1078EF is equipped at ends of the restraint band with restraint claws 1080EF. The restraint claws are seated in the restraint recesses 1082EF with the lower restraint band again stretched under the ball mount and/or over the inferior end of the hitch ball stem 430EF. A restraining cup 1059EF centered over the hitch ball stem can be used to help assist holding the band in a secure position.

FIGS. 285-286 depict yet another embodiment of an apparatus operable for improved stabilization of a wood splitter 100EG. In this embodiment, a coupler clip 1084EG comprising a C-frame 1092EG shaped body utilizes a pair of spaced upper ridge 1086EG and lower ridge 1088EG on each side of the C-frame. Once the wood splitter 100EG is in an operable mode over the hitch ball, the coupler clip 1084EG is slid in position capturing the wood splitter and ball mount between the upper and lower ridges on each side of the C-frame. To facilitate this, the inferior end of the wood splitter 100EG can comprise respective restraint recesses 1082EG for improved face to face engagement.

FIG. 287 depicts a wood splitter 100EH equipped with one or more set screws 1094EH seated in set screw holes 1090EH. The set screws can be radially spaced about the fixation portion 104EH of the wood splitter. Advancing the set screw impinges the leading end of the set screw under the inferior side of the hitch ball thereby securing the wood splitter in position. Alternatively, the set screws can be in the form of spring pins to provide an alternative friction fit.

FIGS. 112 through 123 illustrate a select number of embodiments of guide portions. FIGS. 113-115 illustrate a guide portion 106QQ in the form of a plate. In preferred embodiment, guide portion 106QQ is manufactured from sheet metal although other materials such as polymers may be substituted. Extending out from the plate from plate leg 498QQ towards cut edge 132QQ is guide wall 186QQ with guide surface 188QQ thereon. Guide surface 188QQ is generally parallel, superior, and horizontally distanced from cut edge 132QQ a distance for a preferred kindling thickness (i.e. 0.75-1" for example). In this embodiment, a lower portion of plate leg 498QQ is fastened to secondary blade 120QQ by use of one or more guide fasteners 494QQ threading into complementing fastener receivers 496QQ in secondary blade 120QQ. In an alternative embodiment, a sliding glide wall plate is adapted to provide a user the ability to adjust the horizontal distance between the guide surface 188QQ and cut edge 132QQ. Adjustment fasteners at 500QQ may be tightened to secure the sliding guide wall at a predetermined distance based on user preference. In the embodiment of FIG. 112, guide portion 106SS is in the form of a plate with extended superior lobe serving as a guide wall 186SS with guide surface 188SS thereon. Guide portion 106QQ (FIG. 114) may be substituted with guide portion 106SS thereby fastened to secondary blade 120QQ using the same guide fasteners. Log boss 492SS extends above the cut edge on secondary blade 120QQ thereby serving as both a kindling width guide and as a small protectant against blade exposure.

FIG. 117-120 illustrate various configurations of guide portions 106RR of a wood splitter 100RR each having a first guide leg 190RR with a first guide foot 194RR received in a first guide receiver 108RR in the form of a bore and a second guide leg 192RR with a second guide foot 196RR received in a second guide receiver 110RR also in the form of a bore. Guide wall 186RR with guide surface 188RR formed thereon spans between first guide leg 190RR and second guide leg 192RR. In the embodiment of FIGS. 117 and 118, the first and second guide feet are seated into the respective first guide receiver 108RR and second guide receiver 110RR by elastically stretching the two legs apart and aligning them with each hole. Releasing the second guide leg 192RR causes consequent springing of second guide leg 192RR toward second guide receiver 110RR thereby holding the guide portion to the remaining portions of wood splitter 100RR. In this embodiment, first guide receiver 108RR is placed vertical through a fixation portion 104RR whereas second guide receiver 110RR is placed horizontal through a blade portion 102RR. Guide portion 106RR illustrated in FIG. 119 and FIG. 120 also provides adjustability whereby guide surface 188RR may be adjustably locked at various distances from cut edge 132RR. Here first guide foot 194RR and second guide foot 196RR are generally parallel and aligned with a pair of complementary first guide receiver 108RR and second guide receiver 110RR positioned generally perpendicular to cut edge 132RR. A set screw or locking pin may be extended through lock port 472RR to interfere with and lock guide portion 106RR in a predetermined position.

FIGS. 119-122 illustrate various embodiments of optional blade covers 502RR for quickly covering and uncovering a cut edge 132RR of a blade portion 102RR. Blade cover 502RR comprises a cover body 504RR from which one or more cover legs 506RR extends. A spin aperture 508RR extends through at least one cover leg 506RR for occupation by a spin fastener 512RR such as a screw. A blade cap 510RR may be formed as a U-shaped tunnel (FIG. 120) for seating cut edge 132RR therein or may be in the form of a broad surface (FIG. 122). In the embodiment of FIG. 120, blade cover 502RR is lifted off cut edge 132RR and allowed to spin and hang from the corresponding first or second guide foot 194RR, 196RR. To reapply, the blade cover 502RR is lifted and moved wherein the cut edge rests in the U-shaped tunnel. In the embodiment of FIG. 122, blade cover 502RR spins about spin fastener 512RR. In a covered position, the blade cover is flipped down as illustrated in FIG. 121. In an uncovered position, the blade cover is flipped up to expose the cut edge 132RR during log splitting operations.

FIG. 123-124 represent yet another embodiment of a wood splitter 100TT in accordance with the disclosed invention. In this embodiment, a fixation portion 104TT is in the form of a generally square tube much like the FIG. 7 embodiment. A fixation bore 116TT is located near a distal end of fixation portion 104TT for housing a hitch pin 112 when inserted in a hitch receiver. A first guide receiver 108TT in the form of a bore is located near a proximal end of the fixation portion and extends generally horizontally through it. In this embodiment, a third guide receiver 520TT extends through blade extension 162TT of blade portion 102TT and is located within fixation recess 164TT. Blade portion 102TT may include blade notch 123TT to reduce the diameter of a portion of blade portion 102TT sufficiently to fit within fixation recess 164TT. Blade portion 102TT may be manufactured from sheet metal having an upward facing superior cut edge 132TT and inferiorly placed primary deflector face 138TT for creation of wedging during splitting operations. First guide receiver 108TT may be enlarged (as illustrated FIG. 124) for welding second side extension wall 168TT of blade portion 102TT to the second side recess wall 176TT in fixation recess 164TT. Alternatively, those skilled in the art will recognize that the blade portion 102TT may be fastened using bolts or screws to fixation portion 104TT. Lock collar 514TT is welded to fixation portion 104TT in alignment with first guide receiver 108TT such that first guide foot 194RR passes through a central aperture of lock collar 514TT. User adjustment of lock collar set screw 516TT binds and releases first guide foot 194RR allowing consequent adjustment width between cut edge 132TT and guide surface 188TT for variance of kindling thickness. Guide portion 106TT in this embodiment is a replica of guide portion 106RR and thus comprises similar features and orientations. A secondary blade 120TT extending from a primary blade 118TT as described previously may be provided to produce twice the strands of kindling with each log split.

FIG. 125 illustrates yet another embodiment of a wood splitter having a guide portion 106UU with fixed or adjustable guide wall 186UU and guide surface 188UU thereon. A receiver block 568UU extends superiorly from each of opposite ends of cut edge 132UU. One receiver block having a first guide receiver 108UU therein and the other having a second guide receiver 110UU therein. Guide portion 106UU may be generally U-shaped with opposed fixation apertures 522UU at each end of the U of guide legs 190UU and 192UU. In this embodiment, the fixation apertures 522UU are in the form of slots for kindling thickness adjustment or may be in the form of holes for fixed kindling thickness. Guide fasteners 494UU extend through fixation apertures 522UU and thread into the respective guide receivers to maintain or adjust position.

FIG. 126 illustrates another embodiment of a wood splitter having a guide portion 106VV in the form of a generally straight bar secured at one end in first guide receiver 108VV. First guide receiver 108VV resides in receiver block 568VV which extends superiorly above cut edge 132VV at a distal end of the cut edge. In this embodiment, guide wall 186VV with guide surface 188VV thereon is in the form of a bar welded, screwed into, clamped or otherwise fixed to first guide receiver 108VV. First guide receiver 108VV may include a bore for receiving the guide portion therein.

FIG. 127 illustrates a variation of a wood splitter having a guide portion 106VV in the form of a generally straight bar secured at one portion in first guide receiver 108VV. First guide receiver 108VV resides superiorly on receiver block 568VV which extends superiorly above cut edge 132VV from a lateral portion of secondary blade 120VV. In this embodiment, guide wall 186VV with guide surface 188VV thereon is in the form of a bar welded, screwed into, clamped or otherwise fixed to first guide receiver 108VV. First guide receiver 108VV may include a hole or channel for receiving the guide portion therein. In some embodiments, receiver block 568VV may further comprise a sharpened vertical edge whereby wood impacted against the receiver block will be split as it moves down across blade portion 102VV. Likewise, first guide leg 190WW may also be sharpened to also assist wood splitting.

FIGS. 128-136 illustrate various forms of wood splitters having a guide portion 106WW switchable between an operational mode (providing guidance through a guide surface to blade cut edge), storage mode (limiting blade exposure by partially shielding cut edge) and an open mode (no guidance with open exposure to blade) in accordance with the disclosed invention. In an open mode as illustrated in FIG. 128, guide wall 186WW is positioned generally perpendicular to cut edge 132WW at a distal end of blade portion 102WW thereby exposing cut edge 132WW. By moving the guide portion 106WW out of the way, the user may use blade portion 102WW for splitting not only smaller kindling pieces, but also to split larger logs into chunks. In a storage mode, guide portion 106WW is rotated such that guide wall 186WW is above and generally parallel with cut edge 132WW thereby minimizing exposure to the cut edge. Second guide foot 196WW may be seated in second guide receiver 110WW which here is in the form of a depression that the foot can elastically snap into and out of. Guide portion 106WW rotates about first guide leg 190WW which terminates in first guide foot 194WW which is housed within first guide receiver 108WW bore. First guide receiver 108WW bore is housed in receiver block 568WW which extends behind secondary blade 120WW. A third guide receiver may be located at a position intermediate blade portion 102WW and fixation portion 104WW for receiving second guide foot 196WW when in open mode. Also illustrated in FIG. 128 is logo face 524WW also located intermediate the blade portion 102WW and fixation portion 104WW. Logo face 524WW faces at least partially proximally and is a face comprising no other features aside from trademark information related the product.

FIGS. 131, 134, 137, and 145-147 illustrate further embodiments of wood splitters in accordance with the disclosed invention with guide portions set in an operational mode or configuration. FIGS. 132, 135 and 138, illustrate further embodiments of wood splitters in accordance with the disclosed invention with guide portions set in an open mode or configuration.

Illustrated in FIG. 130 is another embodiment of a wood splitter comprising an L-shaped guide portion 106XX having guide wall 186XX illustrated here in the form of a round rod. Here at least a portion of first guide foot 194XX and in some cases first guide leg 190XX is threaded, however in alternative embodiments the threads are absent. First guide foot 194XX is housed in first guide receiver 108XX of receiver block 568XX extending between an upper prop floor 538XX and a lower prop floor 540XX. First guide receiver 108XX is in the form of a bore along generally vertical axis H. A faceted collar 530XX extends at least partially around first guide foot 194XX and is illustrated here in the form of a square nut. Faceted collar 530XX is supported vertically by upper prop floor 538XX. Faceted collar 530XX comprises at least a first facet 532XX and a second facet 534XX which interface with block face 528XX on block wall 526XX. In this embodiment, first facet 532XX and second facet 534XX are distanced at approximately 90 degrees. Thus, open and operational modes are dependent on whether first facet 532XX or second facet 534XX abuts block face 528XX. Faceted collar 530XX which may be threaded, is fixed on first guide foot 194XX at a predetermined position to provide a desired vertical GAP between guide surface 188XX and blade edge 132XX. Welds, adhesives, pins, or other fixation methods may be used to secure the facet collar in place. In this embodiment, faceted collar 530XX is fixed such that the first facet 532XX is parallel to an axis defining guide surface 188XX and second facet 534XX is perpendicular to an axis defining guide surface 188XX. To switch between open and operational modes, the user simply lifts the guide portion enough to unblock faceted collar 530XX and rotate 90 degrees then re-lower into a blocked position. An inferior restraint such as a nut, pin, or clip may be used to releasably retain guide portion 106XX which may be by abutment against lower prop floor 540XX.

Guide portion 106XX illustrated in FIGS. 133-136 operate using a similar function. In this embodiment, guide portion 106XX is in a turret form as noted in FIG. 136. Faceted collar 530XX is a generally circular block with a central turret aperture 542XX extending therethrough. A facet recess 544XX on a radial surface is bounded by a first facet 532XX and a second facet 534XX. Guide wall 186XX with guide surface 188XX thereon is tangent and radially extends from the faceted collar 530XX. A bottom surface of the faceted collar is supported by upper prop floor 538XX. Guide fastener 494XX extends through turret aperture 542XX and is received in a threaded portion of first guide receiver 108XX. Block wall 526XX with block face 528XX thereon extends upward from upper prop floor 538XX and is positioned to travel within facet recess 544XX when guide portion 106XX is moved between modes. Contact between each facet and the block face limits movement of guide portion 106XX.

FIGS. 137-147 illustrate additional examples of embodiments of guide portions within wood splitters in accordance with the disclosed invention. FIG. 137 illustrates an example of a wood splitter 100YY that is monolithic between a fixation portion 104YY and a blade portion 102YY as might be achieved by machining from a single block of metal or casting processes. In this embodiment, a bottle opener is integrated into a proximal end of blade portion 102YY comprising a downwardly extended bottle flange 221YY defining a bottle opener recess 220YY extending upward. The bottle open recess is sufficiently wide to engage a bottle cap therein to wedge it off a bottle for the convenience of the user.

FIG. 140 illustrates an embodiment including optional cavities. A fixation cavity 550YY extends upward from an inferior portion of a wood splitter 100YY into the fixation portion 104YY. Embodiments may also include a primary blade cavity 546YY also extending upward from an inferior portion of wood splitter 100Y but into the primary blade. Some embodiments include a secondary blade cavity 548ZZ extending upward from lower prop floor 540ZZ at an inferior portion of a wood splitter 100ZZ into a secondary blade 120ZZ as illustrated in FIG. 143. One or more cavity dividers 562ZZ may be present to reinforce the cavities.

First guide receiver 108YY, 108ZZ (within receiver block 568YY, 568ZZ) in these embodiments is in the form of a generally vertical bore. Receiver block 568YY, 568ZZ are located intermediately between a fixation portion 104YY, 104ZZ and a blade portion 102YY, 102ZZ. First guide receiver 108YY, 108ZZ is configured to house a first guide foot 194YY, 194ZZ therein. Formed in an upper prop floor 538YY, 538ZZ is block wall 526YY, 526ZZ which is in the form of a channel for cradling various parts of guide portion 106YY, 106ZZ. Offset approximately 90 degrees from the block wall is secondary block wall 527YY, 527ZZ with secondary block face 529YY, 529ZZ thereon which is also in the form of a channel for cradling various parts of guide portion 106YY, 106ZZ as illustrated in the Figures. As illustrated in FIG. 139, the channels formed by the block wall and the secondary block wall intersect at generally 90 degrees in this embodiment but may vary in other embodiments.

Illustrated in FIG. 141 is an alternative embodiment of a guide portion 106YY having a generally circular guide wall 186YY with guide surface 188YY formed thereon. A generally vertical first guide leg 190YY extends substantially perpendicular from generally horizontal guide wall 186YY terminating in a first guide foot 194YY. A prong 558YY, here L-shaped, extends between the first guide leg 190YY and another portion of guide wall 186YY at a distance. First guide foot 194YY is sized to be received and secured in first guide receiver 108YY. Prong 558YY is positioned to reside in the channel formed by secondary block wall 527YY thereby maintaining the height of the guide wall 186YY and its position generally centered over cut edge 132YY. Guide portion 106YY may be formed from a variety of manufacturing techniques including casting and welding of formed rods. As illustrated in previous figures such as FIG. 10A, guide wall 186YY may not be fully enclosed. In alternative embodiments, a second guide leg 192YY may be extended for extra support as illustrated and received in a second guide receiver 110WW such as shown in FIG. 128. The guide illustrated may be inserted or removed by aligning the guide feet to the respective guide receivers and applying an upward or downward force.

FIGS. 144-147 illustrate yet another guide portion 106ZZ also formed in an L shape. In this embodiment, a prong 558ZZ extends from a side of first guide leg 190ZZ. Prong 558ZZ in this embodiment is generally cylindrical and positioned generally perpendicular first guide leg 190YY while also being generally parallel with guide wall 186ZZ although distanced inferiorly from it. Welds or fasteners may be used to fix prong 558ZZ to first guide leg 190ZZ. An optional inferior restraint 536ZZ may be utilized at first guide foot 194ZZ to prevent unintended release of the guide portion from first guide receiver 108ZZ.

FIG. 144 also illustrates an alternative form of construction of a wood splitter 100ZZ. In this embodiment, a tubular fixation portion 104ZZ is fixed to a casted or machined blade portion 102ZZ. Tubular fixation portion 104ZZ may be cut from a length of tubular metal stock. Alternatively, bar stock may be used. In preferred forms, the fixation portion has a square profile with a nominal dimension of 1.25 inch×1.25 inch, 2 inch×2 inch, 2.5 inch×2.5 inch, or 3 inch×3 inch for sliding fit into standard hitch receivers. Intermediate cavity 552ZZ is optional, however when present may be sized for the tube or bar stock of fixation portion 104ZZ to slide in and reside partially inside the intermediate cavity 552ZZ. Alternatively, intermediate cavity 552ZZ can be sized small enough such that an end of fixation portion 104ZZ will not fit within intermediate cavity 552ZZ and sits flush with terminal face 554ZZ. One or more positioning pods 556ZZ extending from terminal face 554ZZ may be used to rapidly align blade portion 102ZZ and fixation portion 104ZZ during manufacturing.

Due to variability of wood grains encountered during splitting, kindling pieces may become wedged between secondary blade 120ZZ and receiver block 568ZZ which define wood chute 566ZZ. To minimize wedging, combinations of the following features may be implemented. First, step back 560ZZ is utilized to further distance receiver block 568ZZ from log boss 492ZZ. Secondly, wood chute 566ZZ is wider inferiorly by beveling back the face of receiver block 568ZZ. Third, secondary blade 120ZZ is generally vertical or negatively sloped on the side facing wood chute 566ZZ. In preferred embodiments, wood chute 566ZZ also widens with increasing lateral distance from cut edge 132ZZ. In alternative embodiments, secondary blade 120ZZ is absent.

FIG. 147 illustrates a wood splitter variation having a solid fixation portion which may be in the form of a bar welded to the blade portion or casted as a monolithic part. In this Figure, the bar has a nominal diameter of 1.25"×1.25". Other embodiments are nominally 2"×2". Custom diameters and cross-sectional profiles may be utilized.

FIG. 148 illustrates an alternative embodiment of a wood splitter with optional guide portion removed. Note that the body of blade portion 102II as illustrated is curved as is cut edge 132II. In some embodiments this curvature is concave whereas in others the curvature is convex.

FIG. 151-152 illustrates a form of a jack stand having a jack stand base 700AB and a jack stand lift arm 702AB captured within base cavity 701AB of jack stand base 700AB along axis W. A variety of locking mechanisms are utilized in the prior art for locking the overall height of jack stands including but not limited to pinned aligned bores, and toothed jack stand lift arms. The locking mechanisms are immaterial to the wood splitting functions described albeit some are more convenient than others. The embodiment illustrated in the Figures such as FIGS. 151-152 and 154-161 utilizes pinned aligned bores as noted by first jack pin receiver 707AB which extends through base cavity 701AB of jack stand base 700AB. The pinned aligned bores facilitate adjustment and fixation of a jack stand lift arm 702AB or blade arm 704AB within a base cavity 701AB of a jack stand base 700AB. In some embodiments, jack stand base 700AB comprises a broad pod 732AB that is sloped inward superiorly toward a central jack stand base axis (i.e. axis W) at jack neck 734AB. The broad pod 732AB has an inferior base surface 726AB for seating on a ground surface. Base cavity 701AB extends generally vertically through jack neck 734AB and is sized and shaped to slidingly house jack stand lift arm 702AB or jack stand blade arm 704AB therein. First jack pin receiver 707AB is aligned with one of the second jack pin receivers 709AB on the elongate lift trunk 713AB of jack stand lift arm 702AB for a predetermined height then pinned for locking with jack pin 706AB.

Similarly, FIGS. 162-166 illustrate a toothed style jack stand base 700AT configured to adjustably support a toothed jack stand blade arm 704AT or toothed jack stand lift arm 702BI (FIG. 153C). In alternative embodiments, a toothed style jack stand base 700AT is configured to adjustably support a jack stand lift arm 702AT (i.e. 702AT for use with cover blade 708), and in other embodiments it supports a modified jack stand lift arm having a blade insert such as 702AU or 702AV as depicted in FIGS. 171-173.

Illustrated in FIGS. 235-238 are yet additional examples of jack stand blade arms. In the embodiment of FIG. 235-237, the jack stand blade arm 704DA comprises an assembly of welded plates and tubes which can be fastened or secured using welds 304DA. In this embodiment, lift trunk 713DA comprises a lift trunk inferior face 755DA at an inferior end and a lift trunk superior face 753DA at a superior end. The lift trunk superior face 753DA is angled to provide support and fixation to deflector plate 298DA. Blade plate 302DA is secured to an outer trunk surface 756DA and can also be fixed to deflector plate 298DA whereby together the blade plate (with secondary deflector face 140DA thereon) and deflector plate 298DA (with primary deflector face 138DA thereon) form a wedge to assist in the splitting process as log 101DA is driven inferiorly when impacted by impact tool 105DA (i.e. mallet). The split pieces of kindling 103 as a result of the impact can fall to the ground or into a collector placed adjacent to the jack stand blade arm and jack stand base. This blade portion wedge between deflector faces is typically, although not limited to, 20-60 degrees and can be fixed or a variably changing angle. Blade plate 302DA comprises an upward facing cut edge 132DA on which a log to be split is placed. The cut edge is illustrated here as linear but can be of other configurations such as for example, downwardly concave or upwardly convex. If desired, a log boss 492DA can be included on one or both ends of the cut edge elevating above the cut edge to serve as a buffer between the cut edge and the user. In this embodiment, the rounded log bosses are cut in the metal blade plate. In alternative forms, the log bosses are manufactured of softer bumper materials. In this embodiment, blade plate 302DA narrows at an inferior end. Some embodiments include an optional bottle opener such as illustrated in FIG. 235 as bottle opener recess 220DA with bottle flange 221DA to grip the edge of a bottle cap. The cut edge 132DA is formed by an angled primary edge face 134DA and opposing secondary edge face 136DA if needed. A trunk stop 739DA can be disposed on the lift trunk to serve as a fixation support of the lift trunk in base cavity 701DA of jack stand base 700DA. In this embodiment, jack stand base 700DA is manufactured of sheet metal forming a plurality of leg bends 763DA as depicted here and also as leg bends 763DC in FIG. 239 and elsewhere. In this embodiment, the trunk stop 739DA is in the form of a collar welded to the outside of the lift trunk. The trunk stop comprises an upper trunk stop face 743DA facing upwards and a lower trunk stop face 741DA facing downwards to serve as a stop when abutting superior base surface 723DA. In some embodiments a trunk stop finger 749DA extends further distally from the lower trunk stop face to improve fit against jack neck inner faces 696DA which forms base cavity 701DA of which the lift trunk is seated. Along the length of the lift trunk can be one or more second jack pin receivers 709DA which can be used for a purposes such as one or more of: hanging the jack stand blade arm on a hook during storage, to receive a lift pin/plunger to secure the lift trunk in a predetermined position with respect to the jack stand base, and secure a trunk stop plunger 751DB when the trunk stop plunger is configured to be vertically adjustable (FIG. 238) along the lift trunk as opposed to be fixed by welds or fasteners (i.e. FIG. 237). This adjustment maintains ergonomic use of the device by accommodating users varying in height. The length of the lift trunk below the trunk stop 739DB is the working portion 757DB. In preferred embodiments, although not limited to, the working portion is about the length of the jack neck 734DA. However, the working length is preferred to be longer than this when the trunk stop is adjustable and can be other lengths as desired. The jack neck 734DA can include a first jack pin receiver 707DA extending transversely through it and can also include a secondary key recess 944DA to receive a locking key as a safety lock.

FIG. 238 depicts a jack stand blade arm 704DB much like 704DA. In this embodiment, blade plate 302DB is bent at a bend line and mounted to the lift trunk superior face 753DB of lift trunk 713DB and held using weld 304DB and/or fasteners. Again, one side of blade plate 302DB comprises a secondary deflector face 140DB that works cooperatively as a wedge during splitting with primary deflector face 138DB on the opposing side of blade plate 302DB.

FIG. 239 depicts a jack stand blade arm 704DC much like that previously illustrated in FIGS. 167-168, however, without the trunk teeth whereas the jack stand blade arm is fixed in position relative to the jack neck 734DC by trunk stop 739DC. Again, trunk stop 739DC can be fixed by welds and/or fasteners, or adjustable to slide along the lift trunk. In preferred embodiments although not limited to, the cut edge is positioned between 8 inches to 24 inches from the ground support surface. In other embodiments, the cut edge is between 12 to 22 inches from the ground support surface.

FIG. 240 illustrates yet another embodiment of a jack stand base 700DD with a centralized base cavity 701DD that in this embodiment is in the form of a round cylinder. Jack stand blade arm 704DD is depicted here in a modular form whereby blade portion 102DD is releasable from lift trunk 713DD and can be exchanged with other accessories such as lift pod 711DD for supporting a motor vehicle or any one or more of the accessories for example in FIGS. 218 and 224-234. Lift trunk 713DD seats within base cavity 701DD of jack neck 734DD of jack stand base 700DD. As illustrated, lift trunk 713DD has a generally round profile but as recognized other sectional profiles can be used to provide support. Jack stand base 700DD comprises a generally cylindrical jack neck 734DD elevated to extend above 3-4 substantially equally spaced first base leg 1040DD, second base leg 1042DD, and third base leg 1044DD (and fourth base leg if present). An inner leg strut 1036DD extends horizontally between adjacent base legs for additional support. Each base leg extends out radially from the jack neck in an inferior direction. The inferior portions of each base leg can include a substantially horizontally flat base pod 1038DD. A base wall 703DD defines each elongate base leg whereas each base leg cross-sectional profile in this embodiment is substantially rectangular. One or more first jack pin receivers 707DD extend through jack neck 734DD, and one or more second jack pin receivers 709DD extend through lift trunk 713DD, for alignment and insertion of jack pin 706DD therethrough thereby securing the positional relationship therebetween. In the absence of using a jack pin, a trunk stop 739DD can be utilized to secure this positional relationship as described in previous embodiments. In this case, the trunk stop would abut upward facing superior base surface 723DD of the jack neck. In this embodiment, collector 258 (here in the form of a bucket) can be angled such that kindling split into collector cavity 1024DD will fall to one side of the collector (against collector inner face 1018DD and collector floor face 1020DD). Opposite the collector floor face 1020DD is collector bottom face 1022DD. A collector retainer 1030DD can be used to facilitate this by securing the collector to the lift trunk 713DD. In this embodiment, the collector retainer comprises a primary finger 1032DD that extends into the collector cavity and against collector inner face 1018DD. A secondary finger 1034DD is positioned inferiorly and extends radially to provide for the capture of collector rim 1014DD between the fingers. Other forms of a collector retainers can be used that are available in the prior art such a spring clips, straps, or brackets. As disclosed for other embodiments, the blade portion 102DD comprises a primary deflector face 138DD angled from a secondary deflector face 140DD. In some embodiments, the secondary deflector face is positioned with a steep downward slope. In other embodiments, the secondary deflector face has a less steep slope. As an example, this relationship is illustrated in FIG. 241 whereby the angular position of the secondary deflector face 140DD can be adjusted. For example, at an angular position of angle $\delta$, pieces of split kindling will be directed into a high space 1026DD, whereas a secondary deflector face 140DD at angle $\chi$ will be directed into a low space 1028DD of the collector 258DD. This relationship in this case is dependent on the vertical height of the blade portion and the height of the collector. In a preferred embodiment, the secondary deflector face 140DD is sloped at angle $\delta$ such that split kindling pieces will be directed into the high space 1026DD then fall and stack by influence of gravity into the low space 1028DD. This action provides the user the ability to continue to split wood without bending or other physical effort to pick up and stack the kindling in the collector. In preferred embodiments, the collector as illustrated here has a height between 12.5 and 16.5 inches and a rim diameter between 10.5 and 13.5 inches. Further to FIGS. 240-241, note blade portion 102DD is removeable from lift trunk 713DD. When assembled, a blade anchor 771DD is held within the internal cannula of lift trunk 713DD to secure the blade portion 102DD thereon (FIG. 248-249).

FIGS. 243-244 illustrate yet another embodiment of a jack stand blade arm 704DE seated within jack neck 734DE with collector 258DE standing substantially vertical adjacent the lift trunk 713DE. Like a typical bucket, the collector 258DE has a collector bottom face 1020DE enclosing the bottom end of the collector. Note in this embodiment, the outside surface of 1016DE of collector 258DE is adjacent the lift trunk 713DE and cradled between two base legs which in this example are first base leg 1040DE and second base leg 1042DE. Again, the secondary deflector face 140DE can be adjusted to direct the split kindling into the bucket (i.e., adjustment of angle $\chi$). Note also, the blade portion can be fixed to the lift trunk such as by welding 304DE (FIG. 243) using a blade portion 102DM such as that illustrated in FIG. 250. In this embodiment, a lift trunk superior face is welded to flat 769DM. Note that a log boss illustrated in the various embodiments herein can assume many forms some of which have been described in this document but not limited to these. Further, a log boss such as 492DM can also be in the form of a fastener such as a threaded post, shoulder bolt, cap screw, or as a pin such the domed pin illustrated in FIG. 250. The pins can be pressed in boss sockets 497DM in the blade, welded, threaded, or retained by magnets located at the bottom of the boss socket or the end of the pin. When held by magnets or gravity, the log boss can be quickly removed by hand using a superior distraction force for the purpose of blade sharpening. In some forms, the boss socket can be in the form of an open elongate channel at the end of the blade portion and secured by weld.

FIGS. 245-247 and 251-253 illustrates additional forms of lift trunks sized and shaped for seating in a jack stand having a square or rectangular base cavity. In preferred embodiments although not limited to, the cross-sectional profile of the working portion (i.e., 757DH) has a length between. 75 and 2.0 inches, and a width between 0.7 and 1.5 inches. FIG. 245 illustrates a lift trunk 713DF which can be supported by one or more of a fixed or adjustable trunk stop 739DF and pinned through second jack pin receiver 709DF. Various accessories can be mounted to the lift trunk such as the blade portion 102DK illustrated in FIG. 249 whereby the blade anchor 771DK is in the form of a tube extending from the bottom of the blade portion and whereby the superior end of the lift trunk is sized and shaped for fit inside the blade anchor adjacent the capture faces 352DK. In some embodiments, the superior end of lift trunk 713DK is of reduced size compared to the working portion 757DK of the lift trunk, whereas outer cavity face 353DK defines a blade anchor 771DK that is sized to also have sliding fit into base cavity 701DK. Therefore, blade portion 102DK can be mounted directly within the base cavity or in an elevated position at the superior end of the lift trunk 713DK.

FIG. 246 illustrates yet another embodiment of a lift trunk 713DG which includes a multi-purpose hole 776DG (which may be partially or wholly threaded) extending inferiorly from a lift trunk superior face 753DG and terminating at multi-purpose hole stop 777DG. Using this embodiment, the boss style blade anchor 771DD is seated in multi-purpose hole stop 777DG to secure the blade portion 102DD in position. FIG. 247 illustrates an embodiment whereas the multi-purpose hole 776DH extends further into the lift trunk and again terminating at upward facing multi-purpose hole stop 777DH. An inferior multi-purpose restraint 761DH may be utilized to provide additional support to fixtures inserted therein the multi-purpose hole. One or more recesses can be included in the lift trunk to reduce unnecessary weight such as illustrated (i.e., first trunk recess 752DF, second trunk recess 754DF). FIG. 251 illustrates at least 3 methods for supporting a lift trunk in a base cavity at a preferred height. These include the use of one or more trunk teeth 748DJ, a trunk stop 739DJ, and a second jack pin receiver 709DJ. FIG. 252 illustrates a lift trunk 713DK in preparation for seating in a base cavity of a jack stand base. FIG. 253 illustrates the use of a lift trunk 713DL used in combination with an elongate support member 802DL. As one can see, the lift trunks and lift trunk/elongate support member combination facilitates use of the accessories introduced in previous embodiments such as those in FIGS. 169, 217-234. Although it is preferred that the working portion of the lift trunk complements the shape of the base cavity (i.e., rectangular working portion seating in rectangular base cavity) other combinations are contemplated. For example, a cylindrical working portion can be seated in a rectangular base cavity. In alternative embodiments, the profile of the working portion can be the same or different from the portion of the lift trunk above the working portion. For example, the working portion can be rectangular whereas the portion above can be cylindrical. In yet another alternative embodiment, the working portion ends at the trunk stop. This results in a very reduced overall profile. In preferred embodiments, the length of the lift trunk ranges between 3 and 26 inches and in some cases between 4 and 13 inches.

As illustrated in FIG. 153A, a novel cover blade 708AB comprises a blade housing 342AB having a cover blade cavity 710AB extending in from an inferior surface. Cover blade cavity 710AB is sized and shaped to house lift pod 711AB therein. The cover blade cavity can be a fully enclosed space (aside from the opening for entry of a lift pod), or can be open to varying degrees sufficient to remain secured at the top of a lift pod. This mating of the cover blade and lift pod creates a novel form of jack stand wood splitter 715AB. Cover blade cavity 710AB is defined by cavity walls 712AB with capture faces 352AB thereon positioned radially and terminates in ceiling face 469AB superiorly. Ceiling face 469AB faces downward to abut a portion or all of the superior surfaces of a jack stand lift arm. Ceiling face 469AB can be substantially flat, as illustrated here, or can be contoured to engage with any one or more of the superior facing jackstand lift arm surfaces such as those illustrated in FIG. 169J. Cut edge 132AB is positioned at a superior end with an opposed primary deflector face 138AB and secondary deflector face 140AB angled with respect to each other to create a wedge extending below the leading cut edge. Further as illustrated in FIG. 159A, cover blade 708AR can comprise a guide portion 106AR providing a guide wall 186AR with guide surface 188AR thereon spaced superiorly and offset laterally yet generally parallel to cut edge 132AR. In this embodiment, guide portion 106AR is in the form of a U-shaped rod having a first guide foot 194AR housed within a first guide receiver 108AR that extends at least partially through cover blade 708AR and welded, screwed, or otherwise fixed into position. In some embodiments, guide portion 106AR is L-shaped whereas one leg of the L is welded 304AR or otherwise fixed directly to one of first end 728AR and second end 730AR of blade portion 102AR. In some embodiments, one or more ends of cut edge 132AR may terminate in a log boss 492AR (or otherwise known as an enlarged portion 324 in other embodiments) that is elevated above the cut edge. Some embodiments of log splitter 100AR include any one or more of guide portions and log bosses whereas some embodiments include neither. In some embodiments, first guide leg 190AR is resilient such that guide wall 186AR can deflect if necessary when driving a log, in other embodiments first guide leg 190AR is rigid.

In some embodiments of cover blades, an optional friction spacer 189AB (FIG. 153A for example) can be used to tighten the fit between a cover blade and a lift pod 711AB. For example, a weaved cloth (i.e., polypropylene), a polymer insert, or an elastomeric layer (i.e. rubber, silicone) can be placed on or draped over the lift pod before fitting the cover blade over it. This provides a cushioned feel to the user and tightens the fit between the lift pod and the cover blade. In some forms, the friction spacer is in the form of a thin polymer adhered to the capture faces 352AB of the cover blade 708AB.

FIG. 153B depicts a similar cover blade 708BI with cover blade cavity 710BI defined by cavity walls 712 with capture faces 352BI thereon radially and terminating in ceiling face 469AB superiorly. As previous for the embodiment of FIG. 151-152, cover blade cavity 710B1 is sized and shaped for housing a lift pod 711 of a jack stand lift arm 702 therein. For example (FIG. 153A), cover blade cavity dimensions can range from but are not limited to 3.0 inches to 4.75 inches in length (L), and 0.75 inches to 1.8 inches in width (W) with a depth (D) that can have a wide variance although typically between 0.5 to 3.0 inches. In typical cases, for 6 ton rated jack stand arms, the cover blade cavity will have a length substantially between 3.75 to 4.25 inches, and a width substantially between 1.0-1.8 inches. In typical cases, for 3 ton rated jack stand arms, the cover blade cavity will have a length between 3.3 to 3.75 inches and a width between 0.85 to 1.5 inches. In some cases, these cavities will be even narrower when fit for 2 ton rated jack stands. Opposed primary deflector face 138BI and secondary deflector face 140BI are angled with respect to each other as before for splitting. As before, the cut edge can be offset and one deflector face can have a steeper slope than the other. The deflector faces can be planar as shown or curved as can the cut edge. As with other embodiments herein, a primary and/or secondary edge face can extend down from the cut edge as noted in FIG. 153D. Some embodiments include an extended collar 729BI which is a portion of cover blade 708BI that extends inferiorly to provide more support as it rests lower on the lift trunk 713BI of a jack stand lift arm 702BI. Extending into the cover blade cavity 710BI can be one or more cover restraints 731BI in the form of one or more of: pins, fasteners such as set screws or thumb screws that are centrally or laterally placed, and bosses. In some forms the cover restraints are in the form of bands or ties. In the case of set screws for example, they are advanced sufficiently into lift trunk 713BI to prevent removal, limit wobble, or both. For example, when in the form of a fastener, the restrain can be advanced into the first trunk recess 752 of a lift arm. In the case of pins, the pins block removal of cover blade 708B1. One or more log boss 492BI can be integrated into the cover blade (one or both lateral ends of the blade), or as illustrated in FIG. 153C, the log boss 492BI is removable by removal of log boss fasteners 493BI. Also depicted in FIG. 153C, is a toothed jack stand lift arm 702B1 having lift pod 711B1 housed within cover blade cavity 710B1 of cover blade 708BI. In some embodiments such as illustrated in FIG. 153C, a restraining band 1058BI can be utilized to provide additional fixation of a cover blade over a lift arm. The restraining band can be elastic or having spring like properties or inelastic. In the case of a spring, the spring can be stretched over a tooth of the lift arm if present. In this case, the restraining band forms a loop and is fastened, welded, or otherwise fixed to one or more cavity wall. The embodiment in FIG. 153D depicts a cover blade 708BW much like cover blade 708AB but having a cover blade cavity 710BW defined by a pair of opposing substantially vertical capture faces whereas the cover blade cavity 710BW is open at one or more opposing ends. These open ends for example, can be at ends parallel to the cut edge or perpendicular to the cut edge. The cavity is bounded superiorly by ceiling face 469BW. This configuration provides for a cover blade that fits over support surface 765AT of jack stand lift arm 702AT like a saddle and is captured between pod posts 770AT. One or more log boss can be positioned at the ends of the cut edge 132BW. In one embodiment, the cover blade 708BW is formed by extrusion such as using an aluminum alloy and comprises a removable edge portion of a harder material (i.e. carbon steel) as previously illustrated in FIG. 32. FIG. 153E illustrates yet another embodiment of a cover blade 708DN. In this embodiment, cavity walls 712DN with capture faces 352DN thereon extend downward to form a cover blade cavity 710DN for capture of a lift pod 711 therebetween the opposing capture faces. Ceiling face 469DN is supported on top of the lift pod in an operational configuration. Note in this embodiment, a central section of the capture cavity is open. FIG. 153F illustrates yet another embodiment of a cover blade 708DP. In this embodiment, a cover blade cavity 710DP is defined by opposing cavity walls 712DP with capture faces 352DP in the form of opposing legs. In some embodiments, these legs are formed from a U-shaped sheet metal flat that is welded 304DP to ceiling face 469DP of the wood splitter. One or more restraints can be present and directed inside the cover blade cavity 710DP. For example, as further illustrated in FIG. 153F, the restraint is in the form of a boss or pair of opposed bosses extending into the cavity, whereas in FIG. 153G, the restraint is in the form of a set screw that can be advanced into a first trunk recess 752 of a lift arm. The base of the U-shaped flat settles within the concave mid-section of the lift pod (i.e., FIG. 169J) in an operational configuration. In some embodiments, a log boss 492DP can be configured to extend above a blade portion/cover blade and below the blade portion/coverblade to limit side to side blade motion on the lift pod as illustrated in FIG. 153F. Here, the log boss 492DP is in the form of an elongate shaft secured in a log boss socket 497DP and is in the form of a channel in the side of the blade. Alternatively, the log boss socket can be in the form of a cannula for holding the log boss therein. The elongate shaft of the log boss in some embodiments includes a collar to determine position of the log boss in the log boss socket. In some embodiments, the relationship between the log boss and log boss socket is tongue and groove which can be wedged to maintain a predetermined positional relationship while providing a means for removal if so desired.

In an alternative embodiment, a jack stand lift arm of a jack stand is substituted with a jack stand blade arm as illustrated in FIG. 154-158 to form a novel jack stand wood splitter. In one embodiment, jack stand blade arm 704AZ replicates jack stand lift arm 702AZ except lift pod 711AZ is replaced with blade portion 102AZ. Jack stand blade arm 704AZ comprises a lift trunk 713AZ extending from blade portion 102AZ whereas the lift trunk is sized and shaped for being received in base cavity 701AZ and fixed using jack pin 706AZ. Blade portion 102AZ comprises an upward facing cut edge 132AZ with opposed primary deflector face 138AZ and secondary deflector face 140AZ forming a splitting wedge. As illustrated elsewhere, one or more of a; log boss (i.e., 492Q), first bumper (i.e., 222V), and guide portion may be used to guide the log splitting and also minimize cut edge exposure. For example, and as illustrated in FIGS. 156-158, a guide portion may be in the form of a U-shaped rod having a first guide foot 194AQ operable for housing within first guide receiver 108AQ extending through blade portion 102AQ just below cut edge 132AQ. Weld 304Q holds guide portion 106AQ in a designated position. Alternatively, first guide leg 190AQ may be fixed or welded directly to a side of blade portion 102AQ in the absence of first guide foot 194AQ. In some embodiments, a guide boss such as illustrated in FIG. 102 may be present to provide a rotating guide portion as previously described.

In an alternative embodiment, a jack stand blade arm 704AT of a jack stand wood splitter 715AT may be converted for use as a jack stand lift arm by addition of an adaptable lift pod 838BP. As depicted in FIG. 159B, an inferior surface of the adaptable lift pod 838BP has an inferior profile complementary to reside on the blade of jack stand blade arm 704AT. In this embodiment, a substantially V-shaped capture cavity 840BP is defined by inclined V-faces 841BP. The superior facing support surface 765BP of adaptable lift pod 838BP may comprise a variety of profiles but is illustrated here with pod posts 770BP, concave mid-section 766BP, and opposing lift pod flats 768BP. Outer faces 842BP encircle the block body of the adaptable lift pod.

FIGS. 160 and 161 illustrate one embodiment of a guide portion 106AS extending upwards from a jack stand base 700AS. The guide portion 106AS comprises a guide wall 186AS with guide surface 188AS thereon encircling above cut edge 132AS. The guide wall 186AS is supported by a first guide leg 190AS and an opposed second guide leg 192AS that are fixed or releasably fixed to the base wall 703AS of jack stand base 700AS. As noted here, base wall 703AS of jack stand base 700AS is inwardly sloped on 4 sides from inferior base surface 726AS. First guide leg 190AS and second guide leg 192AS extend upward from respective first guide foot 194AS and second guide foot 196AS to intersect guide wall 186AS thereby supporting it in position. In this embodiment, first guide leg 190AS and second guide leg 192AS diverge as they move superiorly from jack stand base 700AS. Each guide foot may be fixed to base wall 703AS using a common fixation such as welding or fasteners. In alternative embodiments, first guide receiver 108AS and second guide receiver 110AS are provided on the base wall 703AS to removably house the first guide foot 194AS in the first guide receiver 108AS, and removably fix first the second guide foot 196AS in the second guide receiver 110AS.

FIGS. 162-173 illustrate various forms of jack stand splitters having a toothed jack stand lift arm or toothed jack stand blade arm. For example, the embodiments illustrated in FIGS. 162-166 depict a jack stand base 700AT having a jack neck 734AT extending upward at the jack stand base. A centralized generally vertical elongate base cavity 701AT extends through the jack neck. The base cavity is typically square, rectangular or round to complement the profile of a corresponding lift trunk such as 713AT of a jack stand lift arm 702AT (with lift pod 711AT as illustrated in FIG. 169A), or to complement the profile of a corresponding lift trunk 713AT of a jack stand blade arm 704AT (with blade portion 102AT at a superior end) for seating of the lift trunk therein. The toothed arms comprise a plurality of trunk teeth 748AT that may be described as pointing downward and separated by tooth gaps 750AT. The tooth gaps are sufficiently wide for cam 738AT interference. The lift trunk may include one or more elongate trunk recesses such as first trunk recess 752AT, and second trunk recess 754AT extending into the trunk from one or more outer trunk surfaces 756AT. The base wall 703AT may be interrupted by one or more base windows 758AT extending through the sides (generally rectangular) or bottom (generally square) of the jack stand base 700AT. A U-shaped cam arm 736AT with circular cross sectional profile comprises a cam leg 742AT, a handle leg 744AT, and a stop leg 746AT. A cam 738AT with cam surface 740AT thereon, extends generally perpendicular from the cam leg 742AT. The cam leg pivots through the jack neck 734AT whereby the cam 738AT is positionable for interference mode (FIG. 165) where the cam interferes with a trunk tooth 748AT consequently securing the blade arm or lift pod at a desired height, or positionable for a clearance mode (FIG. 166), where the cam does not interfere with a trunk tooth 748AT allowing consequent adjustment of the lift trunk position. Adjustment of the lift trunk is completed by the user grasping the cam arm 736AT such that the stop leg 746AT is elevated (FIG. 166) thereby moving the cam to the clearance mode, adjusting the height to a desired level, and releasing the cam arm 736AT (FIG. 165) such that cam 738AT moves to an interference mode wherein cam surface 740AT aligns in a tooth gap 750AT and interferes with one trunk tooth 748AT locking the lift trunk in a desired position. In preferred embodiments, the weight of the cam arm 736AT biases the cam 738AT towards the interference mode. In this case, stop leg 746AT abuts base wall 703AT or base tab 760AT to hold in interference mode position whereby cam 738AT remains engaged with a desired trunk tooth 748AT. The jack stand blade arm 704AT may absent of a log boss 492AT at either end of the blade, or may include one log boss at first end 728AT, and may also include a second log boss 492AT at a second end 730AT. The first and second log bosses may be manufactured integral to the blade portion or removable such as by the use of fasteners as previously discussed.

FIG. 167-168 illustrate various views of a jack stand blade arm 704AT separated from a jack stand base 700AT. Note lift trunk 713AT may comprise one or more of a first trunk recess 752AT and a second trunk recess 754AT inset from an outer trunk surface 756AT. In some embodiments a hole may extend through the lift trunk of sufficient size to hang the jack stand blade arm 704AT from a hook on a wall.

FIG. 169A illustrates one embodiment of a modified jack stand lift arm 702AT depicted here in the form of having a toothed lift trunk 713AT but may alternatively be in the form of a pinned hole lift trunk (FIG. 152). Integrated into a superior end of jack stand lift arm 702AT is lift pod 711AT having an upward facing support surface 765AT extending between opposed first arm face 772AT and second arm face 774AT. Typically, there is a concave shaped mid-section 766AT separating two spaced generally horizontal flats 768AT. In some embodiments, a pair of laterally spaced pod posts 770AT reside adjacent or nearly adjacent first end 728AT and second end 730AT of lift pod 711AT. Extending inferiorly through support surface 765AT is multi-purpose hole 776AT which may take the form of a blind hole extending into lift pod 711AT and in some embodiments into the lift trunk 713AT, or may take the form of a through hole extending all the way through the lift trunk as illustrated in FIG. 169D. Multi-purpose hole 776AT may be unthreaded, partially threaded (FIG. 169D), or fully threaded. If threaded, it is preferable that the threads are at a superior end of the hole. Some embodiments include an interference hole 780AT extending through at least a portion of multi-purpose hole 776AT. Interference hole 780AT is configured to receive a removeable interference key 784AT that may be threaded into or pushed into interference hole 780AT thereby causing consequent blocking of multi-purpose hole 776AT. Therefore, the interference hole may also include interference threads 782AT. With this configuration, a rod (i.e., sign post, material support stand) may be extended entirely through multi-purpose hole 776AT for resting on a ground surface, or extend partially through multi-purpose hole 776AT until blocked by interference key 784AT, or extend through multi-purpose hole 776AT and locked in place by an interference key 784AT threaded against it. Interference key 784AT may be in the form of, but not limited to, a locking pin or a screw which may include a knobbed end. In some embodiments, the interference key 784AT is removable, thus allowing complete removal of jack stand lift arm 702AT from jack stand base 700AT if so desired.

FIG. 169B-169C depicts a wood splitter 100AT configured as a removable blade insert for mating with a modified jack stand lift arm 702AT. In this embodiment, the upward facing side of blade portion 102AT has features described previously in other disclosed blades. The downward facing fixation portion 104AT is configured for mating with support surface 765AT. As one skilled in the art would recognize, this downward facing blade portion may assume a variety of profiles yet still be supported by support surface 765AT. In a preferred embodiment, the downward facing fixation portion comprises a convex mid-section 767AT, separating a pair of generally horizontal fixation portion flats 769AT. At each end of the downward facing fixation portion are pod post seats 786AT shaped to house pod posts 770AT in a mounted configuration. Extending inferiorly from downward facing fixation portion is blade anchor 771AT which in this embodiment is in the form of cylindrical boss sized for sliding fit along axis-WW into multi-purpose hole 776AT for transition from an unmounted to a mounted configuration whereby wood splitter 100AT is securely mated with support surface 765AT of lift pod 711AT. In the mounted configuration, wood such as a log placed upright on top of cut edge 132AT and impacted from the top will split as previously illustrated in FIG. 3.

The mating relationship between the wood splitter and the lift pod may assume a variety of forms including those illustrated here. For example, FIGS. 170-173 depict various embodiments of modified jack stand lift arms 702AU and 702AV that comprise a wood splitter 100AU, 100AV in the form of a removable blade insert. Although illustrated here as toothed jack stand arms, the jack stand arms may alternatively be of an aligned pin hole type. At least a portion of inferior face 764AU and 764AV are configured to complement at least a portion of respective support surfaces 765AU and 765AV on the jack stand arms. In the embodiment of FIG. 170-171, wood splitter 100AU comprises a blade anchor 771AU configured in the shape of a tongue for sliding receipt in boss receiver 788AU which in this embodiment is in the form of a planar recess. The embodiment illustrated in FIGS. 172-173 utilizes a blade anchor 771AV in the form of bulbous shaped tongue for receipt into a bulbous shaped boss receiver 788AV. Note in the FIG. 170 embodiment, the mounted and unmounted configurations are obtained by translation along a generally vertical axis, whereas in the FIG. 172 embodiment, movement between mounted and unmounted configurations are obtained by translation along a generally horizontal axis.

The modified jack stand lift arm with multi-purpose hole is adaptable to perform a wide variety of functions in addition to the log splitting capabilities as will be recognized by those skilled in the art. For example, jack stand base 700AT with jack stand lift arm 702AT equipped with multi-purpose hole 776AT may be used as a pole support such as may be used for portable upright support of signs (FIG. 169G). Here, an inferior end of the sign pole is slid into, or threaded into, multi-purpose hole 776AT. In some embodiments, interference key 784AT is used to stop translation of sign pole 790AT or to clamp against the sign pole to secure it in a predetermined position.

In yet another example, the modified jack stand lift arm with multi-purpose hole is adaptable for use as a material support stand. Cutting boards, pipes, or other material with extended length can be very difficult to balance by one person especially while they simultaneously attempt to perform a mechanical operation such as cutting the material. A material support stand can be very useful to support one end of the elongate material while sawing at an opposing end of the material. A modified jack stand with multi-purpose hole, is utilized to support a material support pole and material support pod thereby eliminating the duplication of material support stand base supports. FIGS. 169E, 169F, and 169H depict examples of various forms of material support stands supportable in the multi-purpose hole of the modified jack stand. For example, FIG. 169E depicts an exploded view of a jack stand base 700AT, jack stand lift arm 702AT, and material support assembly 800BJ. The material support assembly 800BJ comprises an elongate support member 802BJ which may be of a fixed length or of an adjustable length as illustrated in FIG. 169E. Here (although useable in a variety of embodiments), the elongate support member 802BJ comprises an inner rod 804BJ in telescoping relationship with an outer rod 806BJ and a member lock 808BJ for releasably fixing the length relationship between the inner and outer rod. Although an inner rod and outer rod are used here as examples, those skilled in the art will recognize that other profiles of inter-translating elongate support members may be substituted for the rods such as elongate rails. The inferior end of elongate support member 802BJ is threaded 810BJ in some embodiments for threaded coupling with multi-purpose hole threads 778AT of jack stand lift arm 702AT. In other embodiments, a portion of the material support assembly may be configured for sliding engagement within the multi-purpose hole. At the superior end of elongate support member 802BJ is material support pod 812BJ. The material support pod may be fixedly attached (FIG. 169F), pivotably attached (i.e., hinge), or releasably attached (FIG. 169H, lower left) to a material support assembly 800BJ/BK/BL/BM/BN. The material support pod may be configured for a variety of different uses. For example, in FIGS. 169E and 169F, material support pod 812BJ is configured for rolling support of elongate flat materials such as lumber. It utilizes an elongate roller 814BJ pivoting about a pivot pin 816BJ that is supported by a cradle 818BJ. While supported in the air, a piece of lumber will easily translate as it is moved towards a saw for example. Member lock 808BJ may be used in some configuration to adjust the height of the material support pod, however, in other embodiments the interference key 784AT may be utilized for this. Where height of the support pod is less imperative, the inferior end of the elongate support member 802BJ may be unlocked for resting against a ground surface. FIG. 169H depicts four additional examples of material support assemblies 800BJ/BL/BM/BN. In the BK embodiment, cradle 818BK is configured to hold a pair of roller wheels 815BK in a spaced relationship for cupping the outer surface of an elongate round member such as a pipe therebetween. Due to the rollers, the pipe may be easily rotated during machining operations. Similarly, in the BM embodiment, cradle 818MB is elevated at the end to again cup a round object such as a pipe on a V-shaped platform 823BM. In the BL embodiment, the material support pod 812BL is in the form of a work platform 820BL which in preferred embodiments is generally flat and horizontal although in other embodiments may be angled from horizontal. The platform may serve as an elevated work surface. In some embodiments the work platform is generally round with a raised circumferential fence for securing a paint can to provide an elevated painting experience. In alterative embodiments, a group of 2-4 material support assemblies 800BL, with supporting modified jack stand lift arm 702AT and jack stand base 700AT, are utilized to support a board, a sheet (i.e., plywood), or other support surface (flat or contoured) to create a quickly assembled table surface. Such an arrangement may be useful for a garage sale without the need to purchase a folding table. The BN embodiment illustrates that the material support assembly may be configured for releasable fixation to a material support pod 812BN. In this example, the releasable fixation is by threaded engagement.

FIGS. 169P and 169Q depict yet another embodiment of the use of a modified jack stand, in this case as a portable ski wax station. In this embodiment, a pair of jack stand bases 700AT are spaced on a support surface such as a basement floor. An elongate support member 802BX is supported substantially vertically when housed in the multi-purpose hole 776AT (FIG. 169D) of jack stand lift arm 702AT. Alternatively, elongate support member may use a variety of other support methods to fix to the jack stand lift arm, some of which are illustrated in FIGS. 169I-169N. A ski wax strut 850BX is mounted to the elongate support members. The ski wax strut has a superior facing contoured ski surface 858BX for supporting a ski 852BX to be waxed with bottom side of the ski up, and an inferiorly facing strut bottom 867BX. A binding recess 864BX dips into the ski wax strut 850BX to provide clearance for the ski's binding. A pair of spaced and opposed ski guides 854BX are fixed to each strut side 866BX to maintain ski position therebetween. Extending into the strut bottom 867BX of ski wax strut 850BX are a pair of spaced strut receivers 856BX (one at a tip end 860BX and one at a tail end 862BX) which here are in the form of blind holes of complementary size and shape to receive the superior end of an elongate support member 802BX. This arrangement provides for a quickly assembled/disassembled ski wax station using multi-purpose jack stands.

The elongate support member may use a variety of other support configurations to fix to a jack stand lift arm. Some examples, not all, are illustrated in FIGS. 169I-169N. The embodiments in FIG. 169I-169N illustrates a jack stand base 700AT as described previously in FIGS. 162-164, however the modifications to the jack stand lift arm described here apply also to pinned jack stands like those illustrated in FIG. 152. As illustrated in FIG. 169I, the base of U-shaped support bracket 796BR is fixed to the inferior end of elongate support member 802BR preferably by threaded engagement, welding, or other method known in the art such that when assembled the elongate support member stands substantially vertical. Support bracket 796BR comprises a plurality of fastener holes 792BR extending through the legs of the U-shaped support bracket 796BR and/or horizontal base of the U-shaped support bracket. The legs of the U-shaped support bracket are spaced for sliding fit over the first arm face 772BR and second arm face 774BR of lift pod 711BR. Support fasteners 794BR extend through fastener holes 792BR to clamp the legs of the U-shaped support bracket together or for threading into fastener holes 792BR of lift pod 711BR. As illustrated, the fastener hole 792BR may extend through the base of the U and/or legs of the U. Alternatively, the fastener holes 792BR in the support bracket may be positioned so as to extend across and below the inferior surface of the lift pod thereby clamping the U-shaped support bracket about the lift pod. Alternatively, as illustrated in FIG. 169K, support bracket 796BS is in the form of a substantially horizontal rectangular plate comprising vertical fastener holes 792BS. One or more support fastener 794BS is advanced through fastener holes 792BS of the bracket and threaded into vertical fastener holes 792BS of lift pod 711BS. Again, this may be a threaded engagement with the lift pod or nuts may be utilized on an opposing end of the support fasteners.

FIG. 169L illustrates yet another form of fixation between an elongate support member 802BT and lift pod 711BT. Here the elongate support member 802BT is fixed to a generally flat and vertically positioned support bracket 796BT preferably by welding 304BT. The support bracket 796BT comprises a plurality of fastener holes extending horizontally through the support bracket and are aligned with complementing fastener holes 792BT in the lift pod for fixation using support fasteners 794BT. Fixation may be by threaded fixation or by use of nuts on opposing ends of the support fasteners. FIG. 169M illustrates use of a support bracket 796BT in the form of a compressive clamping plate. The clamping plate is substantially flat with a vertically arched portion 797BU for housing elongate support member 802BU therein for compressive clamping by advancing support fasteners 794BU within fastener holes 792BU. In yet another example in FIG. 169N, fastener holes 792BV extend through elongate support member 802BV and into lift pod 711BV with clamping by support fasteners 794BV which extend therein using threaded engagement or by use of a nut.

FIG. 169R illustrates perspective views of a size coupler 828BO that may be utilized to couple various sized elongate members such as sign pole 790AT or a material support assembly 800BJ/BL/BM/BN with multi-purpose hole 776AT in the event they are not of compatible sizes. Size coupler 828BO comprises a first coupler end 830BO of a predetermined size and a second coupler end 832BO of different predetermined size. At least one of the first coupler end 830BO and the second coupler end 832BO are sized for sliding fit into the multi-purpose hole of a jack stand lift arm. One or more of the outer and/or inner surfaces of size coupler 828BO may be threaded for threaded engagement with the multi-purpose hole or with the elongate support member of the material support assembly. In some embodiments, this engagement may occur on an outside surface of the size coupler or on an inside surface of the size coupler.

FIGS. 174-175 depicts an alternative form of jack stand splitter with removable cover blade 708AW (also referred to as wood splitter 100AW). In one form, the jack stand base supports wood splitter 100AW when used as a wood splitter, and in another form, the cover blade (wood splitter) is removed to be used as a jack stand such as to support an RV once parked. In this embodiment, a jack stand base 700AW is substantially pyramid shaped extending upward from inferior base surface 726AW of broad pod 732AW. At each side of the pyramid is a base wall 703AW terminating superiorly at a post seat 834AW with a central base cavity 701AW that extends vertically therethrough. Threaded post and nut 725AW (with lever arm 727AW) are removably seated within post seat 834AW when used as a jack stand, however the threaded post and nut 725AW are removed for seating of cover blade 708AW over the superior end of jack stand base 700AW when used as a jack stand splitter. Cover blade 708AW comprises an upward facing cut edge 132AW situated superiorly between a primary deflector face 138AW that diverges inferiorly from a secondary deflector face 140AW to form a wedge for splitting. Blade portions of this disclosure optionally include an opposing primary edge face and secondary edge face extending from the cut edge and between the respective deflector faces such as illustrated in FIG. 175. The edge faces are typically a narrow band of material adjacent the cut edge optimized for cutting into a material and can be the result of blade sharpening. Extending superiorly from one or more ends of cut edge 132AW is an optional log boss 492AW which provides the user a safety buffer from the cut edge. Extending superiorly from an inferior end of cover blade 708AW is a cover blade cavity 710AW which in preferred embodiments comprises a profile complementing the superior end of jack stand base 700AW for fit therein. The cover blade cavity 710AW comprises an inferiorly facing ceiling face 469AW with two pairs of opposed sloped and opposing capture faces 352AW (FIG. 176-177). In preferred embodiments, when cover blade 708AW is seated over the superior end of jack stand base 700AW, the opposing capture faces 352AW are seated against base wall 703AW. Similarly, ceiling face 469AW can be seated against a superior surface of jack stand base 700AW to form a stable and strong wood splitting apparatus.

FIGS. 184-187 illustrate various views of a wood splitter 100AY comprising an 'I' shaped fixation portion 104AY for fixation within a hitch receiver 126 of a vehicle (i.e. car, truck, trailer, RV). Extending proximally from the fixation portion 104AY is a blade portion 102AY. The fixation portion comprises; a distal tube wall 184AY at a distal end, a substantially flat top face 154AY opposed to a substantially flat bottom face 156AY, a substantially flat first side face 158AY opposed to a substantially flat second side face 160AY. Together, the opposed side faces and opposed top/bottom faces have a width that substantially occupies a trailer hitch receiver when slid into it. As illustrated in various embodiments, a receiver block may be present intermediate the fixation portion and blade portion (i.e. overlapping or extending between). Here, note receiver block 568AY. When present, the receiver block is a mass of material (typically an enlarged mass) that may be used as one or more of: an attachment point for the blade portion, an attachment point for the fixation portion, attachment/housing of a guide portion, as a log boss, and to direct movement of split material. In this embodiment, situated in the receiver block is a first guide receiver 108AY that is positioned upwards (but assumes other positions in other embodiments) for housing a portion of guide portion 106AY. Here, guide portion 106AY is substantially L shaped and in a rod form. One leg of the guide portion is positioned parallel above and spaced laterally from cut edge 132AY. A primary blade 118AY of blade portion 102AY extends proximally parallel to axis M, and an optional secondary blade 120AY extends substantially perpendicular from the primary blade. Extending inferiorly from cut edge 132AY of each blade is a primary deflector face 138AY and a secondary deflector face 140AY as described previously. In this embodiment, the secondary deflector faces are substantially vertical but may assume other inclines, and the primary deflector faces are sloped. If the secondary blade is present, a wood chute 566AY is formed between the secondary blade and the receiver block 568AY. In preferred embodiments, wood chute 566AY widens inferiorly and/or laterally thereby providing low friction escape of wood pieces as they are split and move through the wood chute. Distally adjacent the primary deflector face of primary blade 118AY is an enlarged portion of receiver block 568AY which serves to quickly position wood pieces to be split. In some forms this may be considered a log boss as described earlier. Note in this embodiment that the receiver block 568AY is stepped back distally on the side of the secondary deflector face compared to primary deflector face side thereby providing additional depth to the chute to again provide for easy escape of split wood pieces. A fixation bore 116AY extends across the midsection of the 'I' beam and is sized to pass a locking pin to lock the splitter in a hitch receiver.

In this embodiment, one or more primary blade cavities 546AY may extend upwards from a bottom face 156AY of the primary blade 118AY of the blade portion 102AY, and may also extend a second blade cavity 548AY from a bottom face of the secondary blade 120AY. Here a bottle opener recess 220AY with bottle flange 221AY for opening a bottle is formed at a proximal end of the blade portion extending between the adjacent primary blade cavity 546AY and secondary deflector face 140AY of the primary blade 118AY.

FIGS. 188 and 188B illustrate a wood splitter 100DS similar to that described previously but having a log boss 492DS elevated above the cut edge at a proximal end of the blade portion 102DS. The log boss can be optional and in some embodiments removable. In some embodiments, a log boss may be used in the absence of a guide rod as illustrated in FIGS. 188/188B or vice versa. In some embodiments, both a log boss and a guide rod are used whereas in other embodiments neither is used. In some embodiments, such as illustrated in FIGS. 188/188B, a secondary blade is absent. The splitter in this embodiment occupies a very small volume which is an attractive feature for those limited in space when storing or transporting this device.

It is worth noting that in most embodiments, the splitting devices described herein have a size and weight conducive for most users to lift using one hand with a size profile conducive to easily storing and transporting in spaces like a shoe box or smaller. These weight, portability, and size advantages make the devices preferable and less cumbersome to users than splitters offered in the prior art. Therefore, although features such as wheels can be incorporated for transport of the devices, the devices disclosed herein are typically absent of wheels coupled to the device. Furthermore, some prior art splitters include an expansive and typically multi-part blade guard, guide, shroud, or shield separating an upward facing blade of a splitter from the user. These features of the prior art add weight, size, and complexity to the splitting devices. The applicant, however, has discovered novel ways to incorporate safety, guidance, and handling features to the disclosed splitters without sacrificing size, weight, and portability that is attractive to campers. In some cases, the splitters herein are absent of safety guards or guides placed above a splitting blade. In other embodiments, a guide portion is utilized typically in the form of a straight or curved bar elevated above the cut edge. Typically, this straight or curved bar is a single part. In most embodiments, this bar/tube is monolithic with the wood splitter (i.e., extending from the fixation portion or blade portion) by way of casting or welding although in some embodiments this guide portion is pivotable and operates as a separate part. In some embodiments, the only portion of the splitter extending above the cut edge of the wood splitter is a log boss (i.e., 492AX) having an upright log boss face (i.e., 495AX) at one end of the cut edge for positioning a log there against. The log boss also works as an elevated safety buffer between the user and the cut edge of the splitter. In preferred embodiments, the log boss is monolithic with the wood splitter by casting or welding but can alternatively be attached and detachable by fasteners, magnets, or wedged joints and other mating systems known in the art. In most embodiments, the splitter is either absent of a guide portion or log boss, or includes a guide portion in the form of a bar and/or a log boss.

In several embodiments, wood splitters disclosed herein have a fixation portion operable to be received in a hitch receiver of a vehicle (i.e., FIG. 1, 185, 188 and others) and are absent of any support frame for the splitter that engages with a ground surface to support an elevated splitting blade. Similarly, splitters disclosed herein having a ball space for capture over a hitch ball (i.e., FIG. 73, 91, 178 and others) are also absent of any support frame for the wood splitter or base that engages with a ground surface. Embodiments such as these and others disclosed herein, rely fully on the support of the vehicle during operation of the splitter and are not supported by the vehicle for the sole purpose of transporting the device. Other splitter embodiments herein rely on the elevated support provided by a jack stand type of device (i.e., 152, 153D, 174, and others).

As noted in the Figures for most embodiments, the fixation portion and blade portion are monolithic and generally inseparable (without destruction of the device) due to unified casting or welding of these portions. In some cases, fasteners can be used to join the fixation portion and blade portion of the wood splitter. Preferred embodiments of splitters herein are operable for mounting in a hitch receiver of a vehicle (i.e., FIG. 1, 185, 188 and others) and whereby the fixation portion is un-separable from the wood splitter. In preferred embodiments, there is an absence of release pins joining the fixation portion housed in the vehicle's receiver and the wood splitter. However, in some embodiments threaded fasteners can be utilized for joining the fixation portion and blade portion.

FIG. 189 illustrates a wood splitter similar to the embodiment in FIG. 184 whereas the fixation portion 104BA has a 'X' profile instead of an 'I' profile.

FIG. 190 illustrates a wood splitter 100EK similar to the embodiment illustrated in FIG. 144 whereas the fixation portion 104EK is in the form of a tube and welded to a blade portion 102EK.

FIG. 191-194 depict a variety of styles of blade plates that can used to form the cut edge of a blade portion. These options may provide more flexibility to utilize sharper or more durable materials than can formed through the casting process without incurring unnecessary expense. FIG. 191 for example, comprises a blade plate 302BC having a superior positioned cut edge 132BC with an opposing primary edge face 134BC and secondary edge face 136BC extending in a wedged configuration from it. A blade plate undercut 303BC extends across the back of the blade plate 302BC with blade clamp holes 145BC extending therethrough for fastening the blade plate 302BC to the body of the blade portion. Integrated with the blade plate and extending perpendicular is secondary blade 120BC. FIG. 193 is a blade plate 302BD sized for capping a secondary blade. It too comprises a blade plate undercut 303BD. FIG. 194 illustrates yet another embodiment of a secondary blade 120BE configured for fastening to a primary blade. It comprises a primary deflector face 138BE and a second deflector face 140BE. One or more fixation pods 305BE are utilized for fixation to a primary blade using welds or fasteners through blade clamp holes 145BE.

FIGS. 195 and 196 illustrate various sized envelope volumes in which selected embodiments of the article of invention may fit. Preferred embodiments of the invention are attractive due at least to their small size, portability and reduced material/weight when compared to wood splitters of the prior art. FIG. 195 for example, illustrates an envelope size in which selected wood splitter embodiments comprising a ball space for fitting over a hitch ball would fit (100BF for example). In this case, an (X, Y, Z) envelope may be (4"×4"×7"), and alternatively (6"×6"×8"), and alternatively (8"×8"×10"). FIG. 196 for example, illustrates an envelope in which selected wood splitter embodiments disclosed herein comprising a fixation portion operable to fit in a receiver cavity of a hitch receiver would fit (100BG for example). In this case, an (X, Y, Z) envelope may be (13"×3.5"×6"), and alternatively (14"×5"×7"), and alternatively (16"×7"×12"). In some cases, removal of the guide portion significantly reduces the size of the envelope needed to house the remaining portions of the wood splitter. For example, a splitter of the form illustrated in FIG. 188-188B can fit in an (X, Y, Z) envelope (13"×3.5"×3.5") or slightly more generous envelope of (14"×4"×4").

FIGS. 197-201 illustrate yet another embodiment of a wood splitter 100BZ. In this embodiment, wood splitter 100BZ is equipped for mounting on European style ball mount 340BZ. This European style of ball mount is illustrated as equipped for sliding into a hitch receiver of a vehicle and pinned if so desired with hitch pin 112BZ. Here the ball mount is in the form of a substantially square bar but could also be a tube and can assume other profiles besides square as previously discussed. The ball mount may alternatively use other known fixation mechanisms for attachment to a vehicle known to those skilled in the art.

In this embodiment, European style ball mount 340BZ comprises a torso 874BZ extending outward and upward from a proximal end of the ball mount. A neck 872BZ extends substantially vertical from a proximal end of torso 874BZ effectively elevating the wood splitter 100BZ above the hitch receiver (i.e. 2-6 inches for example). The neck and bar may be a bar or tube and assume a variety of cross-sectional profiles beside the round profile shown here. At the superior end of neck 872BZ is hitch ball 334BZ of substantially spherical shape and replicating one of the hitch ball sizes discussed earlier. At a superior end of hitch ball 334BZ is first ball flat 870BZ, a substantially flattened area.

As illustrated, blade portion 102BZ of wood splitter 100BZ comprises a blade housing 342BZ having an upward facing cut edge 132BZ. Extending below the cut edge are opposed primary deflector face 138BZ and secondary deflector face 140BZ that inferiorly diverge. A respective primary edge face 134BZ and secondary edge face 136BZ may also be present between the cut edge and deflector faces. Cut edge 132BZ is illustrated here as centered over blade housing 342BZ but may be offset to one side as previously illustrated in FIG. 104 (also see FIG. 203).

Providing access into ball space 354BZ for housing the hitch ball is ball window 884BZ. The ball window is defined by ball window face 886BZ and is sized and shaped, typically round, for passing through outer face 842BZ a hitch ball along the mount-unmount path illustrated in FIG. 200. In addition, generally U-shaped neck collar 880BZ defined by collar face 882BZ extends into blade housing 342BZ. Neck collar 880BZ is sized and shaped (vertical channel) to receive neck 872BZ therein. Therefore, during mounting of the wood splitter 100BZ on the hitch ball 334BZ, hitch ball 334BZ and neck 872BZ pass through the ball window and collar until substantially centered in blade housing 342BZ. The blade housing is then lowered until the hitch ball 334BZ is seated in ball space 354BZ against capture face 352BZ which defines the substantially spherical ball space. In addition, first ball flat 870BZ and a complementing second ball flat 871BZ at the superior end of the ball space are seated against each other to provide further stability during splitting operations. Wood splitter 100BZ in this embodiment comprises a blade portion locking mechanism illustrated here in the form of a neck pin 876BZ for removable placement in neck pin hole 878BZ. The neck pin hole extends across neck collar 880BZ from an outer face 842BZ. The neck pin and neck pin hole include cooperating threads in some embodiments. The neck pin hole is positioned such that an inserted neck pin will capture neck 872BZ within neck collar 880BZ thereby fixing blade portion 102BZ upright for splitting purposes. Removing neck pin 876BZ provides for removal by lifting the blade portion 102BZ such that the hitch ball and neck can escape through the ball window and neck collar. Like other embodiments, a log boss 492BZ may be positioned on one end of the cut edge 132BZ.

FIGS. 202 and 203 illustrate yet another embodiment of a wood splitter 100BY. The fixation portion 104BY, torso 874BY, and neck 872BY replicate the embodiment of FIG. 197. Fixed (i.e., welded, threaded, pinned, pressed) or removably fixed (i.e., FIG. 92) to the superior end of neck 872BY is blade portion 102BY. At the superior end of blade portion 102BY is upwardly facing cut edge 132BY with one or more pairs of diverging deflector faces and edge faces.

FIGS. 206 and 207 illustrate examples of various forms of blade caps for covering the blade of a wood splitter during non-use. As noted in FIG. 206, blade cap 900AY comprises an outer cap face 904AY and an inner cap face 902AY. The inner cap face defines a blade cavity 906AY having a form complementing the shape of the blade portion which in this embodiment is an ‘T’ shaped blade. In preferred forms, a control fixator 910AY is secured to the outer cap face. The control fixator can assume a variety of forms such as one or more of an elastic band, a tie, a magnet, and a Velcro strip. The elongate forms of the control fixator can be wrapped around the blade portion for fixation and released for removal. Similarly, blade cap 900AX also comprises an outer cap face 904AX and an inner cap face 902AX. The inner cap face defines a blade cavity 906AX again having a form complementing the shape of the blade portion which in this embodiment is substantially a straight edge. Again, one or more control fixators 910AX may be used assuming a variety of forms as introduced previously. In one embodiment, the control fixator is in the form of a magnet or magnetic strip secured to a control surface 908AX on the outer cap face and/or inner cap face. During storage, the magnets secure the blade cap over the blade. During operation, the blade cap can be completely removed or stored using magnetic force at the superior end of the ball space as also illustrated in FIG. 207. In this configuration, the outer cap face 904AX is preferred to complement the superior end of the ball space of blade portion 102AX. In other embodiments, the blade cap comprises one or more band posts 912AX, 912AY for retaining bands utilized to hold the blade cap in place. The band post can be configured to hold the retaining bands from separating from the blade cap and/or hold it in a designated position on the blade cap. The retaining bands can be formed to stretch around a feature of the splitter such as around a portion of the blade portion yet still be quickly removed. In one embodiment, the control fixator is in the form of a retaining band that can be stretched about the entire ball mount thereby holding both the blade cap and blade portion 102AX from undesired removal from the ball mount such as when the vehicle is in motion.

FIGS. 208-225 illustrate various forms of multi-function jack stands (i.e., 699CA) with secondary support 698 for supporting material handling and other utility accessories. Note that the secondary support can be used with a variety of jack stands such as but not limited to those with pinned aligned bores lift arms (i.e., FIG. 152) and those having toothed jack stand lift arms (i.e., FIG. 169B). In FIG. 208 for example, jack stand base 700CA comprises a base tongue 936CA extending inward from a base wall 703CA. In this embodiment, the base tongue is substantially horizontal and intersects axis XX that extends upward through base aperture 705CA of base wall 703CA. In this embodiment, a support collar 918CA in the form of a tube extends between base aperture 705CA and upper tongue surface 938CA, however, in other embodiments, the support collar only extends part of the distance. One or more welds 304CA may be used to secure the support collar in place. Support collar 918CA is sized and shaped to house a portion of an elongate support member therein to provide support and stability to the elongate support member. Support collar 918CA in this embodiment extends towards the top of jack stand base 700CA or may be trimmed just superior to base wall 703CB as illustrated in FIG. 209. A positional lock such as a set screw 516CA, locking pin, locking nut, other apparatus known in the art can be utilized to hold a desired rotational position of an elongate support member housed in a secondary support of a multi-function jack stand.

FIGS. 210-211 illustrate components of the secondary support 698CB of the FIG. 209 embodiment. Here, support collar 918CB is in the form of a tube having an exterior collar face 927CB and an inner collar face 924CB defining a support collar channel 926CB extending therethrough. A superior collar face 920CB extends between the inner collar face and exterior collar face at the superior end. An inferior collar face 922CB extends between the inner collar face and exterior collar face at the inferior end. In this embodiment, a support strut 928CB comprises a first strut end 930CB and a second strut end 932CB whereby the support strut extends between opposing base walls 703CB and is secured by means such as welding 304CB or fastening to the base wall 703CB. In some embodiments, the support strut 928CB comprises a support hole 934CB extending through a superior strut face 933CB of the support strut. The support hole 934CB is sized to house just the terminal point (i.e. 958CH) of an elongate support member such as elongate support member 802CH, or sized to pass the entire diameter of the elongate support member while still providing radial support.

FIGS. 212 and 213 illustrate a jack stand base 700CD having a removable secondary key 940CD sized and shaped for housing within a secondary key recess 944CD of jack neck 734CD. The secondary key serves as a back up lock to hold the jack stand lift arm 702CD in the desired position even if the cam lock fails (the primary locking mechanism). This secondary key can be integrated in any of the toothed jack stands disclosed herein. Note in addition to base windows 758CD, the jack stand base 700CD can comprise one or more base reliefs 759CD extending upwards from the inferior base surface 726CD.

FIGS. 214-216 illustrate further embodiments of jack stand bases with multi-function jack stand secondary support 698CE. FIG. 214 for example, introduces a tongue coupler 948CE fixed to the superior strut face 933CE of support strut 928CE. Here the tongue coupler is in the form of a tube with the inside of the tube sized and shaped for housing the inferior end of an elongate support member. Alternatively, jack stand base 700CF (FIG. 215) illustrates a base tongue 936CF with a support hole 934CF extending therethrough as described earlier. In this embodiment, a support collar is absent, and therefore base aperture 705CF and the support hole provide the radial support to an elongate support member. This configuration is further illustrated in FIGS. 217 and 218 whereby an elongate support member 802CH (here as a part of a material support assembly 800CH) extends through base aperture 705CH and supported by upper tongue surface 938CH of base tongue 936CH. Point 958CH is housed in support hole 934CH. In yet another alternative, FIG. 216 illustrates where extending upward from the base tongue is a tongue pin 946CG. The tongue pin is received in an inferior recess of an elongate support member to provide an alternative method of fixation to a removable elongate support member. Also illustrated is cam arm hole 737CG that extends through jack neck outer face 697CG of jack neck 734CG for seating a portion of a cam arm. Similarly, cam arm hole 737DC is depicted in FIG. 239 for seating cam arm 736DC and as a further example, a cam arm hole is depicted in FIG. 236 extending through jack neck outer face 697DA.

FIGS. 222 and 223 illustrate yet additional alternative embodiments of support for the inferior end of an elongate support member. In FIG. 222, the elongate support member extends through support hole 934CH and is supported by a ground surface (i.e., garage floor). In FIG. 223, the elongate support member also extends through support hole 934 CM and is supported by both the ground and point 958 CM being driven into the ground (i.e., dirt/grass).

FIGS. 220-221 illustrate an embodiment of a multi-function jack stand whereby support is provided to an elongate support member 802CK by one or more coupler arms extending from a side of a jack stand lift arm 702CK. In this embodiment, opposed coupler arms 952CK extend from first arm face 772CK. An inner coupler face 954CK extends down the coupler arms along axis WW and form coupler channel 956CK for removable housing of elongate support member 802CK therein. As illustrated, base aperture 705CK is aligned with coupler channel 956CK. Also as disclosed in FIG. 220, any of the jack stand bases disclosed herein can include one or more stake apertures 982CK extending through base wall 703CK between inner base face 733CK and outer base face 735CK. This feature provides the option to stake the jack stand base to the ground in the event additional stability is required. In preferred embodiments, the stake apertures are spaced just above (i.e. 0.25-2.0 inch) the inferior end of the jack stand base 700CK and are located at the four corners of the jack stand base, however, they can vary in number and be located at other positions in the base wall such as along the substantially straight sides. The stake apertures are sufficient in size to extend a stake 984CK through, however also small enough so as to not compromise the structural integrity of the base wall 703CK.

FIG. 219 illustrates a multi-function jack stand 699CJ with removable elongate support member 802CJ. The superior end of the elongate support member, the support member receiver 803CJ, can be solid or comprise a support member cannula 811CJ and is available for attachment of accessories.

As illustrated earlier in at least FIGS. 169A-169Q, jack stands can include secondary support features such as multi-purpose hole 776AT extending inferiorly from support surface 765AT of jack stand lift arm 702AT. Also illustrated, the secondary support features can be integrated into the jack stand base. FIGS. 224-234 illustrate some additional examples of accessories that can be used with a multi-function jack stand. FIG. 226 for example, depicts a utility light 960CP configured for mating with a multi-function jack stand as disclosed herein. The utility light 960CP comprises a light body 962CP for securing various components of the light together such as an emitter 963CP (i.e. LED bulb or other light bulb), one or more of a battery 966CP for wireless power and a power cord 968CP for wired power, an accessory stem 972CP operable for mating with an elongate support member or other jack stand secondary support. The accessory stem preferably comprises a single or poly-axial joint 970CP for adjusting the direction of the light. The accessory stem comprises a first stem surface 976CP defining the accessory stem. A stem stop 974CP can be present for positioning height. The accessory stem 972CP is operable to seat within or over a support member receiver 803CQ. For example, support member receiver 803CN of FIG. 224 comprises a cannula 811CQ (FIG. 228) defined by support member inner surface 807CG for seating the accessory stem therein. Alternatively, the stem can be configured to fit over the support member receiver as illustrated with the accessories of FIGS. 232-234. As yet another alternative, the accessory stem 972CP can be seated in multi-purpose hole 776 of a jack stand lift arm as illustrated in FIG. 225.

FIG. 224 also illustrates an elongate support member 802CN operable for seating within the multi-purpose hole of a jack stand lift arm. Alternatively, a reduced diameter point 958CN extending from the elongate support member at support member base end 805CN can be housed in the multi-purpose hole. In the embodiment of FIG. 224, the elongate support member is illustrated as telescoping and therefore adjustable in length, however, the elongate support member can alternatively be fixed in length or adjustable for all embodiments disclosed herein.

FIG. 227 illustrates the use of a multi-function jack stand with integrated secondary support and elongate support member utilized to support a screen 990CR which can also be in the form of one of a drape, drop cloth, curtain, and backdrop. A screen arrangement can be used to provide a backdrop for pictures, to contain overspray when painting, to serve as a screen for slideshows or projected movies, or to serve as a room divider etc. The screen 990CR preferably comprises one or more screen retainers 992CR of various forms such as but not limited to one of a hole, a grommet, and a material loop or flap fastened to the screen. The screen retainers can integrate Velcro or similar materials for quick fastening and unfastening. In this embodiment, the screen retainer is in the form of a hole extending through the screen 990CR near two opposing corners. Alternatively, screen 990CR can be in the form of a target. Although not limited to, the target can be any one or more of rigid or semi-rigid such as paper, cardboard, plastics, wood or steel. The target can also be flexible such as a cloth, paper, or plastic sheet. In some embodiments, the target can include a Velcro or similar material portion on the broad face of the screen and used for example for target games where a Velcro faced toy is thrown at the target symbol 994CR affixed or imprinted on one of the broad faces 991CR of screen 990CR. In some embodiments, the screen 990CR with target symbol 994CR with or without center bullseye is utilized for target practice with bb-guns or firearms whereby the multi-function jack stands 699CR serve as a convenient means to hold the screen 990CR upright. Similarly, the target can be utilized for other games that require aim such as bow and arrow, pitching and kicking.

Illustrated in FIGS. 228-230 are various accessories for securing devices such as a screen to an elongate support member. For example, FIG. 228 depicts an elongate support member having a utility aperture 978CQ extending into inner rod 804CQ (note the inner rod and outer rod positions may be swapped in various embodiments). The utility aperture can be threaded for engagement with utility fastener 980CQ which is used to support the screen through a screen retainer 992CR. The utility fastener can assume a variety of forms including but not limited to a threaded screw, hook, and spring clip. In this embodiment, two multi-function jack stands are spaced and utilized to support the screen, however any number can be utilized as needed by the specific task. FIGS. 229-230 illustrate embodiments of hanger accessories for use with an elongate support member. In FIG. 229, the hanger accessory comprises a first stem surface 976CS defining accessory stem 972CS that is operable for fit within a support member cannula 811CS of an elongate support member 802. Extending from a superior end of the hanger accessory is a hanger 979CS that is generally elongate and, in this embodiment, has a free end extending radially and sloping upwards. Alternatively, as with other accessories disclosed herein, the accessory stem 972CS is operable for fit over the support member receiver 803CQ at the superior end of the elongate support member. Here, the accessory stem comprises a second stem surface 975CS defining a stem cavity 977CS operable for fit of the support member receiver therein. The hanger 979CS can vary in length depending on the intended purpose. For example, the hanger may be short (i.e. 1") if needed only to extend through a screen, or longer (i.e. 4") if needed to support a coiled extension cord for example. In alternative embodiments, the hanger is in the form of an upward U-shape centered over the central axis of the accessory stem. An object such as a coiled extension cord is then hung between the two legs of the U.

FIG. 231 depicts a camera mount 890CT as yet another accessory for use with an elongate support member and multi-function jack stand. As illustrated, the camera mount 890CT comprises a retainer arm body 896CT having a first retainer arm 892CT and opposed second retainer arm 894CT extending therefrom for fitting a smart phone therebetween. An accessory stem 972CT extends from one end of the retainer arm body 896CT and is defined by a first stem surface 976CT for fit into a support member cannula 811 of an elongate support member. A uni-axial or poly-axial joint 970CT can be utilized to provide camera direction adjustment. This simple accessory is helpful in a pinch when a traditional tripod is unavailable for use.

FIG. 232-234 illustrate various forms of material support pods. In these embodiments, an accessory stem 972 extends from an inferior surface of a material support pod 812CU/812CV/812CW. The material support pod 812CU in FIG. 232 is illustrated as substantially circular but can assume other non-circular shapes. Each can include a retainer wall 817CU/817CV/817/CW to contain objects placed on work platform 820CU/820CV/820CW of the respective material support pod. The material support pod 812CV/812CW of FIGS. 233-234 comprise a plurality of spaced arms 813CV/813CW. Each spaced arm can be utilized for example as a convenient place to hang extension cords or ropes. In the configurations illustrated, the material support pod is also operable to support a can of paint such a quart size or gallon size as an ergonomic benefit during painting by elevating the paint can off the floor. The retainer wall is sized to hold position of the paint can therein. As illustrated previously, the accessory stem can be configured for fit over the support member receiver or inside the support member receiver of an elongate support member. In an alternative embodiment, the support member receiver of the elongate support member is threaded and threads directly into complementary threads extending into the bottom side of a material support pod. In this configuration, an accessory stem may be absent.

One example of a method of use of a jack stand wood splitter 715AB using a cover blade comprises the following steps. The user obtains a jack stand assembly 716AB and places it on a ground surface. The user then obtains a cover blade 708AB and aligns cover blade cavity 710AB with the top of lift pod 711AB of jack stand lift arm 702AB and lowers the cover blade 708AB until base surface 344AB rests on the superior end of lift pod 711AB. The user then places one end of a log on top of cut edge 132AB and impacts the other end of the log causing it to split with pieces falling to the ground. In a second method in accordance with the FIG. 155 embodiment, the user again obtains a jack stand assembly 716AB and places it on a ground surface. The user removes jack stand lift arm 702AB and substitutes it with jack stand blade arm 704AB and locks into position with jack pin 706AB. The user then places one end of a log on top of cut edge 132AB of jack stand blade arm 704AB and impacts the other end of the log causing it to split with pieces falling to the ground.

In one embodiment, a method for splitting wood in accordance with the disclosed invention comprises one or more of the following steps as illustrated in FIG. 149. Obtaining a wood splitter (580) having a blade portion and a fixation portion extending from the blade portion and wherein the blade portion comprises an upward facing cut edge situated between a primary deflector face and a secondary deflector face and wherein at least a portion the fixation portion is sized and shaped to be received in a hitch receiver of a vehicle. Then obtaining a vehicle having a hitch receiver (582). Aligning the fixation portion of the wood splitter with the receiver cavity of the vehicle's hitch receiver (584). Sliding at least a portion of the fixation portion of the wood splitter into the receiver cavity whereby the wood splitter is supported entirely by the hitch receiver (586). Optionally aligning a fixation bore on the fixation portion with a pin hole of the hitch receiver (588). Optionally securing the wood splitter with a hitch pin (590). Optionally placing a collector under the wood splitter (and angling if so desired) to collect wood pieces (592). Removing and/or repositioning blade covers if present and couple guide portion and/or reset guide mode as desired (594). Reattaching removable edge portion and other blade portions if so equipped (596). Grasping a log to be split preferably from its side by hand or grasping tool (598). Positioning a log in any one of the following positions with respect to the wood splitter: against a guide surface of a guide portion (600), within a guide aperture (602), over blade with guide absent (604), over blade with guide in open mode (606). Positioning the end of the log to be split on the upward facing cut edge of a primary blade of the blade portion (610) and simultaneously optionally positioning the log against a log boss if present (608) and optionally positioning log over both primary and secondary blade if present (612). Grasping an impactor such as a hammer or mallet (614). Impacting the opposing end of the log with sufficient force to cause it to split and wood pieces to fall to ground or into a collector if present (616). Repeating the process to split the next log (618).

In one embodiment (FIG. 150), a method for splitting wood in accordance with the disclosed invention comprises one or more of the following steps. Obtaining a vehicle having a hitch receiver (630). Obtaining a ball mount with a hitch ball secured thereon (632). Aligning the ball mount with the receiver cavity of the vehicle's hitch receiver (634). Sliding at least a portion of the ball mount into the receiver cavity (636). Optionally aligning a fixation bore on the ball mount with a pin hole of the hitch receiver (638). Optionally securing the ball mount with a hitch pin (640). Optionally placing a collector under the wood splitter (and angling if so desired) to collect wood pieces (642). Obtaining a wood splitter with blade portion having an internal ball space in a fixation portion and placing it over the hitch ball such that the hitch ball occupies the ball space (644). Removing and/or repositioning blade covers if present and couple guide portion and/or reset guide mode as desired (646). Reattaching removable edge portion and other blade portions if so equipped (648). Grasping a log to be split preferably from its side by hand or grasping tool (650). Positioning a log in any one of the following positions with respect to the wood splitter: against a guide surface of a guide portion (652), within a guide aperture (654), over blade with guide absent (656), over blade with guide in open mode (658). Positioning the end of the log to be split on the upward facing cut edge of a primary blade of the blade portion (662) and simultaneously optionally positioning the log against a log boss if present (660) and optionally positioning log over both primary and secondary blade if present (664). Grasping an impactor such as a hammer or mallet (668). Impacting the opposing end of the log with sufficient force to cause it to split and wood pieces to fall to ground or into a collector if present (670). Repeating the process to split the next log (672). When finished, the user lifts the blade portion and wood splitter off the hitch ball making the hitch ball available for use in towing.

In one embodiment (FIG. 254), a method of converting a jack stand into a jack stand wood splitter and splitting wood in accordance with the disclosed invention comprises one or more of the following steps. Obtaining a jack stand having a jack stand base with a jack neck substantially centered in the jack stand base and an adjustable lift arm (1050). Removing the jack stand lift arm, typically using an axial force, from the base cavity of the jack stand base (1052). Obtaining a jack stand blade arm having a lift trunk sized and shaped for sliding engagement within the base cavity of the jack stand base (1054). Leading with the lift trunk inferior face, aligning then sliding the lift trunk of the jack stand blade arm into the superior end of the base cavity (1056). Securing the lift arm in a desired position in relation to the base cavity by the use of at least one of: a jack pin, a trunk stop, a clamp, and a trunk tooth (1058). Installing the wood splitter with blade portion on the superior end of the lift trunk if needed (1060). Optionally positioning a collector under the blade portion of the wood splitter to collect kindling (1062). Obtaining a log/wood and placing one end on top of the cut edge (1064). Impacting the superior facing end of the log/wood with an impactor and directing kindling pieces into the collector if so equipped (1066).

In one embodiment (FIG. 255), a method of converting a jack stand into a jack stand wood splitter and splitting wood in accordance with the disclosed invention comprises one or more of the following steps. Obtaining a jack stand comprising a jack stand base and a jack stand lift arm (1070). Obtaining a jack stand cover blade (wood splitter) configured for fit over the lift pod of the jack stand lift arm (1072). Lowering the cover blade so the lift pod is seated in the cover blade cavity and securing if desired (i.e., fasteners, pins etc.) (1074). Optionally, positioning a collector under the blade portion of the wood splitter (1076). Placing a log on top of the cut edge of the cover blade (1078), and impacting the superior end of the log with an impactor (1080).

In one embodiment (FIG. 256), a method of converting a jack stand of the type illustrated in FIG. 175 into a jack stand wood splitter and splitting wood in accordance with the disclosed invention comprises one or more of the following steps. Obtaining the jack stand comprising a jack stand base with inward sloping base walls and if necessary, removing the associate threaded post and nut lift pad (1084). Obtaining a jack stand cover blade (wood splitter) with cover blade cavity configured for fit over and supported by the base wall of the jack stand (1086). Lowering the cover blade so the base walls of the jack stand base are seated in the cover blade cavity (1088). Optionally, positioning a collector under the cover blade (1090). Placing a log on top of the cut edge of the cover blade (1092), and impacting the superior end of the log with an impactor (1094) to cause consequent splitting of the log.

In one embodiment (FIG. 257), a method of converting a jack stand into a multi-function jack stand in accordance with the disclosed invention comprises one or more of the following steps. Obtaining a jack stand having a jack stand base and adjustable height jack stand lift arm (1096). Removing the lift arm from the base cavity of the jack stand base (1098). Obtaining an elongate lift trunk having a multi-purpose hole extending down at least a portion of the lift trunk from a superior end and having a working portion sized and shaped for seating within the base cavity of the jack stand base (1100). Aligning then sliding the lift trunk into the base cavity of the jack stand base (1102). Securing the lift arm in a desired position using one of a pin, a stop, a clamp, and a tooth (1104). Performing at least one of the following: inserting the inferior end of an elongate support member into the multi-purpose hole and attaching accessories to the elongate support member (1106), attaching accessories directly to the superior end or outside of the lift trunk (1108) (i.e., wood splitter 100DK FIG. 252), attaching accessories within the multi-purpose hole (1110).

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Terms such as inferior, superior, and lateral reflect locations relative to the position of the tool during operation.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A multi-functional tool in an operable configuration comprising:
a jack stand base;
said jack stand base having a substantially pyramid profile defined by 3 to 4 base walls;
a jack neck;
said base walls sloping toward said jack neck;
said jack neck centered between and extending upwards from said base walls;
said jack neck fixed in position relative to said base walls;
said jack neck comprising a jack neck inner face;
said jack neck inner face defining an internal base cavity extending vertically through said jack neck;
an elongate lift trunk;
said lift trunk configured for seating within said base cavity for vertical support of said lift trunk;
said lift trunk terminating on a superior end with any one of a superior face, a lift pod forming a jack stand lift arm, and a blade portion forming a jack stand blade arm;
said lift pod extending from said superior end of said lift trunk operable for supporting a heavy object thereon;
a multi-purpose hole;
said multi-purpose hole extends vertically into at least one of said lift trunk and said base walls and is operable to receive accessories for support by said multi-functional tool;
said jack stand blade arm comprising a pair of opposing deflector faces;
said jack stand blade arm comprising an upward facing cut edge; and,
wherein said opposing deflector faces descend from said cut edge forming a wedge.

2. The multi-functional tool of claim 1 further comprising:
an elongate support member;
said elongate support member operable on one end for seating in said multi-purpose hole thereby vertically supporting said elongate support member.

3. The multi-functional tool of claim 2 wherein said elongate support member is adjustable in length between opposing ends of said elongate support member.

4. The multi-functional tool of claim 2 further comprising:
said multi-functional tool in the form of a first multi-functional tool;
said elongate support member in the form of a first elongate support member;
a second multi-functional tool with a second elongate support member;
at least one item from a group of a screen, a flag, a target and a sign;
wherein said at least one item from said group is at least partially vertically supported by said first elongate support member and said second elongate support members.

5. The multi-functional tool of claim 2 further comprising:
a material support pod;
an accessory stem extending downward from said material support pod;

said accessory stem operable to engage a superior end of said elongate support member thereby stabilizing said material support pod at an elevated position.

6. The multi-functional tool of claim 5 wherein said material support pod is in the form of an elongate roller for low resistance material handling assistance.

7. The multi-functional tool of claim 5 further comprising:

said material support pod having an upward facing work platform operable to support a bottom of a paint container.

8. The multi-functional tool of claim 5 further comprising:

one or more arms radiating outward from said accessory stem operable for supporting items placed on said arms.

9. The multi-functional tool of claim 1, the jack stand lift arm further comprising:

a coverblade;

said coverblade comprising opposed deflector faces;

said coverblade comprising an upward facing cut edge;

said opposed deflector faces descending from said cut edge to form a wedge;

a plurality of capture faces;

a ceiling face;

said capture faces extending from an inferior end of said coverblade upwards into said coverblade and terminating at a ceiling face to define a coverblade cavity;

said coverblade cavity configured to house at least a portion of said lift pod thereby securing said coverblade on said lift pod during splitting operations against lateral, torsional, and downward forces.

10. The multi-functional tool of claim 9 wherein said coverblade comprises a rounded elevated mass at each end of said upward facing cut edge of said coverblade for user protection from said cut edge during splitting operations.

11. The multi-functional tool of claim 1 wherein said jack stand lift arm is secured in position by a jack pin extending through said lift trunk or a cam engaging a trunk tooth on said jack stand lift arm.

12. The multi-functional tool of claim 9 further comprising:

wherein said plurality of capture faces defining said coverblade cavity rest on said base walls of said jack stand base during splitting operations.

13. The multi-functional tool of claim 1 wherein said lift trunk comprises an immovable enlarged trunk stop on its outer surface to control position of said lift trunk with respect to said jack neck.

14. The multi-functional tool of claim 1 wherein at least a portion of said jack neck inner face is threaded.

15. The multi-functional tool of claim 9 wherein said coverblade comprises a blade anchor extending downward for seating in said internal base cavity.

16. The multi-functional tool of claim 9 wherein said coverblade cavity comprises two pairs of opposed sloped and opposing capture faces.

17. The multi-functional tool of claim 1 wherein said lift trunk comprises an immovable enlarged trunk stop disposed on the lift trunk to serve as a positional fixation support with respect to said jack neck.

18. The multi-functional tool of claim 5 wherein said material support pod comprises a cradle having a pair of spaced roller wheels operable for cupping the outer surface of an elongate round member.

19. A multi-functional tool in an operable configuration comprising:

a jack stand base;

said jack stand base having a substantially pyramid profile defined by 3 to 4 base walls;

a jack neck;

said base walls sloping toward said jack neck;

said jack neck centered between and extending upwards from said base walls;

said jack neck fixed in position relative to said base walls;

said jack neck comprising a jack neck inner face;

said jack neck inner face defining an internal base cavity extending vertically through said jack neck;

an elongate lift trunk;

said lift trunk configured for seating within said base cavity for vertical support of said lift trunk;

said lift trunk terminating on a superior end with a lift pod forming a jack stand lift arm;

said lift pod extending from said superior end of said lift trunk operable for supporting a heavy object thereon;

a coverblade;

said coverblade comprising opposed deflector faces;

said coverblade comprising an upward facing cut edge;

said opposed deflector faces descending from said cut edge to form a wedge;

a plurality of capture faces;

a ceiling face;

said capture faces extending from an inferior end of said coverblade upwards into said coverblade and terminating at said ceiling face to define a coverblade cavity;

said coverblade cavity configured to house at least a portion of said lift pod thereby securing said coverblade on said lift pod during splitting operations against lateral, torsional, and downward forces.

20. The multi-functional tool of claim 19 wherein said coverblade comprises a rounded elevated mass at each end of said upward facing cut edge of said coverblade for user protection from said cut edge during splitting operations.

* * * * *